(12) United States Patent
Laine et al.

(10) Patent No.: US 12,327,871 B2
(45) Date of Patent: Jun. 10, 2025

(54) POLYMER PRECURSORS FOR SOLID STATE ELECTROLYTES

(71) Applicant: THE REGENTS OF THE UNIVERSITY OF MICHIGAN, Ann Arbor, MI (US)

(72) Inventors: Richard M. Laine, Ann Arbor, MI (US); Eleni Temeche, Ann Arbor, MI (US); Xinyu Zhang, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 1038 days.

(21) Appl. No.: 17/271,244

(22) PCT Filed: Aug. 30, 2019

(86) PCT No.: PCT/US2019/049155
§ 371 (c)(1),
(2) Date: Feb. 25, 2021

(87) PCT Pub. No.: WO2020/047470
PCT Pub. Date: Mar. 5, 2020

(65) Prior Publication Data
US 2021/0340011 A1 Nov. 4, 2021

Related U.S. Application Data

(60) Provisional application No. 62/725,731, filed on Aug. 31, 2018.

(51) Int. Cl.
*H01M 4/62* (2006.01)
*C01B 21/082* (2006.01)
(Continued)

(52) U.S. Cl.
CPC .......... *H01M 4/62* (2013.01); *C01B 21/082* (2013.01); *H01M 4/131* (2013.01);
(Continued)

(58) Field of Classification Search
CPC .......... C01B 21/0823; C01B 21/082; H01M 50/403–497; H01M 10/0525;
(Continued)

(56) References Cited

U.S. PATENT DOCUMENTS 3,685,974 A * 8/1972 Silverstri .............. C01B 21/082
423/302
4,244,986 A 1/1981 Paruso et al.
(Continued)

FOREIGN PATENT DOCUMENTS

CN 105720254 A 6/2016
CN 107365151 A 11/2017
(Continued)

OTHER PUBLICATIONS

Kim et al., KR 20180003682 A EPO machine translation, 2018 (Year: 2018).*
(Continued)

*Primary Examiner* — Jonathan G Leong
*Assistant Examiner* — Kan Luo
(74) *Attorney, Agent, or Firm* — Harness, Dickey & Pierce, P.L.C.

(57) ABSTRACT

A method of synthesizing a precursor for making a polymer, glass, or ceramic material is provided. The method includes reacting $OPCl_3$ with $NH_3$ or $MNH_2$, where M is Li, Na, K, Mg, Ca, Ba, or combinations thereof, to form $O{=}P(NH2)_3$. The method then includes either: (i) reacting the $O{=}P(NH_2)_3$ with $M1NH_2$, where M1 is Li, Na, K, Mg, Ca, Ba, or combinations thereof, to form the precursor; or (ii) heating the $O{=}P(NH_2)_3$ to form a branched or cyclomeric
(Continued)

compound, and reacting the branched or cyclomeric compound with M1NH$_2$, where M1 is Li, Na, K, Mg, Ca, Ba, or combinations thereof, to form the precursor. The precursor is an oligomer or a polymer. Uses for the precursor and the polymer, glass, or ceramic material as binders, sintering aids, adhesives, and electrolytes in battery components are also provided.

18 Claims, 86 Drawing Sheets

(51) Int. Cl.

| | |
|---|---|
| H01M 4/131 | (2010.01) |
| H01M 4/1391 | (2010.01) |
| H01M 10/0562 | (2010.01) |
| H01M 50/403 | (2021.01) |
| H01M 50/414 | (2021.01) |
| H01M 50/434 | (2021.01) |
| H01M 50/437 | (2021.01) |
| H01M 50/449 | (2021.01) |
| H01M 50/451 | (2021.01) |
| H01M 50/497 | (2021.01) |

(52) U.S. Cl.
CPC ..... *H01M 4/1391* (2013.01); *H01M 10/0562* (2013.01); *H01M 50/403* (2021.01); *H01M 50/414* (2021.01); *H01M 50/434* (2021.01); *H01M 50/437* (2021.01); *H01M 50/449* (2021.01); *H01M 50/451* (2021.01); *H01M 50/497* (2021.01); *H01M 2300/0068* (2013.01)

(58) Field of Classification Search
CPC ..... H01M 10/0562; H01M 2300/0071; H01M 2300/0085; H01M 2300/0068; H01M 4/62; H01M 4/1391; H01M 4/131; H01M 4/0471; H01M 50/449; C03C 1/006; C03C 3/11; C03C 3/16; C03C 4/18
See application file for complete search history.

(56) References Cited

U.S. PATENT DOCUMENTS

| | | | |
|---|---|---|---|
| 5,418,298 | A | 5/1995 | Laine et al. |
| 5,440,011 | A | 8/1995 | Laine |
| 5,614,596 | A | 3/1997 | Laine et al. |
| 5,635,240 | A | 6/1997 | Haluska et al. |
| 5,958,361 | A | 9/1999 | Laine et al. |
| 6,656,588 | B1 | 12/2003 | Laine et al. |
| 6,927,301 | B2 | 8/2005 | Laine et al. |
| 7,220,398 | B2 | 5/2007 | Sutorik et al. |
| 7,247,588 | B2 | 7/2007 | Kwon et al. |
| 7,700,152 | B2 | 4/2010 | Laine et al. |
| 8,242,037 | B2 | 8/2012 | Laine et al. |
| 2001/0009734 | A1 | 7/2001 | Clough |
| 2002/0059708 | A1 | 5/2002 | Zhang et al. |
| 2002/0192137 | A1 | 12/2002 | Chaloner-Gill et al. |
| 2003/0203205 | A1 | 10/2003 | Bi et al. |
| 2005/0227864 | A1 | 10/2005 | Sutorik |
| 2006/0040182 | A1 | 2/2006 | Kawakami et al. |
| 2006/0087062 | A1 | 4/2006 | Laine |
| 2006/0134347 | A1 | 6/2006 | Chiruvolu et al. |
| 2008/0187831 | A1* | 8/2008 | Barker ............ H01M 4/48 429/188 |
| 2010/0209328 | A1 | 8/2010 | Bi et al. |
| 2011/0210658 | A1 | 9/2011 | Pan et al. |
| 2012/0012032 | A1 | 1/2012 | Bi et al. |
| 2012/0244446 | A1 | 9/2012 | Barbarich et al. |
| 2015/0099188 | A1 | 4/2015 | Holme et al. |
| 2017/0069932 | A1 | 3/2017 | Sweeney et al. |
| 2018/0375149 | A1 | 12/2018 | Beck et al. |
| 2018/0375151 | A1 | 12/2018 | Gaben et al. |
| 2019/0177238 | A1 | 6/2019 | Yi et al. |
| 2021/0028444 | A1 | 1/2021 | Laine et al. |

FOREIGN PATENT DOCUMENTS

| | | | |
|---|---|---|---|
| JP | 2013235841 A | 11/2013 | |
| KR | 20090087692 A | 8/2009 | |
| KR | 20180003682 A * | 1/2018 | ........... C01B 21/097 |
| WO | WO-2010011891 A2 | 1/2010 | |
| WO | WO-2017172793 A1 | 10/2017 | |
| WO | WO-2019178099 A1 | 9/2019 | |
| WO | WO-2020047470 A1 | 3/2020 | |

OTHER PUBLICATIONS

International Search Report and Written Opinion regarding International Application No. PCT/US2009/051644, mailed Mar. 5, 2010; ISR/KR.

International Search Report and Written Opinion regarding International Application No. PCT/US2017/024573, mailed Jun. 30, 2017; ISA/KR.

International Search Report and Written Opinion regarding International Application No. PCT/US2019/021851, mailed Jun. 26, 2019; ISA/US.

Adamu, Mohammed et al., "Novel Sol-Gel Synthesis of MgZr$_4$P$_6$O$_{24}$ Composite Solid Electrolyte and Newer Insight into the Mg$^{2+}$-Ion Conducting Properties Using Impedance Spectroscopy." The Journal of Physical Chemistry C, vol. 120, No. 32, pp. 17909-17915 (2016).

Adelhelm, Philipp et al., "From lithium to sodium: cell chemistry of room temperature sodium-air and sodium-sulfur batteries." Beilstein Journal of Nanotechnology, vol. 6, pp. 1016-1055 (2015).

Allen, J.L. et al., "Effect of substitution (Ta, Al, Ga) on the conductivity of Li$_7$La$_3$Zr$_2$O$_{12}$." Journal of Power Sources, vol. 206, pp. 315-319 (May 2012).

Anuar, N.K. et al., "Characterization of Mg$_{0.5}$Zr$_2$(PO$_4$)$_3$ for potential use as electrolyte in solid state magnesium batteries." Ceramics International, vol. 40, No. 8, pp. 13719-13727 (Sep. 2014).

Anuar, N.K et al., "Studies on structural and electrical properties of Mg$_{0.5+y}$(Zr$_{2-y}$-Fe$_y$)$_2$(PO$_4$)$_3$ ceramic electrolytes." Ionics, vol. 22, pp. 1125-1133 (2016).

Aono, Hiromichi et al., "Ionic Conductivity of Solid Electrolytes Based on Lithium Titanium Phosphate." Journal of the Electrochemical Society, vol. 137, No. 4, pp. 1023-1027 (1990).

Azurdia, Jose A. et al., "Liquid-Feed Flame Spray Pyrolysis as a Method of Producing Mixed-Metal Oxide Nanopowders of Potential Interest as Catalytic Materials. Nanopowders along the NiO-Al$_2$O$_3$ Tie Line Including (NiO)$_{0.22}$(Al$_2$O$_3$)$_{0.78}$, a New Inverse Spinel Composition." Chemistry of Materials, vol. 18, No. 3, pp. 731-739 (2006).

Azurdia, Jose A et al., "Systematic synthesis of mixed-metal oxides in NiO-Co$_3$O$_4$, NiO-MoO$_3$, and NiO-CuO systems via liquid-feed flame spray pyrolysis." Journal of Materials Chemistry, vol. 18, No. 27, pp. 3249-3258 (2008).

Azurdia, Jose et al., "Synthesis and Characterization of Mixed-Metal Oxide Nanopowders Along the CoO$_x$-Al$_2$O$_3$ Tie Line Using Liquid-Feed Flame Spray Pyrolysis." Journal of the American Ceramic Society, vol. 89, No. 9, pp. 2749-2756 (Sep. 2006).

Balakrishnan, P.G. et al., "Safety mechanisms in lithium-ion batteries." Journal of Power Sources, vol. 155, No. 2, pp. 401-414 (Apr. 21, 2006).

Baranwal, Rita et al., "Flame Spray Pyrolysis of Precursors as a Route to Nano-mullite Powder: Powder Characterization and Sintering Behavior." Journal of the American Ceramic Society, vol. 84, No. 5, pp. 951-961 (May 2001).

Benato, Roberto et al., "Sodium nickel chloride battery technology for large-scale stationary storage in the high voltage network." Journal of Power Sources, vol. 293, pp. 127-136 (Oct. 20, 2015).

Bickmore, Clint R. et al., "Ultrafine Spinel Powders by Flame Spray Pyrolysis of a Magnesium Aluminum Double Alkoxide." Journal of the American Ceramic Society, vol. 79, No. 5, pp. 1419-1423 (May 1996).

(56) References Cited

OTHER PUBLICATIONS

Bickmore, Clint R. et al., "Ultrafine Titania by Flame Spray Pyrolysis of a Titanatrane Complex." Journal of the European Ceramic Society, vol. 18, No. 4, pp. 287-297 (Apr. 1998).

Bonderer, Lorenz J. et al., "Free-Standing Ultrathin Ceramic Foils." Journal of the American Ceramic Society, vol. 93, No. 11, pp. 3624-3631 (Nov. 2010).

Cao, Yang et al., "Densification and lithium ion conductivity of garnet-type $Li_{7-x}La_3Zr_{2-x}Ta_xO_{12}$ (x=0.25) solid electrolytes." Chinese Physics B, vol. 22, No. 7, pp. 078201-1-078201-5 (2013).

Cohn, Adam P. et al., "Anode-Free Sodium Battery through in Situ Plating of Sodium Metal." Nano Letters, vol. 17, No. 2, pp. 1296-1301 (2017).

Djenadic, Ruzica et al., "Nebulized spray pyrolysis of Al-doped $Li_7La_3Zr_2O_{12}$ solid electrolyte for battery applications." Solid State Ionics, vol. 263, pp. 49-56 (Oct. 2014).

Dudney, Nancy J., "Addition of a thin-film inorganic solid electrolyte (Lipon) as a protective film in lithium batteries with a liquid electrolyte." Journal of Power Sources, vol. 89, No. 2, pp. 176-179 (Aug. 2000).

Dudney, Nancy J., "Thin Film Micro-Batteries." The Electrochemical Society Interface, vol. 17, No. 3, pp. 44-48 (2008).

Frey, Martin et al., "Easily Accessible, Textile Fiber-Based Sulfurized Poly(acrylonitrile) as Li/S Cathode Material: Correlating Electrochemical Performance with Morphology and Structure." ACS Energy Letters, vol. 2, No. 3, pp. 595-604 (2017).

Gao, Mengyao et al., "A high performance lithium-sulfur battery enabled by a fish-scale porous carbon/sulfur composite and symmetric fluorinated diethoxyethane electrolyte." Journal of Materials Chemistry A, vol. 5, No. 14, pp. 6725-6733 (2017).

Gocha, April, "Say sayonara to exploding batteries—LLZO ceramic thin films offer hope for safer, thinner all-solid state lithium-ions." Ceramic Tech Today, The American Ceramic Society, https://ceramics.org/ceramic-tech-today/say-sayonara-to-exploding-batteries-llzo-ceramic-thin-films-offer-hope-for-safer-thinner-all-solid-state-lithium-ions (Oct. 14, 2016).

Goodenough, J.B. et al., "Fast $Na^+$-ion transport in skeleton structures." Materials Research Bulletin, vol. 11, No. 2, pp. 203-220 (Feb. 1976).

Halim, Z.A. et al., "Effect of sintering temperature on the structural, electrical and electrochemical properties of novel $Mg_{0.5}Si_2(PO_4)_3$ ceramic electrolytes." Ceramics International, vol. 42, No. 3, pp. 4452-4461 (Feb. 15, 2016).

Hamon, Y. et al., "Influence of sputtering conditions on ionic conductivity of LiPON thin films." Solid State Ionics, vol. 177, No. 3-4, pp. 257-261 (Jan. 2006).

Han, Yong Sheng et al., "Effect of Preparation Temperature on the Lattice Parameter of Nickel Aluminate Spinel." Journal of the American Ceramic Society, vol. 87, No. 7, pp. 1347-1349 (Jul. 2004).

Hartmann, Pascal et al., "Degradation of NASICON-Type Materials in Contact with Lithium Metal: Formation of Mixed Conducting Interphases (MCI) on Solid Electrolytes." The Journal of Physical Chemistry C, vol. 117, No. 41, pp. 21064-21074 (2013).

Hayashi, Katsuro et al., "Light-induced conversion of an insulating refractory oxide into a persistent electronic conductor." Nature, vol. 419, pp. 462-465 (Oct. 3, 2002).

Hinklin, Thomas R. et al., "Finding Spinel in All the Wrong Places." Advanced Materials, vol. 20, No. 7, pp. 1373-1375 (Apr. 4, 2008).

Hotza, D. et al., "Review: aqueous tape casting of ceramic powders." Materials Science and Engineering: A, vol. 202, No. 1-2, pp. 206-217 (Nov. 1995).

Ikeda, Shoichiro et al., "Carbon dioxide sensor using solid electrolytes with zirconium phosphate framework." Solid State Ionics, vol. 70-71, No. 1, pp. 569-571 (May-Jun. 1994).

Ikeda, Shoichiro et al., "Solid electrolytes with multivalent cation conduction. 1. Conducting species in $Mg-Zr-PO^4$ system." Solid State Ionics, vol. 23, No. 1-2, pp. 125-129 (Mar. 1987).

Imagawa, Haruo et al., "Garnet-type $Li_{6.75}La_3Zr_{1.75}Nb_{0.25}O_{12}$ synthesized by coprecipitation method and its lithium ion conductivity." Solid State Ionics, vol. 262, pp. 609-612 (Sep. 2014).

Imanaka, N. et al., "Divalent Magnesium Ionic Conduction in $Mg_{1-2x}(Zr_{1-x}Nb_x)_4P_6O_{24}$ (x=0-0.4) Solid Solutions." Electrochemical and Solid-State Letters, vol. 3, No. 7, pp. 327-329 (2000).

Imanaka, Nobuhito et al., "Divalent magnesium ion conducting characteristics in phosphate based solid electrolyte composites." Journal of Materials Chemistry, vol. 10, No. 6, pp. 1431-1435 (2000).

Jalem, Randy et al., "Concerted Migration Mechanism in the Li Ion Dynamics of Garnet-Type $Li_7La_3Zr_2O_{12}$." Chemistry of Materials, vol. 25, No. 3, pp. 425-430 (2013).

Janani, Narayanasamy et al., "Influence of sintering additives on densification and $Li^+$ conductivity of Al doped $Li_7La_3Zr_2O_{12}$ lithium garnet." RSC Advances, vol. 4, No. 93, pp. 51228-51238 (2014).

Kennedy, John H. et al., "Conductivity of Beta-Alumina and Its Dependence on Sodium and Magnesium Content." Journal of the Electrochemical Society, vol. 119, No. 12, pp. 1609-1613 (1972).

Kim, Duho et al., "Rational Design of $Na(Li_{1/3}Mn_{2/3})O_2$ Operated by Anionic Redox Reactions for Advanced Sodium-Ion Batteries." Advanced Materials, vol. 29, No. 33, 1701788 (Sep. 6, 2017).

Kim, Min et al., "Liquid-feed flame spray pyrolysis (LF-FSP) for combinatorial processing of nanooxide powders along the $(ZrO_2)_{1-x}(Al_4O_3)_x$ tie-line. Phase segregation and the formation of core-shell nanoparticles." Journal of Ceramic Processing Research, vol. 8, No. 2, pp. 129-136 (2007).

Kim, Min et al., "Pressureless Sintering t-zirconia@δ-$Al_2O_3$ (54 mol%) Core-Shell Nanopowders at 1120° C. Provides Dense t-Zirconia-Toughened «-Al2O3 Nanocomposites." Journal of the American Ceramic Society, vol. 93, No. 3, pp. 709-715 (Mar. 2010).

Kim, Min, "Mixed-Metal Oxide Nanopowders by Liquid-Feed Flame Spray Pyrolysis: Synthesis and Processing of Core-Shell Nanoparticles." Ph.D. Dissertation, The University of Michigan, pp. 88-103 (May 8, 2008).

Kim, Yunsung et al., "The Effect of Relative Density on the Mechanical Properties of Hot-Pressed Cubic $Li_7La_3Zr_2O_{12}$." Journal of the American Ceramic Society, vol. 99, No. 4, pp. 1367-1374 (Apr. 2016).

Kokal, I. et al., "Sol-gel synthesis and lithium ion conductivity of $Li_7La_3Zr_2O_{12}$ with garnet-related type structure." Solid State Ionics, vol. 185, pp. 42-46 (2011).

Kotobuki, Masashi et al., "Fabrication of all-solid-state lithium battery with lithium metal anode using $Al_2O_3$-added $Li_7La_3Zr_2O_{12}$ solid electrolyte." Journal of Power Sources, vol. 196, No. 18, pp. 7750-7754 (Sep. 15, 2011).

Kwak, Bu Ho et al., "Ni and metal aluminate mixtures for solid oxide fuel cell anode supports." Journal of Power Sources, vol. 185, No. 2, pp. 633-640 (Dec. 2008).

Laine, Richard M. et al., "A New $Y_3Al_5O_{12}$ Phase Produced by Liquid-Feed Flame Spray Pyrolysis (LF-FSP)." Advanced Materials, vol. 17, No. 7, pp. 830-833 (Apr. 2005).

Laine, Richard M. et al., "Mg—Si—Al—O—N Glasses Prepared by Nitriding Cordierite Powders Derived from Polymer Precursors." Materials Research Society Symposium Proceedings, vol. 287, pp. 251-256 (1993).

Laine, Richard M. et al., "Processable aluminosilicate alkoxide precursors from metal oxides and hydroxides. The oxide one-pot synthesis process." Journal of Materials Chemistry, vol. 6, No. 8, pp. 1441-1443 (1996).

Laobuthee, Apirat et al., "$MgAl_2O_4$ spinel powders from oxide one pot synthesis (OOPS) process for ceramic humidity sensors." Journal of the European Ceramic Society, vol. 20, No. 2, pp. 91-97 (Feb. 2000).

Levin, Igor et al., "Metastable Alumina Polymorphs: Crystal Structures and Transition Sequences." Journal of the American Ceramic Society, vol. 81, No. 8, pp. 1995-2012 (Aug. 1998).

Liang, B. et al., "Processing liquid-feed flame spray pyrolysis synthesized $Mg_{0.5}Ce_{0.2}Zr_{1.8}(PO_4)_3$ nanopowders to free standing thin films and pellets as potential electrolytes in all-solid-state Mg batteries." Electrochimica Acta, vol. 272, pp. 144-153 (May 10, 2018).

(56) References Cited

OTHER PUBLICATIONS

Liao, Songyi et al., "Characteristics, Thermodynamics, and Preparation of Nanocaged 12CaO•7Al$_2$O$_3$ and Its Derivatives." International Journal of Applied Ceramic Technology, vol. 13, No. 5, pp. 844-855 (Sep./Oct. 2016).

Liu, Kai et al., "Excess lithium salt functions more than compensating for lithium loss when synthesizing Li$_{6.5}$La$_3$Ta$_{0.5}$Zr$_{1.5}$O$_{12}$ in alumina crucible." Journal of Power Sources, vol. 260, pp. 109-114 (Aug. 2014).

Lu, Xiaochuan et al., "Advanced materials for sodium-beta alumina batteries: Status, challenges and perspectives." Journal of Power Sources, vol. 195, No. 9, pp. 2431-2442 (May 2010).

Matović, Branko et al., "Synthesis and densification of single-phase mayenite (C12A7)." Journal of the European Ceramic Society, vol. 36, No. 16, pp. 4237-4241 (Dec. 2016).

McCloskey, Bryan D., "Attainable Gravimetric and Volumetric Energy Density of Li—S and Li Ion Battery Cells with Solid Separator-Protected Li Metal Anodes." The Journal of Physical Chemistry Letters, vol. 6, No. 22, pp. 4581-4588 (2015).

Murugan, Ramaswamy et al., "Fast Lithium Ion Conduction in Garnet-Type Li$_7$La$_3$Zr$_2$O$_{12}$." Angewandte Chemie International Edition, vol. 46, No. 41, pp. 7778-7781 (Oct. 2007).

Nomura, K. et al., "Ionic conduction behavior in zirconium phosphate framework." Solid State Ionics, vol. 61, No. 4, pp. 293-301 (Jun. 1993).

Nuspl, Gerhard, "Lithium ion migration pathways in LiTi$_2$(PO$_4$)$_3$ and related materials." Journal of Applied Physics, vol. 86, No. 10, pp. 5484-5491 (1999).

Ohta, Shingo et al., "All-solid-state lithium ion battery using garnet-type oxide and Li$_3$BO$_3$ solid electrolytes fabricated by screen-printing." Journal of Power Sources, vol. 238, pp. 53-56 (Sep. 2013).

Ohta, Shingo et al., "Co-sinterable lithium garnet-type oxide electrolyte with cathode for all-solid-state lithium ion battery." Journal of Power Sources, vol. 265, pp. 40-44 (Nov. 2014).

Ohta, Shingo et al., "Electrochemical performance of an all-solid-state lithium ion battery with garnet-type oxide electrolyte." Journal of Power Sources, vol. 202, pp. 332-335 (Mar. 2012).

Ohta, Shingo et al., "High lithium ionic conductivity in the garnet-type oxide Li$_{7-x}$ La$_3$(Zr$_{2-x}$, Nb$_x$)O$_{12}$ (X=0-2)." Journal of Power Sources, vol. 196, No. 6, pp. 3342-3345 (Mar. 15, 2011).

Palomares, Verónica et al., "Na-ion batteries, recent advances and present challenges to become low cost energy storage systems." Energy & Environmental Science, vol. 5, No. 3, pp. 5884-5901 (2012).

Peled, E., "Advanced Power Sources for EVs." Presented at Advanced Energy Sources Conference (Fuel Cells and Batteries)—IFCBC, Tel Aviv University, Tel Aviv, Israel (Jan. 26, 2011).

Peled, E., "The Electrochemical Behavior of Alkali and Alkaline Earth Metals in Nonaqueous Battery Systems—The Solid Electrolyte Interphase Model." Journal of The Electrochemical Society, vol. 126, No. 12, pp. 2047-2051 (Dec. 1979).

Plucknett, Kevin P., "Processing of Tape-Cast Laminates Prepared from Fine Alumina/Zirconia Powders." Journal of the American Ceramic Society, vol. 77, No. 8, pp. 2145-2153 (Aug. 1994).

Rangasamy, Ezhiyl et al., "The role of Al and Li concentration on the formation of cubic garnet solid electrolyte of nominal composition Li$_7$La$_3$Zr$_2$O$_{12}$." Solid State Ionics, vol. 206, pp. 28-32 (Jan. 2012).

Rettenwander, Daniel et al., "Structural and Electrochemical Consequences of Al and Ga Cosubstitution in Li$_7$La$_3$Zr$_2$O$_{12}$ Solid Electrolytes." Chemistry of Materials, vol. 28, pp. 2384-2392 (2016).

Rhodes, W.H. et al., "Agglomerate and Particle Size Effects on Sintering Yttria-Stabilized Zirconia." Journal of the American Ceramic Society, vol. 64, No. 1, pp. 19-22 (Jan. 1981).

Scott, Alex, "Challenging Lithium-Ion Batteries With New Chemistry." Chemical & Engineering News, vol. 93, No. 29, pp. 18-19 (Jul. 20, 2015).

Song, Shufeng et al., "A Na$^+$ Superionic Conductor for Room-Temperature Sodium Batteries." Scientific Reports, vol. 6, No. 32330, pp. 1-10 (2016).

Srisuwan, Anuwat et al., "Fabrication of SOFCs on Ni/NiAl$_2$O$_4$ support." Journal of Power Sources, vol. 250, pp. 352-358 (Mar. 2014).

Su, Yurong et al., "Electrochemical properties and optical transmission of high Li$^+$ conducting LiSiPON electrolyte films." Physica Status Solidi (B), vol. 254, No. 2, 1600088 (Feb. 2017).

Sutorik, Anthony C. et al., "Synthesis of Ultrafine ß"-Alumina Powders via Flame Spray Pyrolysis of Polymeric Precursors." Journal of the American Ceramic Society, vol. 81, No. 6, pp. 1477-1486 (Jun. 1998).

Tadanaga, Kiyoharu et al., "Preparation of lithium ion conductive Al-doped Li$_7$La$_3$Zr$_2$O$_{12}$ thin films by a sol-gel process." Journal of Power Sources, vol. 273, pp. 844-847 (2014).

Tamura, Shinji et al., "Highly conducting divalent Mg$^{2+}$ cation solid electrolytes with well-ordered three-dimensional network structure." Journal of Solid State Chemistry, vol. 235, pp. 7-11 (Mar. 2016).

Taylor, Nathan J. et al., "The Bottom Up Approach is Not Always the Best Processing Method: Dense $\alpha$-Al$_2$O$_3$/NiAl$_2$O$_4$ Composites." Advanced Functional Materials, vol. 24, No. 22, pp. 3392-3398 (Jun. 2014).

Temeche, Eleni et al., "Liquid-feed flame spray pyrolysis derived nanopowders (NPs) as a route to electrically conducting calcium aluminate (12CaO.7Al$_2$O$_3$) films." Journal of the European Ceramic Society, vol. 39, No. 4, pp. 1263-1270 (Apr. 2019).

The University of Texas at Austin, "Lithium-Ion Battery Inventor Introduces New Technology for Fast-Charging, Noncombustible Batteries." UT News, https://news.utexas.edu/2017/02/28/goodenough-introduces-new-battery-technology/ (Feb. 28, 2017).

Treadwell, David R. et al., "Synthesis of ß"-Alumina Polymer Precursor and Ultrafine ß"-Alumina Composition Powders." In: *Synthesis and Characterization of Advanced Materials*, ACS Symposium Series, vol. 681, pp. 146-156 (1997).

Wachsman, Eric D. et al., "Lowering the Temperature of Solid Oxide Fuel Cells." Science, vol. 334, No. 6058, pp. 935-939 (Nov. 18, 2011).

Wang, Yuxing et al., "Phase transition in lithium garnet oxide ionic conductors Li$_7$La$_3$Zr$_2$O$_{12}$: The role of Ta substitution and H$_2$O/CO$_2$ exposure." Journal of Power Sources, vol. 275, pp. 612-620 (Feb. 2015).

West, W.C. et al., "Chemical stability enhancement of lithium conducting solid electrolyte plates using sputtered LiPON thin films." Journal of Power Sources, vol. 126, No. 1-2, pp. 134-138 (Feb. 2004).

Yang, Li-Ping et al., "The mechanical and electrical properties of ZrO$_2$-TiO$_2$-Na-ß/ß"-alumina composite electrolyte synthesized via a citrate sol-gel method." Ceramics International, vol. 40, No. 7, pp. 9055-9060 (Aug. 2014).

Yang, Shuwu et al., "Formation and Desorption of Oxygen Species in Nanoporous Crystal 12CaO•7Al$_2$O$_3$." Chemistry of Materials, vol. 16, No. 1, pp. 104-110 (2004).

Yi, Eongyu et al., "Flame made nanoparticles permit processing of dense, flexible, Li$^+$ conducting ceramic electrolyte thin films of cubic-Li$_7$La$_3$Zr$_2$O$_{12}$ (c-LLZO)." Journal of Materials Chemistry A, vol. 4, pp. 12947-12954 (2016).

Yi, Eongyu et al., "Key parameters governing the densification of cubic-Li$_7$La$_3$Zr$_2$O$_{12}$ Li$^+$ conductors." Journal of Power Sources, vol. 352, pp. 156-164 (Jun. 2017).

Yi, Eongyu et al., "Roll your own—nano-nanocomposite capacitors." Journal of Materials Chemistry A, vol. 2, No. 11, pp. 3766-3775 (2014).

International Search Report and Written Opinion regarding International Application No. PCT/US2019/049155, mailed Jan. 21, 2020 (ISA/US), 10 pages.

Borodin, Oleg et al., "Mechanism of Ion Transport in Amorphous Poly(ethylene oxide)/LiTFSI from Molecular Dynamics Simulations." Macromolecules, vol. 39, No. 4, pp. 1620-1629 (2006).

ElBellihi, Abdelhameed Ahmed et al., "Preparation, Characterizations and Conductivity of Composite Polymer Electrolytes Based on

(56) References Cited

OTHER PUBLICATIONS

PEO-LiClO$_4$ and Nano ZnO Filler." Bulletin of the Korean Chemical Society, vol. 33, No. 9, pp. 2949-2954 (2012).
Gurusiddappa, J. et al., "Studies on the morphology and conductivity of PEO/LiClO$_4$." Materials Today: Proceedings, vol. 3, No. 6, pp. 1451-1459 (2016).
Jung, Yoon Seok et al., "Ultrathin Direct Atomic Layer Deposition on Composite Electrodes for Highly Durable and Safe Li-Ion Batteries." Advanced Materials, vol. 22, No. 19, pp. 2172-2176 (2010).
Kim, Hong Tak et al., "Characteristics of lithium phosphorous oxynitride thin films deposited by metal-organic chemical vapor deposition technique." Journal of Power Sources, vol. 244, pp. 641-645 (2013).
Laine, Richard M. et al., "Preceramic polymer routes to silicon carbide." Chemistry of Materials, vol. 5, No. 3, pp. 260-279 (1993).
Larson, Rodney W. et al., "Preparation and characterization of lithium phosphorus oxynitride glass." Journal of Non-Crystalline Solids, vol. 88, No. 1, pp. 97-113 (1986).
Lee, Seung-Joo et al., "An all-solid-state thin film battery using LISIPON electrolyte and Si-V negative electrode films." Electrochemistry Communications, vol. 5, No. 1, pp. 32-35 (2003).
Lee, Seung-Joo et al., "Electrical conductivity in Li—Si—P—O—N oxynitride thin-films." Journal of Power Sources, vol. 123, pp. 61-64 (2003).
Levchik, Sergei V. et al., "Phosphorus oxynitride: a thermally stable fire retardant additive for polyamide 6 and poly(butylene terephthalate)." Macromolecular Materials and Engineering, vol. 264, No. 1, pp. 48-55 (1999).
Lin, Chuan-Fu et al., "Nanoscale Protection Layers to Mitigate Degradation in High-Energy Electrochemical Energy Storage Systems." Accounts of Chemical Research, vol. 51, No. 1, pp. 97-106 (2018).
Liu, Yayuan et al., "Design of Complex Nanomaterials for Energy Storage: Past Success and Future Opportunity." Accounts of Chemical Research, vol. 50, No. 12, pp. 2895-2905 (2017).
Long, Lizhen et al., "Polymer electrolytes for lithium polymer batteries." Journal of Materials Chemistry A, vol. 4, No. 26, pp. 10038-10069 (2016).
Mani, Prabhu Doss et al., "Ionic conductivity of bias sputtered lithium phosphorous oxy-nitride thin films." Solid State Ionics, vol. 287, pp. 48-59 (2016).
Morita, Masayuki et al., "Ionic conductance behavior of polymeric composite solid electrolytes containing lithium aluminate." Electrochimica Acta, vol. 46, No. 10-11, pp. 1565-1569 (2001).
Muñoz, Francisco, "Comments on the structure of LiPON thin film solid electrolytes." Journal of Power Sources, vol. 198, pp. 432-433 (2012).
Scrosati, B. et al., "Impedance Spectroscopy Study of PEO-Based Nanocomposite Polymer Electrolytes." Journal of the Electrochemical Society, vol. 147, No. 5, pp. 1718-1721 (2000).
Wang, Weiman et al., "Lithium Ion Conducting Poly(ethylene oxide)-Based Solid Electrolytes Containing Active or Passive Ceramic Nanoparticles." The Journal of Physical Chemistry C, vol. 121, No. 5, pp. 2563-2573 (2017).
Wang, Yan-Jie et al., "Ion-conducting polymer electrolyte based on poly(ethylene oxide) complexed with $Li_{1.3}Al_{0.3}Ti_{1.7}(PO_4)_3$ salt." Materials Chemistry and Physics, vol. 92, No. 2-3, pp. 354-360 (2005).
Yi, Eongyu et al., "Materials that can replace liquid electrolytes in Li batteries: Superionic conductivities in $Li_{1.7}Al_{0.3}Ti_{1.7}Si_{0.4}P_{2.6}O_{12}$. Processing combustion synthesized nanopowders to free standing thin films." Journal of Power Sources, vol. 269, pp. 577-588 (2014).
Yi, Eongyu et al., "Superionically conducting ß"-$Al_2O_3$ thin films processed using flame synthesized nanopowders." Journal of Materials Chemistry A, vol. 6, No. 26, pp. 12411-12419 (2018).
Yu, Xiaohua et al., "A Stable Thin-Film Lithium Electrolyte: Lithium Phosphorus Oxynitride." Journal of The Electrochemical Society, vol. 144, No. 2, pp. 524-532 (1997).
Rangasamy, The role of Al and Li concentration on the formation of cubic garnet solid electrolyte of nominal composition $Li_7La_3Zr_2O_{12}$, Solid State Ionics, 206, p. 28-32 (2012).
Wang, Structure and Properties of Garnet-Type Lithium Ion Conductors $Li_{7-x}la_3Zr_{2-x}Ta_xO_{12}$ and Their Applicability in Lithium-Ion Batteries, A Dissertation, Michigan State University, p. 1-143 (2014).
Li, Low-temperature synthesis of cubic phase $Li_7La_3Zr_2O_{12}$ via sol-gel and ball milling induced phase transition, Journal of Power Sources, 412, 2019, p. 189-196 (2019).
M. Teasley, et al., "Synthesis, Characterization, and Ring-Opening Polymerization of the Cyclic Oligomers of Poly(Oxy-1,3-phenylenecarbonyl-1,4-phenylene)," Macromolecules 1998, 31, 7, pp. 2064-2074 (1998) https://doi.org/10.1021/ma971328o (Abstract Only).
Ding, Y., et al., Chapter 9, "Cyclomer Technology for High Performance Polymers," from Cyclic Polymers, Semlyen, J.A. (eds.) Springer, Dordrecht. pp. 307-308 (2000). https://doi.org/10.1007/0-306-47117-5_9.
Chenglong Zhao et al.; "Solid-State Sodium Batteries"; Advanced Energy Materials; Feb. 2018; 20 pages.

* cited by examiner

POLYMER PRECURSORS FOR SOLID STATE ELECTROLYTES

CROSS-REFERENCE TO RELATED APPLICATIONS

This application is a U.S. National Phase Application under 35 U.S.C. 371 of International Application No. PCT/US2019/049155 filed on Aug. 30, 2019. This application claims the benefit and priority of U.S. Provisional Application No. 62/725,731 filed on Aug. 31, 2018. The entire disclosures of the above applications are incorporated herein by reference.

GOVERNMENT SUPPORT

This invention was made with government support under EE0008235 awarded by the Department of Energy and 19-PAF04357 awarded by the National Science Foundation. The government has certain rights in the invention.

FIELD

The present disclosure relates to polymer electrolytes that can also serve as precursors to ceramic electrolytes for coating, binder, sintering aid, and adhesive applications for solid state electrolytes and methods for chemically synthesizing the polymers.

BACKGROUND

This section provides background information related to the present disclosure which is not necessarily prior art.

A well-established problem with cycling lithium ion batteries with any type of electrolyte is that during recharging, Li deposition can be non-uniform. For example, in a battery including an anode, a cathode, and an electrolyte layer disposed between the anode and the cathode, non-uniform Li deposition on an anode can result in a rapid growth of dendrites that can penetrate the electrolyte layer and form a bridge to the cathode. This bridge causes a short circuit that leads to catastrophic failure. Consequently, tremendous efforts have been directed at solving this problem.

In part, these efforts led to the development of ceramic electrolytes, e.g., $Li_{1.3}Al_{0.3}Ti_{1.7}(PO_4)_3$ (LATP) and cubic-$Li_7La_3Zr_2O_{12}$ (c-LLZO), which were originally thought to offer a mechanical solution by physically blocking dendrite growth. However, these materials were found to suffer from other problems that have rendered them less than completely practical for battery applications. Indeed, LATP is susceptible to irreversible reduction during cycling and c-LLZO has been found to be susceptible to dendrite penetration along grain boundaries, which again leads to short-circuiting.

Because of these deficiencies, other solutions are sought to resolve these problems. To this end, a set of ceramic materials has been identified that appears to be resistant to dendrite penetration, that also wets with Li metal, and that offers sufficient ionic conductivity ($>10^{-6}$ $Scm^{-1}$) to permit use as interfaces with LATP and c-LLZO. These materials include the family of LiPON glasses, $Li_xAlO_y$ and $Li_xZnO_y$, among others. However, a key problem with these materials is that their $Li^+$ conductivities are very low. For example, whereas LATP and c-LLZO have conductivities of 2-6 $mScm^{-1}$ and 0.2-2 $mScm^{-1}$ (Al vs Ga doping), respectively, the ceramic materials have conductivities in the rage of $2-10\times10^{-3}$ $mS\ cm^{-1}$. Due to these low $Li^+$ conductivities, the ceramic materials must be introduced as interface materials at thicknesses of 50-200 nm in order to offer practical $Li^+$ cycling. This requirement, to-date, has mandated their application via gas phase deposition methods that include a variety of sputtering methods (e.g., magnetron), chemical vapor deposition (CVD), and atomic layer deposition (ALD). Unfortunately, these methods all require specialized apparatuses for controlling deposition atmospheres, deposition rates, film properties, and control of coating uniformity. As such, they represent an expensive and not easily scaled step in the fabrication of all solid-state batteries for large-scale commercial applications.

In contrast, polymeric ceramic precursor systems that are meltable or soluble offer a facile, low cost alternative to thin ceramic films. Polymer precursor methods of processing ceramics have been the subject of multiple reviews. However, this approach has not been applied to the synthesis of, as non-limiting examples, thin films of LiPON, $LiAlO_x$, $LiZnO_x$, $M_1M_2P_mH_nO_xN_yS_z$, for coatings and/or interfaces for battery applications.

A further advantage gained from using polymer precursors is that, because they can be applied in a liquid format, the precursors can also be used to coat particles to be used in forming and/or processing anode and cathode components; thereby serving as a non-fugitive binder during processing to dense or almost dense components. Alternately, these same precursors can be used to infiltrate porous green or intermediately sintered bodies, including electrolytes, anodes and cathodes, to both strengthen the component and/or to introduce continuous cation conducting phases within an initially porous ceramic such that they can act as a second ion conducting phase while also introducing additional, useful mechanical properties.

Finally, the processing of all solid-state batteries has inherent assembly problems. Processing methods can include sintering anode, cathode and electrolyte thin films in one step starting from green ceramic powder-filled polymer thin films that are themselves assembled and thereafter compressed or thermally compressed, followed by binder burnout and co-sintering all the green layers together at one time. Several problems arise from this approach: (1) each layer does not need the same processing conditions to reach full density with optimal properties, e.g., each layer will not sinter correctly under the harshest conditions needed to optimize the performance of the most difficult to sinter layer; (2) on heating, components (ions) in one layer may diffuse into other layers, changing both the phases, chemistries, electrochemistries and even mechanical properties in an undesired fashion; and (3) binder burnout in an intermediate treatment may lead to pores or other undesired defects (e.g., chemical reactions) in other layers such that optimization of all global properties is prevented.

Consequently, under some circumstances, the assembly of all solid-state batteries may best be conducted by forming individual layers first and then assembling them, which must involve uniform mating of surfaces. The problem therein is that the surface roughness (or smoothness) is not the same for each thin film needed to achieve intimate and/or uniform mating between two, or even three or more, components. One solution to this problem is to formulate a coating that can be a liquid or a meltable or malleable solid, such that uniform mating between two surfaces in question is possible. It is advantageous when, on heating such a coating, it not only transforms into an ion conducting interface, but it also acts to uniformly bond one surface to the other. Different surfaces may require different coatings, and as such, first coatings may be overlaid with second precursor coatings to ensure wetting of all components. It is further advantageous if the precursor coating system can be transformed into a ceramic (glass) interface at temperatures below those needed to sinter the original films, such that minimal chemical reactions take place unless desirable. For example, the precursor may serve as an "adhesive or bonding" interface that also penetrates to some extent a porous substrate to extend, on conversion to ceramic or glass, the conducting layer some distance into the substrate while also improving mechanical properties in the substrate and between bonded components.

Accordingly, polymeric precursors that address the foregoing problems associated with conventional precursors, that can be used to generate thin film, ceramic coatings of interface systems; as coatings on polymeric separators; and/or as composites with other polymers, e.g., polyethers, are desired.

SUMMARY

This section provides a general summary of the disclosure, and is not a comprehensive disclosure of its full scope or all of its features.

In various aspects, the current technology provides a method of synthesizing a precursor for making a polymer, glass or ceramic material. The method includes reacting $OPCl_3$ with $NH_3$ or $MNH_2$, where M is Li, Na, K, Mg, Ca, Ba, or combinations thereof, to form $O=P(NH_2)_3$; and either: i. reacting the $O=P(NH_2)_3$ with $M1NH_2$, where M1 is Li, Na, K, Mg, Ca, Ba, or combinations thereof, to form the precursor; or ii. heating the $O=P(NH_2)_3$ to form a branched or cyclomeric compound; and reacting the branched or cyclomeric compound with $M1NH_2$, where M1 is Li, Na, K, Mg, Ca, Ba, or combinations thereof, to form the precursor.

The precursor is an oligomer or a polymer.

In one aspect, the reacting the $OPCl_3$ with the $NH_3$ or $MNH_2$ is performed in a polar, aprotic solvent at a temperature of greater than or equal to about −50° C. to less than or equal to about 200° C.

In one aspect, the method includes i. and the reacting the $O=P(NH_2)_3$ with the $M1NH_2$ is performed at a temperature of greater than or equal to about −50° C. to less than or equal to about 200° C. to from the precursor as the oligomer.

In one aspect, the method further includes heating the oligomer to a temperature greater than or equal to about 40° C. to less than or equal to about 300° C. to increase the molecular weight of the oligomer.

In one aspect, the method comprises i. and the reacting the $O=P(NH_2)_3$ with the $M1NH_2$ is performed at a temperature of greater than about 20° C. to less than or equal to about 500° C. to from the precursor as the polymer.

In one aspect, the method further includes heating the polymer to a temperature greater than or equal to about 50° C. to less than or equal to about 400° C. to increase the ceramic yield of the polymer.

In one aspect, the method includes i. and further includes heating the precursor to a temperature of greater than or equal to about ambient temperature to less than or equal to about 1000° C. to form the glass or ceramic material.

In one aspect, the method further includes, prior to the heating, applying the oligomeric or polymeric precursor to at least a portion of a surface of a battery component selected from the group consisting of a cathode, an anode, a solid electrolyte, and combinations thereof, wherein the applying is performed by a process selected from the group consisting of doctor blading, spreading, brushing, spin casting, pouring, pipetting, printing, spray coating, dip coating, and combinations thereof.

In one aspect, the method includes ii. and the reacting is performed at a temperature of greater than or equal to about 30° C. to less than or equal to about 150° C.

In one aspect, the method includes ii. and is performed on a surface of, and optionally in pores of, a solid-state battery component selected from the group consisting of a cathode, an anode, a solid electrode, and combinations thereof.

In one aspect, the precursor has the formula $M1_aM2_bP_mH_nN_xO_yS_z$, where M1 is Li, Na, K, Mg, Ca, Ba, or combinations thereof; M2 is Al, S, Se, C, Si, Ge, Sn, Zn, or combinations thereof; $1 \le a \le 10$; $0 \le b \le 10$; $0 \le m \le 50$; and $0 \le n \le 60$; $0 \le x \le 50$; $0 \le y \le 20$; and $0 \le z \le 20$.

In one aspect, the precursor is PON, $Li_xPON$, $Na_xPON$, SiPON, $Li_xSiPON$, $Na_xSiPON$, LiNaSiPON, or MgSiPON, where x is 1, 1.5, 3, or 6.

In one aspect, the method further includes combining the precursor with at least one of an electrode active material, with a separator material, or with a solid-state electrolyte material to generate at least one of a composite electrode material, a composite separator material, or a composite solid-state electrolyte material.

In one aspect, the method further includes adding the precursor to a solution including an ion-conducting polymer and a solvent to form a polymer-precursor solution; casting the polymer-precursor solution on a plate; and removing the solvent from the polymer-precursor solution to form an ion-conducting polymer-precursor composite material.

In one aspect, the ion-conducting polymer is polyethylene oxide (PEO), polypropylene oxide (PPO), an ion-conducting carboxylate polymer, copolymers thereof, or mixtures thereof.

In one aspect, the solvent is acetonitrile.

In one aspect, the precursor is PON, $Li_xPON$, $Na_xPON$, SiPON, $Li_xSiPON$, $Na_xSiPON$, LiNaSiPON, or MgSiPON, where x is 1, 1.5, 3, or 6.

In one aspect, the method further includes incorporating the ion-conducting polymer-precursor composite material into a solid-state battery as a solid composite electrolyte.

The current technology also provides the oligomeric or the polymeric precursor made by the above method.

The current technology yet also provides a method of synthesizing precursor for making a polymer, glass or ceramic material. The method includes reacting $OPCl_3$ with $(Me_3X)_2NH$, where Me is methyl and X is Si, Ge, Sn, or combinations thereof, to form $O=P(NHSiMe_3)_3$; and reacting the $O=P(NHSiMe_3)_3$ with $M1NH_2$, where M1 is Li, Na, K, Mg, Ca, Ba, or combinations thereof, to form the precursor. Then precursor is an oligomer or a polymer.

In one aspect, the reacting the $OPCl_3$ with $(Me_3X)_2NH$ is performed at a temperature of greater than or equal to about 20° C. to less than or equal to about 120° C. for a time of greater than or equal to about 2 minutes to less than or equal to about 10 hours.

In one aspect, the reacting the $OPCl_3$ with the $(Me_3X)_2NH$ is performed in a polar aprotic solvent.

In one aspect, the reacting the $O=P(NHSiMe_3)_3$ with the $M1NH_2$ is performed at a temperature of greater than or equal to about −50° C. to less than or equal to about 200° C. to form the precursor as the oligomer.

In one aspect, the method further includes heating the oligomer to a temperature greater than or equal to about 40° C. to less than or equal to about 300° C. to d reacting the $O=P(NHSiMe_3)_3$ with $M1NH_2$ is performed at a temperature of greater than about 20° C. to less than or equal to about 500° C. to from the precursor as the polymer.

In one aspect, the method further includes heating the polymer to a temperature greater than or equal to about 50° C. to less than or equal to about 400° C. to increase the ceramic yield of the polymer.

In one aspect, the method further includes reacting the precursor with at least one of $Y(OR)_n$, $Y(O_2CR')_n$, $Y(NO_3)_n$, and $YCl_n$, wherein Y is Al or Zn, n is 3 when Y is Al, n is 2 when Y is Zn, and R and R' are independently a saturated C1-C5 alkyl that is branched or unbranched, and substituted or unsubstituted.

In one aspect, the method further includes reacting the oligomeric or polymeric precursor with at least one of $Li_2S$ or $Li_2Se$.

In one aspect, the method further includes heating the precursor at a temperature of greater than or equal to about ambient temperature to less than or equal to about 1000° C. to form the glass or ceramic material.

In one aspect, the method further includes, prior to the heating, applying the precursor to at least a portion of a surface of a battery component selected from the group consisting of a cathode, an anode, a solid electrode, and combinations thereof, wherein the applying is performed by a process selected from the group consisting of doctor blading, spreading, brushing, spin casting, pouring, pipetting, printing, spray coating, dip coating, and combinations thereof, and wherein, after the heating, the glass or ceramic material is formed as a coating on at least a portion of the battery component.

In one aspect, the method further includes, prior to the heating, dipping a battery component selected from the group consisting of a cathode, an anode, a solid electrode, and combinations thereof into a solution comprising the oligomeric or polymeric precursor, wherein after the heating, the glass or ceramic material is formed as a coating that surrounds the battery component.

In one aspect, the method further includes combining the precursor with at least one of an electrode active material, with a separator material, or with a solid-state electrolyte material to generate at least one of a composite electrode material, a composite separator material, or a composite solid-state electrolyte material.

In one aspect, the precursor has the formula $M1_aM2_bP_mH_nN_xO_yS_z$, where M1 is Li, Na, K, Mg, Ca, Ba, or combinations thereof; M2 is Al, S, Se, C, Si, Ge, Sn, Zn, or combinations thereof; $1 \leq a \leq 10$; $0 \leq b \leq 10$; $0 \leq m \leq 50$; and $0 \leq n \leq 60$; $0 \leq x \leq 50$; $0 \leq y \leq 20$; and $0 \leq z \leq 20$.

The current technology provides an oligomeric or polymeric precursor made according to the above method.

In various aspects, the current technology yet also provides a method of synthesizing a precursor for making a polymer, glass or ceramic material. The method includes reacting $Cl_6N_3P_3$ with $NH(SiMe_3)_2$ to form a SiPHN as the precursor, wherein the precursor is an oligomer or a polymer.

In one aspect, the reacting is performed at a temperature of greater than or equal to about −50° C. to less than or equal to about 200° C. to form the precursor as the oligomer.

In one aspect, the method further includes heating the oligomer to a temperature greater than or equal to about 40° C. to less than or equal to about 300° C. to increase the molecular weight of the oligomer.

In one aspect, the reacting is performed at a temperature of greater than about 20° C. to less than or equal to about 500° C. to from the precursor as the polymer.

In one aspect, the method further includes heating the polymer to a temperature greater than or equal to about 50° C. to less than or equal to about 400° C. to increase the ceramic yield of the polymer.

In one aspect, a battery component including the precursor is provided.

In one aspect, the method further includes reacting the precursor with $MNH_2$, where M is Li, Na, K, Mg, Ca, Ba, or combinations thereof, to form a MSiPHN precursor, wherein the MSiPHN precursor is an oligomer or a polymer.

In one aspect, the reacting the precursor with $MNH_2$ is performed at a temperature of greater than or equal to about −50° C. to less than or equal to about 200° C. to form the MSiPHN precursor as the oligomer.

In one aspect, the method further includes heating the MSiPHN precursor oligomer to a temperature greater than or equal to about 40° C. to less than or equal to about 300° C. to increase the molecular weight of the MSiPHN precursor oligomer.

In one aspect, the reacting the precursor with $MNH_2$ is performed at a temperature of greater than about 20° C. to less than or equal to about 500° C. to from the MSiPHN precursor as the polymer.

In one aspect, the method further includes heating the MSiPHN precursor polymer to a temperature greater than or equal to about 50° C. to less than or equal to about 400° C. to increase the ceramic yield of the MSiPHN precursor polymer.

In one aspect, a battery component including the MSiPHN precursor is provided.

In one aspect, the method further includes heating the MSiPHN precursor to a temperature of greater than or equal to about ambient temperature to less than or equal to about 1000° C. to form the glass or ceramic material.

In one aspect, a battery component including the polymer, glass, or ceramic material is provided.

The current technology yet further provides a precursor having the formula $M1_aM2_bP_mH_nN_xO_yS_z$, where M1 is Li, Na, K, Mg, Ca, Ba, or combinations thereof; M2 is Al, S, Se, C, Si, Ge, Sn, Zn, or combinations thereof; $1 \leq a \leq 10$; $0 \leq b \leq 10$; $0 \leq m \leq 5a$; and $0 \leq n \leq 60$; $0 \leq x \leq 5a$; $0 \leq y \leq 20$; and $0 \leq z \leq 20$, wherein the precursor is an oligomer, or a polymer.

In one aspect, the precursor is in the form of a coating on a battery component selected from the group consisting of a cathode, an anode, a separator, a solid electrolyte and combinations thereof.

In one aspect, the precursor is combined with a cathode active material.

In one aspect, the precursor is combined with an anode active material.

In one aspect, the precursor is combined with an anode separator material.

In one aspect, the precursor is combined with a solid electrolyte.

In one aspect, the precursor is combined with an ion-conducting polymer as an ion-conducting polymer-precursor composite material.

In one aspect, the ion-conducting polymer is polyethylene oxide (PEO), polypropylene oxide (PPO), an ion-conducting carboxylate polymer, copolymers thereof, or mixtures thereof.

In one aspect, a solid state battery including a polymer, glass, or ceramic material formed from the precursor is provided.

In one aspect, a polymer, glass, or ceramic material formed from heating the precursor is provided.

In one aspect, the precursor is made by any method provided herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
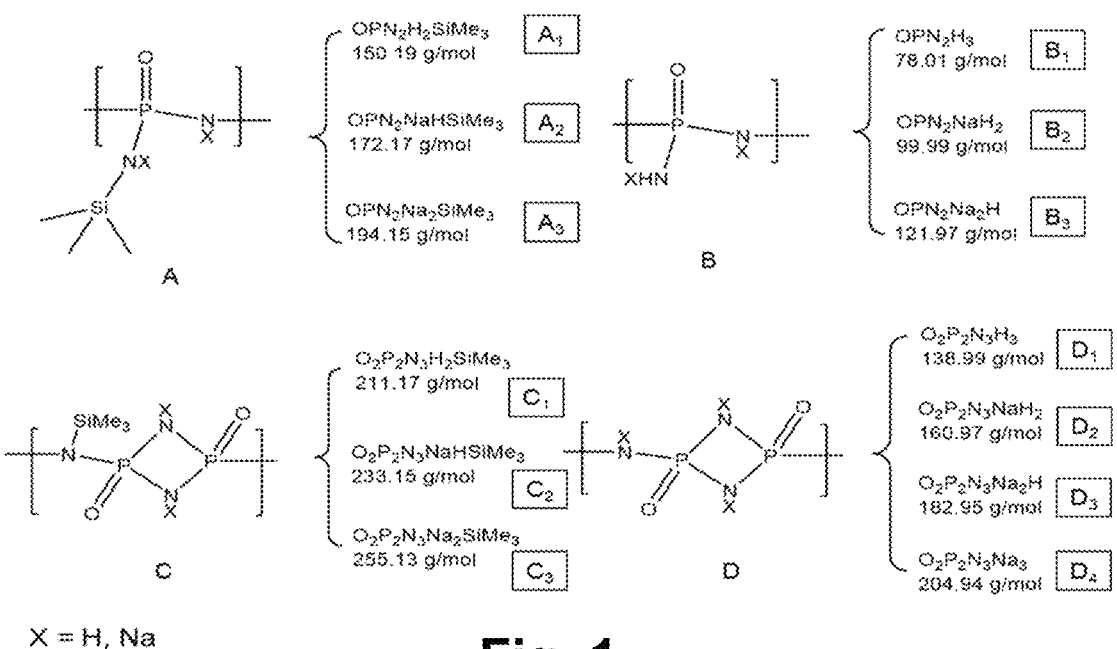
FIG. 1 shows exemplary precursor structures according to various aspects of the current technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B.

Example embodiments will now be described more fully with reference to the accompanying drawings.

The current technology provides polymer precursors that can be applied as overcoats to process thin film, ceramic coatings of the respective interface systems. The polymer precursors themselves, or when mixed with other ion-conducting polymers, provide ion-conducting properties that were not anticipated during their formulation as ceramic precursors.

More particularly, the current technology provides a pathway to coatings that are similar to gas phase-deposited LiPON, but that utilize solution coating of ceramic precursors. The pathway includes the synthesis of, for example, $O=P(NH_2)_3$ from $OPCl_3$ followed by lithiation by an Li source, such as $LiNH_2$ as a non-limiting example. As an alternate method, $OPCl_3$ is reacted with $(Me_3Si)_2NH$ to generate $Me_3SiCl$ and $O=P(NHSiMe_3)_{3-x}[NH]_x$ which can be lithiated again by $LiNH_2$. In yet another exemplary method, the cyclomer $[Cl_2P=N]_3$ reacts with $(Me_3Si)_2NH$ to generate $Me_3SiCl$ and $[P=N](NHSiMe_3)_{33-x}[NH]_x$ which can be lithiated by $LiNH_2$ or by another source of Li.

Accordingly, the current technology provides systems that permit simple coating from solutions or from solid polymer films. These polymers have excellent $Li^+$ conductivities alone at ambient temperature and as mixtures with other ion conducting polymers. Upon heating to various temperatures less than 1000° C., polymer precursors, which are generally oligomers, will transform to PON, LiPON, SiPON, LiSiPON, SiPHN, LiSiPHN, or other materials with various compositions. Intermediates of these materials are characterized during heating in air or nitrogen by FTIR, TGA, and XRD. Surprisingly, coatings made on a variety of substrates with or without heating show $Li^+$ conductivities several orders of magnitude higher ($10^{-5}$ vs $10^{-6}$ S/cm) than those expected from gas phase deposited materials at thicknesses of greater than or equal to about 1 μm and less than or equal to about 50 μm or greater than or equal to about 1 μm and less than or equal to about 20 μm.

The current technology provides methods of synthesizing compounds, oligomers or polymers of the formula $M1_aM2_bP_mH_nO_xN_yS_z$, where $M_1$ is Li, Na, K, Mg, Ca, or Ba or combinations thereof, and M2 is S, Se, C, Si, Ge, Sn, Zn, or combinations thereof thereof. $M_1$ is bonded to O, N, P or can bridge between two forms, such as $M_1O-P=N$ or $O=P-NM_1$. The amount of M1 is $1 \leq a \leq 10$ mol %. The amount of M2 can generally be from 0-10 times, preferably 1-5 times, with respect to the O, P, N, S or Se amounts, and is 1≤b≤10 mol %.content, n, x, y, and z are satisfy the following: 0≤m≤5a; and 0≤n≤60, 0≤x≤5a; 0≤y≤20a; 0≤z≤20a.

Oligomers or polymers having the above formula can be volatilized, dissolved and coated, melted and coated, or pressed onto or into substrates to generate polymers ceramic or glass powders, porous thin films, dense thin films, continuous interpenetrating second or third phases. Upon heating to a temperature of greater than or equal to about 100° C. to less than or equal to about 400° C. to the oligomers or polymers are formed. Upon heating to a temperature of greater than or equal to about 400° C. to less than or equal to about 1500° C. in a controlled atmosphere, the oligomers or polymers transform into, e.g., a lithium ion conducting, a sodium ion conducting, or a magnesium ion conducting, ceramic or glass coating having a thickness of greater than or equal to about 5 nm to less than or equal to about 20 µm. The coating imparts an interface to the coated substrate or powder, allowing it to be mated to another component and/or to fills pores in the substrate in order to provide semi- or continuous ion conducting sections and/or extends to the surface of a porous substrate. The coated substrate can also be used to cause one semi-flat surface to adhere strongly to another semi-flat surface, to mechanically and electrochemically bond one to the other, and to permit rapid ion diffusion across the resulting interface and/or through the substrate matrix, and/or coated particles, and/or cause particles to sinter together faster and at lower temperature to impart mechanical strength and improved electrochemical performance after heating to the temperatures of greater than or equal to about 400° C. to less than or equal to about 1500° C. in atmospheres of nitrogen, argon, hydrogen, and mixtures thereof depending on the target properties. Heating in air or oxygen is also useful for some formulations.

The current technology provides a method of synthesizing precursors to phosphorous oxynitrides, herein termed "PON", with variable ratios of phosphorous to oxygen to nitrogen that may later be lithiated, sodiated or modified with magnesium. The PONs can be dissolved, melted or pressed to form thin films having a thickness of greater than or equal to about 5 nm to less than or equal to about 20 µm and then either the solvent is removed or the PONs are thermally converted to lithium, sodium, magnesium or mixed metal ion conductors on substrates that are powders of cathode, anode or electrolyte materials before or after processing such powders to selected forms, such as porous or dense thin films and or composites consisting of mixtures of cathode and electrically conducting materials such as carbon in any form, and/or forming thin films on preformed porous or dense films and also used to promote sintering at lower temperatures than without coatings and that coincidentally provide improved mechanical and electrochemical properties.

The current technology also provides a method of synthesizing precursors to silicon modified phosphorous oxynitrides, herein termed "SiPON", with variable ratios of silicon to phosphorous to oxygen to nitrogen that may be later lithiated, sodiated or modified with magnesium and that can be dissolved, melted or pressed to form thin films having a thickness of greater than or equal to about 5 nm to less than or equal to about 20 µm and then thermally converted to lithium, sodium, magnesium or mixed metal ion conductors on substrates that are powders of cathode, anode or electrolyte materials before or after processing such powders to selected forms such as porous or dense thin films and or composites consisting of mixtures of cathode and electrically conducting materials such as carbon in any form and or forming thin films on preformed porous or dense films and also used to promote sintering at lower temperatures than without coatings and that coincidentally provide improved mechanical and electrochemical properties.

The current technology also provides a method of synthesizing precursors to sodium and silicon modified phosphorous oxynitrides, herein termed "NaSiPON", with variable ratios of sodium and silicon to phosphorous to oxygen to nitrogen that may be later lithiated or modified with magnesium and that can be dissolved, melted or pressed to form thin films having a thickness of greater than or equal to about 5 nm to less than or equal to about 20 µm and then thermally converted to lithium, sodium, magnesium or mixed metal ion conductors on substrates that are powders of cathode, anode or electrolyte materials before or after processing such powders to selected forms such as porous or dense thin films and or composites consisting of mixtures of cathode and electrically conducting materials such as carbon in any form and or forming thin films on preformed porous or dense films and also used to promote sintering at lower temperatures than without coatings and that coincidentally provide improved mechanical and electrochemical properties.

The current technology also provides a method of synthesizing precursors to magnesium and silicon modified phosphorous oxynitrides, herein termed "MgSiPON", with variable ratios of magnesium and silicon to phosphorous to oxygen to nitrogen that may be later lithiated or sodiated and that can be dissolved, melted or pressed to form thin films having a thickness of greater than or equal to about 5 nm to less than or equal to about 20 µm and then thermally converted to lithium, sodium, magnesium or mixed metal ion conductors on substrates that are powders of cathode, anode or electrolyte materials before or after processing such powders to selected forms such as porous or dense thin films and or composites consisting of mixtures of cathode and electrically conducting materials such as carbon in any form and or forming thin films on preformed porous or dense films and also used to promote sintering at lower temperatures than without coatings and that coincidentally provide improved mechanical and electrochemical properties.

In various embodiments, the methods include the following steps.

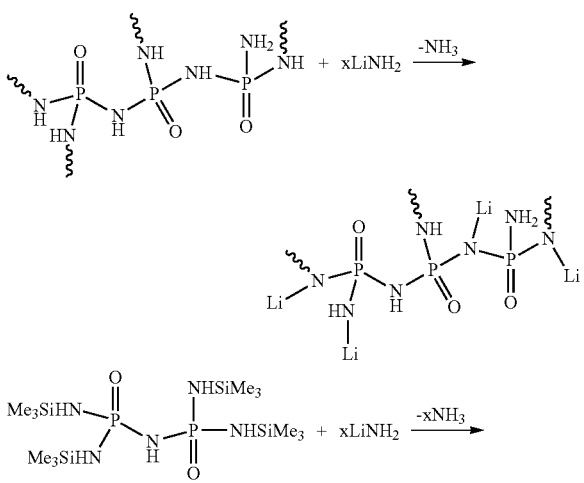

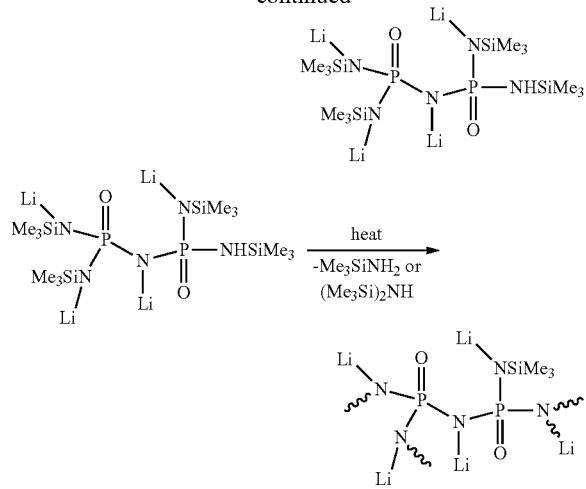

Figure 2:
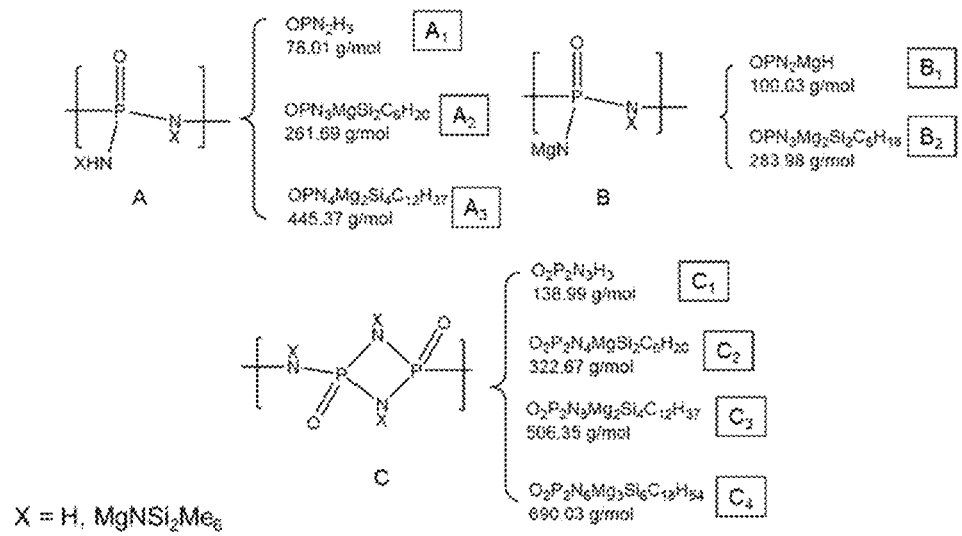
FIG. 2 shows additional exemplary precursor structures according to various aspects of the current technology.
Figure 2:
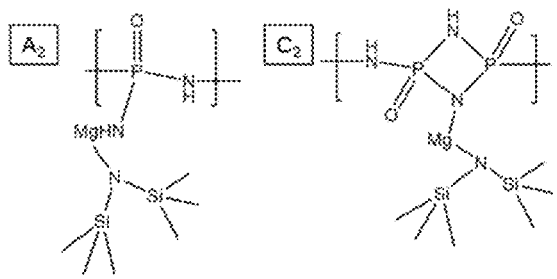
Figure 3:
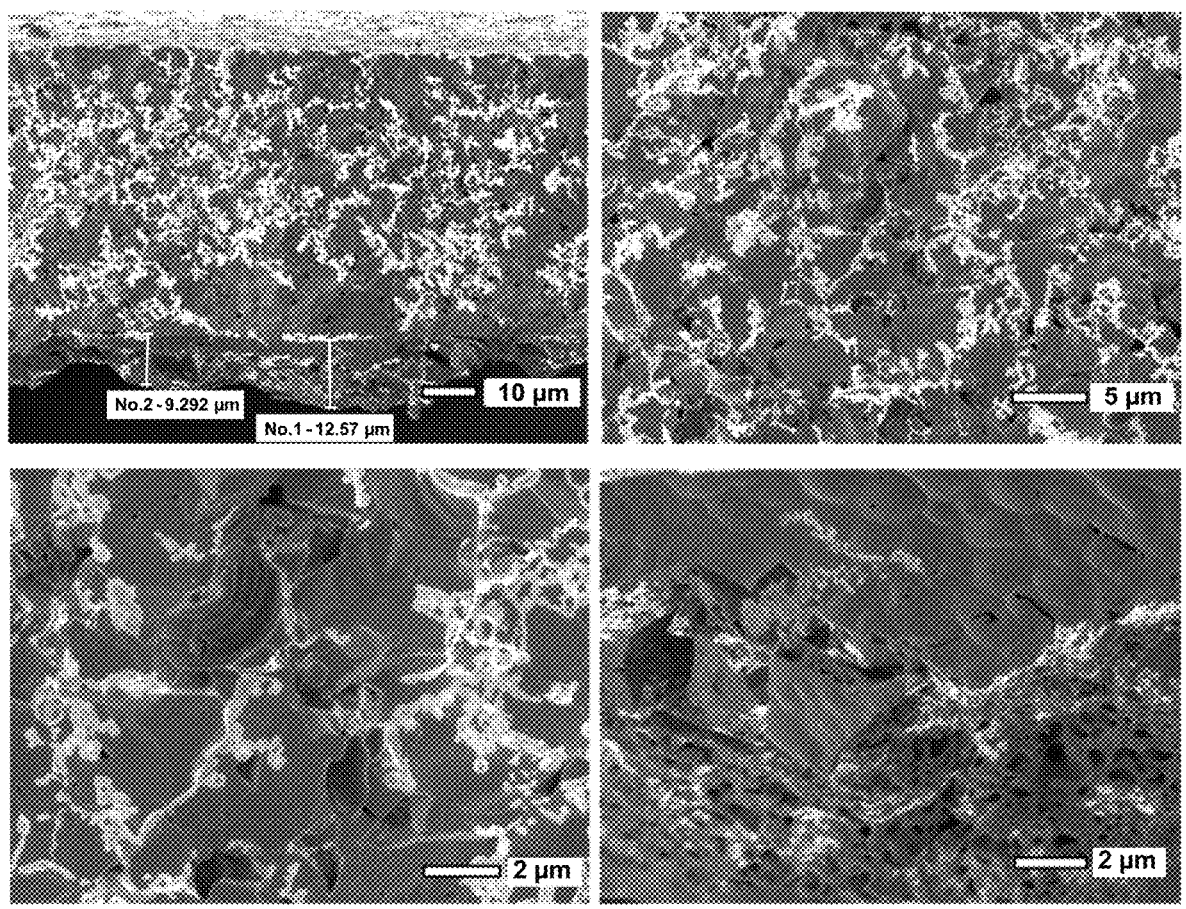
FIG. 3 shows micrographs of a ceramic material made according to various aspects of the current technology.
Figure 4:
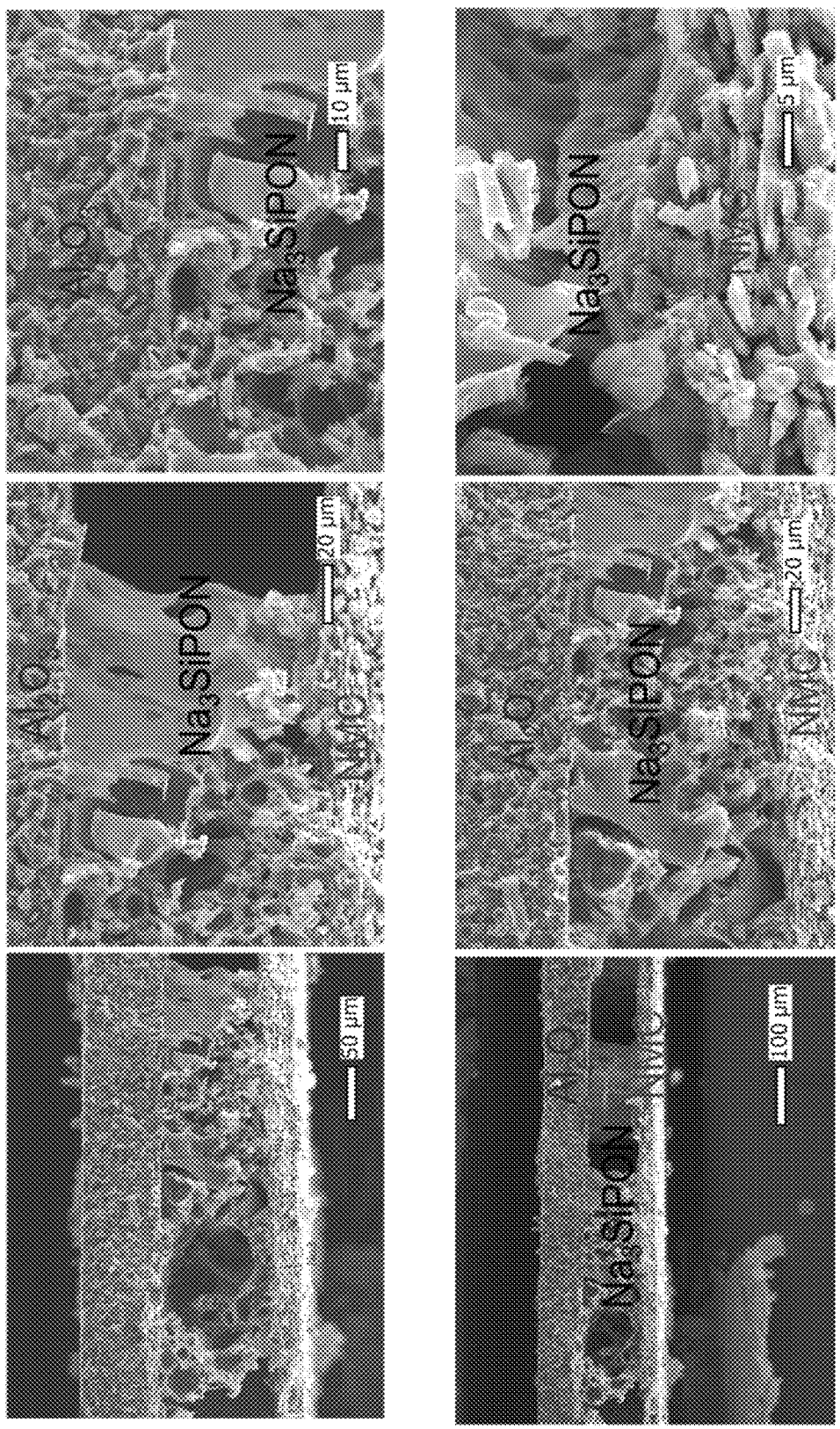
FIG. 4 shows micrographs of a ceramic material made according to various aspects of the current technology.

In various embodiments, the oligomers or polymers have the exemplary structures shown in FIG. 1. In other embodiments, the oligomers or polymers have the exemplary structures shown in FIG. 2.

In various embodiments, the oligomeric or polymeric precursor infiltrates a porous substrate, provides reinforcement, i.e., increased strength, and provides an ion-conducting pathway by forming electrolyte pathways within a substrate as well as coating the surface, as shown in FIGS. 3A-3D. In some embodiments, a cathode and solid electrolyte are bonded together as shown in FIGS. 4A-4F. In a similar manner, an anode and solid electrolyte are bonded together. In yet other embodiments, the coating infiltrates a cathode or composite cathode material and promotes densification.

Accordingly, the current technology provides a method of synthesizing a polymer or ceramic material precursor. The method includes reacting a compound according to one of the following pathways. The compound satisfies the formula $P_xO_yN_zX_mH_nC_o$, where $1 \leq x \leq 20$, $1 \leq x \leq 10$, $1 \leq x \leq 5$; $0 \leq y \leq 20$, $0 \leq y \leq 10$, $0 \leq y \leq 5$; $1 \leq z \leq 20$, $1 \leq z \leq 10$, $1 \leq z \leq 5$; X is Cl, Br, I, CN or mixtures thereof; $1 \leq m \leq 20$, $1 \leq m \leq 15$, $1 \leq m \leq 10$; $0 \leq n \leq 20$, $0 \leq n \leq 10$, $0 \leq n \leq 5$; and $0 \leq o \leq 20$, $0 \leq o \leq 10$, $0 \leq o \leq 5$. The compound is soluble in aprotic solvents.

In a first pathway, X is a halogen. The compound is reacted with $NH_3$ to form $NH_4X$ (a byproduct removed by filtration) and the intermediate $P_xO_yN_{z+m}H_{n+(m-1\ or\ m-2)}C_o$. The intermediate is warmed at a temperature of greater than or equal to about 10° C. to less than or equal to about 150° C. in solution or in a solid phase to eliminate $NH_3$ and form an oligomeric, or polymeric precursor, which remains soluble in aprotic solvents and meltable.

In another pathway, the compound is reacted with $MNH_2$ or $M(NH_2)_2$ or mixtures thereof, where M=Li, Na, K, Ca, Mg, or Ba to form the intermediate $P_xO_yN_{z+m}H_{n+(m-1\ or\ m-2)}C_o$ coincident with $MX_{1(2)}$. The intermediate is warmed at a temperature of greater than or equal to about 10° C. to less than or equal to about 150° C. in solution or in a solid phase to eliminate $NH_3$ to an oligomeric, or polymeric precursor, which remains soluble in aprotic solvents and meltable.

In some variations, excess $MNH_2$ or $M(NH_2)_2$ or mixtures thereof are used to form the second intermediate $M_1M_2P_xO_yN_zX_mH_nC_o$. The second intermediate is warmed at a temperature of greater than or equal to about 10° C. to less than or equal to about 150° C. in solution or in a solid phase to eliminate $NH_3$ to an oligomeric, or polymeric precursor, which remains soluble in aprotic solvents and meltable.

In another pathway, the compound is reacted with silyl compounds as exemplified by $(R_3Si)_2NH$ (where R is $C_1$-$C_8$ alkyl or H) to generate volatile $R_3SiX$, which can be evaporated from solution before or after recovery of the intermediate $(R_3Si)_mP_xO_yN_{z+m}H_{n+(m-1\ or\ m-2)}C_o$. The intermediate is warmed at a temperature of greater than or equal to about 10° C. to less than or equal to about 150° C. in solution or in a solid phase to eliminate $NH_3$ (or $R_3SiNH_2$) to an oligomeric, or polymeric precursor, which remains soluble in aprotic solvents and meltable.

Alternately, the intermediate is treated with $MNH_2$ or $M(NH_2)_2$ or mixtures thereof to produce the intermediate $M_1M_2(R_3Si)_mP_xO_yN_{z+m}H_{n+(m-2,3,-6)}C_o$ (where R is $C_1$-$C_8$ alkyl or H). This intermediate is heated gently at a temperature of greater than or equal to about 10° C. to less than or equal to about 150° C. to produce a higher molecular weight aprotic-solvent soluble and meltable precursor.

The current technology provides another method of synthesizing a precursor for making a polymeric, glass, or ceramic material. The method comprises reacting $OPCl_3$ with $NH_3$ or $MNH_2$, where M is Li, Na, K, Mg, Ca, Ba, or combinations thereof, to form $O=P(NH_2)_3$. The reacting the $OPCl_3$ with $MNH_2$ is performed in a polar, aprotic solvent at a temperature of greater than or equal to about −50° C. to less than or equal to about 200° C., greater than or equal to about 0° C. to less than or equal to about 150° C., or greater than or equal to about 20° C. to less than or equal to about 70° C., thus forming a reaction mixture. Non-limiting examples of polar, aprotic solvents include tetrahydrofuran (THF), dimethoxyethane (glyme), bis(2-methoxyethyl) ether (diglyme), acetone, N—N-dimethylformamide (DMF), acetonitrile (MeCN), dimethyl sulfoxide (DMSO), and combinations thereof.

The method then comprises reacting the $O=P(NH_2)_3$ with $M1NH_2$, where M1 is Li, Na, K, Mg, Ca, Ba, or combinations thereof, to form the precursor as an oligomer or a polymer. The reacting comprises adding the $M1NH_2$ to the reaction mixture. To form the oligomer, the reacting the $O=P(NH_2)_3$ with the $M1NH_2$, is performed at a temperature of greater than or equal to about −50° C. to less than or equal to about 200° C., greater than or equal to about 0° C. to less than or equal to about 150° C., or greater than or equal to about 25° C. to less than or equal to about 100° C. To form the polymer, the reacting the $O=P(NH_2)_3$ with the $M1NH_2$ is performed at a temperature of greater than or equal to about 20° C. to less than or equal to about 500° C., greater than or equal to about 50° C. to less than or equal to about 450° C., or greater than or equal to about 75° C. to less than or equal to about 400° C. In some embodiments, the $O=P(NH_2)_3$ is heated to form a branched or cyclomeric compound and then reacted with the $M1NH_2$ as discussed above.

In some embodiments the method further comprises increasing the molecular weight of the oligomeric precursor by heating the oligomeric precursor to a temperature of greater than or equal to about 40° C. to less than or equal to about 300° C., greater than or equal to about 50° C. to less than or equal to about 250° C., or greater than or equal to about 75° C. to less than or equal to about 200° C. In other embodiments, the method further comprises increasing a ceramic yield of the polymeric precursor by heating the polymeric precursor to a temperature of greater than or equal to about 50° C. to less than or equal to about 400° C., greater than or equal to about 75° C. to less than or equal to about 350° C., or greater than or equal to about 100° C. to less than or equal to about 300° C.

The precursor itself can be used in a variety of embodiments. As non-limiting examples, the precursor can be used: (1) as a solid-state electrolyte for a solid-state battery that cycles lithium or sodium ions; (2) to generate composite electrolyte films, e.g., ion-conducting polymer-precursor composite material, wherein the ion-conducting polymer is polyethylene oxide (PEO), polypropylene oxide (PPO), an ion-conducting carboxylate polymer, copolymers thereof, or mixtures thereof; (3) as a film coating on a polymer separator, including for use in a symmetric cell; (4) to generate composite films on a substrate that is not a separator, including for use in a symmetric cell, e.g., PEO/precursor composite films substrates; (5) as a binder in an anode active material and/or in a cathode active material; and (6) as a ceramic-forming adhesive.

The oligomeric or polymeric precursor can optionally be transformed into the polymer, glass or ceramic material by heating the oligomeric or polymeric precursor to a temperature of greater than or equal to about ambient temperature to less than or equal to about 1500° C., greater than or equal to about ambient temperature to less than or equal to about 1000° C., or greater than or equal to about 100° C. to less than or equal to about 1000° C. to form the polymer, glass, or ceramic material. As used herein, a "glass" is a non-crystalline (amorphous)inorganic material that has glass transition and a "ceramic" is a crystalline, semi-crystalline, or non-crystalline inorganic material that does not have a glass transition.

The polymer, glass, or ceramic precursor material can be used, as non-limiting examples, as a bonding agent between components of a solid-state electrode, to fill pores in a solid-state battery component, as a polymer applied to a ceramic substrate, or as a sintering aid. In various embodiments, the method further comprises applying the oligomeric or polymeric precursor to at least a portion of a surface, and optionally within pores, of a battery component selected from the group consisting of a cathode, an anode, a solid electrolyte, and combinations thereof, and then heating to form the ceramic material as described above. A second solid-state battery component can be disposed on top of the oligomeric or polymeric precursor before the heating in order to generate a ceramic bond or interface between the components after the heating. The applying can be performed by any method known in the art, such as by a process selected from the group consisting of doctor blading, spreading, brushing, spin casting, pouring, pipetting, printing, spray coating, dip coating, and combinations thereof as non-limiting examples. In some embodiments, the solid-state battery component is dip-coated into the oligomeric or polymeric precursor, and then the heating is performed to generate a solid coating that surrounds the solid-state battery component and fills pores within the component when present. The ceramic material can be substantially free of pinholes, i.e., holes having a diameter of greater than or equal to about 5 nm to less than or equal to about 20 nm. By "substantially free" it is meant that less than about 5%, less than about 2.5%, less than 1%, or less than 0.5% of the ceramic material comprises pinholes. The glass or ceramic material is conductive to ions, such as Li, Na, Mg, or Si ions. In some embodiments, the glass or ceramic material includes pinholes, which can be filled with the same or different glass or ceramic material.

The current technology provides another method of synthesizing a precursor for making a polymer, glass, or ceramic material. The method comprises reacting $OPCl_3$ with $NH_3$ or $MNH_2$, where M is Li, Na, K, Mg, Ca, Ba, or combinations thereof, to form $O=P(NH_2)_3$. The reacting the $OPCl_3$ with $MNH_2$ is performed in a polar, aprotic solvent at a temperature of greater than or equal to about −50° C. to less than or equal to about 200° C., greater than or equal to about 0° C. to less than or equal to about 150° C., or greater than or equal to about 20° C. to less than or equal to about 70° C.; thus forming a reaction mixture. Non-limiting examples of polar, aprotic solvents include tetrahydrofuran (THF), dimethoxyethane (glyme), bis(2-methoxyethyl) ether (diglyme), acetone, N—N-dimethylformamide (DMF), acetonitrile (MeCN), dimethyl sulfoxide (DMSO), and combinations thereof.

The method then comprises heating the $O=P(NH_2)_3$ to form a branched or cyclomeric compound and reacting the branched or cyclomeric compound with $M1NH_2$, where M1 is Li, Na, K, Mg, Ca, Ba, or combinations thereof, to form the precursor. as an oligomer or a polymer. To form the oligomer, the reacting the $O=P(NH_2)_3$ with the $M1NH_2$, is performed at a temperature of greater than or equal to about −50° C. to less than or equal to about 200° C., greater than or equal to about 0° C. to less than or equal to about 150° C., or greater than or equal to about 25° C. to less than or equal to about 100° C. To form the polymer, the reacting the $O=P(NH_2)_3$ with the $M1NH_2$ is performed at a temperature of greater than or equal to about 20° C. to less than or equal to about 500° C., greater than or equal to about 50° C. to less than or equal to about 450° C., or greater than or equal to about 75° C. to less than or equal to about 400° C.

In some embodiments the method further comprises increasing the molecular weight of the oligomeric precursor by heating the oligomeric precursor to a temperature of greater than or equal to about 40° C. to less than or equal to about 300° C., greater than or equal to about 50° C. to less than or equal to about 250° C., or greater than or equal to about 75° C. to less than or equal to about 200° C. In other embodiments, the method further comprises increasing a ceramic yield of the polymeric precursor by heating the polymeric precursor to a temperature of greater than or equal to about 50° C. to less than or equal to about 400° C., greater than or equal to about 75° C. to less than or equal to about 350° C., or greater than or equal to about 100° C. to less than or equal to about 300° C.

The precursor itself can be used in a variety of embodiments. As non-limiting examples, the precursor can be used: (1) as a solid-state electrolyte for a solid-state battery that cycles lithium or sodium ions; (2) to generate composite electrolyte films, e.g., ion-conducting polymer-precursor composite material, wherein the ion-conducting polymer is polyethylene oxide (PEO), polypropylene oxide (PPO), an ion-conducting carboxylate polymer, copolymers thereof, or mixtures thereof; (3) as a film coating on a polymer separator, including for use in a symmetric cell; (4) to generate composite films on a substrate that is not a separator, including for use in a symmetric cell, e.g., PEO/precursor composite films substrates; (5) as a binder in an anode active material and/or in a cathode active material; and (6) as a ceramic-forming adhesive.

The oligomeric or polymeric precursor can optionally be transformed into the polymer glass or ceramic material by heating the oligomeric or polymeric precursor to a temperature of greater than or equal to about ambient temperature to less than or equal to about 1500° C., greater than or equal to about ambient temperature to less than or equal to about 1000° C., or greater than or equal to about 100° C. to less than or equal to about 1000° C. to form the polymer, glass, or ceramic material.

The glass or ceramic material can be used, as non-limiting examples, as a bonding agent between components of a solid-state electrode, to fill pores in a solid-state battery component, as a ceramic disposed on a ceramic substrate, or as a sintering aid. In various embodiments, the method further comprises applying the oligomeric or polymeric precursor to at least a portion of a surface, and optionally within pores, of a battery component selected from the group consisting of a cathode, an anode, a solid electrolyte, and combinations thereof, and then heating to form the ceramic material as described above. A second solid-state battery component can be disposed on top of the oligomeric or polymeric precursor before the heating in order to generate a ceramic bond or interface between the components after the heating. The applying can be performed by any method known in the art, such as by a process selected from the group consisting of doctor blading, spreading, brushing, spin casting, pouring, pipetting, printing, spray coating, dip coating, and combinations thereof as non-limiting examples. In some embodiments, the solid-state battery component is dip-coated into the oligomeric or polymeric precursor, and then the heating is performed to generate a solid coating that surrounds the solid-state battery component and fills pores within the component when present. The ceramic material can be substantially free of pinholes, i.e., holes having a diameter of greater than or equal to about 5 nm to less than or equal to about 20 nm. By "substantially free" it is meant that less than about 5%, less than about 2.5%, less than 1%, or less than 0.5% of the ceramic material comprises pinholes. The some embodiments, the glass or ceramic material includes pinholes, which can be filled with the same or different glass or ceramic material.

The current technology further provides another method of synthesizing a precursor for making a polymer, glass, or ceramic material. The method comprises reacting $OPCl_3$ with $(Me_3X)_2NH$, where Me is methyl and X is Si, Ge, Sn, or combinations thereof, to form $O=P(NHSiMe_3)_3$. Although it is understood that other alkyl groups other than methyl can be used, the use of methyl is described herein. The reacting $OPCl_3$ with $(Me_3X)_2NH$, is performed in a polar, aprotic solvent as described above; thus forming a reaction mixture, and at a temperature of greater than or equal to about −50° C. to less than or equal to about 200° C., greater than or equal to about −10° C. to less than or equal to about 150° C., greater than or equal to about 20° C. to less than or equal to about 120° C., or greater than or equal to about 40° C. to less than or equal to about 100° C. for a time of greater than or equal to about 2 minutes to less than or equal to about 10 hours, greater than or equal to about 30 minutes to less than or equal to about 8 hours, or greater than or equal to about 1 hour to less than or equal to about 6 hours.

The method then comprises adding $M1NH_2$ to the reaction mixture and reacting the $O=P(NHSiMe_3)_3$ with the $M1NH_2$, where M1 is Li, Na, K, Mg, Ca, Ba, or combinations thereof to form the precursor as an oligomer or a polymer. To form the oligomer, the reacting the $O=P(NHSiMe_3)_3$ with the $M1NH_2$ is performed at a temperature of greater than or equal to about −50° C. to less than or equal to about 200° C., greater than or equal to about 0° C. to less than or equal to about 150° C., or greater than or equal to about 25° C. to less than or equal to about 100° C. To form the polymer, the reacting the $O=P(NHSiMe_3)_3$ with the $M1NH_2$ is performed at a temperature of greater than or equal to about 20° C. to less than or equal to about 500° C., greater than or equal to about 50° C. to less than or equal to about 450° C., or greater than or equal to about 75° C. to less than or equal to about 400° C.

In some embodiments the method further comprises increasing the molecular weight of the oligomeric precursor by heating the oligomeric precursor to a temperature of greater than or equal to about 40° C. to less than or equal to about 300° C., greater than or equal to about 50° C. to less than or equal to about 250° C., or greater than or equal to about 75° C. to less than or equal to about 200° C. In other embodiments, the method further comprises increasing a ceramic yield of the polymeric precursor by heating the polymeric precursor to a temperature of greater than or equal to about 50° C. to less than or equal to about 400° C., greater than or equal to about 75° C. to less than or equal to about 350° C., or greater than or equal to about 100° C. to less than or equal to about 300° C.

In some embodiments, at least one of Al, Zn, S, or Se is introduced into the oligomeric or polymeric precursor. In order to introduce Al and/or Zn, the method comprises reacting the oligomeric or polymeric precursor with at least one of $Y(OR)_n$, $Y(O_2CR')_n$, $Y(NO_3)_n$, and $YCl_n$, wherein Y is Al or Zn, n is 3 when Y is Al, n is 2 when Y is Zn, and R and R' are independently a saturated C1-C5 alkyl that is branched or unbranched, and substituted or unsubstituted, such as methyl or propyl as non-limiting examples. In order to introduce S and/or Se, the method comprises reacting the oligomeric or polymeric precursor with at least one of $Li_2S$ or $Li_2Se$ at a temperature of greater than or equal to about room temperature to less than or equal to about 80° C.

The precursor itself can be used in a variety of embodiments. As non-limiting examples, the precursor can be used: (1) as a solid-state electrolyte for a solid-state battery that cycles lithium or sodium ions; (2) to generate composite electrolyte films, e.g., ion-conducting polymer-precursor composite material, wherein the ion-conducting polymer is polyethylene oxide (PEO), polypropylene oxide (PPO), an ion-conducting carboxylate polymer, copolymers thereof, or mixtures thereof; (3) as a film coating on a polymer separator, including for use in a symmetric cell; (4) to generate composite films on a substrate that is not a separator, including for use in a symmetric cell, e.g., PEO/precursor composite films substrates; (5) as a binder in an anode active material and/or in a cathode active material; and (6) as a ceramic-forming adhesive.

The oligomeric or polymeric precursor can optionally be transformed into the polymer, glass, or ceramic material by heating the oligomeric or polymeric precursor to a temperature of greater than or equal to about ambient temperature to less than or equal to about 1500° C., greater than or equal to about ambient temperature to less than or equal to about 1000° C., or greater than or equal to about 100° C. to less than or equal to about 1000° C. to form the polymer, glass or ceramic material.

The ceramic material can be used, as non-limiting examples, as a bonding agent between components of a solid-state electrode, to fill pores in a solid-state battery component, as a ceramic disposed on a ceramic substrate, or as a sintering aid. In various embodiments, the method further comprises applying the oligomeric or polymeric precursor to at least a portion of a surface, and optionally within pores, of a battery component selected from the group consisting of a cathode, an anode, a solid electrolyte, and combinations thereof, and then heating to form the ceramic material as described above. A second solid-state battery component can be disposed on top of the oligomeric or polymeric precursor before the heating in order to generate a ceramic bond or interface between the components after the heating. The applying can be performed by any method known in the art, such as by a process selected from the group consisting of doctor blading, spreading, brushing, spin casting, pouring, pipetting, printing, spray coating, dip coating, and combinations thereof as non-limiting examples. In some embodiments, the solid-state battery component is dip-coated into the oligomeric or polymeric precursor, and then the heating is performed to generate a solid coating that surrounds the solid-state battery component and fills pores within the component when present. The ceramic material can be substantially free of pinholes, i.e., holes having a diameter of greater than or equal to about 5 nm to less than or equal to about 20 nm. By "substantially free" it is meant that less than about 5%, less than about 2.5%, less than 1%, or less than 0.5% of the ceramic material comprises pinholes. The ceramic material is conductive to ions, such as Li, Na, Mg, or Si ions. In some embodiments, the glass or ceramic material includes pinholes, which can be filled with the same or different glass or ceramic material.

The current technology yet further provides another method of synthesizing a precursor for making a polymer, glass, or ceramic material. The method comprises reacting $Cl_6N_3P_3$ with $NH(SiMe_3)_2$ to form the precursor as either a SiPHN oligomer precursor or a SiPHN polymer precursor. To form the SiPHN oligomer precursor, the reacting the $Cl_6N_3P_3$ with the $NH(SiMe_3)_2$ is performed at a temperature of greater than or equal to about −50° C. to less than or equal to about 200° C., greater than or equal to about 0° C. to less than or equal to about 150° C., or greater than or equal to about 25° C. to less than or equal to about 100° C. To form the SiPHN polymer precursor, the reacting the $Cl_6N_3P_3$ with the $NH(SiMe_3)_2$ is performed at a temperature of greater than or equal to about 20° C. to less than or equal to about 500° C., greater than or equal to about 50° C. to less than or equal to about 450° C., or greater than or equal to about 75° C. to less than or equal to about 400° C.

In various embodiments, the method further includes reacting the SiPHN precursor with $MNH_2$, where M is Li, Na, K, Mg, Ca, Ba, or combinations thereof to form a MSiPHN precursor as either a MSiPHN oligomer precursor or a MSiPHN polymer precursor. To form the MSiPHN oligomer precursor, the reacting the $Cl_6N_3P_3$ with the $NH(SiMe_3)_2$ is performed at a temperature of greater than or equal to about −50° C. to less than or equal to about 200° C., greater than or equal to about 0° C. to less than or equal to about 150° C., or greater than or equal to about 25° C. to less than or equal to about 100° C. To form the MSiPHN polymer precursor, the reacting the $Cl_6N_3P_3$ with the $NH(SiMe_3)_2$ is performed at a temperature of greater than or equal to about 20° C. to less than or equal to about 500° C., greater than or equal to about 50° C. to less than or equal to about 450° C., or greater than or equal to about 75° C. to less than or equal to about 400° C.

In some embodiments the method further comprises increasing the molecular weight of the SiPHN or MSiPHN oligomer precursor by heating the SiPHN or MSiPHN oligomer precursor to a temperature of greater than or equal to about 40° C. to less than or equal to about 300° C., greater than or equal to about 50° C. to less than or equal to about 250° C., or greater than or equal to about 75° C. to less than or equal to about 200° C. In other embodiments, the method further comprises increasing a ceramic yield of the SiPHN or MSiPHN polymer precursor by heating the SiPHN or MSiPHN polymeric precursor to a temperature of greater than or equal to about 50° C. to less than or equal to about 400° C., greater than or equal to about 75° C. to less than or equal to about 350° C., or greater than or equal to about 100° C. to less than or equal to about 300° C.

The SiPHN precursor or the MSiPHN precursor themselves can be used in a variety of embodiments. As non-limiting examples, the precursors can be used: (1) as a solid-state electrolyte for a solid-state battery that cycles lithium or sodium ions; (2) to generate composite electrolyte films, e.g., ion-conducting polymer-precursor composite material, wherein the ion-conducting polymer is polyethylene oxide (PEO), polypropylene oxide (PPO), an ion-conducting carboxylate polymer, copolymers thereof, or mixtures thereof; (3) as a film coating on a polymer separator, including for use in a symmetric cell; (4) to generate composite films on a substrate that is not a separator, including for use in a symmetric cell, e.g., PEO/precursor composite films substrates; (5) as a binder in an anode active material and/or in a cathode active material; and (6) as a ceramic-forming adhesive.

The SiPHN precursor or the MSiPHN precursor can optionally be transformed into the corresponding polymer glass or ceramic material by heating the SiPHN precursor or the MSiPHN precursor to a temperature of greater than or equal to about ambient temperature to less than or equal to about 1500° C., greater than or equal to about ambient temperature to less than or equal to about 1000° C., or greater than or equal to about 100° C. to less than or equal to about 1000° C. to form the polymer, glass, or ceramic material.

The glass or ceramic material can be used, as non-limiting examples, as a bonding agent between components of a solid-state electrode, to fill pores in a solid-state battery component, as a ceramic disposed on a ceramic substrate, or as a sintering aid. In various embodiments, the method further comprises applying the oligomeric or polymeric precursor to at least a portion of a surface, and optionally within pores, of a battery component selected from the group consisting of a cathode, an anode, a solid electrolyte, and combinations thereof, and then heating to form the ceramic material as described above. A second solid-state battery component can be disposed on top of the oligomeric or polymeric precursor before the heating in order to generate a ceramic bond or interface between the components after the heating. The applying can be performed by any method known in the art, such as by a process selected from the group consisting of doctor blading, spreading, brushing, spin casting, pouring, pipetting, printing, spray coating, dip coating, and combinations thereof as non-limiting examples. In some embodiments, the solid-state battery component is dip-coated into the oligomeric or polymeric precursor, and then the heating is performed to generate a solid coating that surrounds the solid-state battery component and fills pores within the component when present. The ceramic material can be substantially free of pinholes, i.e., holes having a diameter of greater than or equal to about 5 nm to less than or equal to about 20 nm. By "substantially free" it is meant that less than about 5%, less than about 2.5%, less than 1%, or less than 0.5% of the ceramic material comprises pinholes. The some embodiments, the glass or ceramic material includes pinholes, which can be filled with the same or different glass or ceramic material.

The current technology also provides a method of fabricating a solid-state battery that comprises applying any of the oligomeric or polymeric precursors described herein to a battery component, and heating the oligomeric or polymeric precursor to form a ceramic material. The battery component can be, for example, an anode, a cathode, a solid-state electrolyte, a separator, or a combination thereof. The polymeric precursors can be added to a battery component material prior to the heating in order to generate a composite battery component material or the polymeric precursors can be applied over the battery component in order to generate a coated battery component. Alternatively, as discussed above, in some embodiments the precursor is included in the battery component without heating and conversion into a ceramic material.

The current technology also provides an oligomeric or polymeric precursor made by any of the above methods.

The current technology also provides a ceramic material made from an oligomeric or polymeric precursor by any of the above methods The current technology also provides a solid state battery comprising a ceramic material made by any of the above methods. The ceramic material is disposed on at least one of an anode, a cathode, a separator, or a solid-state electrolyte.

The current technology yet further provides a compound having the formula $M1_aM2_bP_mH_nO_xN_yS_z$ where M1 is Li, Na, K, Mg, Ca, Ba, or combinations thereof; M2 is Al, S, Se, C, Si, Ge, Sn, Zn, or combinations thereof; $1 \leq a \leq 10$; $0 \leq b \leq 10$; $0 \leq m \leq 5a$; and $0 \leq n \leq 60$, $0 \leq x \leq 5a$; $0 \leq y \leq 20a$; $0 \leq z \leq 20a$, wherein the compound is an oligomer, or polymer that is configured to form a coating, a bonding material, or an ion conducting pathway through a porous material. The compound is made according to any of the methods provided herein. The compound can optionally be heated as described above in order to be transformed into a ceramic material.

The current technology also provides a solid-state battery comprising a ceramic material formed from the compound having the formula $M1_aM2_bN_xO_yP_zH_c$.

Embodiments of the present technology are further illustrated through the following non-limiting examples.

EXAMPLES

In order to demonstrate the utility of making precursors according to the current technology, it is also important to have a set of substrates qualified to be used to test the efficacy of the coatings and processing conditions explored. To optimize ion conductivity in the resulting ceramized precursors, well-defined substrates are needed that offer: (1) no lithium or sodium ion conductivity; (2) minimal lithium or sodium ion conductivity; or (3) good lithium or sodium ion conductivity. The below approaches either use a polymer separator as a substrate or eliminate the need for a ceramic substrate.

To this end, a series of produced substrates are chosen that are typically 10-50 μm thick and fully or partially dense and meet the criteria just above. Thus, thin films of $\alpha$-$Al_2O_3$, $LiAlO_2$ of various densities, and LATSP ($Li_{1.7}Al_{0.3}Ti_{1.7}Si_{0.4}P_{2.6}O_{12}$) are coated. Substrates of these materials exhibit Li$^+$ conductivities as shown in Table 1.

TABLE 1

| Substrates used in coating studies | | |
|---|---|---|
| Substrate | Thickness | $\sigma_t(S\ cm^{-1})$ |
| $\alpha$-$Al_2O_3$ | $\geq 25$ μm | N/A |
| $LiAlO_2$ | 20-60 μm | $1.6 \times 10^{-8}$ |
| LATSP[17] | 20-60 μm | $4.3 \times 10^{-4} \pm 1.4 \times 10^{-4}$ |

The first step in developing precursors is to realize, simple low cost, minimal step syntheses of precursor systems that are easily modified to allow exploration, and thereafter, control of both precursor properties and processing conditions necessary to generate optimal coating, binder and bonding systems. Thus, work to explore synthetic approaches to various precursors is described.

Precursor Syntheses.

Polymer Precursor Reactions for PON and Li$_x$PON.

Several approaches can be used for these precursors. Perhaps the simplest is ammonolysis of OPCl$_3$ to produce the phosphoramide OP(NH$_2$)$_3$:

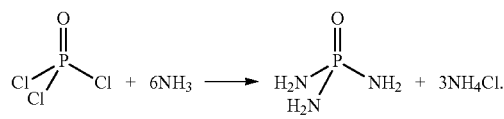

However, depending on the solvent used, byproduct NH$_4$Cl is difficult to remove or interfere with purification. An alternative uses NaNH$_2$ as follows:

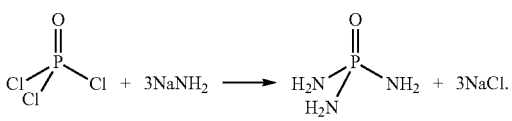

The reason for using NaNH$_2$ rather than LiNH$_2$ is that LiCl is more soluble in polar solvents than NaCl and may not precipitate as easily, and thus, NaNH$_2$ is preferable in some embodiments.

Thereafter, there are two options for producing LiPON precursors. The first is to promote oligomerization/polymerization following reactions shown as stepwise condensation reactions (in which "slight heat" refers to heating from greater than or equal to about -10° C. to less than or equal to about 100° C.):

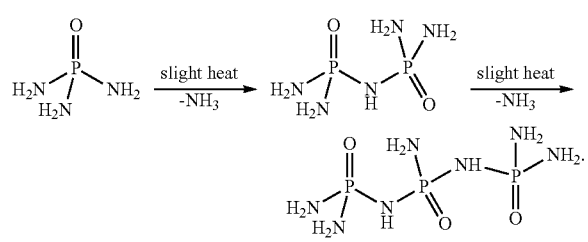

As shown, only linear oligomers are formed. However, it is highly likely that both branched and cyclomeric products are produced coincidentally:

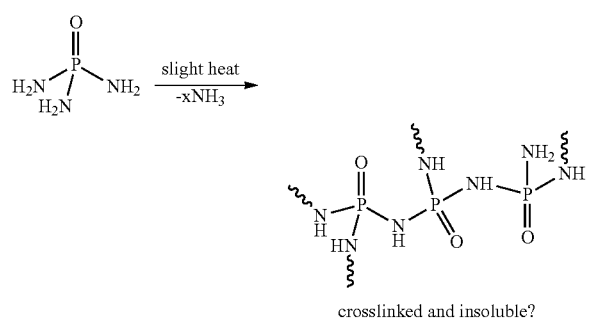

crosslinked and insoluble?

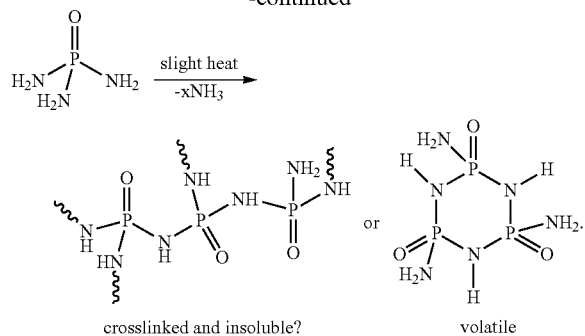

crosslinked and insoluble?      volatile

The volatile system offers a novel method for chemical vapor deposition. At this juncture, it is possible to now add Li as shown below:

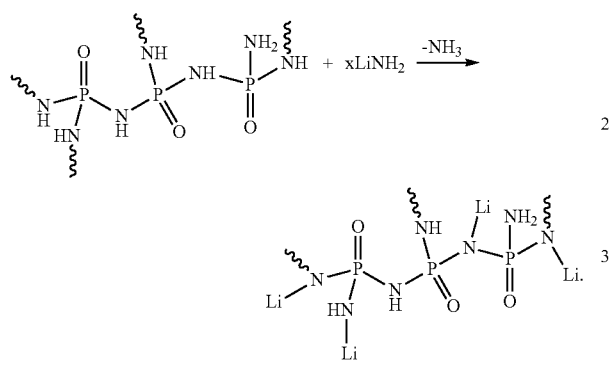

As an alternative, it is preferred that this be done right after the first step. This may not be optimal, but it appears to be the easiest approach:

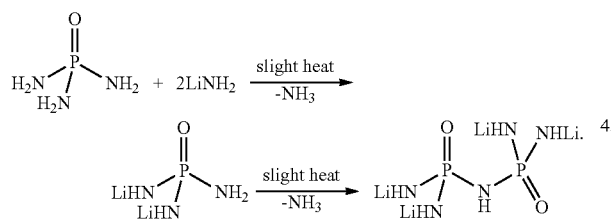

The Li content can be controlled by the degree of initial lithiation. Promoting a condensation reaction can also take place as described above. The condensation process is very likely to be much more complex than shown. However, one can use these intermediates as precursors to make LiPON thin films, binders or bonding agents by using traditional precursor processing techniques. In some instances, the intermediates will be liquids and in others, they will be meltable or soluble solids.

As demonstrated in the examples described below, it is possible to make $Li_{1.5}PON$, $Li_3PON$ and $Li_6PON$ precursors simply by choosing the amount of $LiNH_2$ to add. It is also possible to make a sodium equivalent by adding more $NaNH_2$ to make a NaPON precursor, for example $Na_3PON$. It is also possible to make a mixed ion precursor by adding both $NaNH_2$ and $LiNH_2$ in any possible ratio desired as demonstrated in the examples below.

Finally, a magnesium counterpart can be made by adding a magnesium amide such as $Mg(NiPr_2)_2$, which is used as an example and not meant to be limiting. Again, a mixed ion precursor can also be made by using any type of Na, Li or Mg compound that has the potential to either abstract a hydrogen from $O=P(NH_2)_3$ or oligomeric analogs replacing said hydrogen with that metal and any ratio of metals can be chosen to optimize ionic conductivity and other processing properties.

Polymer Precursors to LiSiPON.

The synthesis of silicon containing LiPON or LiSiPON has been previously reported. The following approach to precursors has not been used. In its simplest form, it takes advantage of the affinity of Si for Cl:

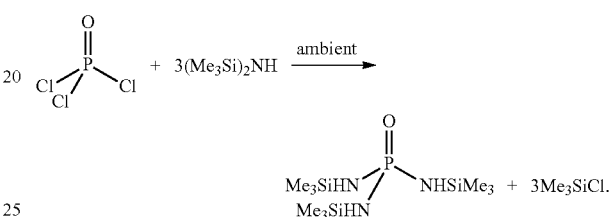

Another embodiment uses less than 2.5 $(Me_3Si)_2NH$:

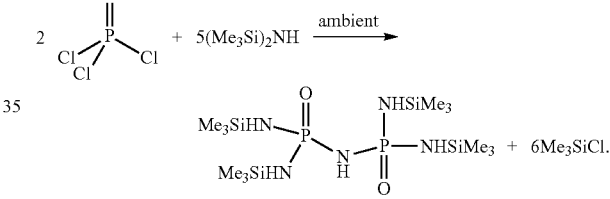

At this stage, the above compound can be lithiated (or use sodium or magnesium):

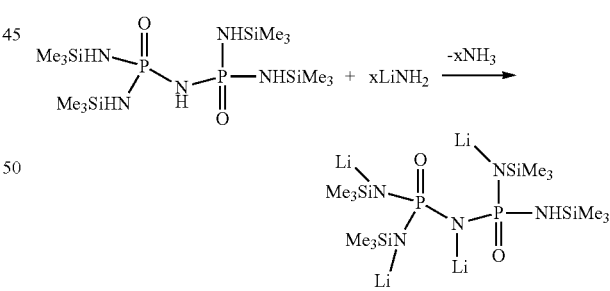

and then heated, as suggested by the following which is not meant to be the only reaction pathway:

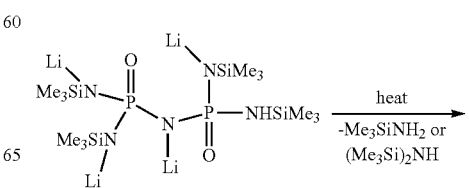

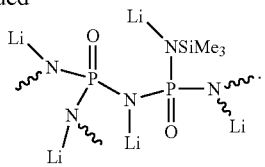

The resulting material's composition will depend on the original amount of LiNH$_2$ [NaNH$_2$ or Mg(NiPr)$_2$] or other deprotonating metallating compound introduced, and the conductivity will be determined by this as well as processing conditions. Thus, Li$_{1.5}$SiPON, Li$_3$SiPON, Li$_6$SiPON, Na$_3$SiPON, and Mg$_{1.5}$SiPON can be made as non-limiting exemplary M$_1$M$_2$P$_m$H$_n$O$_x$N$_y$S$_z$ compounds.

SiPHN and Li$_x$SPHN systems

The use of a polymer that is solely based on phosphorus and nitrogen is explored. The scheme starts form the cyclomer [Cl$_2$P=N]$_3$ and replaces Cl with NH via a Si—Cl exchange process.

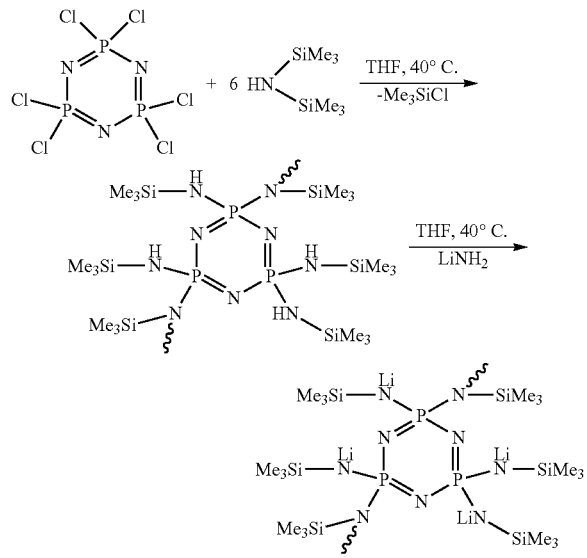

These examples demonstrate an approach for formulating systems for making processable polymers by using non-stoichiometric amounts of (Me$_3$Si)$_2$NH.

Experimental Methods.

Materials. Aluminum tri-sec-butoxide {Al[OCH(CH$_3$)CH$_2$CH$_3$]$_3$} is purchased from Chattem Chemicals (Chattanooga, TN), and absolute ethanol from Decon Labs (King of Prussia, PA). Triethanolamine [N(CH$_2$CH$_2$OH)$_3$], Polyacrylic acid [(C$_3$H$_4$O$_2$)$_n$, M$_n$ 2000], Polyethylene glycol [H(OCH$_2$CH$_2$)$_n$OH, M$_n$ 3400], Methyl ethyl ketone [C$_2$H$_5$COCH$_3$], Benzyl butyl phthalate {2-[CH$_3$(CH$_2$)$_3$O$_2$C]C$_6$H$_4$CO$_2$CH$_2$C$_6$H$_5$, 98%}, Lithium hydroxide monohydrate [LiOH·H$_2$O] and Propionic acid [CH$_3$CH$_2$COOH] are purchased from Sigma-Aldrich (Milwaukee, WI). Polyvinyl butyral [(C$_8$H$_{14}$O$_2$)$_n$, B-98, M$_n$ 40,000-70,000] is purchased from Butvar (Avon, OH). Tetraethoxysilane [Si(OC$_2$H$_5$)$_4$], Triethyl phosphate [(C$_2$H$_5$O)$_3$PO], Titanium isopropoxide [Ti(OiPr)$_4$] is purchased from Fischer Scientific (Pittsburgh, PA).

Analytical Methods.

Thermal gravimetric analysis (TGA) and differential thermal analysis (DTA) are performed on a SDT Q600 simultaneous TGA/DSC (TA instrument, Inc.). Samples (15-25 mg), hand pressed in a 3-mm dual action die, are placed in alumina pans and heated to 1000° C. at 10° C. min$^{-1}$ under constant N$_2$ flow (60 mL min$^{-1}$).

Scanning electron microscopy (SEM). Micrographs of as-produced and sintered thin films are taken using JSM-IT300HR In Touch Scope SEM (JEOL USA, Inc.) For imaging purpose, thin films are fractured, and powders are used as is. SPI sputter coater (SPI Supplies, Inc.) is used to sputter coat all the samples with gold and palladium.

X-Ray diffraction (XRD). As-produced powders and sintered films are characterized using Rigaku Rotating Anode Goniometer (Rigaku Denki., LTD., Tokyo, Japan). For data collection, as-produced powders are prepared by placing ~100 mg in XRD sample holders. Cu Kα (λ=1.54 Å) radiation operating at working voltage of 40 kV and current of 100 mA is used. Scans are continuous from 10 to 70° 2θ using a scan rate of 5 min$^{-1}$ in 0.01 increments. The presence of crystallographic phases, and their wt. fraction is determined by using Jade program 2010 (Version 1.1.5 from Materials Data, Inc.).

FTIR Spectra analyses are run on Nicolet 6700 Series FTIR spectrometer (Thermo Fisher Scientific, Inc.) and are used to measure FTIR spectra. 1 wt. % of the samples are mixed with KBr (International Crystal Laboratories); the mixtures are ground rigorously with an alumina mortal pestle; and the dilute samples are packed in the sample holder to be analyzed. Prior to data acquisition in the range of 4000-400 cm$^{-1}$, the sample chamber is purged with N$_2$.

GPC analyses is done on a Waters 440 system equipped with Waters Styragel columns (7.8×300, HT 0.5, 2, 3, 4) with RI detection using an Optilab DSP interferometric refractometer and THF as solvent. The system is calibrated using polystyrene standards. Analyses are performed using Empower 3 Chromatography Data Software (Waters, Corp., Milford, MA).

MALDI-TOF is done on Bruker AutoFlex Speed using poly(ethylene glycol) as a calibration standard, trihydroxyanthracene as the matrix and AgNO$_3$ as the ion source. Samples are prepared by mixing solutions of 5 parts matrix (10 mg mL$^{-1}$ in THF), 5 parts sample (1 mg mL$^{-1}$ in THF), and optionally 1 part AgNO$_3$ (1.0 mg mL$^{-1}$ in THF) and blotting the mixture on the target plate.

AC Impedance data is collected with broadband dielectric spectrometer (Biologics) in a frequency range of 7 MHz to 1 Hz at −35 to 80° C. in increments of 10° C. Concentric gold electrodes, 3 mm in diameter, are deposited using a SPI sputter coater on both surfaces of the films using a deposition mask. "EIS spectrum analyser" software is used for extracting total resistance. Equivalent circuit consisting of (R$_{total}$Q$_{total}$)(Q$_{electrode}$) is used. R and Q denote resistance and constant phase element, respectively. SEM fracture surface images are taken to measure sample thicknesses.

Example 1

Synthesis of PON from Phosphoramide.

In a 200 mL round bottom Schlenk flask, placed in an ice bath and under N$_{2(g)}$, NaNH$_2$ (7.0 g, 0.179 mol) is added to 80 mL of distilled THF. OPCl$_3$ (5.0 mL, 53.6 mmol) is then added with a graduated pipette to form a reaction mixture. The ice bath is removed after 1 d of reaction and the reaction was kept running at room temperature under N$_2$ for 1 week. The reaction mixture remains cloudy due to insoluble NaCl byproduct. Thereafter, the soluble and insoluble parts in the reaction mixture are separated by centrifugation. This results into 50 mL of stable suspension. To obtain the yield of the reaction, a small sample (3 mL) was taken from the solution and vacuum dried at 60° C. on a Schlenk line. The product is a yellow solid with a yield of 0.23 g, the total yield would be 3.8 g, which is about 75% of theoretical yield (5.1 g) PON Precursor.

Figure 5:
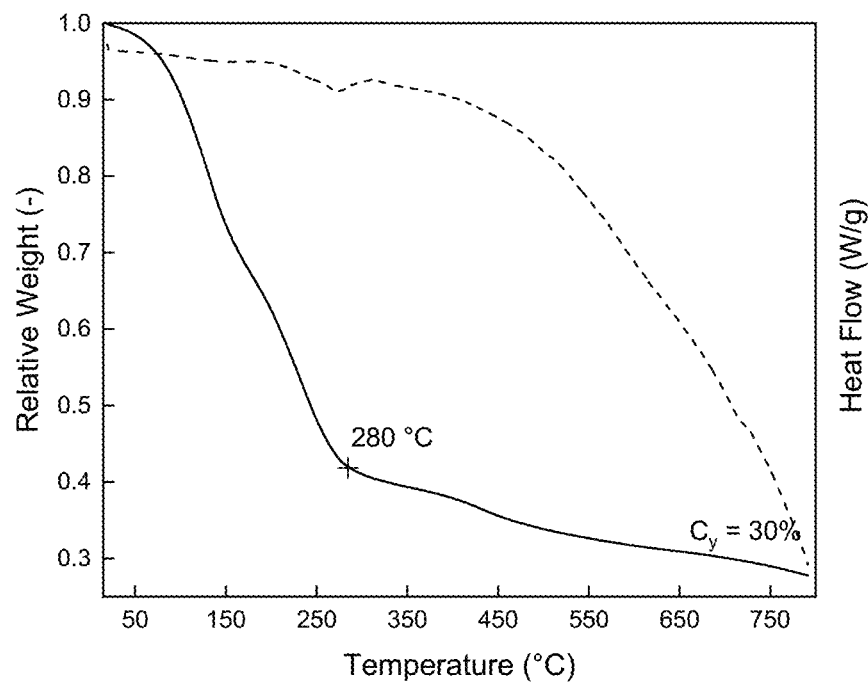
FIG. 5 shows the thermal gravimetric analysis (TGA)—differential thermal analysis (DTA) (800° C./$N_2$) of PON precursor [O=P(NH$_2$)$_3$].

FIG. 5 shows a TGA-DTA (800° C./$N_2$) of the PON precursor. Decomposition starts around 100° C. The ceramic yield at 800° C. is 30%.

Figure 6:
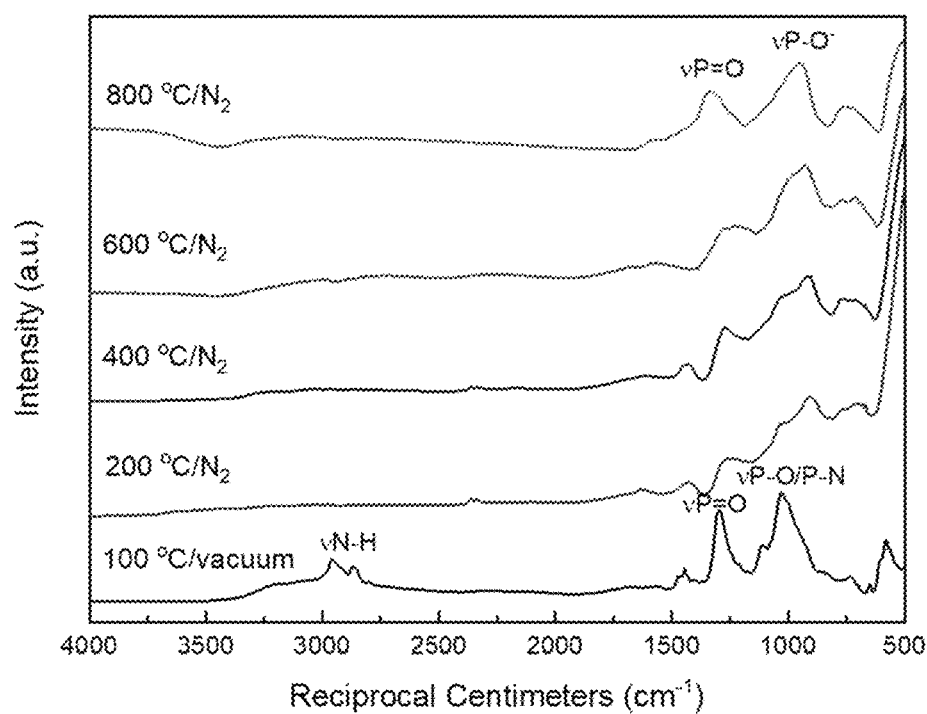
FIG. 6 shows Fourier-transform infrared (FTIR) spectra of PON precursor [O=P(NH$_2$)$_3$] heated to 100-800° C.

PON precursor is heated to different temperatures under $N_2$. FIG. 6 shows FTIRs of the precursor at selected temperatures. The precursor heated at 100° C./vacuum shows a vN—H band around 3000 cm$^{-1}$. Just below 200° C., there is a phase transformation. After heating to 200° C., vN—H disappeared. Spectra from TGA samples heated to 200 and 400° C. show mainly vP=O (~1200 cm$^-$) and vP—O—P (900 cm$^{-1}$). There is also a small peak around 1400 cm$^{-1}$ which is typical for v$NH_4^+$. Both spectra for the 600 and 800° C. TGAs show a typical PON phase, suggesting the phase transformation at ≤600° C.

Table below shows the typical FT-IR of PON and LiPON phases.

TABLE 2

Typical FT-IR of PON and LiPON phases.

| Phase | IR bands | Wavenumber, cm$^{-1}$ |
|---|---|---|
| PON | P—N=P | 1300 |
| | P—O—P | 1010 |
| | P—O/P—N | 900-1100 |
| | $NH_4^+$ | 1400 |
| | N—H | ~3400 |
| LiPON | P=O | 1150-1300 |
| | P—O$^-$ | 950-1150 |
| | P—O—P/P—N=P | 850-950 |
| | —$NH_2$/—NH | ~3400 |
| | Li—O—P | 450-550, 850-925, 1450-1500 |

Figure 7:
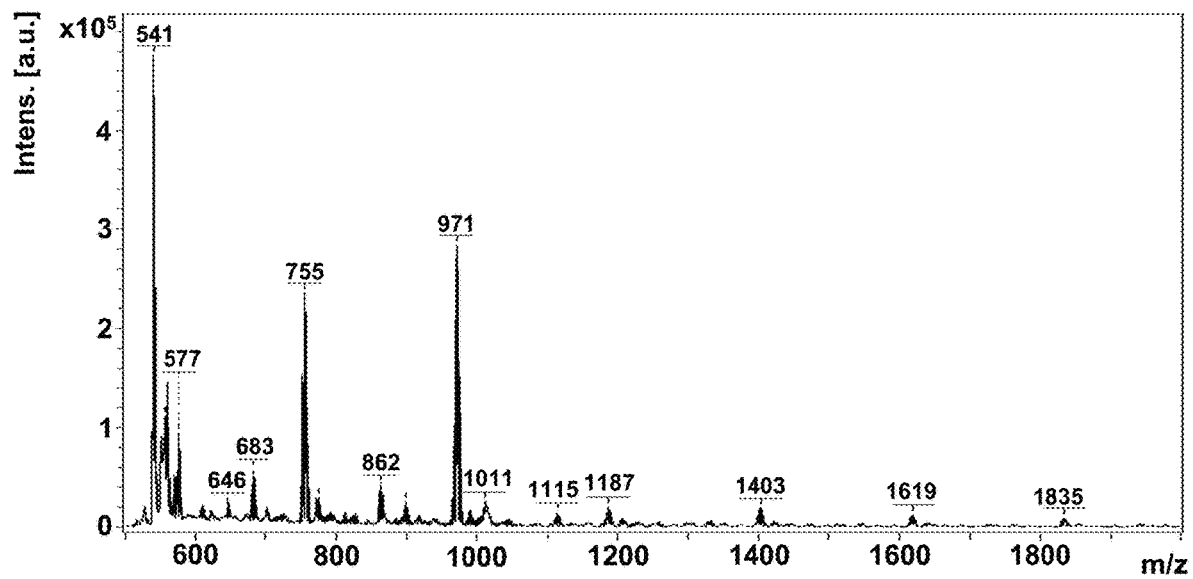
FIG. 7 shows matrix assisted laser desorption/ionization-time of flight (MALDI-ToF) of a blank test plate used as a baseline against MALDI taken with precursor samples.

FIG. 7 is the MALDI-ToF of a blank test plate used as a baseline against MALDI taken with precursor samples.

Figure 8:
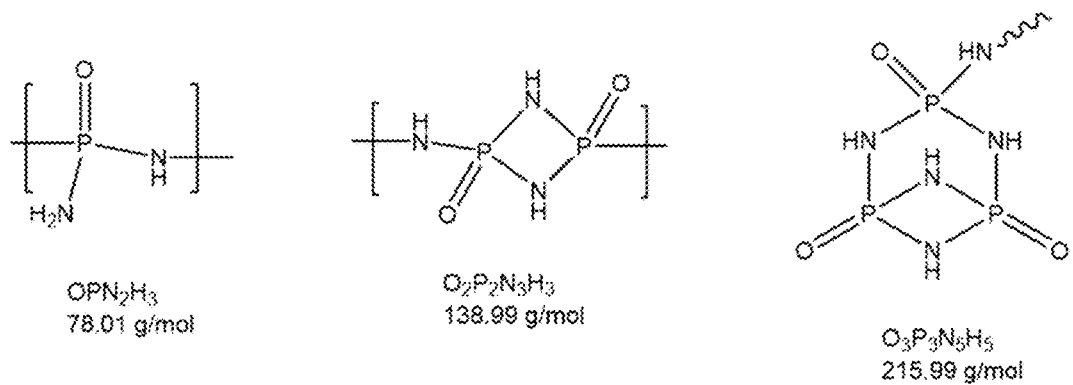
FIG. 8 shows monomer structures of PON precursor.

FIG. 8 shows possible components of an oligomer of a PON precursor. The structure C only has one end group that can react with another component and can only appear one or two times on an oligomer chain.

Figure 9:
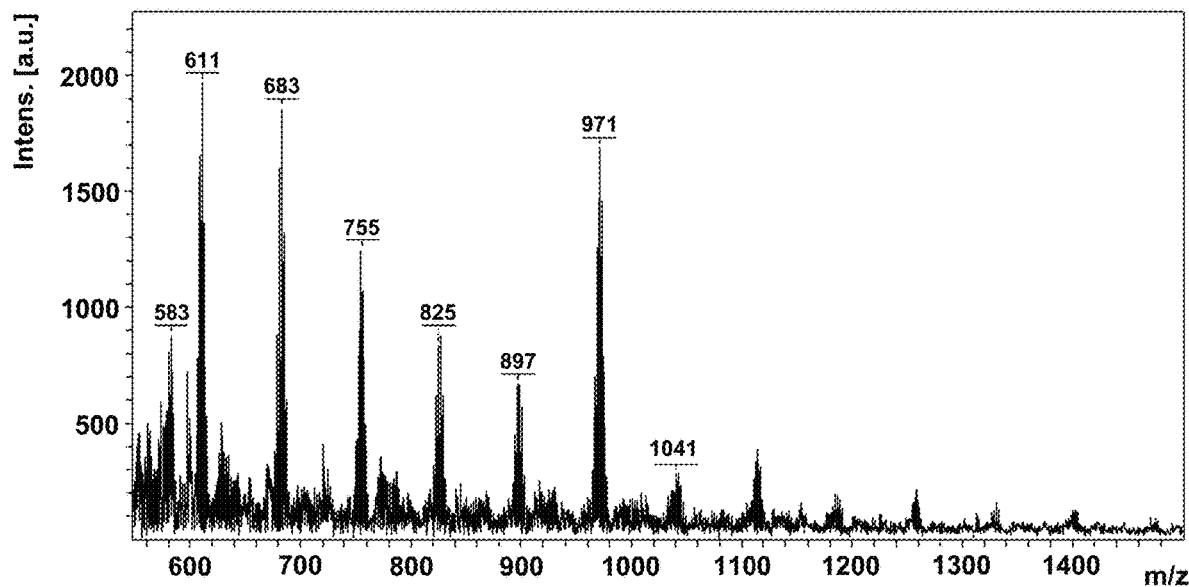
FIG. 9 shows MALDI-ToF of the PON precursor.

FIG. 9 is the MALDI-ToF of the PON precursor synthesized as above. Peaks at 583, 611, 825, 897, and 1041 m/z are observed. The peaks at 683, 755 and 971 m/z come from the matrix as shown in FIG. 7.

Based on the structures shown in FIG. 8, Table 3 shows the calculation of possible compositions of PON precursor, where "—H" stands for terminal hydrogen. If there is monomer structure C (FIG. 8), which is an end group itself, the calculation is added with one or less terminal hydrogen depending on how many C is used in the calculation. From the calculation, it is predicted that the product may include from about 4 to about 10 units of monomers.

TABLE 3

Possible compositions of PON precursor.

| m/z, Da | Possible compositions |
|---|---|
| 583 | 2A + 2C = 588.0 |
| 611 | 5A + C + —H = 607.0 |
| 825 | 6A + B + C + —H = 824.0 |
| 897 | 7A + B + C + —H = 902 |
| 1041 | 7A + 2B + C + —H = 1041 |

Figure 10:
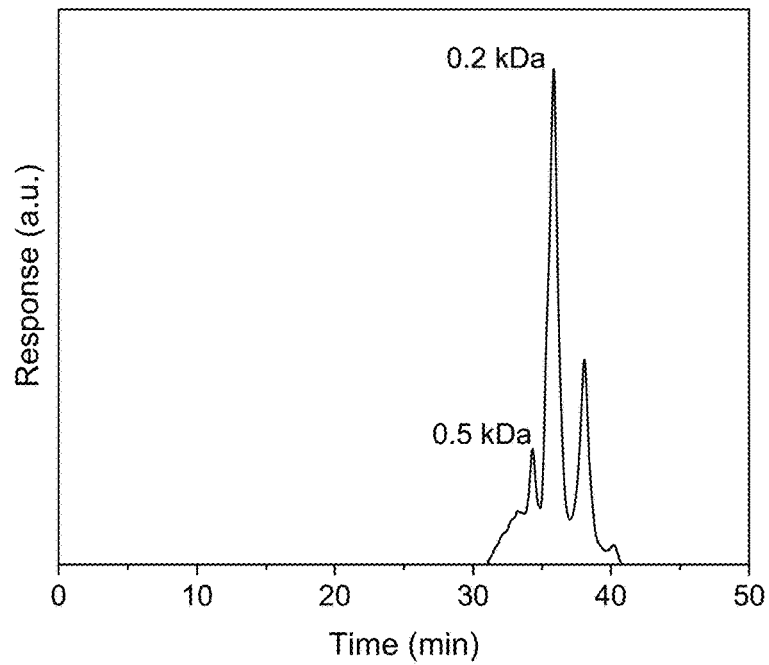
FIG. 10 shows a GPC of a PON precursor.

FIG. 10 shows a GPC of a PON precursor. Peaks are seen at 34 and 36 min, corresponding to MWs of 0.5 and 0.2 kDa. These peaks show much lower MWs than peaks found in MALDI, because GPC can only analyze soluble compounds, but the PON precursor is a suspension wherein not all the products are soluble. These peaks in the GPC correspond to 1-6 monomer units shown in FIG. 8.

Example 2

Synthesis of $Li_xPON$.

$Li_3PON$ precursor: Following the synthesis of PON precursor, $LiNH_2$ (3.0 g, 0.13 mol, the calculated amount of —NH in the PON precursor) is added to the suspension of PON precursor [O=P($NH_2$)$_3$] under $N_2$ while an ice bath is attached. The mixture became cloudy after adding $LiNH_2$ as it is not very soluble in THF. This is all performed under $N_2$. The mixture is kept stirring magnetically under $N_1$. The ice bath is removed after 1 d of reaction.

After a week of reacting, soluble and insoluble parts in the reaction mixture again are separated by centrifugation. This results in 30 mL of a yellow stable suspension. The yield is about 4 g (about 90% of theoretical yield).

Figure 11:
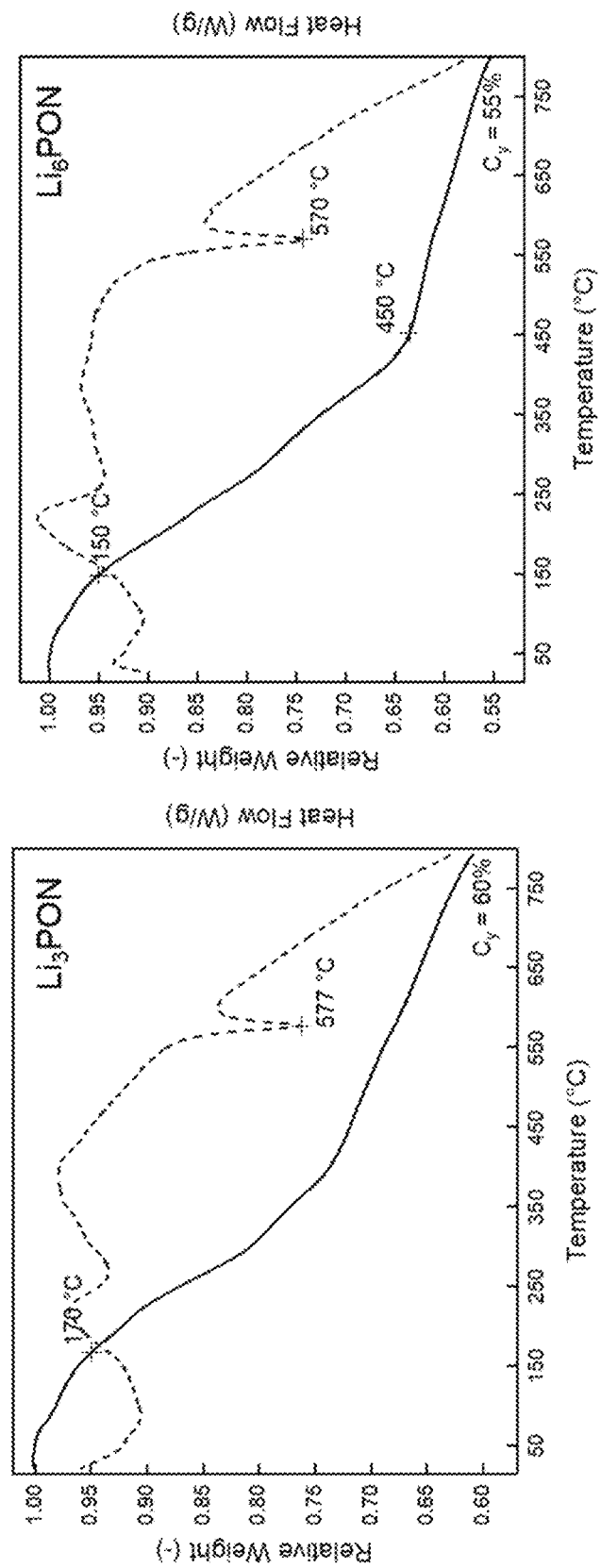
FIG. 11 shows TGA-DTA (800° C./$N_2$) of $Li_3PON$ and $Li_6PON$ precursors.

Similarly, $Li_6PON$ precursor can be synthesized with double the amount of FIG. 11 shows TGA-DTAs (800° C./$N_2$) of $Li_3PON$ and $Li_6PON$ precursors. For both precursors, decomposition starts 150-170° C. The ceramic yield at 800° C. is ~60% for $Li_3PON$ and ~55% for $Li_6PON$. Endotherms at 570-580° C. for both precursors suggest melting as no mass loss occurs coincidentally.

Figure 12:
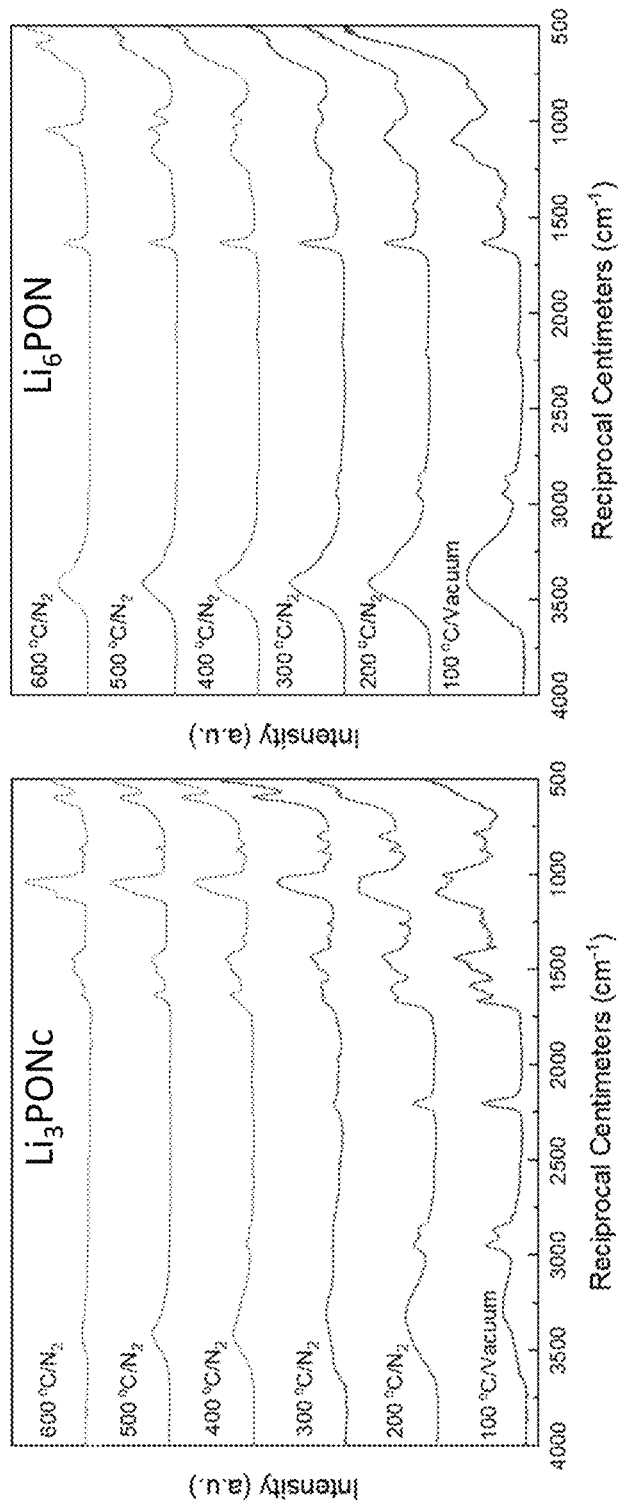
FIG. 12 shows FTIR spectra of $Li_3PON$ and $Li_6PON$ precursors heated to 100-600° C.

FIG. 12 compares FTIR spectra of $Li_3PON$ and $Li_6PON$ precursors heated to temperature 100-600° C. The spectra of $Li_3PON$ and $Li_6PON$ precursors heated at 100-200° C. are similar. Typical absorption peaks are vO—H/N—H (~3400 cm$^{-1}$), vN—H (~3000 cm$^{-1}$, 1500 cm$^{-1}$), vP=0 (1150-1300 cm$^{-1}$), vP—O$^-$ (1000-1150 cm$^{-1}$), vP-N=P (800-900 cm$^{-1}$) and vP—O—P (1150, 780-680 cm$^{-1}$). A peak at ~2200 cm$^{-1}$ is also observed, especially for $Li_xPON$ precursor, which may come from P—N$<_p^P$ or P—N=P bonds. The intensity of this peak decreases as temperature increases and disappears at 300° C., suggesting that P—N$≤_p^P$ or P—N=P bonds rearrange around this temperature. The intensities of vO—H/N—H bands reduce as temperature increases, the dominant absorption band at 1040 cm$^{-1}$ when heated to 600° C. can be assigned to vP—O$^-$.

The source of the vO—H band is unknown. Two possible explanations are that it comes from equilibria between N—H/P=O<->N=P and O—H, or from excess unreacted $LiNH_2$ which reacts with moisture to become LiOH.

Figure 13:
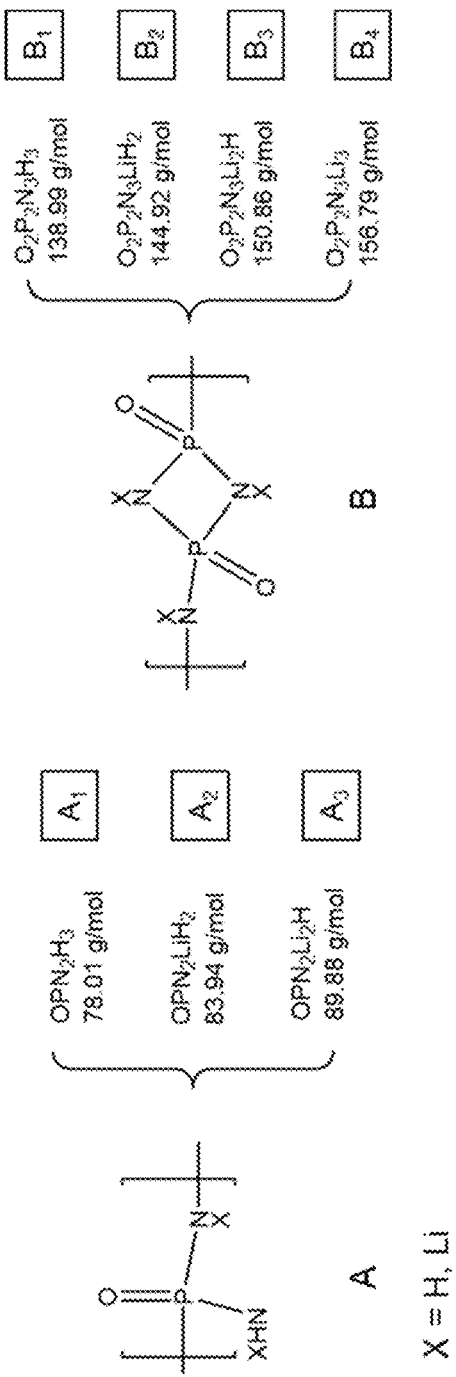
FIG. 13 shows possible monomer structures of $Li_xPON$ precursors.
Figure 14:
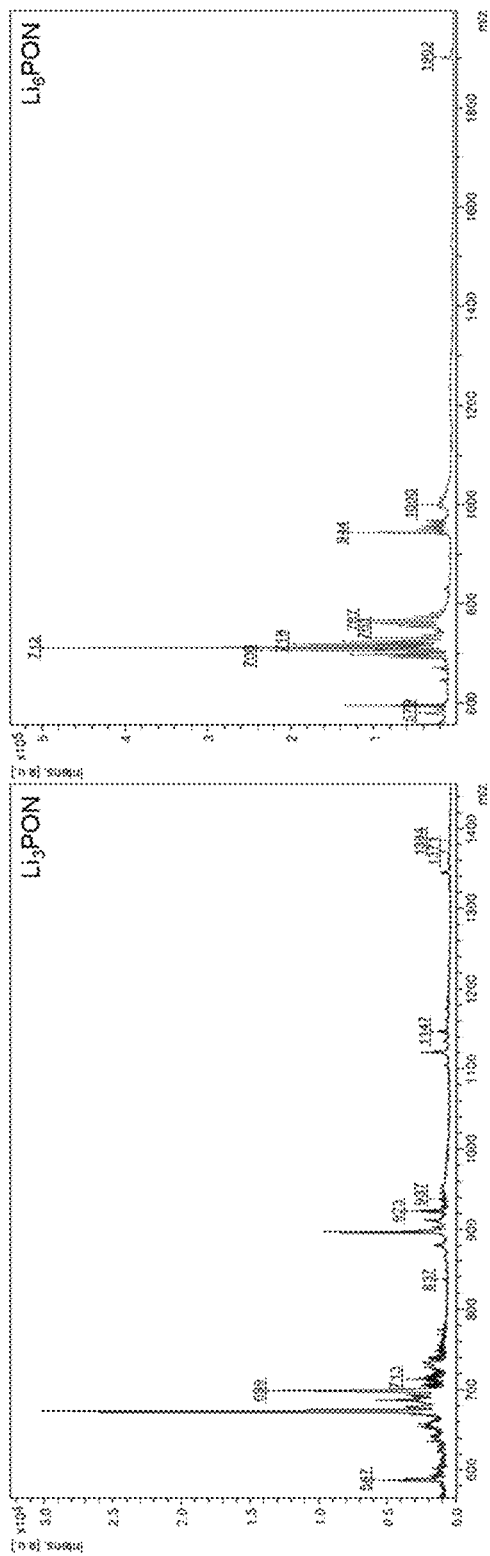
FIG. 14 shows MALDI-ToF of $Li_3PON$ and $Li_6PON$ precursors.

FIG. 13 shows possible structures for $Li_xPON$ precursors. FIG. 14 shows MALDI-ToF of $Li_3PON$ and $Li_6PON$ precursors. The negative-ion mode MALDI is used here, and the ion source comes from the precursor itself which loses one Li$^+$. All the peaks marked in FIG. 14 come from the precursor samples.

Based on the structures shown in FIG. 13, possible compositions of $Li_xPON$ precursors are calculated and shown in Table 4. In Table 4, terminal —H and —$NH_2$ are included and dissociated Li$^+$ are subtracted in the calculations. Overall, it is estimated that $Li_3PON$ precursor includes from about 5 to about 15 monomer units, and $Li_6PON$ precursor includes from about 5 to about 20 monomer units; however, the above is used as an example and should not limiting.

TABLE 5

Possible compositions of $Li_xPON$ precursors.

| $Li_3PON$ | | $Li_6PON$ | |
|---|---|---|---|
| m/z, Da | Possible compositions | m/z, Da | Possible compositions |
| 587 | $A_2 + 2A_3 + 2B_4 + $—H$ + $—$NH_2$ - $Li^+$ = $3A_3 + B_3 + B_4 + $—H$ + $—$NH_2$ - $Li^+$ = 587.4 | 579 | $4A_1 + 2A_2 + A_3 + $—H$ + $—$NH_2$ - $Li^+$ = 579.9 |
| 699 | $A_1 + B_1 + 3B_4 + $—H$ + $—$NH_2$ - $Li^+$ = $A_1 + B_2 + B_3 + 2B_4 + $—H$ + $—$NH_2$ - $Li^+$ = 697.5<br>$A_2 + 6A_3 + B_4 + $—H$ + $—$NH_2$ - $Li^+$ = 700.2 | 706 | $4A_1 + A_2 + B_2 + B_4 + $—H$ + $—$NH_2$ - $Li^+$ = 707.8 |
| 713 | $3A_1 + 3B_4 + $—H$ + $—$NH_2$ - $Li^+$ = $2A_1 + A_2 + C_3 + 2C_4 + $—H$ + $—$NH_2$ - $Li^+$ = 714.5 | 712 | $4B_1 + B_2 + $—H$ + $—$NH_2$ - $Li^+$ = 711.0<br>$6A_1 + A_2 + B_3 + $—H$ + $—$NH_2$ - $Li^+$ = 713.0 |
| 837 | $A_1 + 2B_1 + 3B_4 + $—H$ + $—$NH_2$ - $Li^+$ = 836.5 | 718 | $3B_1 + 2B_2 + $—H$ + $—$NH_2$ - $Li^+$ = 716.9<br>$6A_1 + A_2 + B_4 + $—H$ + $—$NH_2$ - $Li^+$ = 718.9 |
| 923 | $3A_1 + 2A_2 + A_3 + 2B_1 + B_2 + $—H$ + $—$NH_2$ - $Li^+$ = 924.7 | 761 | $A_2 + 4A_3 + B_3 + B_4 + $—H$ + $—$NH_2$ - $Li^+$ = 761.2 |
| 937 | $2A_1 + 2A_2 + 2A_3 + 2B_1 + B_2 + $—H$ + $—$NH_2$ - $Li^+$ = 936.7 | 767 | $A_2 + 4A_3 + 2B_4 + $—H$ + $—$NH_2$ - $Li^+$ = 767.1 |
| 1147 | $3A_1 + 2A_2 + 2B_1 + B_2 + 2B_4 + $—H$ + $—$NH_2$ - $Li^+$ = 1148.5 | 944 | $A_1 + 3A_3 + 2B_1 + B_3 + B_4 + $—H$ + $—$NH_2$ - $Li^+$ = 943.4 |
| 1371 | $3A_1 + 3A_2 + 3B_1 + B_2 + 2B_4 + $—H$ + $—$NH_2$ - $Li^+$ = 1371.4 | 1000 | $A_2 + 2A_3 + 3B_1 + B_3 + B_4 + $—H$ + $—$NH_2$ - $Li^+$ = 998.4<br>$5B_1 + B_2 + B_3 + $—H$ + $—$NH_2$ - $Li^+$ = 1000.8 |
| 1384 | $A_1 + A_2 + 11A_3 + 2B_4 + $—H$ + $—$NH_2$ - $Li^+$ = 1384.4 | 1902 | $12A_1 + 5A_2 + A_3 + B_1 + B_3 + B_4 + $—H$ + $—$NH_2$ - $Li^+$ = 1902.4 |

Example 3

Synthesis of SiPON.

In a 200 ml round bottom Schlenk flask, 80 ml of distilled THF is first collected. $(Me_3Si)_2NH$ (20.1 ml, 96.6 mmol) and $OPCl_3$ (5.0 ml, 53.6 mmol) are then added via graduated pipettes. All was done in an ice bath under $N_2$. Initially, the reaction mixture is transparent. After 5-10 min of stirring, insoluble solid started to form from the reaction and the mixture became cloudy. The ice bath was removed after 1 d of reacting and the reaction was kept running at 40° C. under $N_2$ for 1 week.

After a week of reacting, the soluble and insoluble parts in the reaction mixture are separated by centrifugation. This results in 60 ml of a transparent solution. A small sample (3 mL) is taken from the solution and vacuum dried at 60° C. on a Schlenk line. The product is a yellow viscous liquid with a yield of 0.3 g, the total yield would be about 6 g, which is ~95% of theoretical yield (6.3 g).

Figure 15:
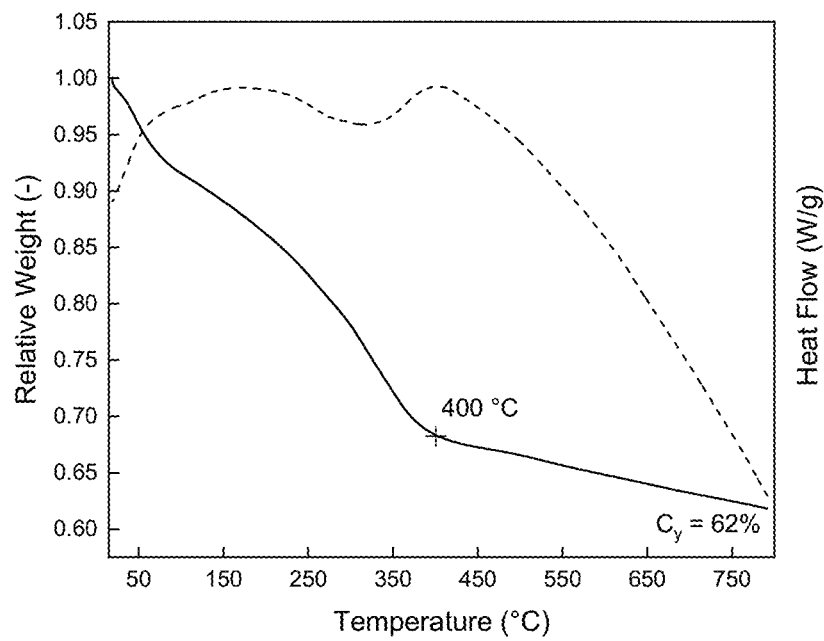
FIG. 15 shows TGA-DTA (800° C./$N_2$) of SiPON precursor.

SiPON precursor. FIG. 15 shows the TGA-DTA (800° C./$N_2$) of SiPON precursor. Mass loss starts from the beginning of the run, meaning either that further condensation or depolymerization occur on heating or there are still volatile components (e.g., cyclomers) in the product. Decomposition seems to occur from about 140° C. to about 400° C. The ceramic yield at 800° C. is 62%.

Figure 16:
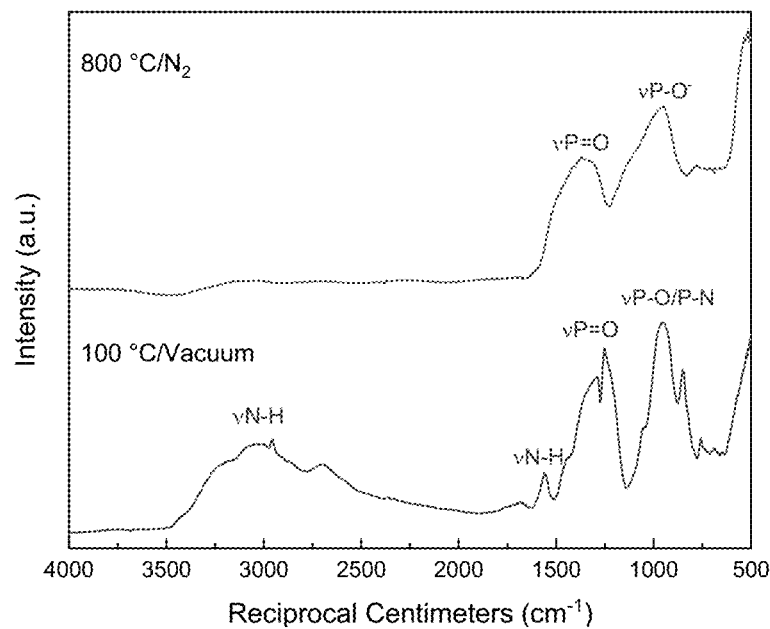
FIG. 16 shows FTIRs of SiPON precursor heated at 100° C./vacuum and 800° C./$N_2$.

FIG. 16 compares the FTIR spectra of the SiPON precursor before and after heating to 800° C./$N_2$. FTIR of the SiPON precursor before heating shows a peak at about 3000 $cm^{-1}$ of $vN$—H, and an N—H overtone at 1560 $cm^{-1}$. There are peaks at 1260 $cm^{-1}$ for $vP$=O. The double peak at 850-950 $cm^{-1}$ may be $vP$—O/P—N groups.

The spectra after heating to 800° C. are quite different, no $vN$—H band can be seen, suggesting that the volatile groups were eliminated by evaporation or particle decomposition. The final phase is the same as PON, with $vP$=O band at about 1250 $cm^{-1}$, $vP$—O around 1000 $cm^{-1}$.

Figure 17:
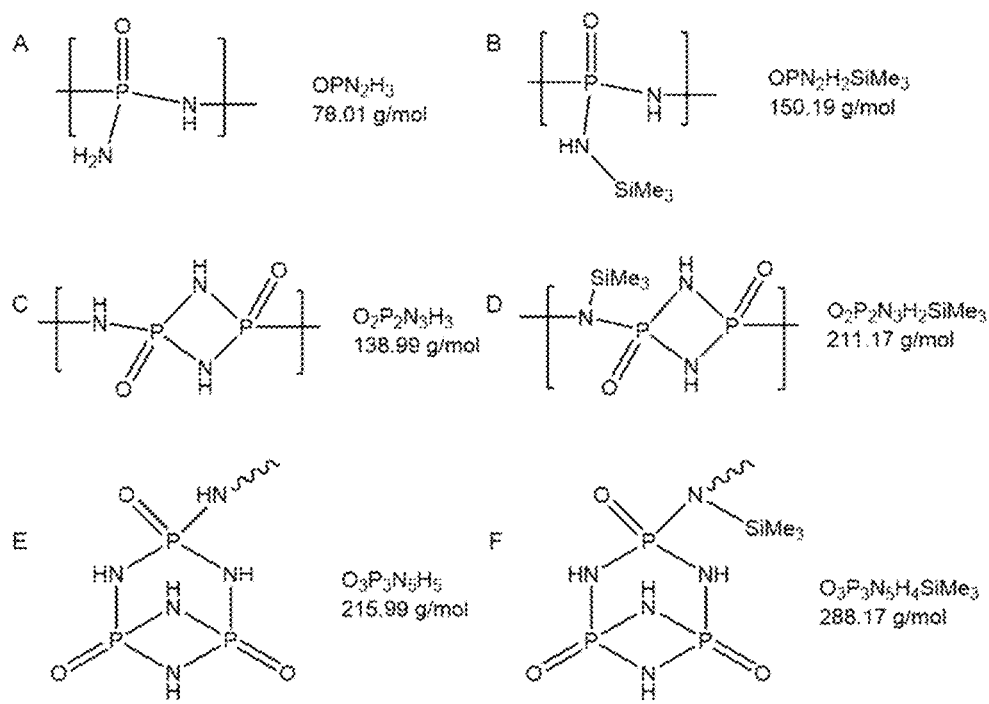
FIG. 17 shows possible monomer structures of SiPON.

FIG. 17 shows possible components of an oligomer of the SiPON precursor. Structure E and F only have one end group. Such end groups can only appear up to twice (either end) on an unbranched oligomer chain.

Figure 18:
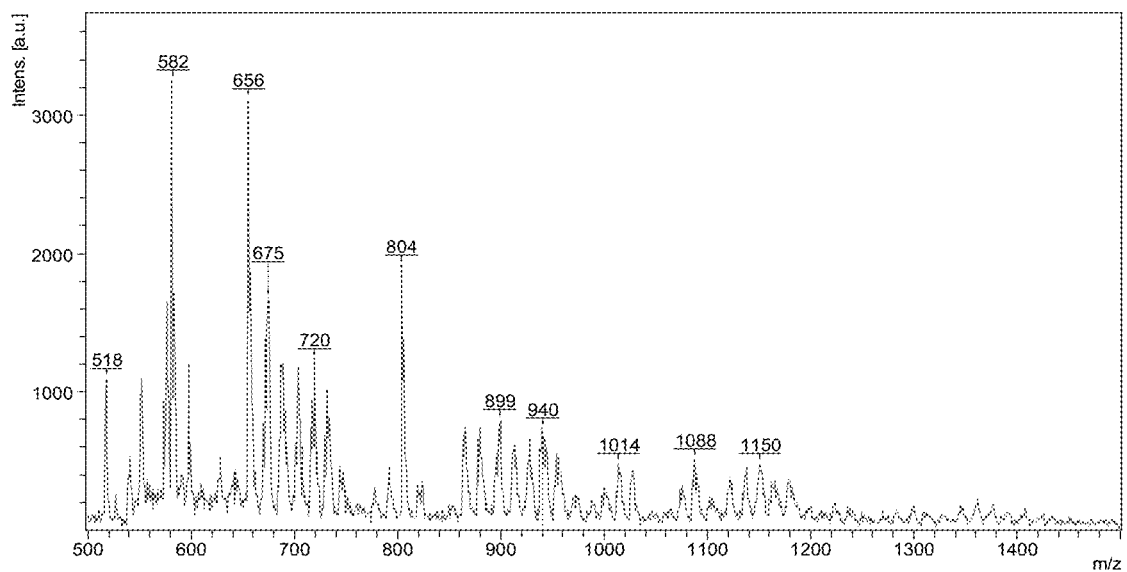
FIG. 18 shows MALDI-ToF of SiPON precursor.

FIG. 18 is a MALDI-ToF of a SiPON precursor. Peaks at 518, 582, 656, 675, 720, 804, 899, 940, 1088 and 1150 m/z are observed.

Based on the structures showed in FIG. 17, Table 5 shows calculations for possible compositions of PON precursor, in which "—H" stands for terminal hydrogen. If there are monomer structures E and/or F (FIG. 17), which are end groups, the calculation should be adjusted with one or less terminal hydrogen. From these calculations, it is predicted that the product can include from about 3 to about 9 units of monomers.

TABLE 5

Possible compositions of SiPON precursor.

| m/z, Da | Possible compositions |
|---|---|
| 518 | $2B + E + $—H = 517.4 |
| 582 | $A + B + C + E + $—H = 584.2 |
| 656 | $2B + C + E + $—H = 656.4 |
| 675 | $2A + 2B + E + $—H = 673.4 |
| 720 | $B + 2C + F + $—H = 717.3 |
| 804 | $3A + 2C + F + $—H = 801.2 |
| 899 | $2A + 2B + F + $—H = 895.8 |
| 940 | $2B + C + D + F + $—H = 939.7 |
| 1088 | $3B + C + D + F + H = 1089.9 |
| 1150 | $A + B + 3D + F + $—H = 1150.9 |

Figure 19:
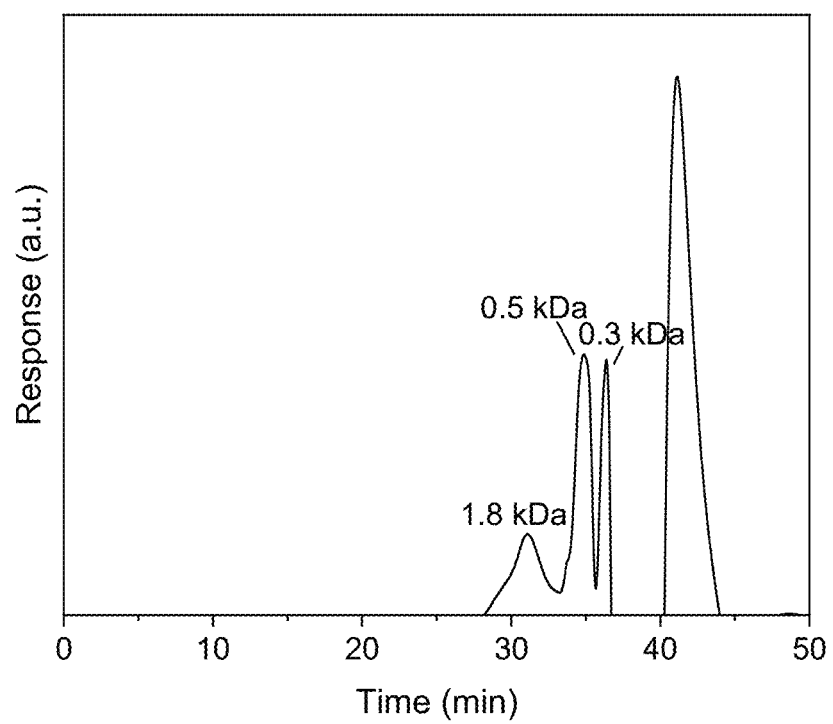
FIG. 19 shows a GPC of SiPON precursor.

FIG. 19 shows the GPC of SiPON precursor. Peaks are seen at 30, 34 and 36 min, corresponding to MWs of 1.8, 0.5 and 0.2 kDa. These peaks lie in the same range as the peaks observed in MALDI-ToF. For the peak at 36 min, it corresponds to monomer structure D, E or F in FIG. 17. For the peak at 34 min, it likely consists of from about 2 to about 6 monomers. The peak at 30 min likely includes from about 6 to about 20 monomer units; however, the above is used as a non-limiting example.

Example 4

Synthesis of $Li_xSiPON$.

$Li_3SiPON$ precursor: Following the synthesis of the SiPON precursor, $LiNH_2$ (2.2 g, 95.8 mol, the calculated amount of —NH in the SiPON precursor) is then added to the SiPON precursor solution under $N_2$ in an ice bath. The reaction mixture stays cloudy due to the low solubility of $LiNH_2$. The ice bath is removed after 1 d of reacting. The reaction kept running at room temperature for 1-2 weeks or kept warming at 40° C. for 1 week.

Thereafter, the reaction mixture of $Li_3SiPON$ precursor is centrifuged to separate the liquid and solid parts. This results in a 50 mL of yellow transparent solution. The yield is about 6 g (about 90% of theoretical yield).

Similarly, $Li_6SiPON$ precursor can be synthesized with double amount of $LiNH_2$.

$Li_xSiPON$ Precursors

Figure 20:
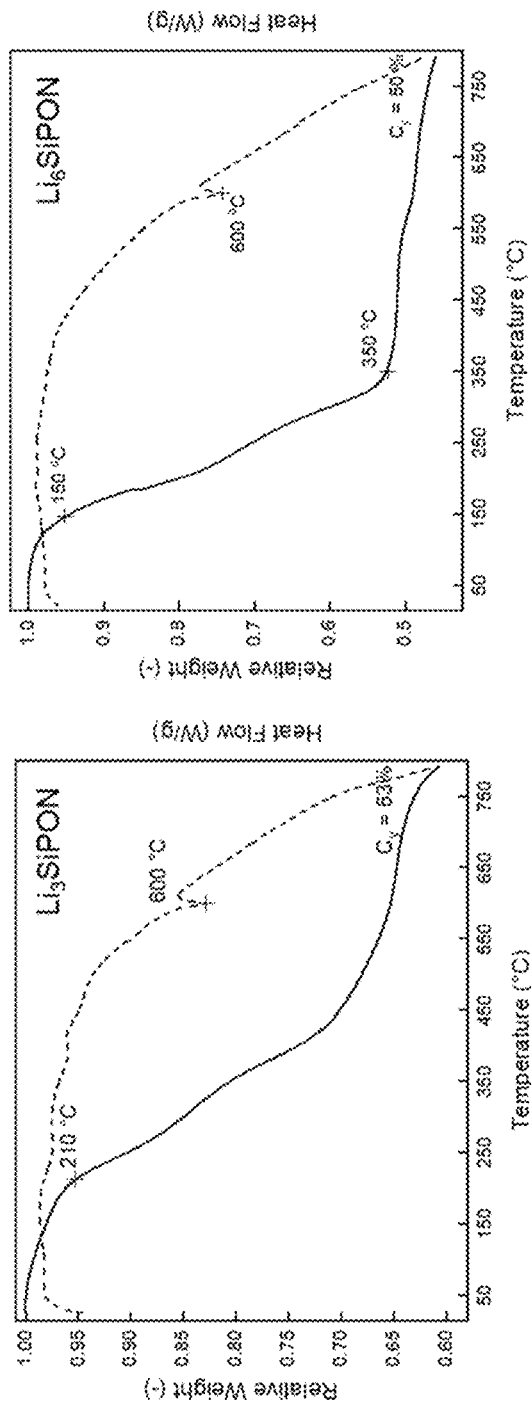
FIG. 20 shows TGA-DTA (800° C./$N_2$) of $Li_3SiPON$ and $Li_6SiPON$ precursors.

FIG. 20 shows TGA-DTA (800° C./$N_2$) of $Li_3SiPON$ and $Li_6SiPON$ precursors. For both precursors, decomposition occurs from about 150-200° C. to about 350-400° C. The ceramic yield at 800° C. is about 60 wt. % for $Li_3SiPON$ and about 50 wt. % for $Li_6SiPON$. Both precursors show an endotherm at 600° C., which suggests melting.

Figure 21:
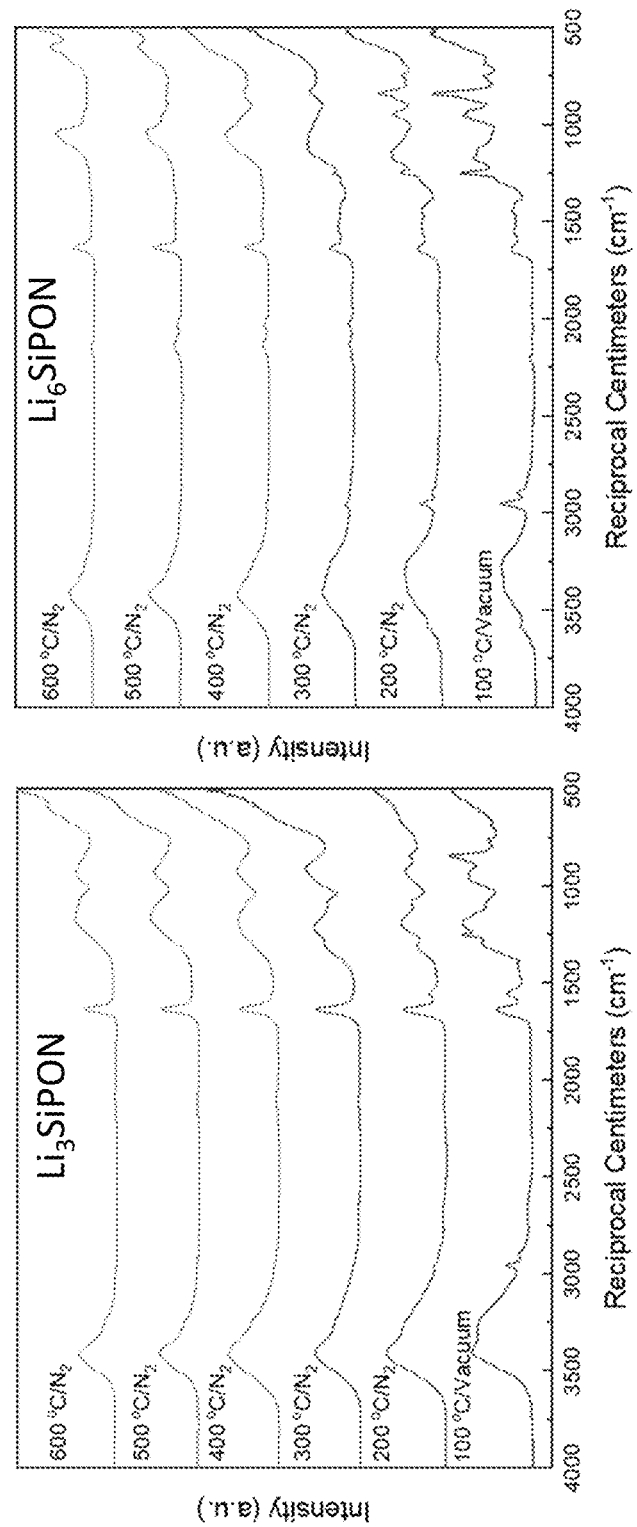
FIG. 21 shows FTIR spectra of $Li_3SiPON$ and $Li_6SiPON$ precursors heated to 100-600° C.

FIG. 21 shows the $Li_xSiPON$ precursors heated to 100-600° C. The FTIRs of the $Li_xSiPON$ precursors heated at 100-200° C. are similar. There is a peak centered at about 3300 $cm^{-1}$ that suggests $vO$—H/N—H, and $\delta O$—H at 1640 $cm^{-1}$ and $\delta N$—H at about 1550 $cm^{-1}$. Peaks at about 3000 $cm^{-1}$ are ascribed to $vC$—H. Peaks at about 1250, 1200, 950 and 850 $cm^{-1}$ are ascribed to $vP$=O, $vP$—O, $vP$—O—P and $vP$-N=P respectively. The $vC$—H band disappears at 300° C. FT-IR spectra at 300-600° C. are generally similar, the intensities of $vO$—H/N—H bands reduce as temperature increases.

Figure 22:
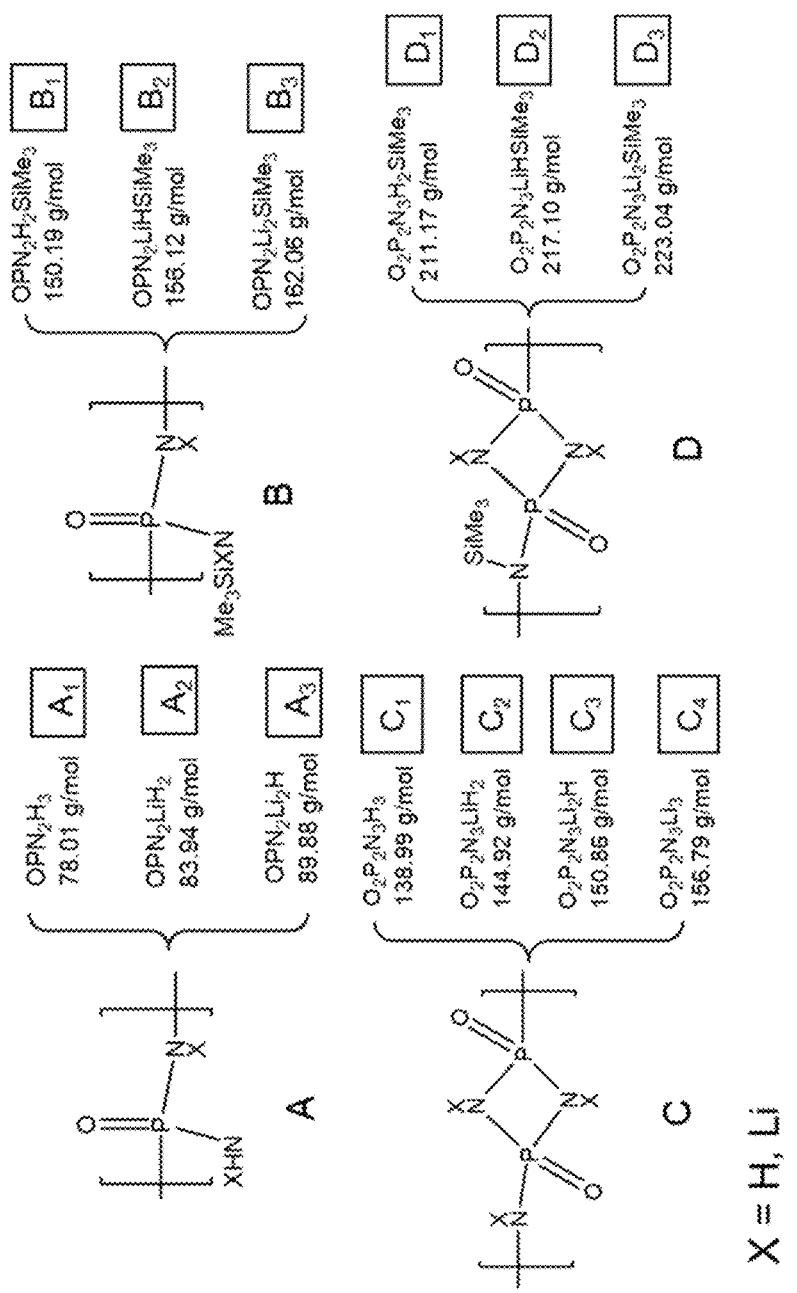
FIG. 22 shows possible monomer structures for $Li_xSiPON$ precursors.
Figure 23:
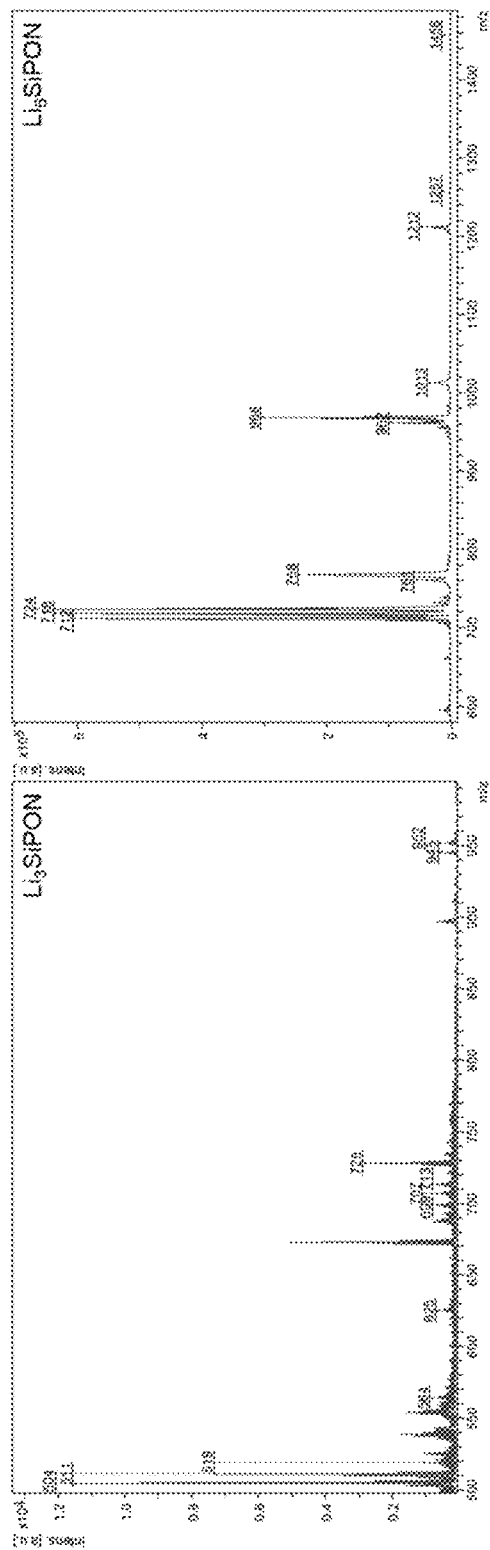
FIG. 23 shows MALDI-ToF of $Li_3SiPON$ and $Li_6SiPON$ precursors.

FIG. 22 shows possible structures for $Li_xSiPON$ precursors. FIG. 23 shows MALDI-ToF of the $Li_3SiPON$ and $Li_6SiPON$ precursors. Negative-ion mode is used here, and the ion source comes from the precursor itself which loses one $Li^+$. All the peaks marked in FIG. 23 come from the precursor samples.

Based on the structures shown in FIG. 22, possible compositions of $Li_xSiPON$ precursors are calculated. Shown as Table 6, terminal —H and —$NH_2$ or —$NHSiMe_3$ are considered and dissociated $Li^+$ are subtracted in the calculations. Overall, it is estimated that $Li_3SiPON$ precursor includes of from about 2 to about 13 monomer units, and $Li_6SiPON$ precursor includes from about 2 to about 17 monomer units.

TABLE 6

Possible compositions of $Li_xSiPON$ precursors.

| $Li_3SiPON$ | | $Li_6SiPON$ | |
| --- | --- | --- | --- |
| m/z, Da | Possible compositions | m/z, Da | Possible compositions |
| 504 | $2A_1 + 2A_3 + C_4 +$ —H $+$ —$NH_2 - Li^+ = A_1 + 2A_2 + A_3 + C_4 +$ —H $+$ —$NH_2 - Li^+ = 502.7$<br>$A_2 + 2A_3 + C_4 +$ —H $+$ —$NHSiMe_3 - Li^+ = 502.8$ | 712 | $A_1 + A_2 + 6A_3 +$ —H $+$ —$NH_2 - Li^+ = 711.3$<br>$3A_1 + A_2 + A_3 + D_3 +$ —H $+$ —$NHSiMe_3 - Li^+ = 713.2$ |
| 511 | $A_1 + 2C_1 + C_2 +$ —H $+$ —$NH_2 - Li^+ = 511.0$<br>$A_1 + C_1 + D_1 +$ —H $+$ —$NHSiMe_3 - Li^+ = B_1 + 2C_1 +$ —H $+$ —$NHSiMe_3 - Li^+ = 510.5$ | 718 | $8A_1 + A_2 +$ —H $+$ —$NH_2 - Li^+ = 718.2$<br>$5A_1 + 2A_2 + B_1 +$ —H $+$ —$NH_2 - Li^+ = 718.3$ |
| 519 | $2A_1 + A_2 + 3A_3 +$ —H $+$ —$NH_2 - Li^+ = 519.7$<br>$2A_2 + 2A_3 + B_3 +$ —H $+$ —$NH_2 - Li^+ = 519.8$ | 724 | $4A_1 + 2A_2 + A_3 + C_2 +$ —H $+$ —$NH_2 - Li^+ = 724.8$<br>$3A_1 + A_2 + 2A_3 + C_2 +$ —H $+$ —$NHSiMe_3 - Li^+ = 725.0$ |
| 564 | $A_1 + 2A_3 + C_3 + C_3 +$ —H $+$ —$NH_2 - Li^+ = 563.6$<br>$A_2 + A_3 + C_3 + C_4 +$ —H $+$ —$NHSiMe_3 - Li^+ = 563.8$ | 761 | $A_1 + A_2 + 3A_3 + B_3 + C_4 +$ —H $+$ —$NH_2 - Li^+ = 760.5$ |
| 625 | $A_3 + B_2 + C_1 + C_4 +$ —H $+$ —$NHSiMe_3 - Li^+ = 624.1$<br>$A_2 + A_3 + C_1 + 2C_3 +$ —H $+$ —$NH_2 - Li^+ = 624.6$ | 768 | $A_1 + A_2 + B_1 + B_2 + C_1 + C_3 +$ —H $+$ —$NH_2 - Li^+ = 768.3$<br>$A_1 + B_2 + B_3 + C_1 + C_3 +$ —H $+$ —$NHSiMe_3 - Li^+ = 768.4$ |
| 699 | $A_1 + 3A_2 + 4A_3 +$ —H $+$ —$NH_2 - Li^+ = 699.5$ | 962 | $5A_1 + 3C_1 + C_2 +$ —H $+$ —$NH_2 - Li^+ = 962.0$<br>$2A_1 + B_1 + 2C_1 + C_2 + D_3 +$ —H $+$ —$NH_2 - Li^+ = 962.2$ |
| 707 | $3A_1 + 2A_2 + D_3 +$ —H $+$ —$NHSiMe_3 - Li^+ = 707.3$ | 968 | $2A_1 + A_2 + B_2 + 3C_1 + C_2 +$ —H $+$ —$NH_2 - Li^+ = 968.1$<br>$2A_1 + B_2 + 2C_1 + C_2 + D_3 +$ —H $+$ —$NH_2 - Li^+ = 968.2$ |
| 713 | $2A_1 + 2A_2 + A_3 + C_1 + C_3 +$ —H $+$ —$NH_2 - Li^+ = 713.8$ | 1013 | $A_1 + 3C_1 + 2C_2 + D_2 +$ —H $+$ —$NH_2 - Li^+ = 1012.0$ |
| 728 | $2A_1 + 3C_1 + C_2 +$ —H $+$ —$NH_2 - Li^+ = A_i + 2C_1 + C_2 + D_2 +$ —H $+$ —$NH_2 - Li^+ = 728.0$<br>$B_1 + 2C_1 + 2C_2 +$ —H $+$ —$NH_2 - Li^+ = A_1 + 2C_1 + C_3 + D1 +$ —H $+$ —$NH_2 - Li^+ = 728.2$ | 1212 | $2A_1 + A_2 + 6A_3 + 2C_1 + C_2 +$ —H $+$ —$NH_2 - Li^+ = 1212.2$ |
| 945 | $3A_1 + 4C_1 + C_2 +$ —H $+$ —$NH_2 - Li^+ = 945.0$ | 1257 | $3A_1 + B_1 + B_3 + 4C_1 + C_2 +$ —H $+$ —$NH_2 - Li^+ = 1257.3$ |
| 952 | $11A_1 + A_2 +$ —H $+$ —$NH_2 - Li^+ = 952.2$<br>$6A_1 + 2A_2 + B_1 + B_2 +$ —H $+$ —$NH_2 - Li^+ = 952.4$ | 1456 | $A_1 + A_2 + 4A_3 + 3C_1 + 2C_2 + D_2 +$ —H $+$ -$NH_2 - Li^+ = 1455.5$<br>$2A_1 + 2A_2 + 10A_3 + D_3 +$ —H $+$ —$NH_2 - Li^+ = 1455.8$ |

Example 5

Synthesis of SiPHN.

In a 200 mL round bottom Schlenk flask, 80 mL of distilled THF is first collected, $Cl_6N_3P_3$ (7.5 g, 21.6 mmol) and $NH(SiMe_3)_2$ (29.2 mL, 0.14 mol) are added. The ratio of $Cl_6N_3P_3$ to $NH(SiMe_3)_2$ is 1:6.5. All is done in an ice bath under $N_2$. $Cl_6N_3P_3$ is mainly soluble in THF, after adding with $NH(SiMe_3)_2$, the reaction is cloudy. However, the mixture slowly turns transparent and the color turns yellow after reacting overnight, which suggests that a soluble product forms during the reaction. The reaction is kept running at 40° C. under $N_2$ for 1 week.

Thereafter, the reaction mixture of SiPHN precursor is centrifuged to separate the liquid and solid parts. This results into 65 mL of a yellow solution. A small sample (3 mL) is taken from the solution and vacuum dried at 60° C. on a Schlenk line. The product is a yellow viscous liquid with a yield of 0.53 g. The total yield would be 11.4 g, which is ~80% of theoretical yield (14.3 g).

SiPHN Precursor

Figure 24:
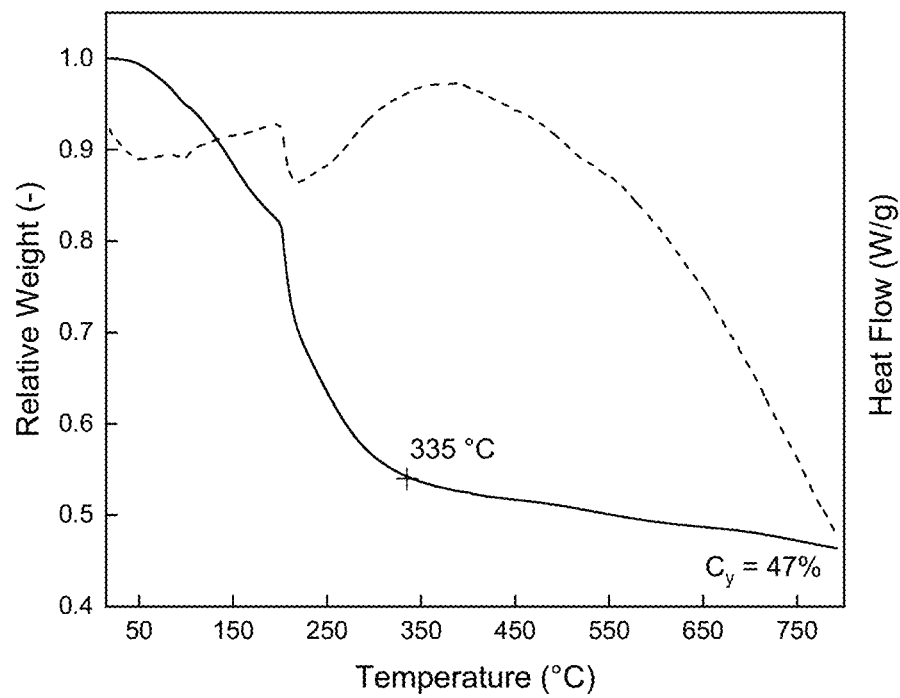
FIG. 24 shows TGA-DTA (800° C./$N_2$) of SiPHN precursor.

FIG. 24 shows the TGA-DTA (800° C./$N_2$) of SiPHN precursor. Decomposition seems to occur from about 100° to about 335° C. The ceramic yield at 800° C. is 47%.

Figure 25:
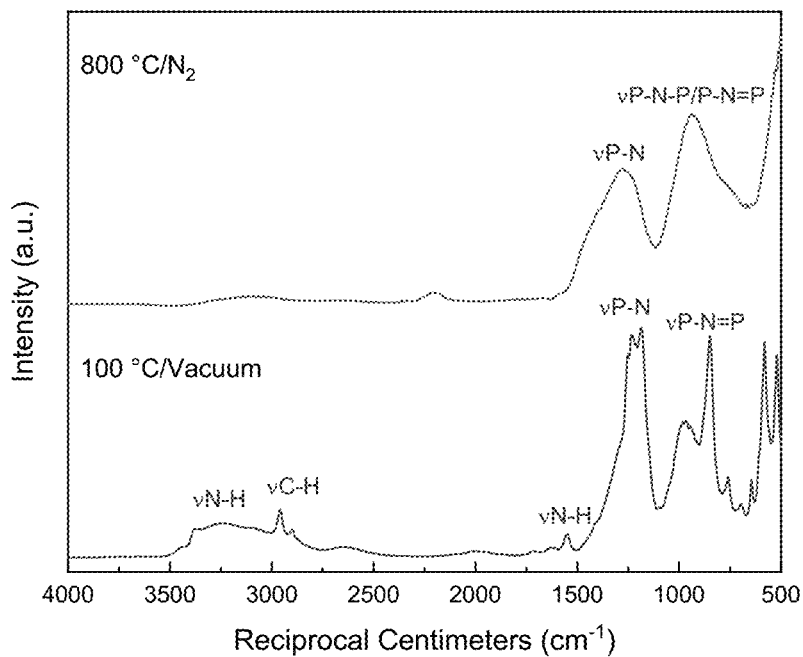
FIG. 25 shows FTIRs of SiPHN precursor heated at 100° C./vacuum and 800° C./$N_2$.
Figure 26:
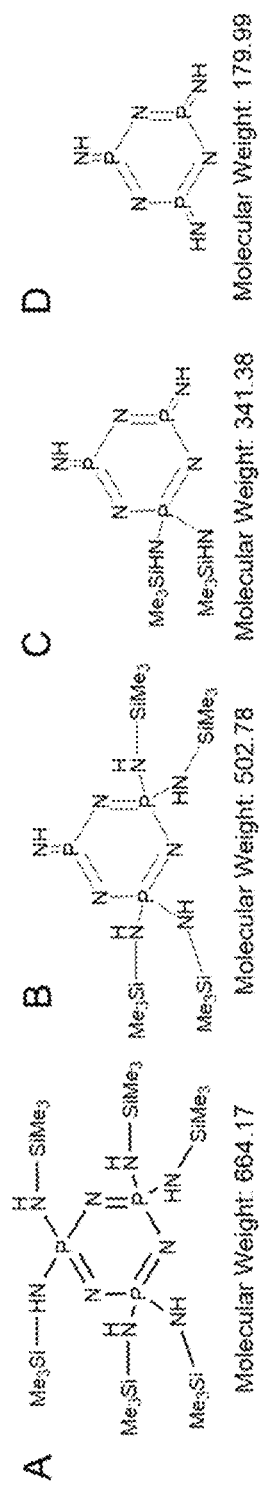
FIG. 26 shows possible monomer structures of SiPHN.

FIG. 25 compares the FTIR spectra of the SiPHN precursor before and after heating to 800° C./$N_2$. After heating at 100° C./vacuum, a peak at about 3300 cm$^{-1}$ for vN—H and 3000 cm$^{-1}$ for vC—H, and an N—H overtone at 1550 cm$^{-1}$ are exhibited. The peak at about 1200 cm$^{-1}$ is assigned to vP-N, and the double peak at 850-950 cm$^{-1}$ may be vP-N=P. After heating at 800° C./$N_2$, no vN—H band can be seen. In the final phase, only peaks for vP-N band at 1250 cm$^{-1}$ and vP-N—P/P—N=P near 1000 cm$^{-1}$ are present. FIG. 26 shows possible monomer structures of SiPHN.

Figure 27:
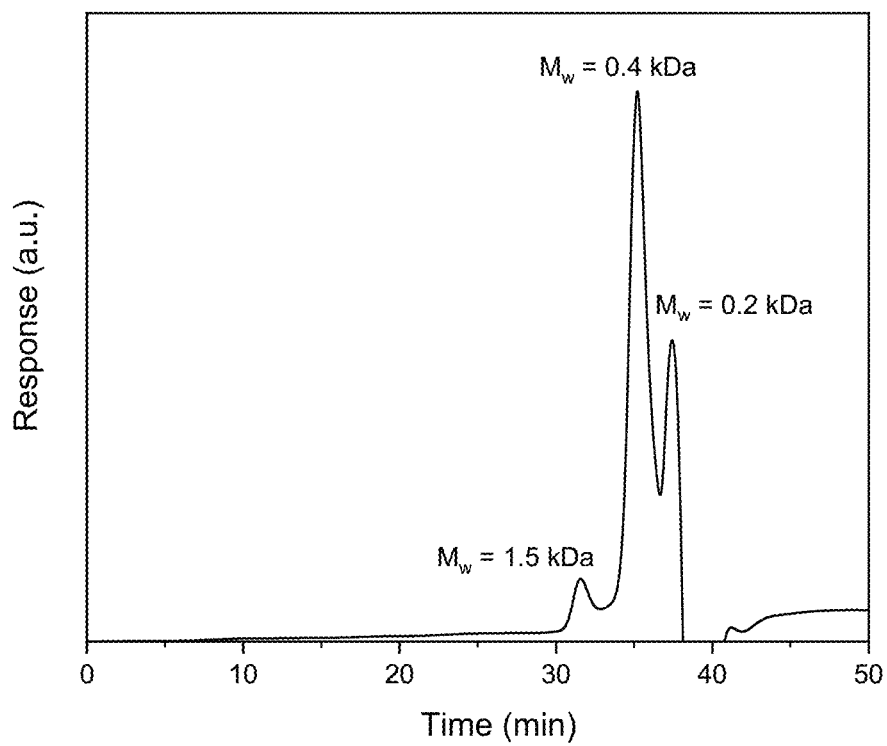
FIG. 27 shows GPC of SiPHN precursor.

FIG. 27 shows the GPC of the SiPHN precursor. Peaks are seen at 32, 35 and 37 min, corresponding to MWs of 1.5, 0.4 and 0.2 kDa. The peaks at 35 and 37 min correspond to monomer structures B, C and D in FIG. 26. The 32 min includes from about 2 to about 7 monomers. However, the above is used as a non-limiting example.

Example 6

Synthesis of LiSiPHN.

Following the synthesis of SiPHN precursor, LiNH$_2$ (3.0 g, 0.13 mol, the calculated amount of —NH in the SiPHN precursor) is added to the SiPHN precursor solution under $N_2$ in an ice bath, no bubbles are generated from the reaction. The reaction mixture stays cloudy due to the low solubility of LiNH$_2$. After 1 d of reacting, the ice bath is removed and changed to an oil bath for heating. The color of the reaction mixture becomes orange. The reaction is kept running at 40° C. under $N_2$ for a week.

Thereafter, the reaction mixture of LiSiPHN precursor is centrifuged to separate the liquid and solid parts. This results in 60 mL of an orange solution. A small sample (3 mL) is taken from the solution and vacuum dried at 60° C. on a Schlenk line. The product is a 0.5 g brown solid. The total yield is calculated to be 10 g, which is 83% of the theoretical yield (12 g).

Li SiPHN Precursors

Figure 28:
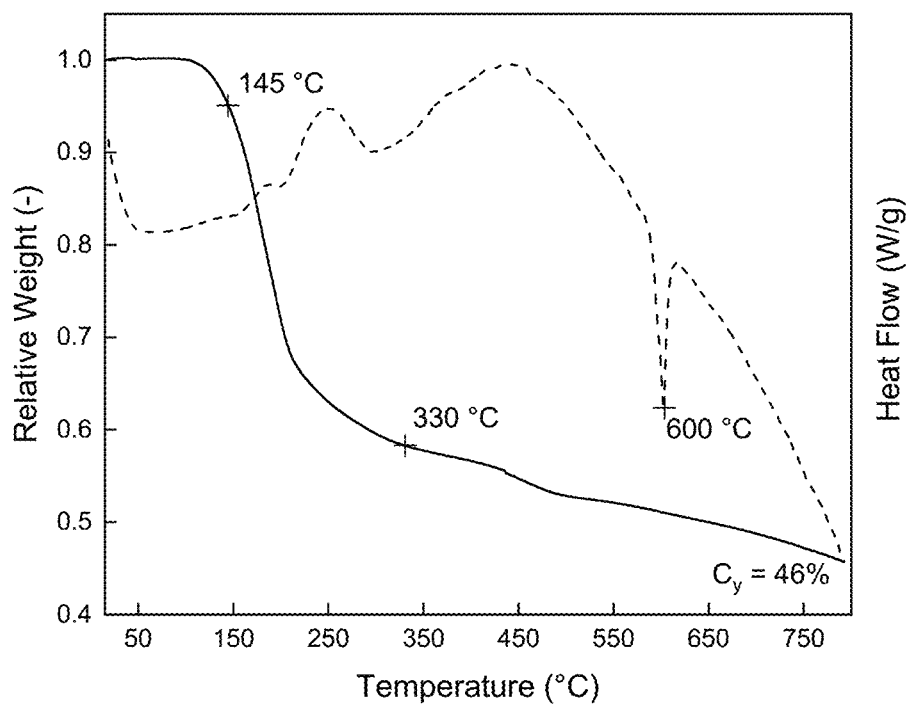
FIG. 28 shows TGA-DTA (800° C./$N_2$) of LiSiPHN precursor.

FIG. 28 shows TGA-DTA (800° C. C./$N_2$) of LiSiPHN precursor. Decomposition is seen over the range 145°–330° C. The ceramic yield at 800° C. is 46%. An endotherm at 600° C. suggests melting.

Figure 29:
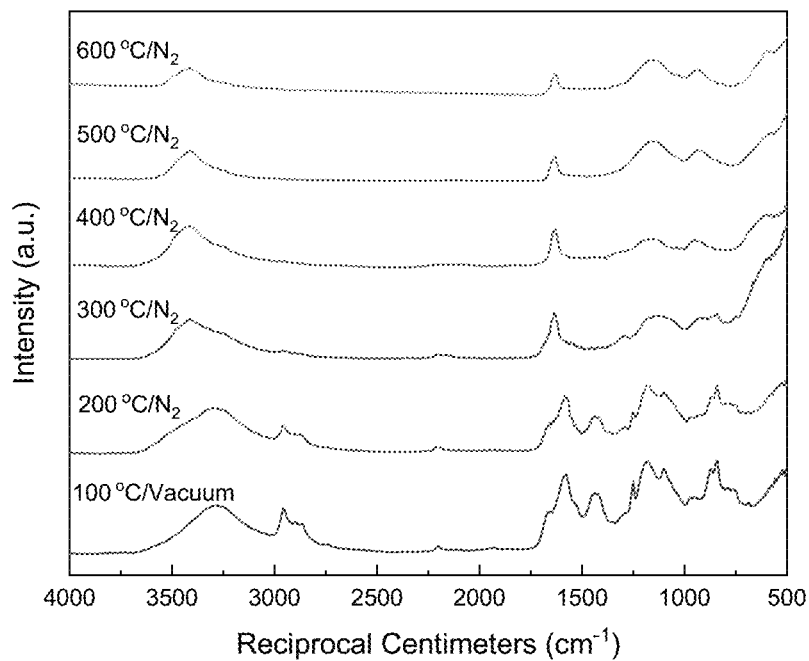
FIG. 29 shows FTIR spectra of LisiPHN precursor heated to 100-600° C.

FIG. 29 shows LiSiPHN precursor heated to 100-600° C. The IRs of LiSiPHN precursors heated at 100-200° C. are similar. Peaks are seen centered at about 3300 cm$^{-1}$ that suggests vO—H/N—H, and its overtone at 1582 cm$^{-1}$ which is likely to be N—H overtone. The peak at 2955 cm$^{-1}$ is assigned to vC—H, and the peak at 1483 cm$^{-1}$ to SC—H. Peaks at about 1250 and 900 cm$^{-1}$ are assigned to vP-N and vP-N=P respectively. The vC—H band at about 3000 cm$^{-1}$ disappears at 300° C. FTIR spectra at 300-600° C. are generally similar, the intensities of vO—H/N—H bands reduce as temperature increases.

Figure 30:
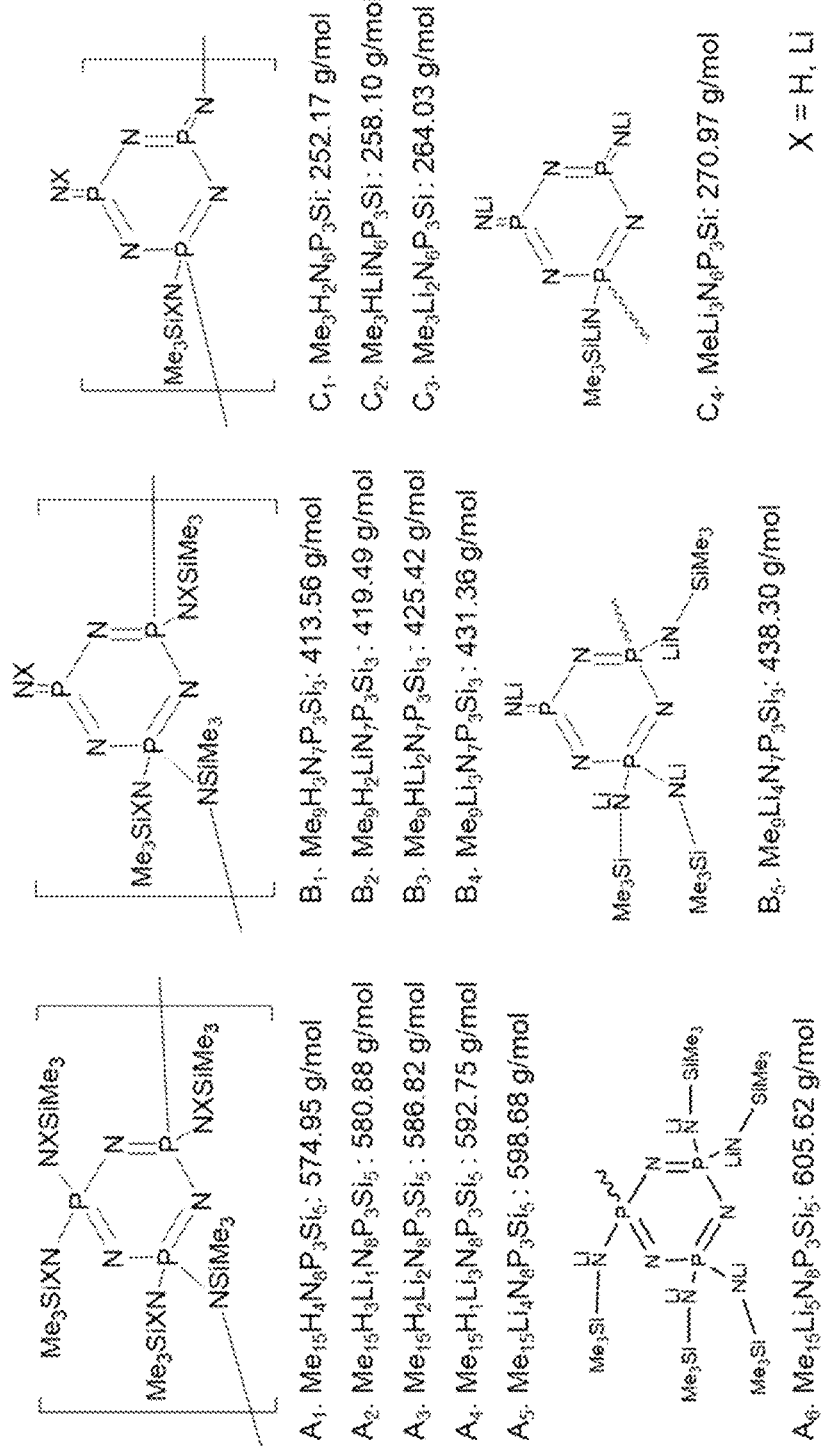
FIG. 30 shows possible monomer structures for LiSiPHN precursor.
Figure 31:
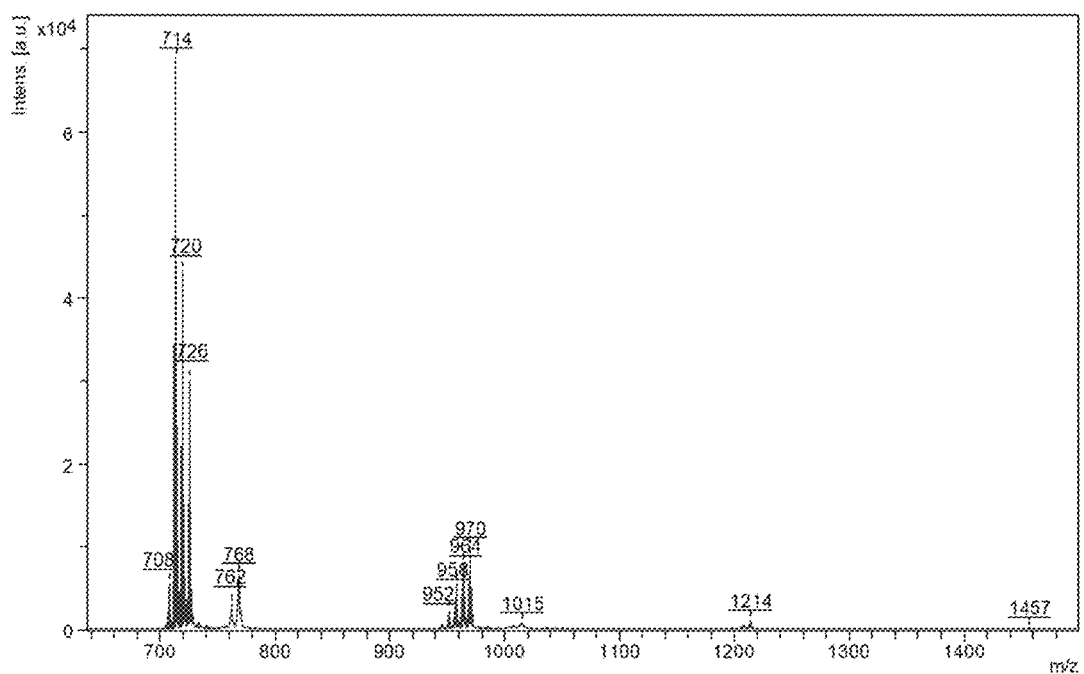
FIG. 31 shows MALDI-ToF of LiSiPHN precursor.

FIG. 30 shows possible monomer structures for LiSiPHN precursor. FIG. 31 shows a MALDI-ToF of LiSiPHN precursor. Negative-ion mode MALDI is used, the ion source comes from the precursor itself which loses one Li$^+$. All the peaks marked in FIG. 31 come from the precursor samples.

Based on the structures shown in FIG. 30, possible compositions for the LiSiPHN precursor are calculated. Table 7 lists MWs where terminal —H and —NH$_2$ or —NHSiMe$_3$ are considered and dissociated Li$^+$ subtracted in the calculations. Overall, it is estimated that the LiSiPHN precursor includes from about 2 to about 4 monomer units.

TABLE 7

Possible compositions of LiSiPHN precursors.

| m/z, Da | Possible compositions |
| --- | --- |
| 708 | $C_2 + C_4 + D_2 - Li^+ = 707.0$ |
| 714 | $2C_3 + D_3 + —H - Li^+ = C_2 + C_4 + D_3 - Li^+ = 712.9$ |
| 720 | $C_3 + C_4 + D_3 - Li^+ = 718.8$ |
| 726 | $2C_4 + D_3 - Li^+ = 726.8$ |
| 762 | $2C_1 + C_3 + H - Li^+ = C_1 + 2C_2 - Li^+ = 761.4$ |
| 768 | $A_4 + D_1 - Li^+ = A_3 + D_2 - Li^+ = 765.7$ |
|  | $B_3 + C_3 + —H + —NHSiMe_3 - Li^+ = B_4 + C_2 + —H + —NHSiMe_3 - Li^+ = 771.8$ |
| 952 | $A_6 + C_3 + —NHSiMe_3 - Li^+ = B_4 + B_5 + —NHSiMe_3 - Li^+ = 950.9$ |
|  | $B_3 + C_3 + C_4 - —H - Li^+ = B_5 + C_2 + C_5 - —H - Li^+ = 952.4$ |
| 958 | $C_1 + C_3 + C_4 + D_1 - Li^+ = C_1 + C_2 + C_4 + D_2 - Li^+ = 959.2$ |
| 964 | $C_2 + C_3 + C_4 + D_1 - Li^+ = 965.1$ |
| 970 | $3C_3 + D_2 - Li^+ = 970.0$ |
| 1015 | $A_1 + C_3 + D_1 + H - Li^+ = B_1 + C_1 + C_3 + —H + —NHSiMe_3 - Li^+ = 1012.0$ |
|  | $A_1 + C_2 + D_3 - Li^+ = B_1 + B_3 + D_2 - Li^+ = 1016.9$ |
| 1214 | $A_5 + B_4 + D_3 + —H - Li^+ = A_5 + B_5 + D_2 - Li^+ = 1214.9$ |
| 1457 | $A_2 + B_4 + C_3 + D_2 + H - Li^+ = A_3 + C_1 + C_3 + C_4 + —NHSiMe_3 - Li^+ = B_1 + B_5 + C_1 + C_4 - —H + —NHSiMe_3 - Li^+ = 1455.2$ |

Example 7

Synthesis of Na$_3$SiPON.

NaNH$_2$ (3.8 g, 0.1 mol, equivalent amount of —NH) is added to the solution of SiPON precursor under $N_2$ in an ice bath. A lot of bubbles form from the reaction right after adding NaNH$_2$. The mixture turns yellow after 1 d of reacting.

Na$_3$SiPON precursor

A small sample of the liquid from the Na$_3$SiPON solution is taken and vacuum dried at 40° C. on a Schlenk line. It is then heated to 180° C. under vacuum for 1 h. The product is a brown solid. TGA and FTIR studies are run on the brown solid.

FTIR shows a band at about 3000 cm$^{-1}$, assigned to vN—H. The sharp peak at 1400 cm$^{-1}$ is typical for NH$_4^+$ (ammonium ions). The peaks near 1200 and 900 cm$^{-1}$ can be assigned to vP=O and vP—O—P/P—N=P respectively. No peak for vO—H is observed.

Figure 32:
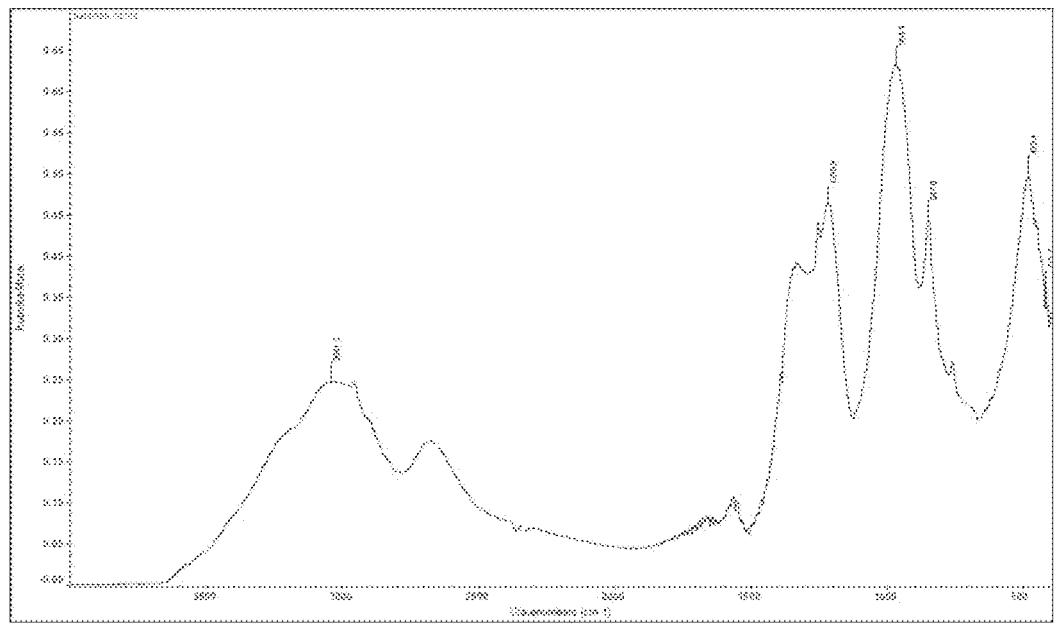
FIG. 32 shows FTIR of $Na_3SiPON$ precursor after heating at 180° C.
Figure 33:
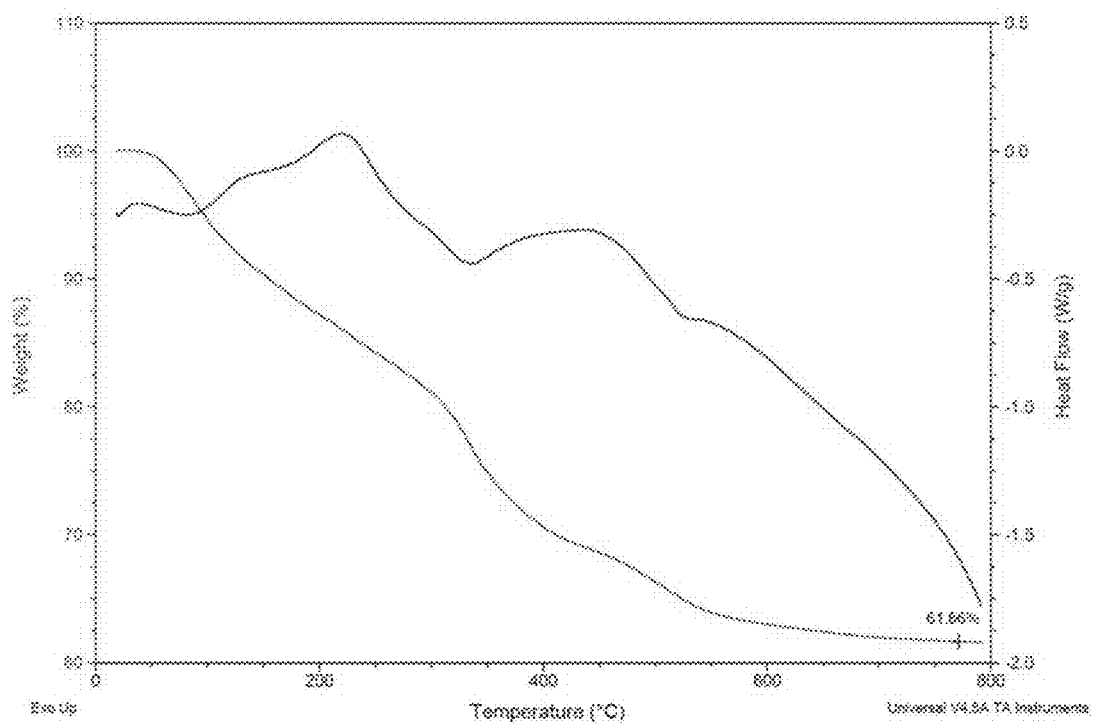
FIG. 33 shows TGA of $Na_3SiPON$ precursor heated to 800° C./$N_2$.

FIG. 32 shows Na$_3$SiPON precursor heated to 800° C./$N_2$. Gradual decomposition occurs continuously. No melting is observed in the DTA. The ceramic yield at 800° C. is 62 wt. %. FIG. 33 shows TGA of Na$_3$SiPON precursor heated to 800° C./$N_2$.

Figure 34:
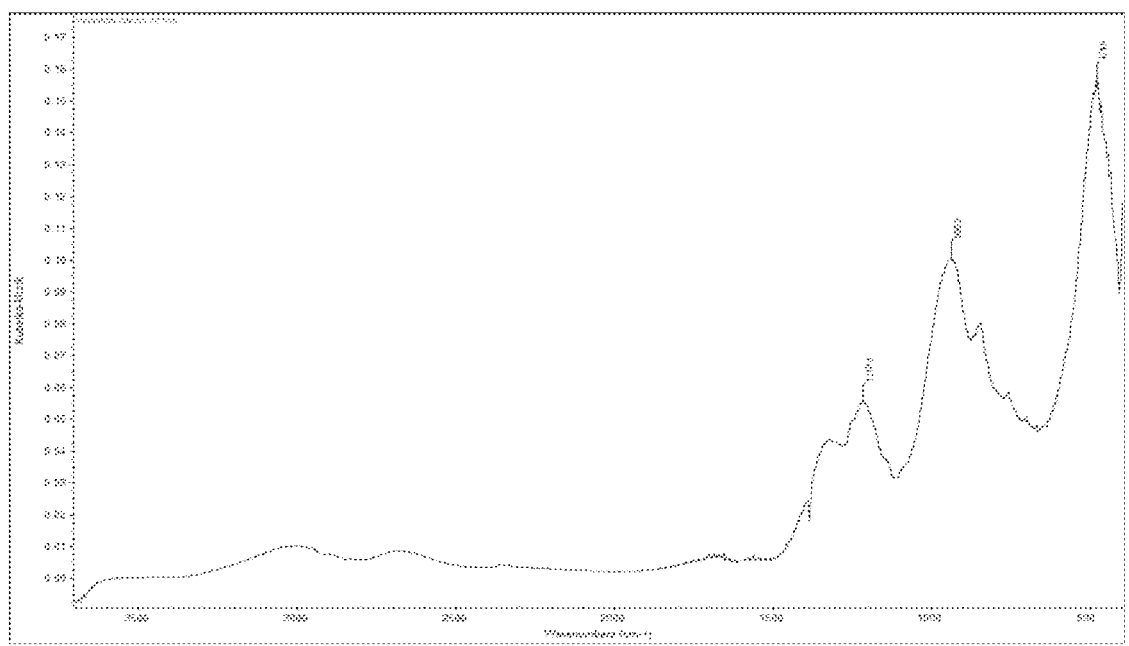
FIG. 34 shows FTIR of $Na_3SiPON$ precursor heated to 800° C./$N_2$.

The residue is a dark solid. FIG. 34 shows FTIR of Na$_3$SiPON precursors heated to 800° C./N$_2$. FTIR show large peaks around 1300 and 950 cm$^{-1}$, from vP=O and vP—O respectively.

Example 8

Synthesis of Li2NaPON.

In a 50 ml round bottom Schlenk flask, NaNH$_2$ (3.5 g, 0.09 mol) is first added to 30 ml of distilled THF. Then OPCl$_3$ (2.5 ml, 0.027 mol) is added with a graduated pipette. All was done in an ice bath under N$_2$. The reaction mixture started to generate bubbles after about 1 min of adding OPCl$_3$, which may be caused by heat generated from the reaction. The mixture also becomes yellow soon after bubbling, showing that reaction is taking place. The ice bath is removed after 1 d of reaction.

After a week of reaction, the soluble and insoluble parts in the reaction mixture are separated by centrifugation. The liquid is an orange solution.

Thereafter, the solution part is taken into another 50 ml Schlenk flask for synthesizing Li$_2$NaPON. LiNH$_2$ (0.74 g, 32.2 mmol) and NaNH$_2$ (0.63 g, 16.1 mmol) are added to the solution under N$_2$ in an ice bath. Bubbles start to generate from the reaction mixture a few seconds after adding the LiNH$_2$ and NaNH$_2$. The reaction mixture stays orange.

Li$_2$NaSiPON precursor

A small sample of the liquid from the Li$_2$NaPON solution is taken and vacuum dried at 40° C. on a Schlenk line. It is then heated to 180° C. under vacuum for 1 h. The product is a brown solid. TGA and FTIR studies are run on the brown solid.

Figure 35:
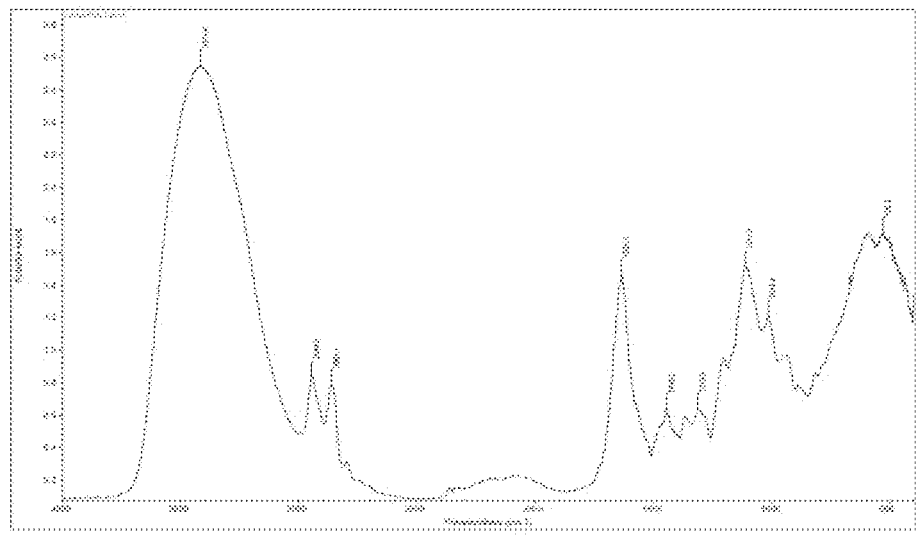
FIG. 35 shows FTIR of $Li_2NaPON$ precursor heated to 180° C.

FIG. 35 shows FTIR of Li$_2$NaPON precursor heated to 180° C. FTIR shows a large band at about 3400 cm$^{-1}$ for vO—H. The peak at 1630 cm$^{-1}$ is an overtone of vO—H. The peak at about 1110 cm$^{-1}$ is assigned to vP—O$^-$. The peak at about 2900 cm$^{-1}$ must come from vN—H as there are no C—H bonds. This result is very similar to that of Li$_3$PON.

Figure 36:
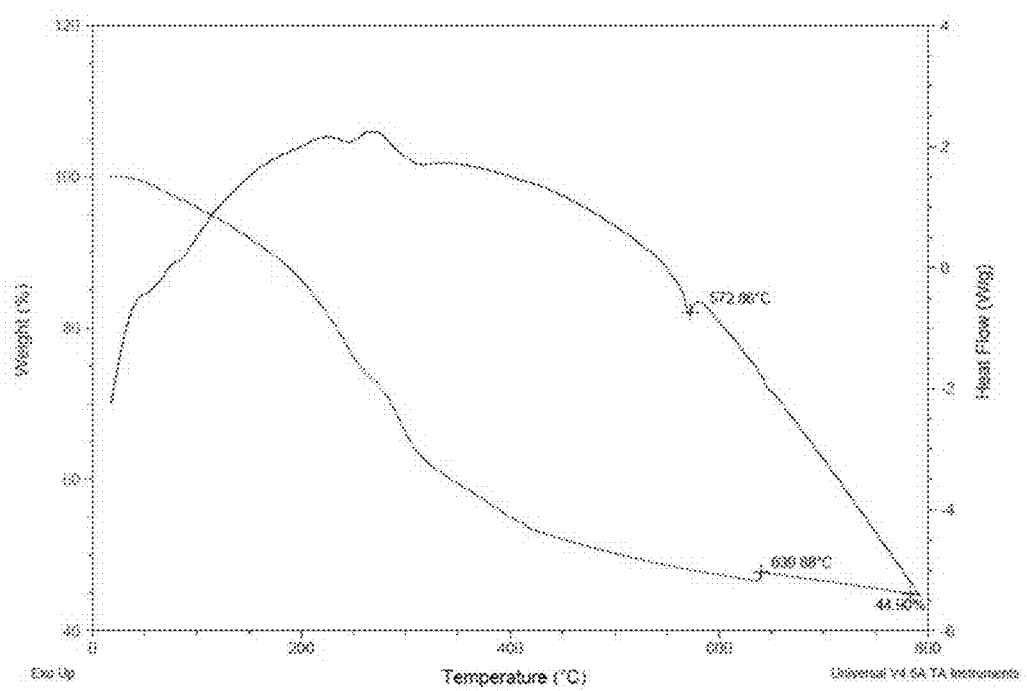
FIG. 36 shows TGA/DTA of $Li_2NaPON$ precursor after heated to 800° C./$N_2$.

FIG. 36 shows TGA/DTA of Li$_2$NaPON precursor heated to 800° C./N$_2$. Mass loss is continuous and likely a consequence of the elimination of volatile groups, such as O—H/N—H. The endotherm at 570° C. is melting. The ceramic yield at 800° C. is 45 wt. %.

Figure 37:
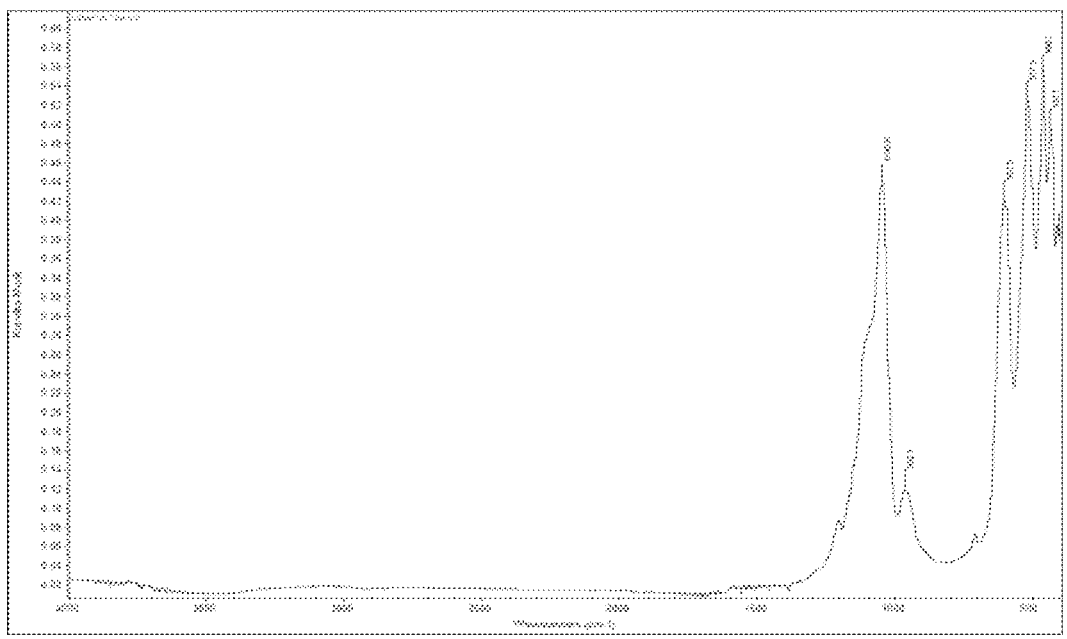
FIG. 37 shows FTIR of residue of $Li_2NaPON$ after TGA.

The residue after TGA is a black solid. FIG. 37 shows FTIR of Li$_2$NaPON heated to 800° C./N$_2$. The FTIR shows a sharp peak at 1046 cm$^{-1}$, which should be vP—O$^-$, and the peak at 962 cm$^{-1}$ should be vP—O—P/P—N=P.

Example 9

Thin Film Substrate Synthesis.

LiAlO$_2$ Powder Synthesis

LiAlO$_2$ nanopowders (NPs) are generated by using liquid flame spray pyrolysis (LF-FSP) apparatus. Lithium propionate and alumatrane are quantitatively mixed at selected molar ratios to result in LiAlO$_2$ composition with 80, 150, and 300 wt. % excess lithium, hereafter referred as LiAlO$_{2+80}$%, LiAlO$_{2+150}$% and LiAlO$_{2+300}$%, respectively. Table 8 shows the number of precursors used for each composition, which are dissolved in ethanol. Resulting NPs are Li short arising from volatility of Li$_2$O from flame temperatures above 1000° C. Hence, excess lithium propionate is introduced to result in a phase pure material. The resulting precursor mixture is dissolved in ethanol to give a 3 wt % ceramic yield solution and the solution is aerosolized with oxygen into a 1.5 m long combustion chamber where it is ignited using methane/oxygen pilot torches. After combustion and cooling, produced NPs are collected downstream in rod-in-tube electrostatic precipitators (ESP) operated at 10 kV.

TABLE 8

Amount of precursors dissolved in ethanol (2100 mL).

| | LiO$_2$CCH$_2$CH$_3$ (g) | Al[OCH(CH$_3$)CH$_2$CH$_3$]$_3$ (g) |
|---|---|---|
| LiAlO$_2$ + 80% | 49.63 | 455.35 |
| LiAlO$_2$ + 150% | 69 | 455.35 |
| LiAlO$_2$ + 300% | 82.72 | 455.35 |

As-produced produced LiAlO$_2$ nanopowders (10 g, 0.15 mol) are first dispersed in anhydrous ethanol (350 ml) with 2 wt % polyacrylic acid (200 mg, 1.2 mmol) dispersant, using an ultrasonic horn (Vibra-cell VC 505 Sonics & Mater. Inc.) at 100 W for 10 min. The suspension is left to settle for 4 h to allow larger particles to settle. The supernatant is decanted, and the recovered solution is poured into a clean beaker and left to dry overnight in the oven (60° C.). The dried powders are ground in an alumina mortar and pestle.

Thin Film Substrate Processing

A suspension is made by dissolving collected nanopowder (0.7 g), benzyl butyl phthalate (0.13 g), as a plasticizer, poly acrylic acid (0.01 g) as a dispersant, polyvinyl butyral (0.13 g) as a binder in anhydrous ethanol (0.9 ml) and acetone (0.9 ml) to form a mixture. The mixture (2.39 g) is placed in a 20 mL vial and milled with spherical alumina beads (6 g) with 3 mm diameter media overnight to homogenize the suspension. The suspension is cast using a wire wound rod coater (Automatic Film Applicator 1137, Sheen Instrument, Ltd). After solvent evaporation, dried green films are uniaxially pressed in between stainless-steel dies at 100° C. with a pressure of 50-70 MPa for 5 min using a heated bench (Carver, Inc) top press to improve packing density.

Sintering Studies

Heat treatments are conducted in a High-Temperature Vaccum/Gas tube furnace (Richmond, CA). Green films of LiAlO$_{2+80}$%, LiAlO$_{2+150}$%, and LiAlO$_{2+300}$% are placed between alumina disks and sintered to 1100° C. for 2 h in air (100 mL min$^{-1}$).

LATSP (Li$_{1.7}$Al$_{0.3}$Ti$_{1.7}$Si$_{0.4}$P$_{2.6}$O$_{12}$) and LiAlO$_2$ substrates are synthesized. Green films of LATSP are placed in between alumina plates and debindered/crystallized at 665° C./2 h at a ramp rate of 5° C. min$^{-1}$ followed by sintering at 1000° C./1 h at a ramp rate of 1° C. min$^{-1}$ under 120 ml min$^{-1}$ air flow.

Coating Studies

Figure 38:
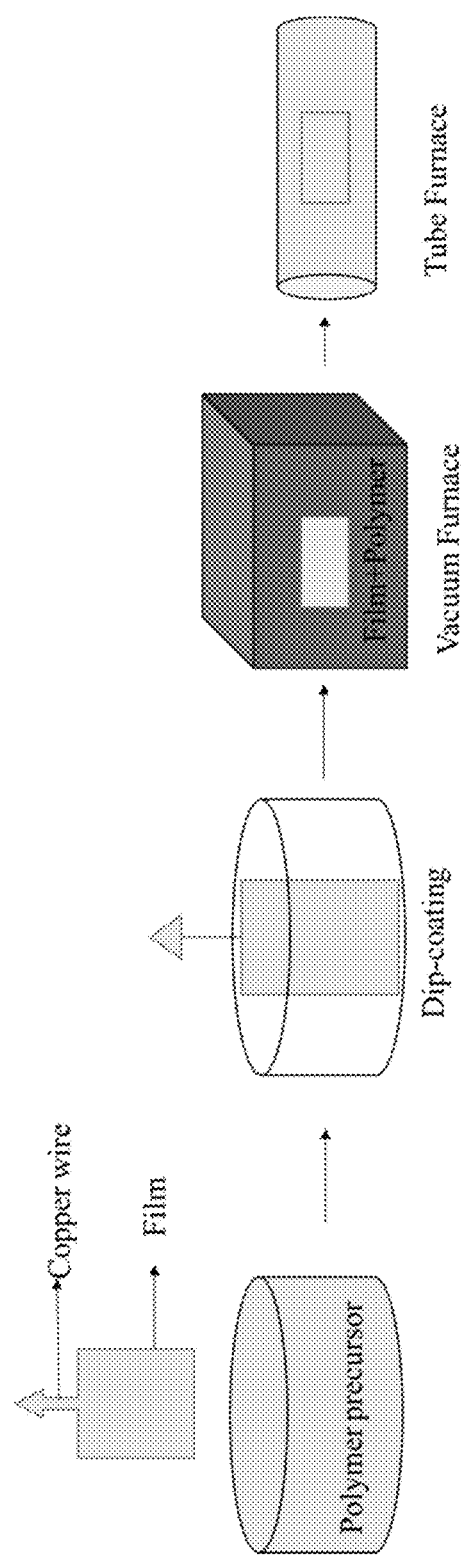
FIG. 38 is a schematic representation of dip-coating ceramic substrates with polymer precursors followed by heat treatments.

Sintered substrates are dip-coated 1× in the desired precursor (LiPON, a are left to dry for 12 h under vacuum at 100° C. Dried samples were then heated up to selected temperature and atmosphere as shown in FIG. 38.

Example 10

Coating LATSP with PON, SiPON, Li$_3$PON, Li$_{1.5}$SiPON, Li$_3$SiPON, Li$_6$SiPON.

LATSP substrates are dip-coated 1× in PON, SiPON, Li$_3$PON, Li$_{1.5}$SiPON, Li$_3$SiPON, Li$_6$SiPON solutions using copper wire to suspend the sample. The coated substrates are left to dry for 12 h/vacuum/100° C. Dried samples are then heated to 300, 400, 500 and 600° C./2 h/N$_2$ at a ramp rate of 5° C./min as shown in FIG. 38.

Figure 39:
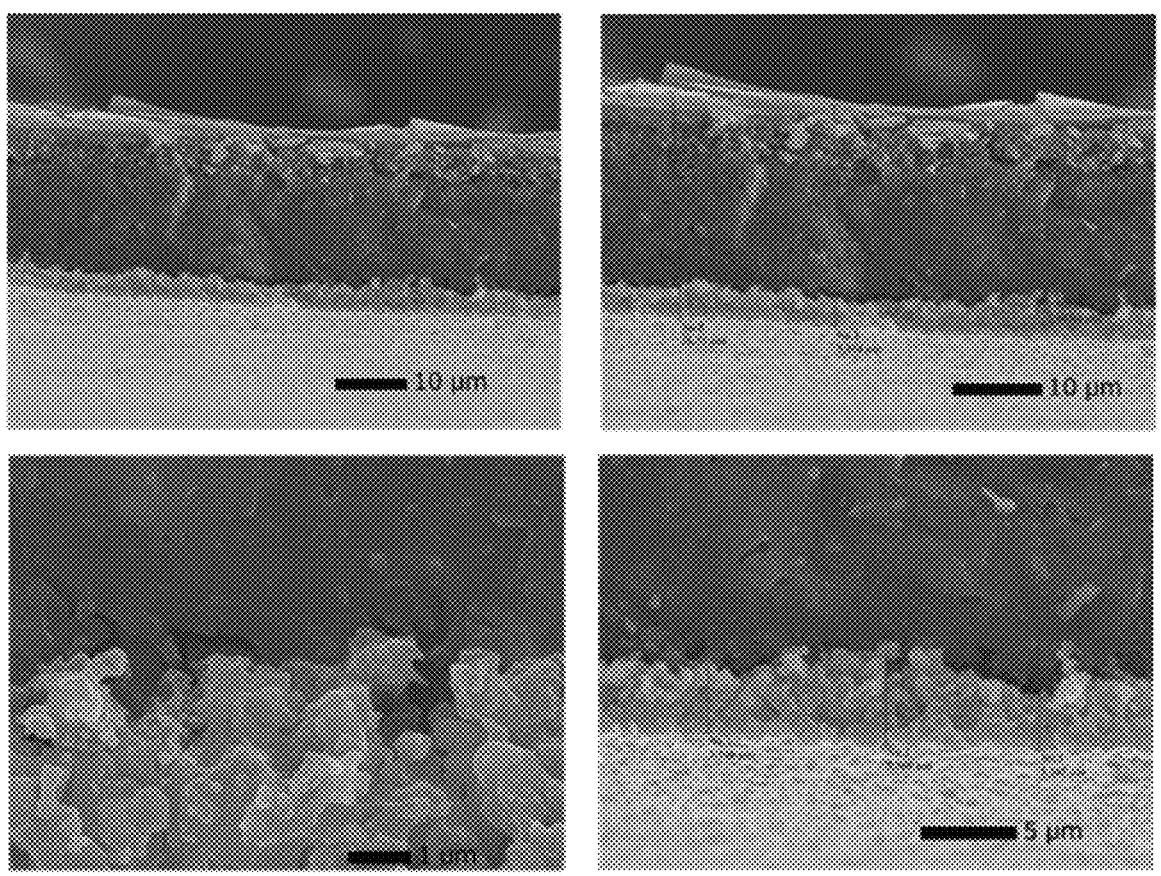
FIG. 39 shows SEM fracture surface images of LATSP+$Li_3SiPON$ films heated to 100° C./12 h/vacuum.

FIG. 39 shows the microstructures of LATSP substrate dip coated with Li$_3$SiPON and heated to 100° C./12 h/vacuum. The fracture surface images of the sintered films look very dense. The substrate thickness is 25±1.5 μm, and the coating average thickness is 4.1±0.06 There is a clear interfacial layer between the coating and the substrate. The mud cracking on top of the film corresponds to the contact of the coating with the glass substrate.

Figure 40:
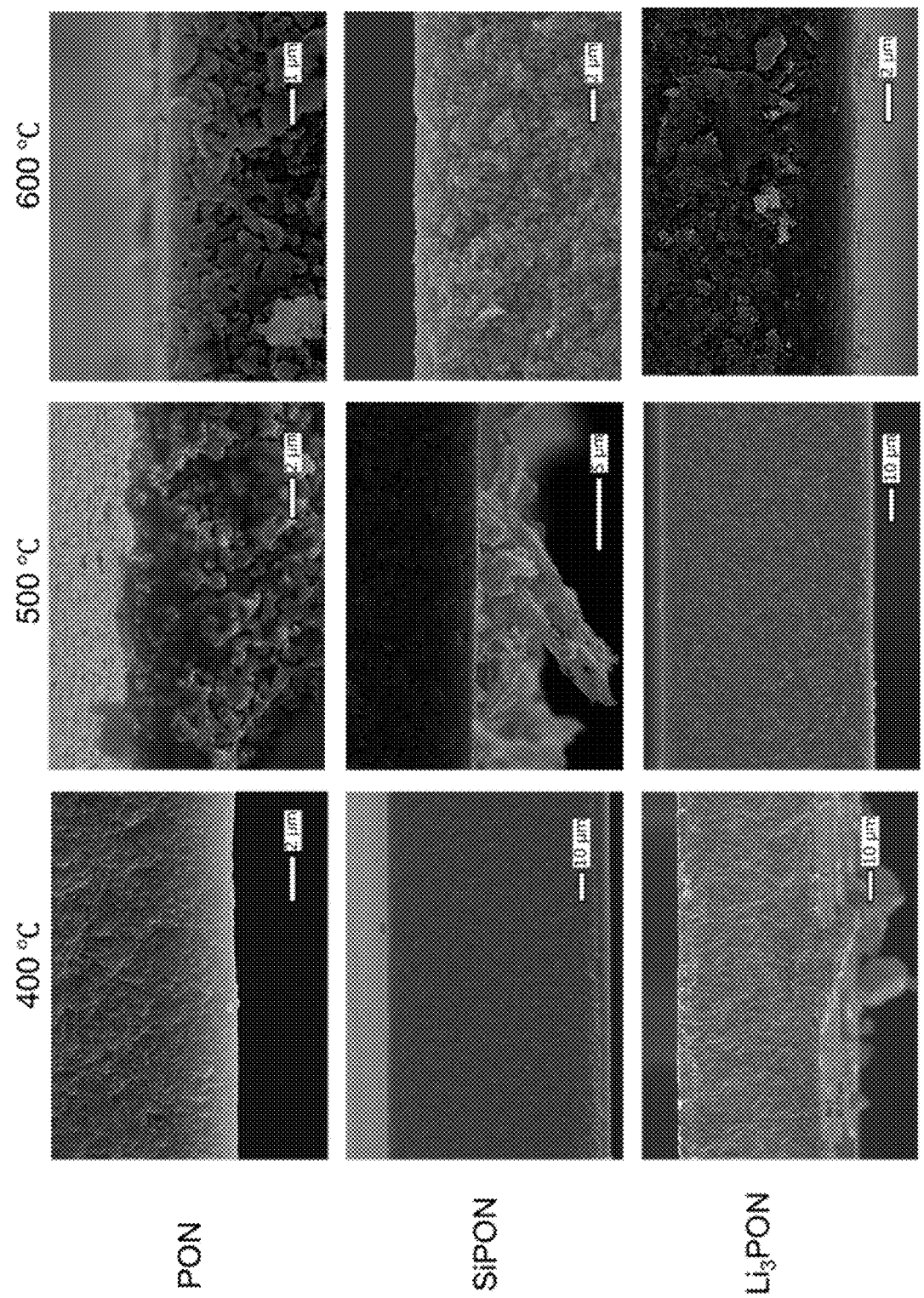
FIG. 40 shows SEM fracture surface images of LATSP+PON, SiPON and $Li_3PON$ films heated to 400°, 500°, and 600° C./2 h/$N_2$.

FIG. 40 shows SEM microstructures of LATSP+PON, SiPON, and Li$_3$PON films heated to 400, 500 and 600° C./2 h/N$_2$. LATSP substrates coated with PON and heated to 400° C. do not show a coating interface. However, films treated to 500° C. showed coating with an average thickness of 5 μm. There is no clear distinguished interface between the PON coating and the substrate for samples heated to 600° C. This might be because of too high temperature that the coating is not stable.

LATSP substrates coated with SiPON and heated to 400° and 600° C. did not show a clear distinguished coating interface. These heating schedules lead to a poor coating for both PON and SiPON precursors. Substrates treated to 500° C. showed coating with an average thickness of 6.8 μm.

LATSP+Li$_3$PON films heated to 500° C. did not show coating interface this might be ascribed to poor coating. However, there is a clear distinguished interface between the coating and the substrate for samples heated to 600° C. with an average coating thickness of 8.8 μm.

Figure 41:
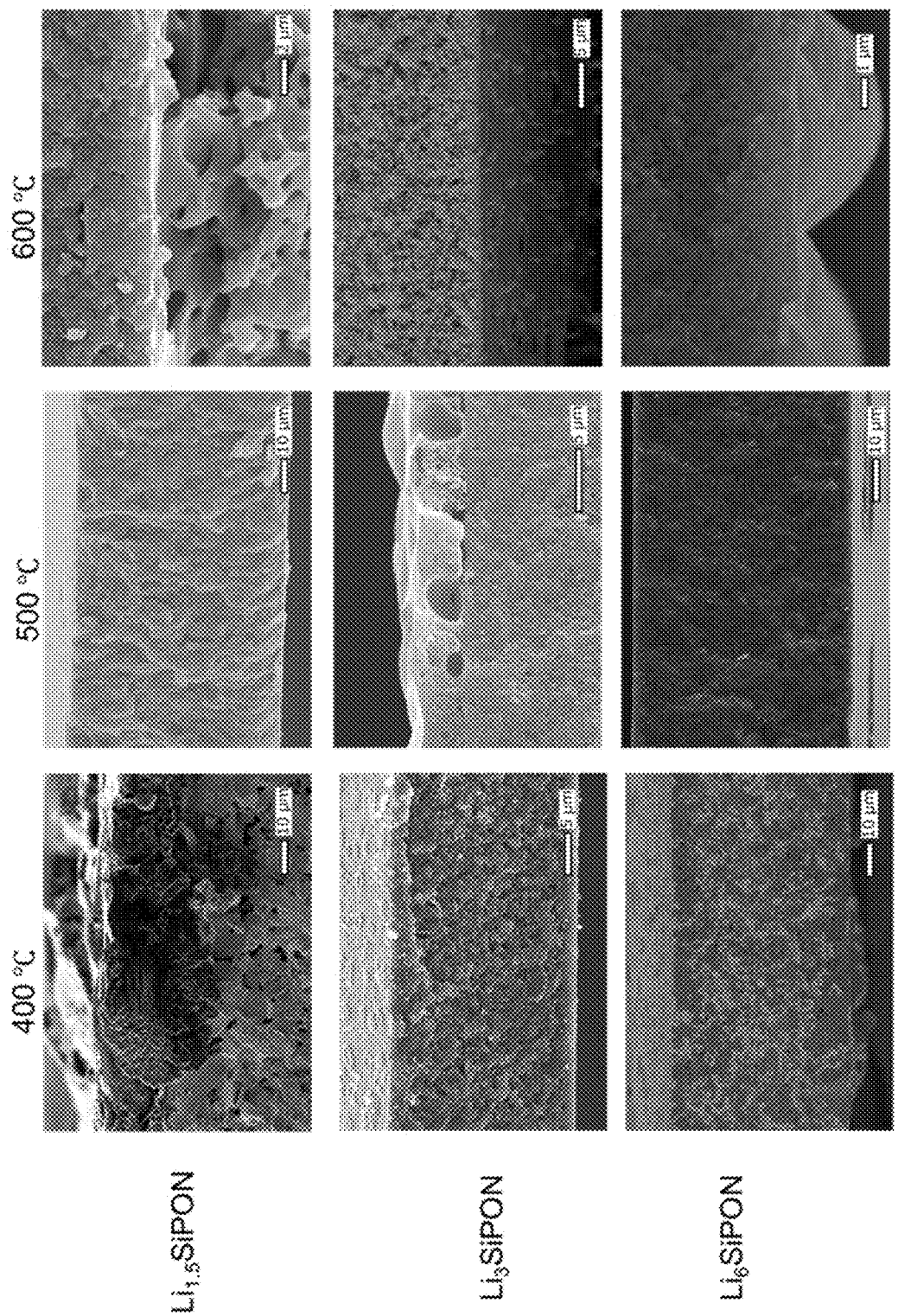
FIG. 41 shows SEM fracture surface images of LATSP+$Li_{1.5}SiPON$, $Li_3SiPON$, $Li_6SiPON$ films heated to 400°, 500°, and 600° C./2 h/$N_2$.

FIG. 41 shows SEM microstructures of LATSP+ Li$_{1.5}$SiPON, Li$_3$SiPON, Li$_6$SiPON films heated to 400°, 500° and 600° C./2 h/N$_2$. LATSP+Li$_{1.5}$SiPON films heated to 400° C. show distinguished coating interface between LATSP and Li$_{1.5}$SiPON. This can be attributed to the fact that this coating is stable when heated at a lower ramp rate. However, the coating is thick (too thick for some uses), with an average thickness of 7.3 μm. LATSP substrates coated with Li$_{1.5}$SiPON and heated to 500° C. do not show any coating behavior which might be ascribed to a poor coating.

Coating treatments with Li$_3$SiPON and Li$_6$SiPON solutions at 500° C. do not show uniform interfaces as they are scarcely distributed. The inconstancy of coating thickness might be ascribed to the uncontrolled process of dip-coating. LATSP substrates coated with Li$_3$SiPON and Li$_6$SiPON and heated to 500° C. show porous coating interfaces suggesting that the coatings are not stable at higher temperatures.

From the fracture surface image of LATSP+ Li$_6$SiPON films heated to 400° C., the coating seems to be percolating through the grain and grain boundaries represented by the white colors. The coating also appears on the surface of the film with an average thickness of 5 μm. All LATSP substrates coated with Li$_x$SiPON derivatives and heated to 600° C. show interfaces with island morphologies. The coatings are not uniformly distributed; suggesting that 600° C. might be too high a temperature for Li$_x$SiPON derivatives on LATSP substrates.

Figure 42:
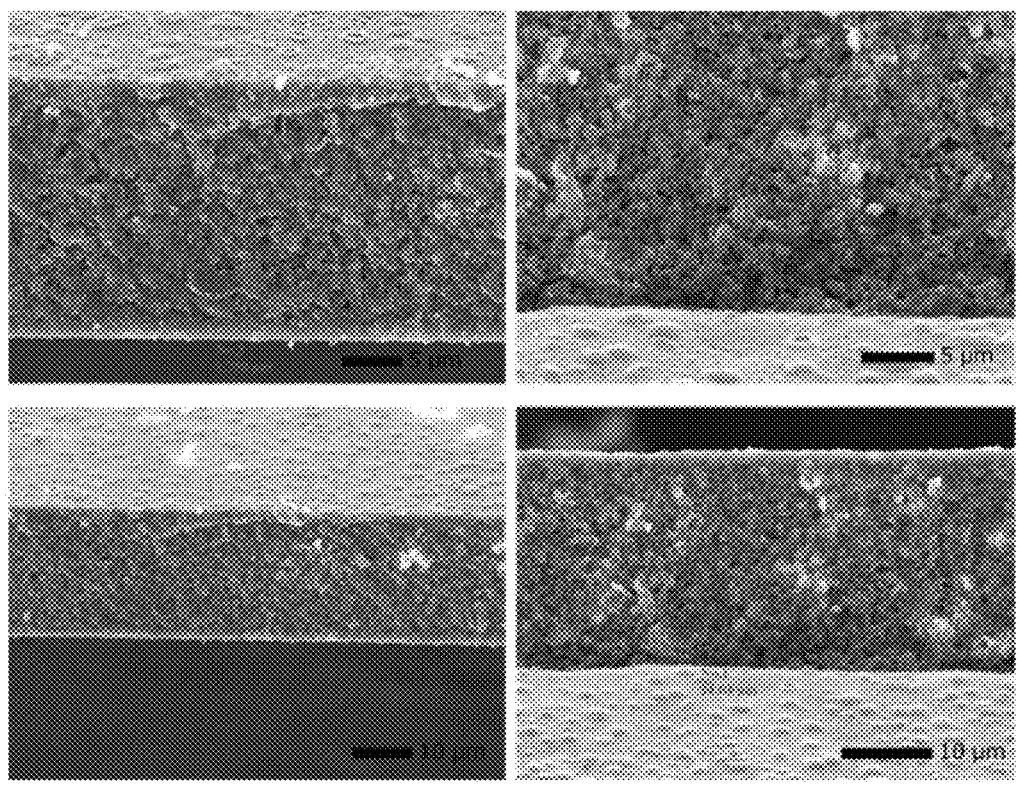
FIG. 42 shows magnified SEM facture surface images of LATSP+$Li_3SiPON$ films heated to 100° C./12 h/vacuum followed by 400° C./2 h/$N_2$.

FIG. 42 shows microstructures for the best coating on a LATSP substrate dip coated with Li$_3$SiPON and heated to 100° C./12 h/vacuum followed by heating at 400° C./2 h/N$_2$. The fracture surface images of sintered films look very dense. The substrate thickness is 24±0.4 μm, and the coating average thickness is 2.23±0.03 μm. There is a clear interfacial layer between the coating and the film.

Figure 43:
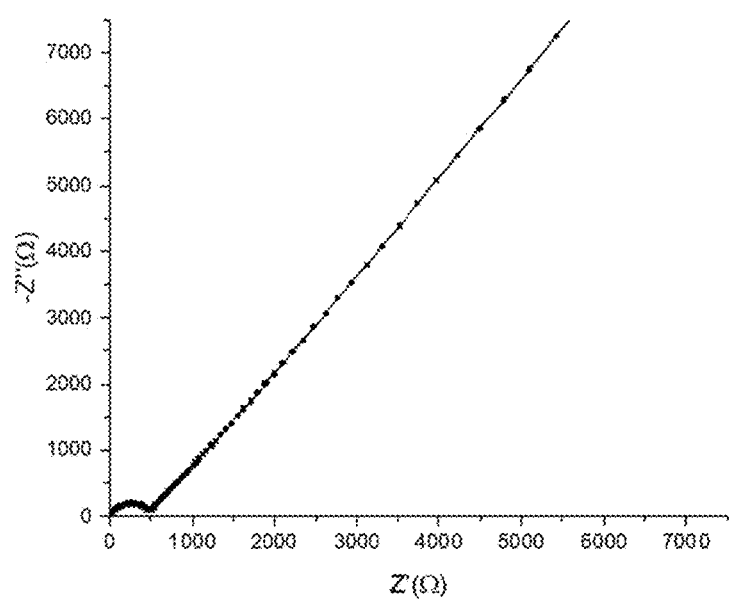
FIG. 43 is a Nyquist plot of LATSP film sintered to 1000° C./1 h/air.

FIG. 43 presents typical impedance spectra plots at room temperature, where the approximate maximum average ionic conductivity is 5.23×10'S cm' for LATSP films (without coating) sintered to 1000° C./1 h/air. Obtained thin film conductivities are comparable to what has been reported [4.3×10' (±1.4×10$^{-4}$) S cm$^{-1}$].

Figure 44:
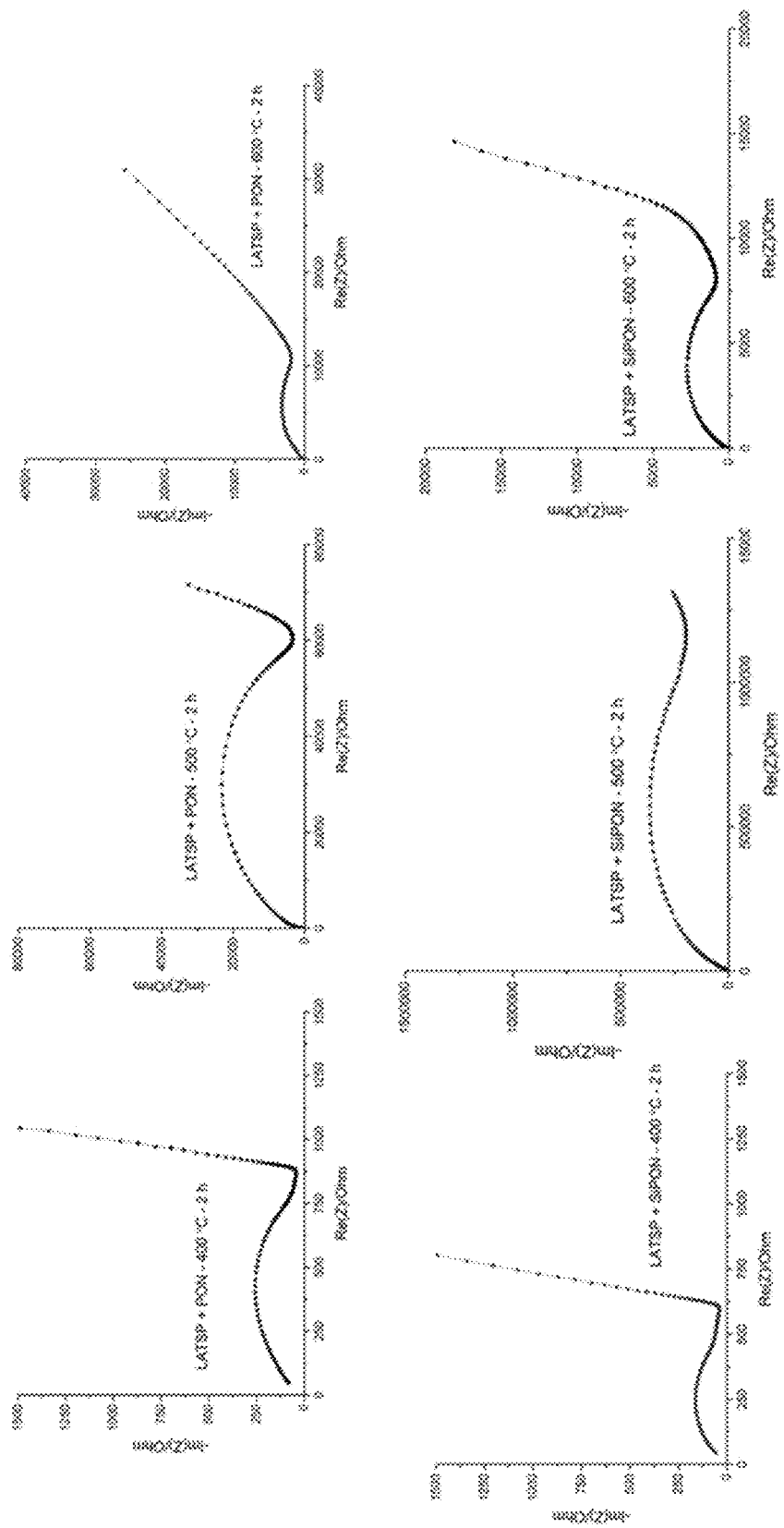
FIG. 44 shows Nyquist plots of LATSP+PON and SiPON films heated to 400°, 500°, and 600° C./2 h/$N_2$.
Figure 45:
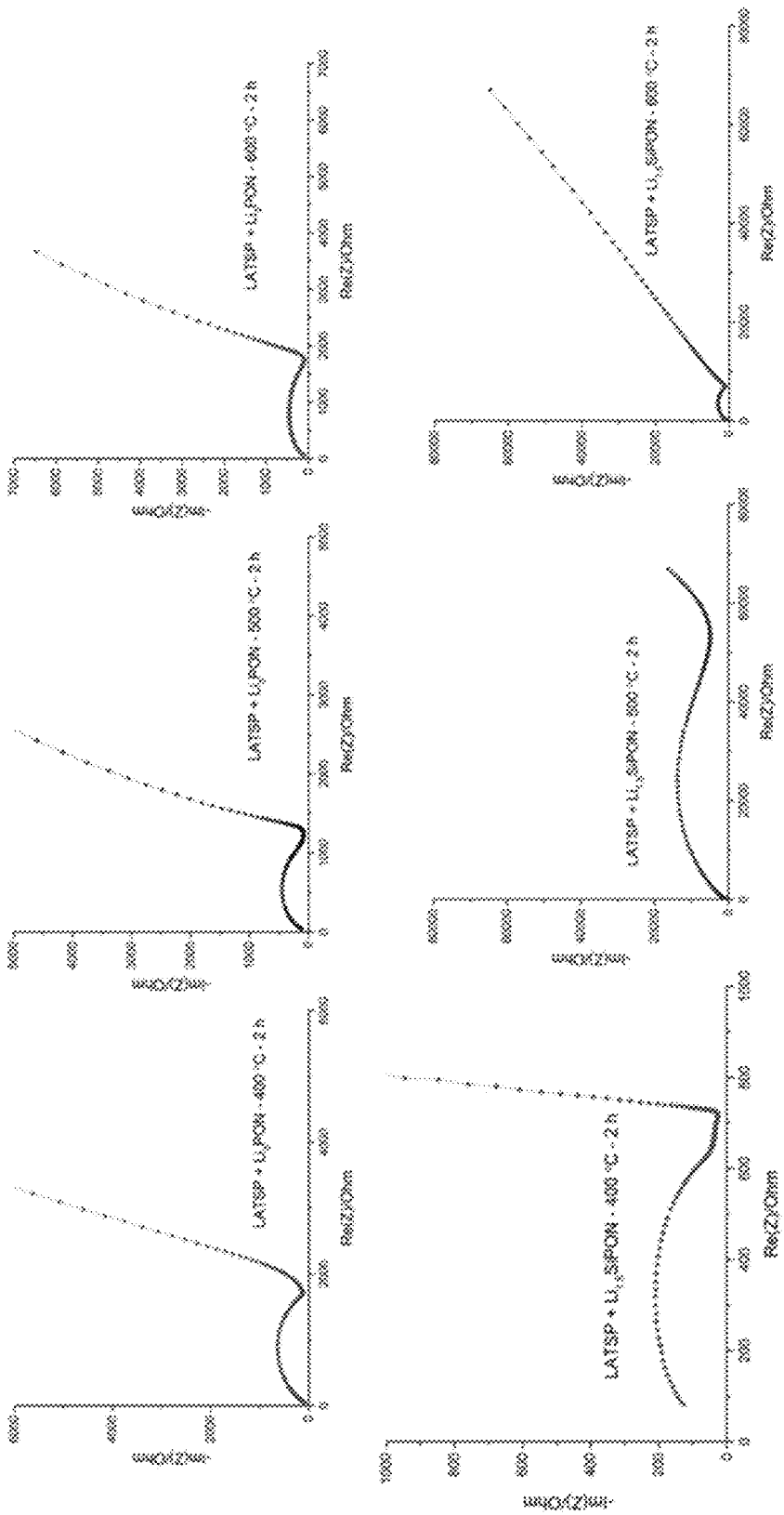
FIG. 45 shows Nyquist plots of LATSP+$Li_3PON$ and $Li_{1.5}SiPON$ films heated to 400°, 500°, and 600° C./2 h/$N_2$.
Figure 46:
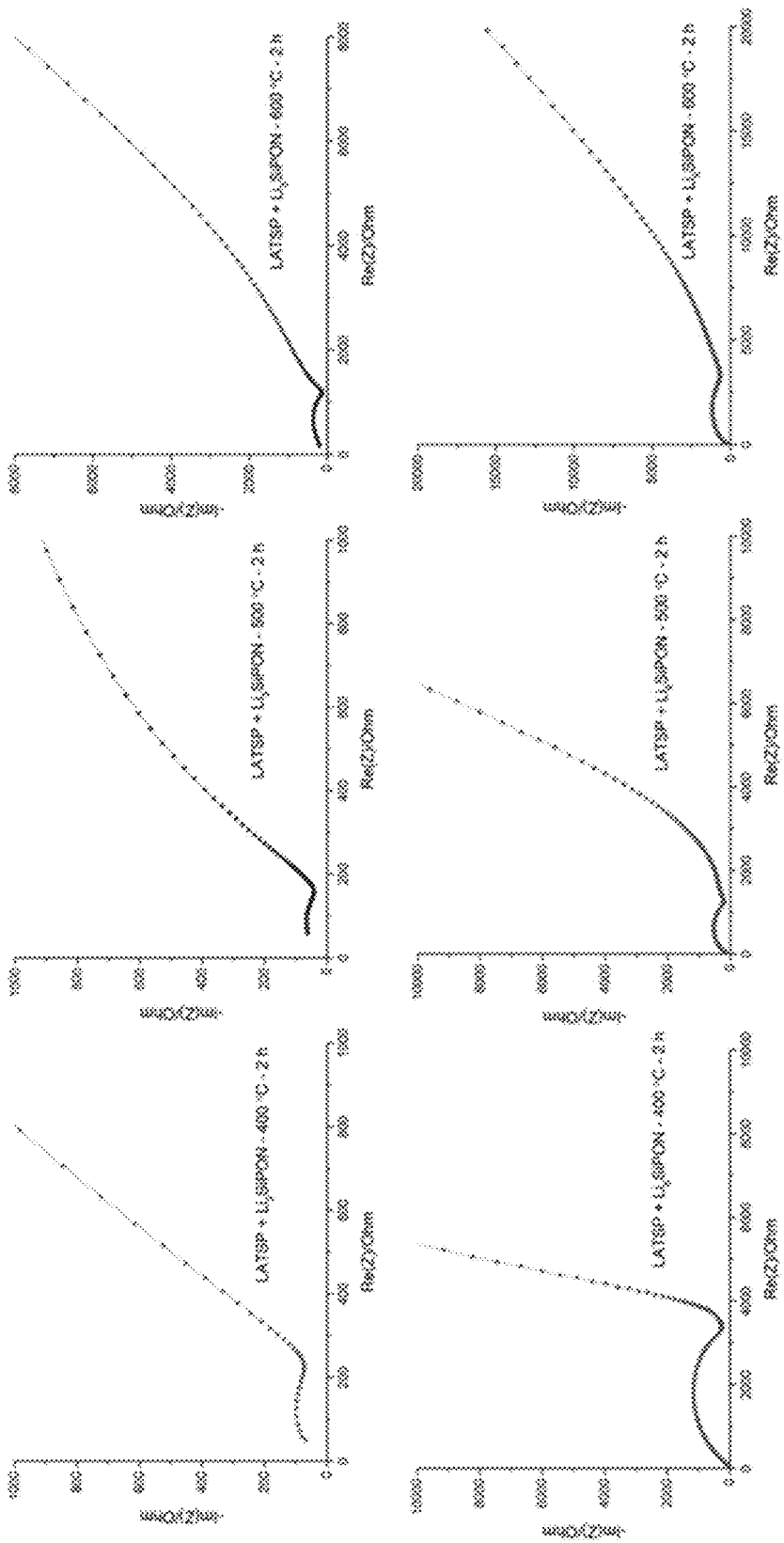
FIG. 46 shows Nyquist plots of LATSP+$Li_3SiPON$ and $Li_6SiPON$ films heated to 400°, 500°, and 600° C./2 h/$N_2$.

FIGS. 44-46 show Nyquist plots of LATSP substrates coated with PON, SiPON, Li$_{1.5}$SiPON, Li$_3$SiPON, and Li$_6$SiPON precursor solutions and heated to 400°, 500°, and 600° C./2 h/N$_2$. The resulting impedance measurements are summarized in Table 9.

TABLE 9

Conductivities (σ$_t$) of LATSP films coated with polymers at selected temperatures.

| Film substrate | Polymer coating | Temperature (° C./2 h/N$_2$) | σ RT (S/cm) |
|---|---|---|---|
| LATSP | PON | 400 | 5.4 × 10$^{-5}$ ± 6 × 10$^{-5}$ |
|  |  | 500 | 7 × 10$^{-7}$ ± 3 × 10$^{-7}$ |
|  |  | 600 | 3.2 × 10$^{-6}$ ± 2.3 × 10$^{-6}$ |
| LATSP | SiPON | 400 | 6.3 × 10$^{-5}$ ± 4.2 × 10$^{-5}$ |
|  |  | 500 | 3 × 10$^{-8}$ ± 1.2 × 10$^{-5}$ |
|  |  | 600 | 6.3 × 10$^{-6}$ ± 2.7 × 10$^{-6}$ |
| LATSP | Li$_3$PON | 400 | 3 × 10$^{-5}$ ± 1.5 × 10$^{-5}$ |
|  |  | 500 | 3 × 10$^{-5}$ ± 9.1 × 10$^{-6}$ |
|  |  | 600 | 3.3 × 10$^{-5}$ ± 7.6 × 10$^{-6}$ |
| LATSP | Li$_{1.5}$SiPON | 400 | 4.5 × 10$^{-5}$ ± 3.1 × 10$^{-5}$ |
|  |  | 500 | 5.3 × 10$^{-8}$ ± 2.7 × 10$^{-8}$ |
|  |  | 600 | 2.3 × 10$^{-6}$ ± 1.4 × 10$^{-6}$ |
| LATSP | Li$_3$SiPON | 400 | 6.7 × 10$^{-5}$ ± 3.8 × 10$^{-5}$ |
|  |  | 500 | 5.2 × 10$^{-5}$ ± 3.8 × 10$^{-6}$ |
|  |  | 600 | 1.92 × 10$^{-5}$ ± 1.2 × 10$^{-5}$ |
| LATSP | Li$_6$SiPON | 400 | 3.3 × 10$^{-5}$ ± 1 × 10$^{-5}$ |
|  |  | 500 | 1 × 10$^{-5}$ ± 9.8 × 10$^{-6}$ |
|  |  | 600 | 2.5 × 10$^{-6}$ ± 2.6 × 10$^{-6}$ |

Table 9 illustrates the total conductivity of LATSP substrates coated with different precursor solutions and heated to 400, 500, and 600° C./2 h/N$_2$. LATSP substrates coated with PON and SiPON show the highest conductivity when heat-treated at 400° C. This might be attributed to the fact that the coating is minimal and is not visible from the fracture surface images shown in FIG. 41. Thus, the bulk conductivity of the substrate, LATSP, dominates, which leads to high conductivity. However, as the heating temperature increases to 500° C., the conductivity drops by two and three orders of magnitude for LATSP substrates coated with PON and SiPON, respectively. These changes can be attributed to the coating's poor ionic conductivity which increases the substrates impedance as a result of binding.

Increasing the heating temperature leads to improved conductivity for Li$_3$PON coatings. The highest conductivity is when samples are heated to 600° C. This heating schedule also leads to good bonding interfaces.

Li$_{1.5}$SiPON film shows poor conductivity when heat treated to 500° C. and 600° C. due to the porous coating. This solution is not stable in air for coating, thus the resulting substrates suffer from too thick coatings that resulted in poor ionic conductivity.

The Li$_3$SiPON and Li$_6$SiPON solutions give the best conductivity around 400°-500° C. The coatings are not stable when heated to 600° C. as shown by the SEM images in FIG. 41. Hence, the conductivity drops by order of magnitude for LATSP substrates coated with Li$_6$SiPON. The Li$_3$SiPON coating shows the highest conductivity of all the coating precursor coatings when heated to 400° C. This can be attributed as a result of a uniform, thin, and dense coating.

Figure 47:
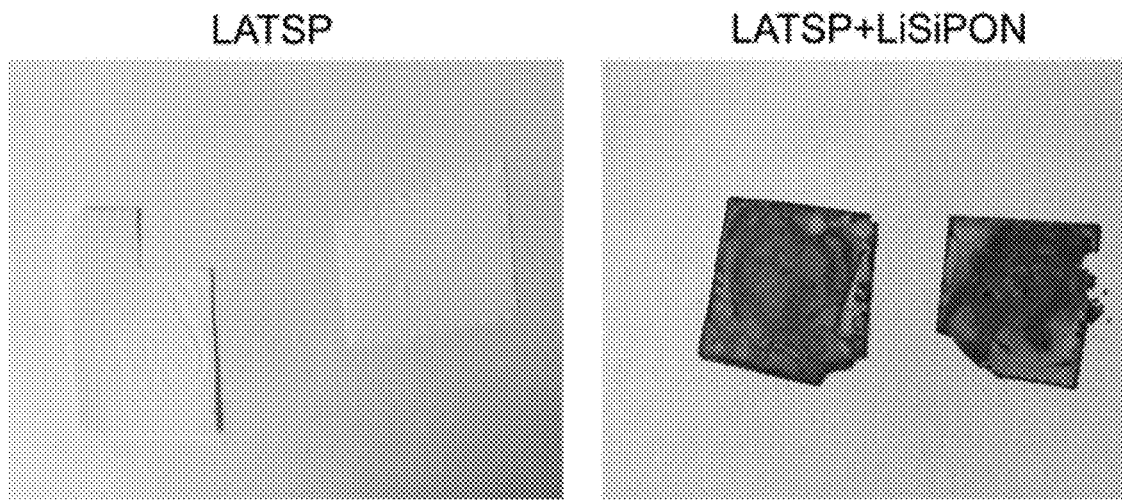
FIG. 47 shows optical images of sintered LATSP substrate (left) and LATSP+$Li_3SiPON$ films (right) heated to 100° C./12 h/vacuum followed by 400° C./2 h/$N_2$.
Figure 48:
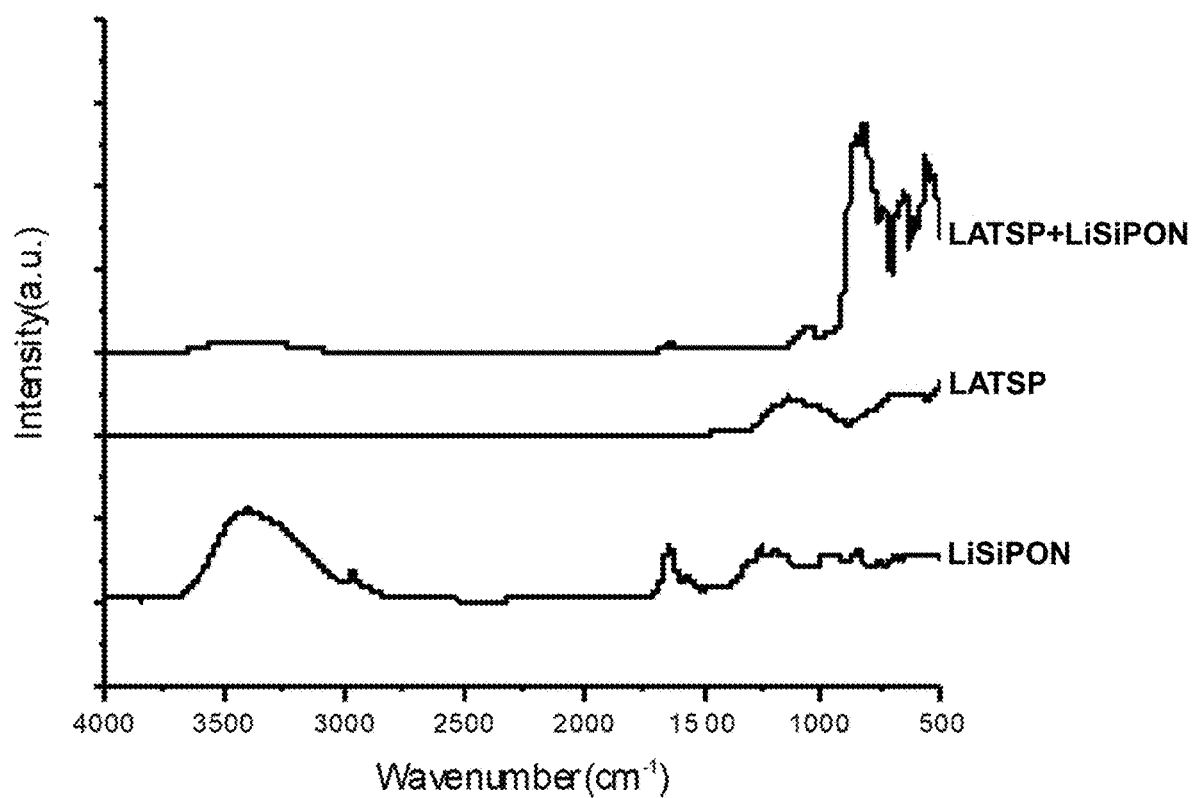
FIG. 48 shows FTIR spectra of $Li_3SiPON$, LATSP, and LATSP+$Li_3SiPON$ heated to 600° C./2 h/$N_2$.

FIG. 47 shows images of sintered LATSP substrate (left) and LATSP+Li$_3$SiPON films (right) heated to 100° C./12 h/vacuum followed by 400° C./2 h/N$_2$. FIG. 48 shows FTIR of Li$_3$SiPON, LATSP, and LATSP coated with Li$_3$SiPON and heated to 600° C./2 h/N$_2$. FTIR of Li$_3$SiPON solution shows large υOH (3400 cm$^{-1}$) and υP—O/P-N (~1000 cm$^{-1}$). FTIR of LATSP film show υC=O (1000-1500 cm$^{-1}$) and M—O (<600 cm$^{-1}$). FTIR of LATSP+Li$_3$SiPON heated to 600° C./2 h/N$_2$ show small υO—H and υP—O/P—N peaks and large M—O peak.

Example 11

Coating LiAlO$_2$+X with PON, SiPON, Li$_3$PON, Li$_{1.5}$SiPON, Li$_3$SiPON, Li$_6$SiPON.

LiAlO$_2$+X substrates are placed between α-alumina disks and heated at 665° C. for 2 h at a ramp rate of 3° C. min$^{-1}$ followed by sintering to 1100° C./2 h at a ramp rate of 1° C. min$^{-1}$ in air (100 ml min$^{-1}$).

LiAlO$_2$+X substrates are dip-coated for 1 min in PON, SiPON, Li$_3$PON, Li$_{1.5}$SiPON Li$_3$SiPON, and Li$_6$SiPON solutions (3 mL). The coated films are left to dry for 12 h under vacuum at 100° C. Dried samples are then heated up to 500° and 600° C./2 h/N$_2$ at a ramp rate of 1° C./min.

Figure 49:
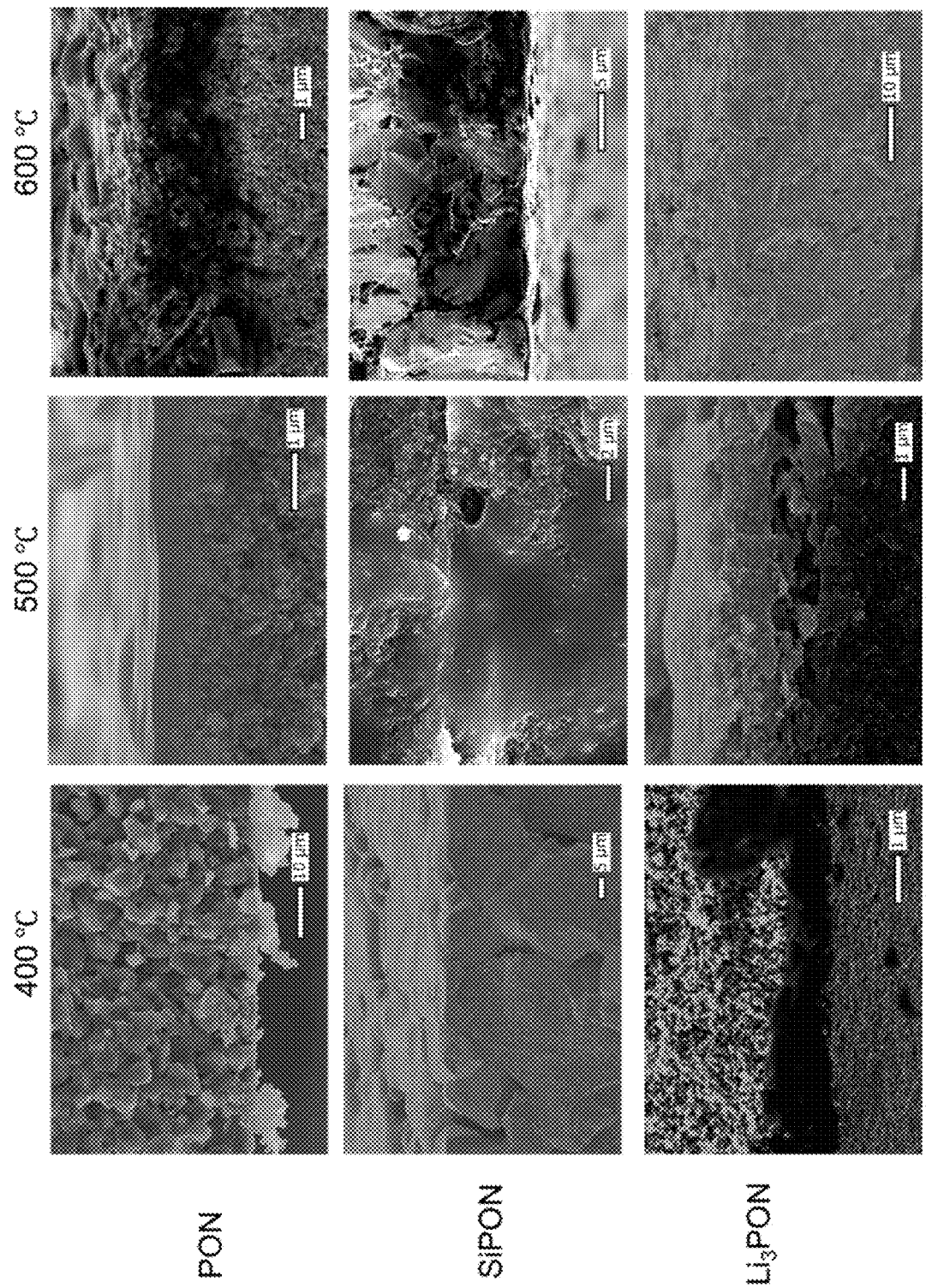
FIG. 49 shows SEM fracture surface images of $LiAlO_2$+300%+PON, SiPON and $Li_3PON$ films heated to 400°, 500°, and 600° C./2 h/$N_2$.

FIG. 49 provides scanning electron micrographs (SEMs) showing the microstructures of LiAlO$_{2+300}$%+PON, SiPON, and Li$_3$PON films heated to 400°, 500°, and 600° C./2 h/N$_2$. LiAlO$_{2+300}$% substrates coated with PON and SiPON and heated to 400° C. showed a non-uniform coating that is non-uniform. However, the SiPON coating causes the substrates to densify as it percolates through the grain and grain boundaries when heated to 500° and 600° C. PON coatings at 500° C. are more stable, dense and uniform with an average coating thickness of about 500 nm. The 600° C. PON treatments generate a rough coating with an average thickness of 4 µm.

LiAlO$_2$+300%+Li$_3$PON films heated to 400° C. show a clear distinguished interface. However, on heating temperature to 500° C. and 600° C., the coating fades and delaminates as demonstrated from the SEM fracture surface images suggesting that the coating is not stable above 400° C.

Figure 50:
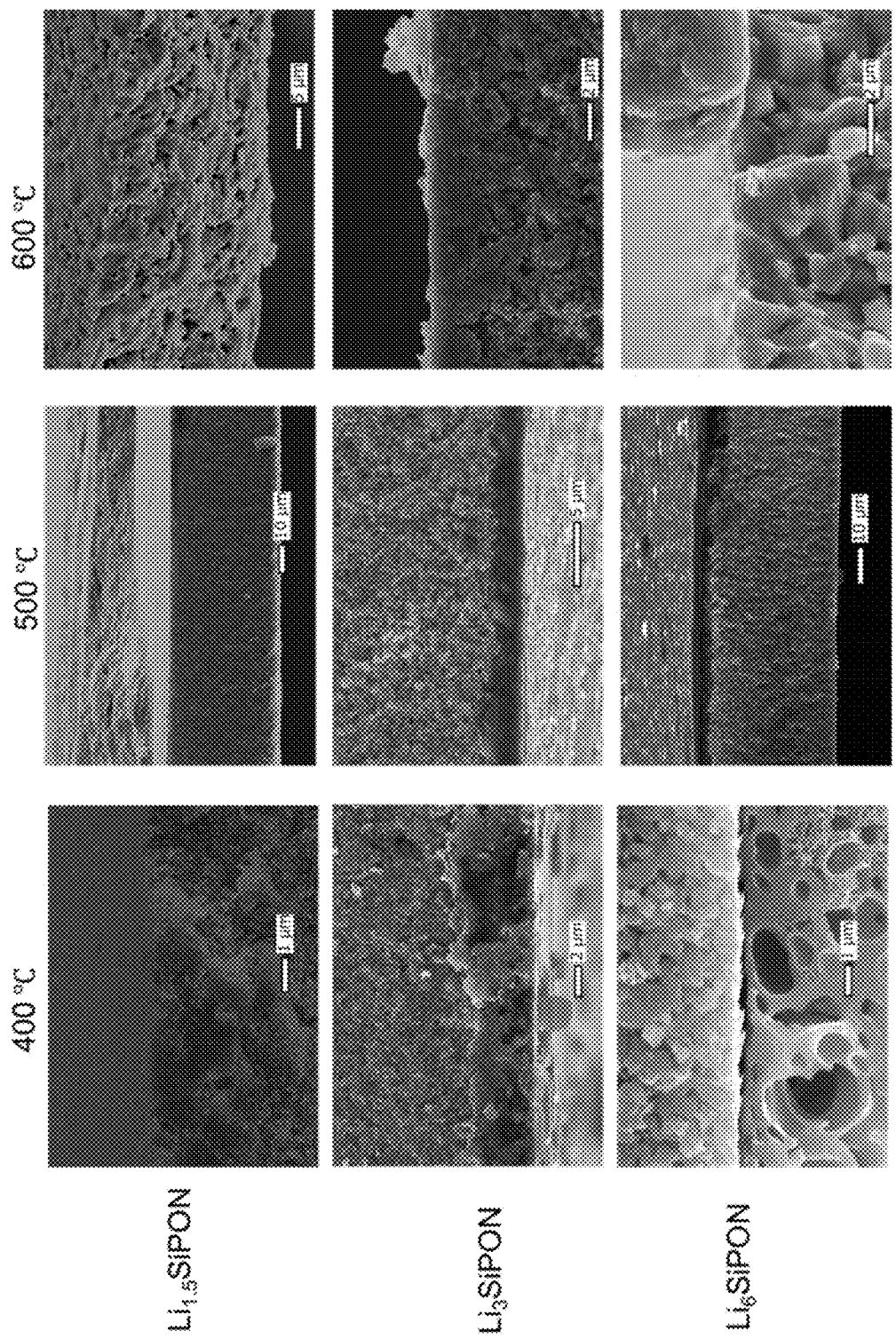
FIG. 50 shows SEM facture surface images of $LiAlO_2$+300%+$Li_{1.5}SiPON$, $Li_3SiPON$, $Li_6SiPON$ films heated to 400°, 500°, and 600° C./2 h/$N_2$.

FIG. 50 provides SEMs showing microstructures for LiAlO$_2$+300%+Li$_3$SiPON, Li$_6$SiPON films heated to 400, 500 and 600° C./2 h/N$_2$. LiAlO$_{2+300}$%+Li$_{1.5}$SiPON films heated to 400° C. and 600° C. do not show distinguishable coating interfaces. The Li$_{1.5}$SiPON films at 400° C. show coating interfaces with average thicknesses of about 13 µm. However, this coating is not uniform as some substrate surface is not coated. LiAlO$_{2+300}$% substrates coated with Li$_3$SiPON show ideal coatings that are dense, uniform and stable when heated between 400-600° C. with average thicknesses of about 4 µm.

The Li$_6$SiPON films heated to 400° C. give porous coatings; however, at 500° C. the coatings are uniform and dense. The bottom part of the substrate did not coat well because a Teflon substrate used to place the films after the dip coating process results in loss of the coating. The Li$_6$SiPON coating is not stable above 500° C. on LATSP and LiAlO$_2$+300% substrates.

Figure 51:
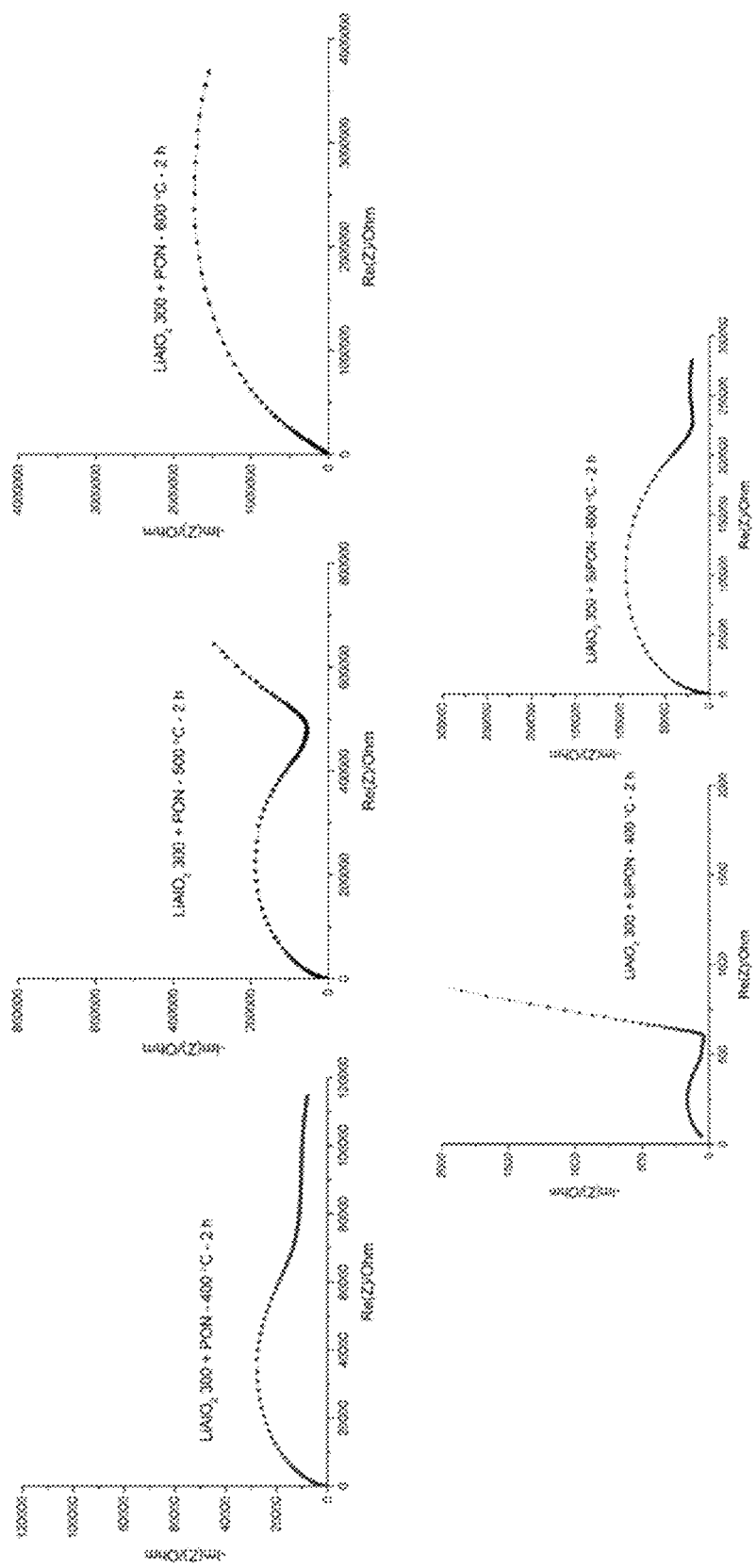
FIG. 51 shows Nyquist plots of $LiAlO_{2+300}$%+PON and SiPON films heated to 400, 500, and 600° C./2 h/$N_2$.
Figure 52:
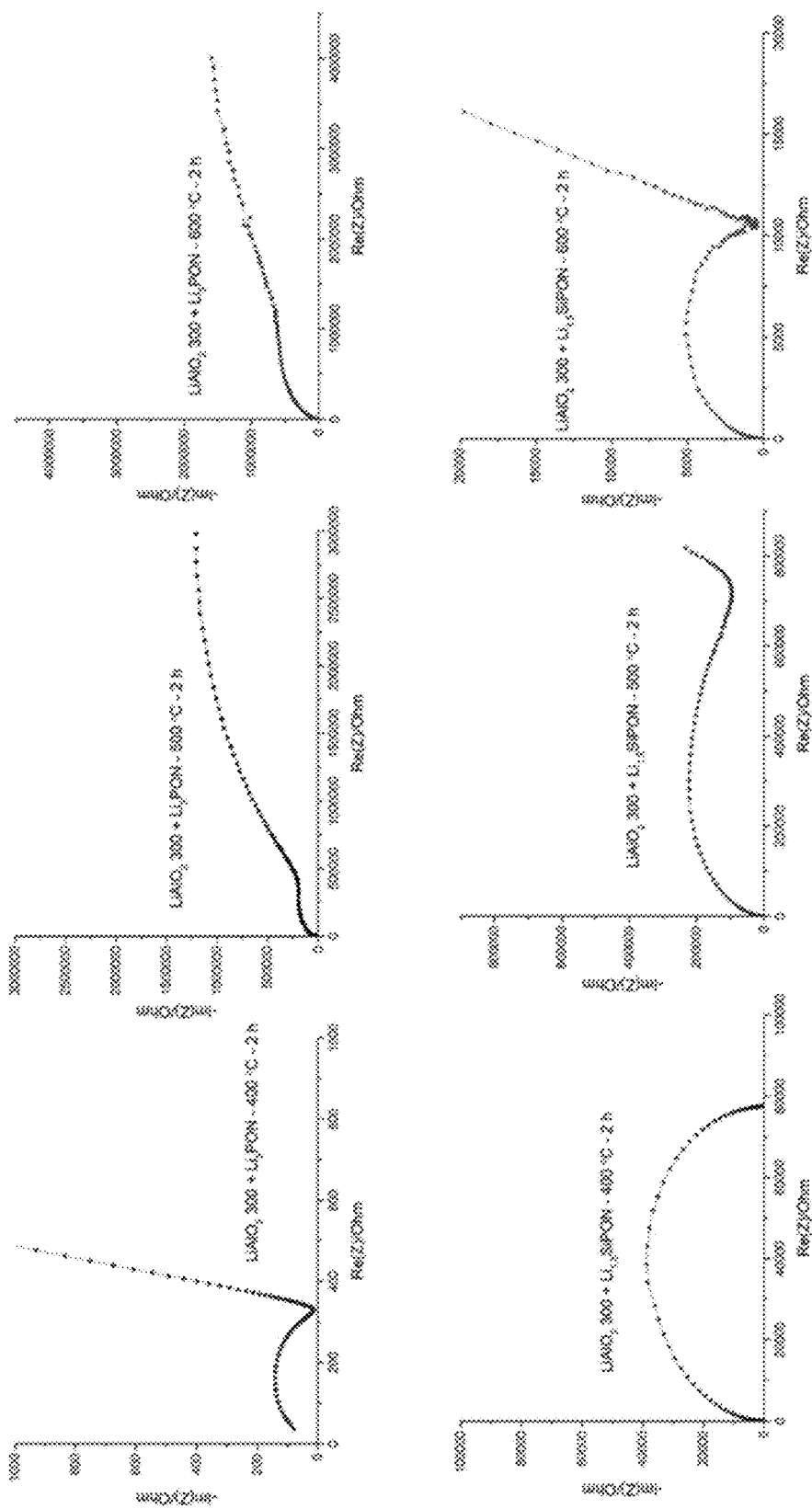
FIG. 52 shows Nyquist plots of $LiAlO_{2+300}$%+$Li_3PON$ and $Li_{1.5}SiPON$ films heated to 400, 500, and 600° C./2 h/$N_2$.
Figure 53:
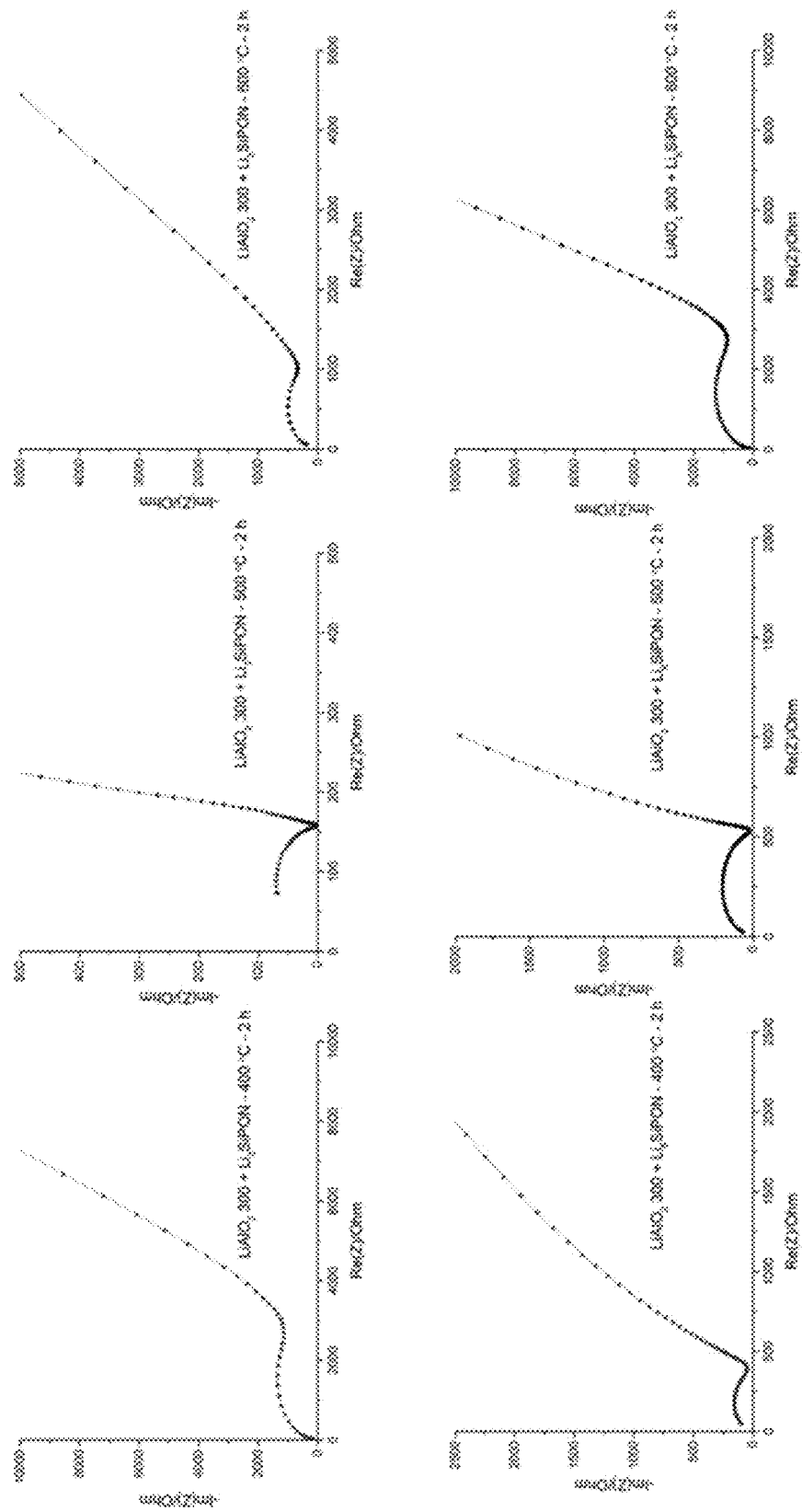
FIG. 53 shows Nyquist plots of $LiAlO_{2+300}$%+$Li_3SiPON$ and $Li_6SiPON$ films heated to 400, 500, and 600° C./2 h/$N_2$.

FIGS. 51, 52, and 53 show Nyquist plots of LiAlO$_2$+ 300% substrates coated with PON, SiPON, Li$_{1.5}$SiPON Li$_3$SiPON, and Li$_6$SiPON precursor solutions and heated to 400, 500, and 600° C./2 h/N$_2$. The resulting impedance measurements are summarized in Table 10.

TABLE 10

Conductivities (σ$_t$) of LiAlO$_2$ + v300% films coated with polymers at selected temperatures.

| Film substrate | Polymer coating | Temperature (° C./2 h/N$_2$) | σ RT (S/cm) |
| --- | --- | --- | --- |
| LiAlO$_2$ + 300% | PON | 400 | $8 \times 10^{-7} \pm 2 \times 10^{-7}$ |
| | | 500 | $1.4 \times 10^{-7} \pm 1.5 \times 10^{-7}$ |
| | | 600 | $1.4 \times 10^{-8} \pm 0.3 \times 10^{-8}$ |
| LiAlO$_2$ + 300% | SiPON | 400 | $4.7 \times 10^{-5} \pm 1.2 \times 10^{-5}$ |
| | | 500 | N/A |
| | | 600 | $2 \times 10^{-7} \pm 8.4 \times 10^{-8}$ |
| LiAlO$_2$ + 300% | Li$_3$PON | 400 | $2.7 \times 10^{-5} \pm 1.1 \times 10^{-5}$ |
| | | 500 | $1.2 \times 10^{-5} \pm 0.5 \times 10^{-5}$ |
| | | 600 | $1 \times 10^{-7} \pm 4.7 \times 10^{-8}$ |
| LiAlO$_2$ + 300% | Li$_{1.5}$SiPON | 400 | $3.2 \times 10^{-8} \pm 1.5 \times 10^{-5}$ |
| | | 500 | $8.9 \times 10^{-8} \pm 2.6 \times 10^{-8}$ |
| | | 600 | $7.1 \times 10^{-6}$ |
| LiAlO$_2$ + 300% | Li$_3$SiPON | 400 | $1.8 \times 10^{-5} \pm 3.5 \times 10^{-5}$ |
| | | 500 | $7 \times 10^{-5} \pm 1.3 \times 10^{-5}$ |
| | | 600 | $4.7 \times 10^{-5} \pm 0.8 \times 10^{-5}$ |
| LiAlO$_2$ + 300% | Li$_6$SiPON | 400 | $1.4 \times 10^{-4} \pm 5.2 \times 10^{-5}$ |
| | | 500 | $1.3 \times 10^{-5} \pm 2.1 \times 10^{-5}$ |
| | | 600 | $1.8 \times 10^{-5} \pm 1.7 \times 10^{-5}$ |

Table 10 records the total conductivity of LiAlO$_{2+300}$% substrates coated with different precursor solutions and heated to 400, 500, and 600° C./2 h/N$_2$. LiAlO$_2$+300% substrates coated with PON and SiPON show the highest conductivities when heat treated at 400° C. with a minimal coating of both precursors, which was also demonstrated when using LATSP substrate. The impedance starts to increase on heating to 500° C. and 600° C., a result of too thick coating for PON thin films. Since these coatings percolate into the substrate when treated to 600° C., the resulting conductivities are poor.

The Li$_3$PON thin films show inverse behavior when LiAlO$_{2+300}$% is used versus the LATSP substrate. The impedance decreases on heating from 400° C. to 600° C. by two orders of magnitude. This can be attributed to the fact that the coating is not stable at high temperatures; as demonstrated from the delamination of the coating from the FIG. 49 SEM.

The Li$_{1.5}$SiPON films shows poor conductivity on heat treating to 400° C. In fact, there is an appearance of a parallel combination of a resistance and a capacitance upon the complex plane as the impedance go all the way down to the real axis at low frequencies. However, the conductivity seems to improve at 600° C.

The $Li_3SiPON$ films show conductivity ($10^{-5}$ S/cm) on heat treating from 400° to 600° C. consistent with the LATSP substrate as well as $LiAlO_2$+300%.

The $Li_6SiPON$ solution gives the highest conductivity of $1.4 \times 10^{-x}$+$5.2 \times 10^{-5}$ S/cm for $LiAlO_2$+300% substrates. The substrate without a coating has a conductivity of $1.6 \times 10^{-8}$ S/cm. However, the conductivity drops an order of magnitude when the film is heated above 400° C.

Figure 54:
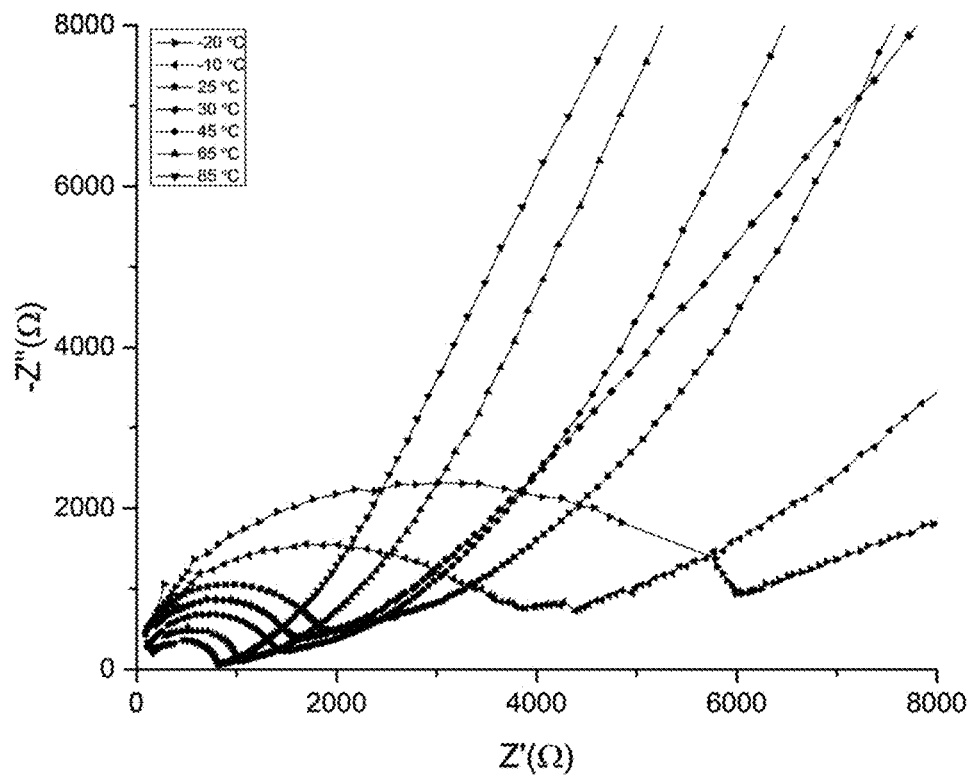
FIG. 54 shows Nyquist plots at selected temperatures of $LiAlO_2$+300% film sintered to 1100° C./2 h/air+$Li_3SiPON$–100° C./Vacuum/12 h heated to 300° C./2 h/$N_2$.
Figure 55:
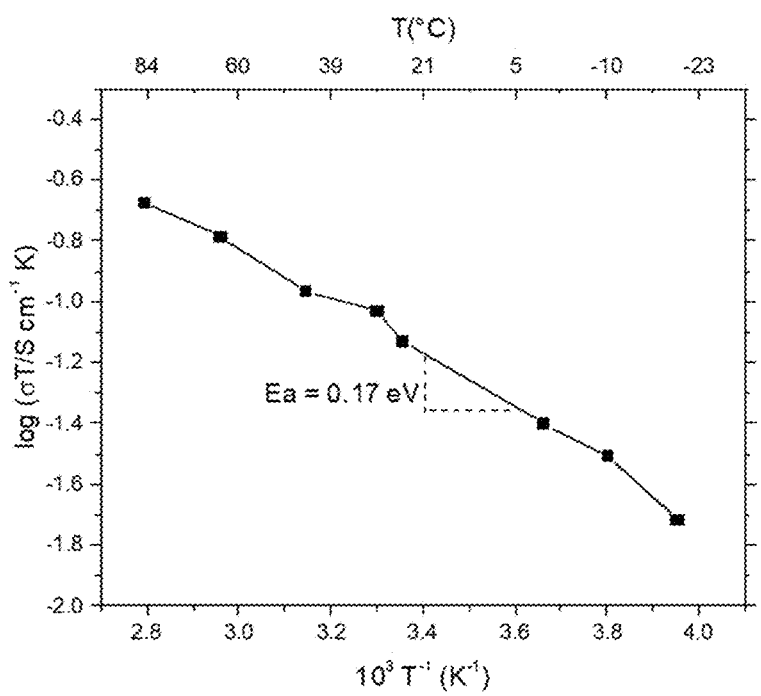
FIG. 55 shows Arrhenius plots of $LiAlO_2$+$Li_3SiPON$ heat treated to 300° C./2 h/$N_2$.

FIG. 54 shows typical Nyquist plots of $Li_3SiPON$ coated $LiAlO_2$+300% films where electrochemical impedance is collected in a frequency range of 7 MHz to 1 Hz at −20° C. to 85° C. Room temperature conductivities of $1.43 \times 10^{-4}$ S $cm^{-1}$ and activation energies of 0.17 eV (16 kJ $mol^{-1}$) are obtained as shown in FIG. 55.

Figure 56:
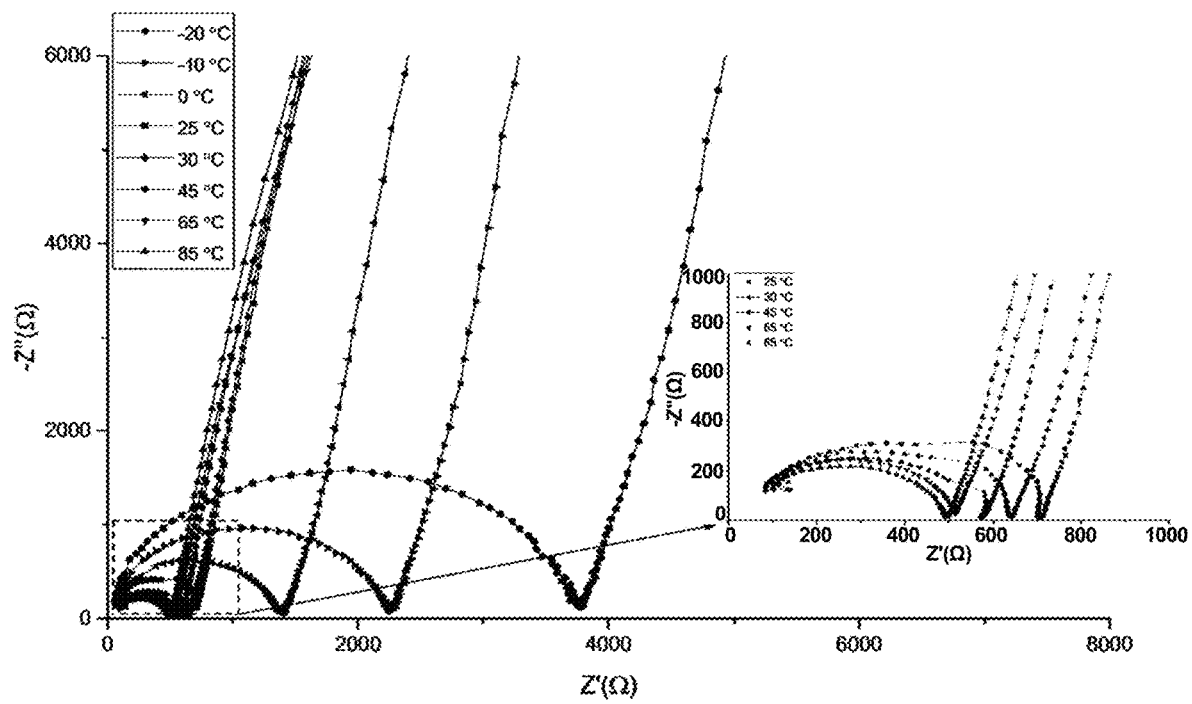
FIG. 56 shows Nyquist plots at selected temperatures of $LiAlO_2$+300% film sintered to 1100° C./2 h/air+$Li_3SiPON$–100° C./Vacuum/12 h heated to 400° C./2 h/$N_2$.
Figure 57:
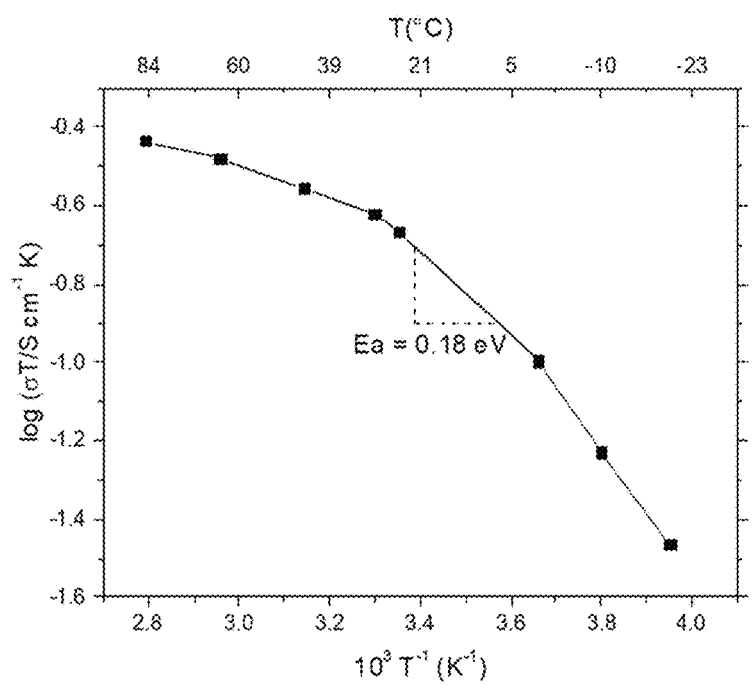
FIG. 57 shows Arrhenius plots of $LiAlO_2$+$Li_3SiPON$ heat treated to 400° C./2 h/$N_2$.

FIG. 56 shows typical Nyquist plots of $Li_3SiPON$ coated $LiAlO_2$+300% films where electrochemical impedance is collected in a frequency range of 7 MHz to 1 Hz at −20° C. to 85° C. Room temperature conductivities of $7.2 \times 10^4$ S $cm^{-1}$ and activation energies of 0.18 eV (17 kJ $mol^{-1}$) are obtained as shown in FIG. 57.

Tables 11 and 12 illustrate the total conductivity of $LiAlO_2$+$Li_3SiPON$ coated substrates heated to 300° C. and 400° C./2 h/$N_2$ respectively. Samples treated at higher temperatures show higher conductivities than samples treated at 300° C. This suggests the coating is more stable at 400° C. The total conductivities reported here are three to four orders of magnitude higher than $LiAlO_2$ substrates without the coating.

TABLE 11

Total conductivities ($\sigma_t$) of $LiAlO_{2v}$ + $Li_3SiPON$ heated to 300° C./2 h/$N_2$ samples at selected temperatures.

| T (° C.) | $\sigma$(S $cm^{-1}$) |
|---|---|
| −20 | $7.28 \times 10^{-5}$ |
| −10 | $9.26 \times 10^{-4}$ |
| 25 | $1.43 \times 10^{-4}$ |
| 35 | $1.38 \times 10^{-4}$ |
| 45 | $2.55 \times 10^{-4}$ |
| 65 | $4.25 \times 10^{-4}$ |
| 85 | $5.66 \times 10^{-4}$ |

TABLE 12

Total conductivities ($\sigma_t$) of $LiAlO_2$ + $Li_3SiPON$ samples heated to 400° C./2 h/$N_2$ at selected temperatures.

| T (° C.) | $\sigma$(S $cm^{-1}$) |
|---|---|
| −20 | $1.35 \times 10^{-4}$ |
| −100 | $2.24 \times 10^{-4}$ |
| 25 | $3.67 \times 10^{-4}$ $7.21 \times 10^{-4}$ |
| 35 | $7.89 \times 10^{-4}$ |
| 45 | $8.75 \times 10^{-4}$ |
| 65 | $9.81 \times 10^{-4}$ |
| 85 | $1.02 \times 10^{-3}$ |

Example 12

Coating $\alpha$-$Al_2O_3$ with $Li_3PON$, $Li_3SiPON$, $Li_6SiPON$, $Na_3SiPON$.

$\alpha$-$Al_2O_3$ substrates are dip-coated for 1 min in $Li_3PON$, $Li_{1.5}SiPON$ $Li_3SiPON$, $Li_6SiPON$, and $Na_3SiPON$ solutions (3 mL). The coated films are left to dry for 12 h under vacuum at 100° C. Dried samples were then heated up to 400-600° C./2 h/$N_2$ at a ramp rate of 1° C./min.

Figure 58:
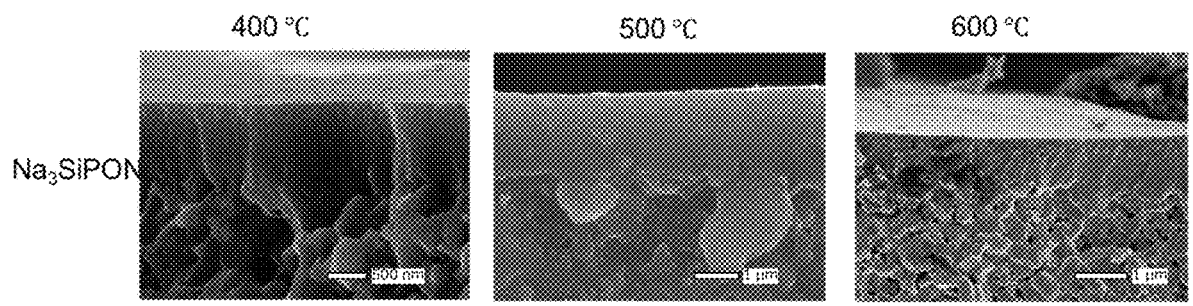
FIG. 58 shows SEM facture surface images of $Al_2O_3$+$Na_3SiPON$ films heated to 400, 500, 600° C./2 h/$N_2$.
Figure 59:
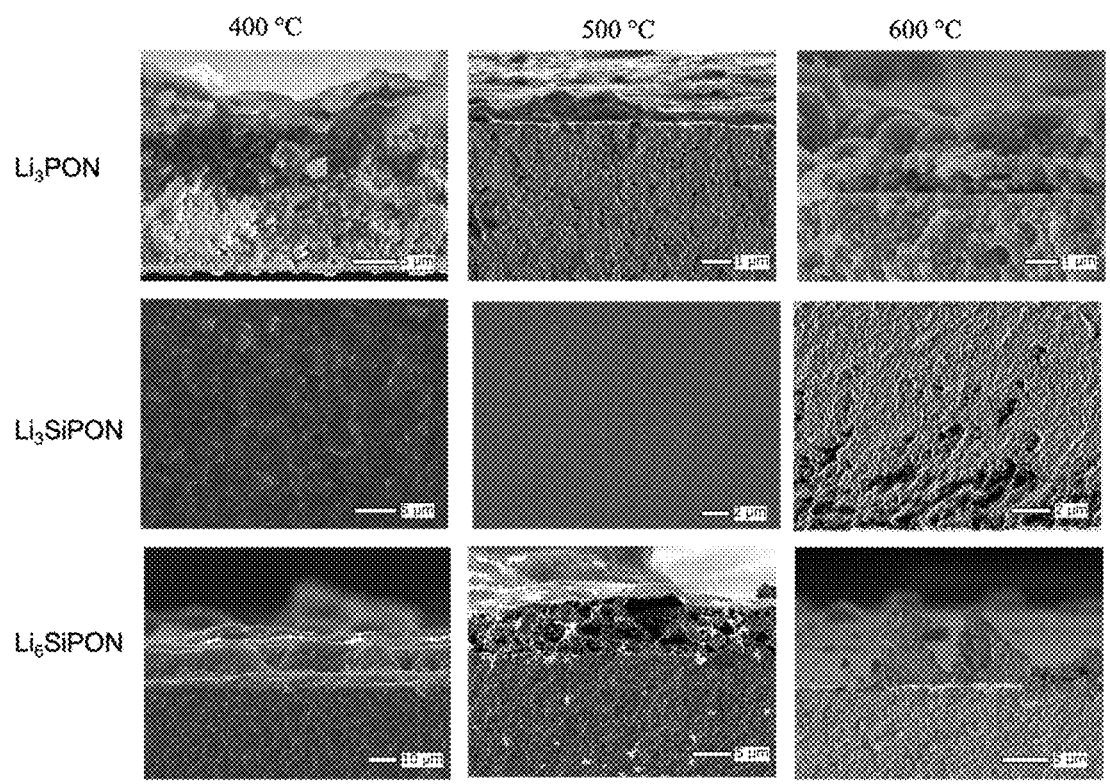
FIG. 59 shows SEM facture surface images of $Al_2O_3$+$Li_3PON$, $Li_3SiPON$ and $Li_6SiPON$ films heated to 400, 500, and 600° C./2 h/$N_2$.

FIGS. 58 and 59 are SEMs showing microstructures for $Al_2O_3$+$Na_3SiPON$, $Li_3PON$ $Li_3SiPON$, $Li_6SiPON$ films heated to 400, 500 and 600° C./2 h/$N_2$. The $Na_3SiPON$ coating is a good system as the coating is dense and bonds uniformly to the substrate. The heating schedule does not alter the interface. The $Li_3SiPON$ films heated to 400° C. show a non-uniform coating. The coating improves with increasing temperature, as a uniform coating is seen for samples heat treated to 600° C.

The $Li_6SiPON$ films heated to 400° C. show uniform and thin coatings bonded to the $\alpha$-$Al_2O_3$ substrate. However, as the heating temperature increases the coating starts to become porous and delaminates from the substrate as seen for both LATSP and $LiAlO_2$ substrates.

Figure 60:
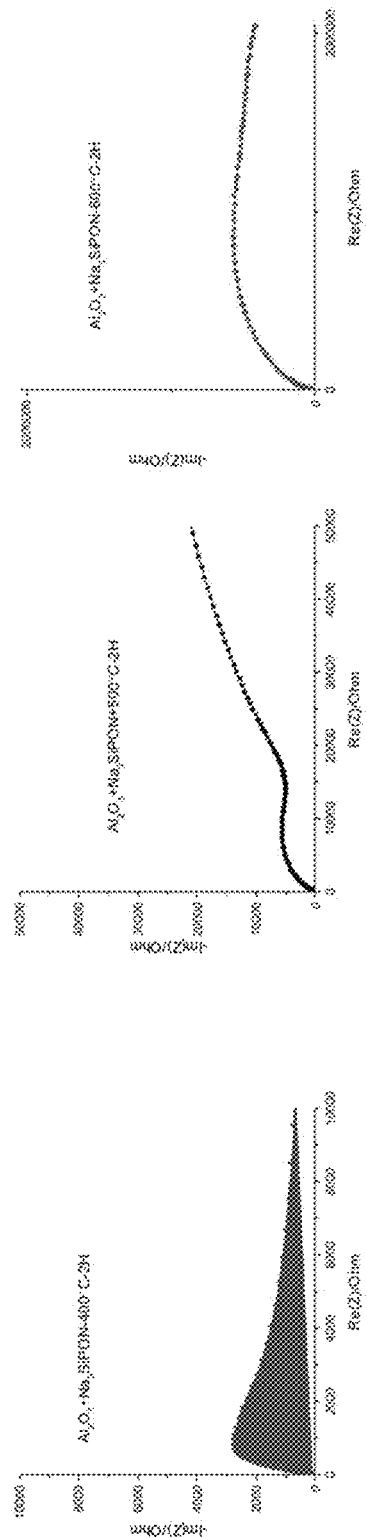
FIG. 60 shows Nyquist plots of $Al_2O_3$+$Na_3SiPON$ films heated to 400, 500, or 600° C./2 h/$N_2$.
Figure 61:
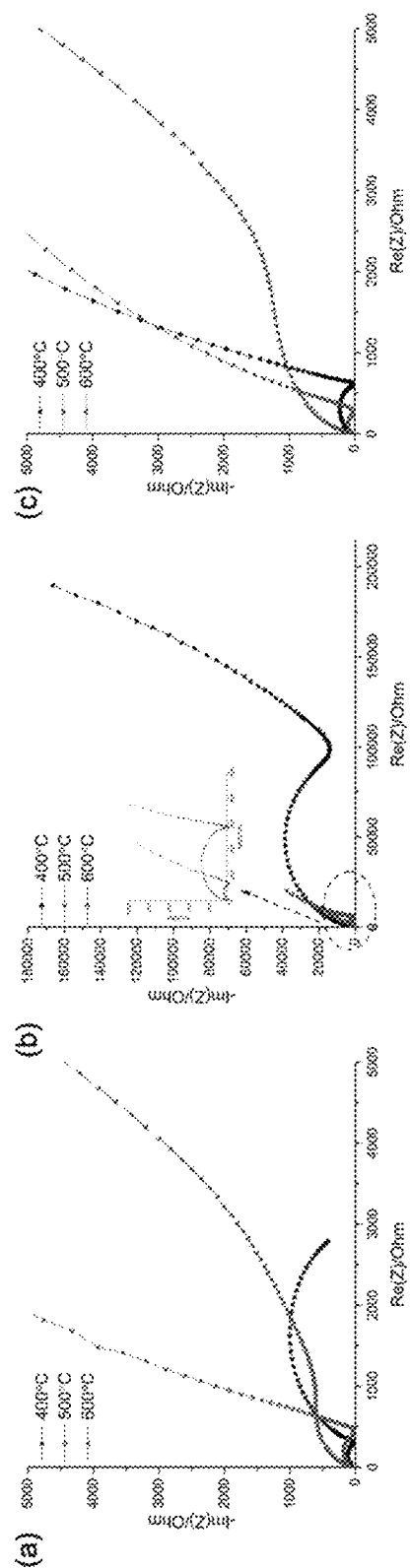
FIG. 61 shows Room temperature Nyquist plots of $Al_2O_3$+a. $Li_3PON$, b. $Li_3SiPON$ and c. $Li_6SiPON$ films heated to 400°, 500°, and 600° C./2 h/$N_2$.

FIGS. 60 and 61 show Nyquist plots of $\alpha$-$Al_2O_3$ substrates coated with $Li_3PON$, $Li_3SiPON$, $Li_6SiPON$, and $Na_3SiPON$ precursor solutions and heated to 400, 500, and 600° C./2 h/$N_2$. The resulting impedance measurements are summarized in Table 13.

TABLE 13

Total conductivities ($\sigma_t$) of $Al_2O_3$ films coated with polymers at selected temperatures.

| Film substrate | Polymer coating | Temperature (° C./2 h/$N_2$) | $\sigma$ RT (S/cm) |
|---|---|---|---|
| $Al_2O_3$ | $Li_3PON$ | 400 | $1.2 \times 10^{-4}$ |
| | | 500 | $7.1 \times 10^{-5}$ |
| | | 600 | $1.7 \times 10^{-5}$ |
| $Al_2O_3$ | $Li_3SiPON$ | 400 | $3.5 \times 10^{-8}$ |
| | | 500 | $2.3 \times 10^{-5}$ |
| | | 600 | $5.8 \times 10^{-6}$ |
| $Al_2O_3$ | $Li_6SiPON$ | 400 | $4.7 \times 10^{-5}$ |
| | | 500 | $1.1 \times 10^{-4}$ |
| | | 600 | $8.8 \times 10^{-6}$ |
| $Al_2O_3$ | $Na_3SiPON$ | 400 | $2.3 \times 10^{-8}$ |
| | | 500 | $2.3 \times 10^{-6}$ |
| | | 600 | $1.7 \times 10^{-6}$ |

Example 13

XRD studies of $Li_3PON$ and $Li_6SiPON$.

Figure 62:
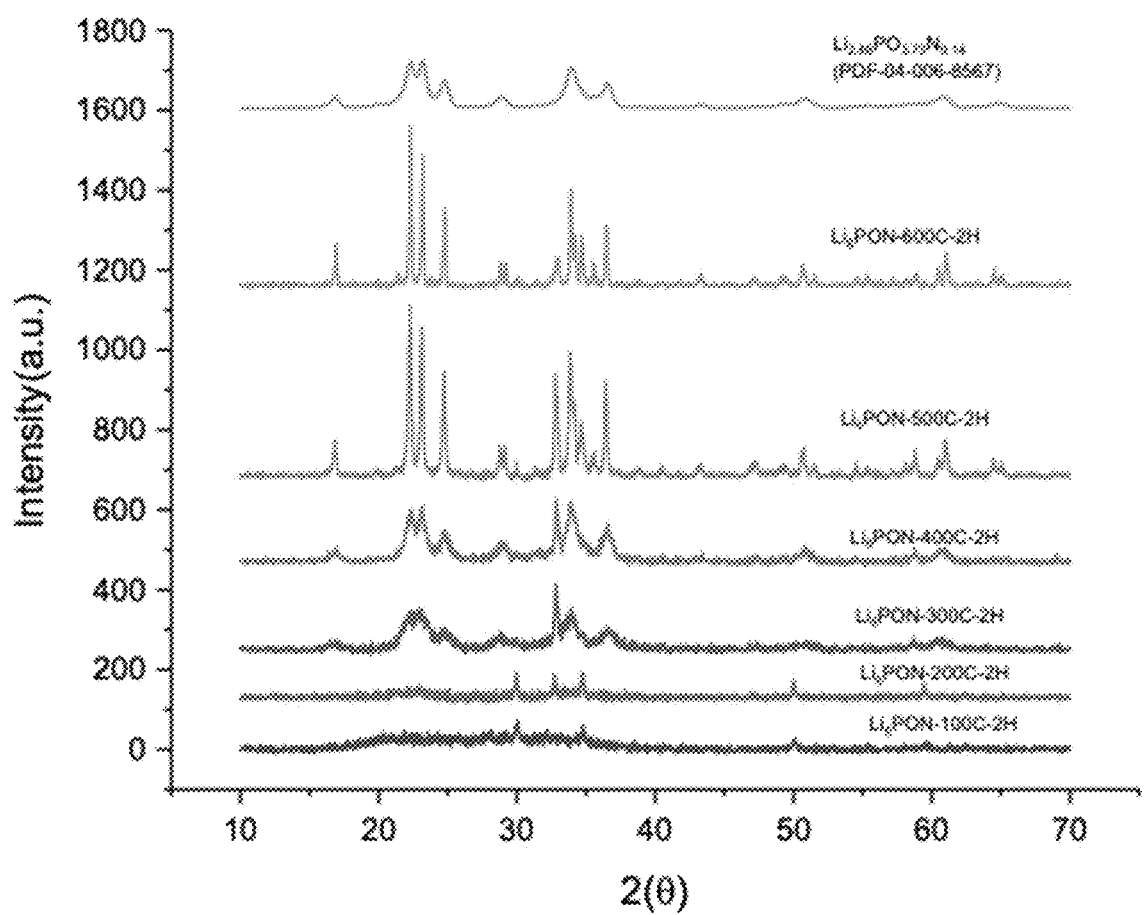
FIG. 62 shows XRD plots $Li_xPON$ pellets heated to 100-600° C./2 h/$N_2$.

FIG. 62 shows XRD patterns of $Li_xPON$ pellets heated to 100-600° C./2 h/$N_2$. The XRDs of $Li_xPON$ pellets heated to 100° C. show a small peak near 35° 2θ, but mostly dominated by a broad peak corresponding to poorly crystallized material indicating amorphous nature of the pellet. Three peaks at 30°, 33°, and 35° 2θ can be indexed to partially crystalline $Li_{2.88}PN_{0.14}O_{3.73}$ when the pellet is heated to 200° to 400° C. These peaks start to shift to 35° and 37° 2θ and doublet peaks near 23° 2θ appear on heating to 500° and 600° C. corresponding to $Li_{2.88}PN_{0.14}O_{3.73}$.

Figure 63:
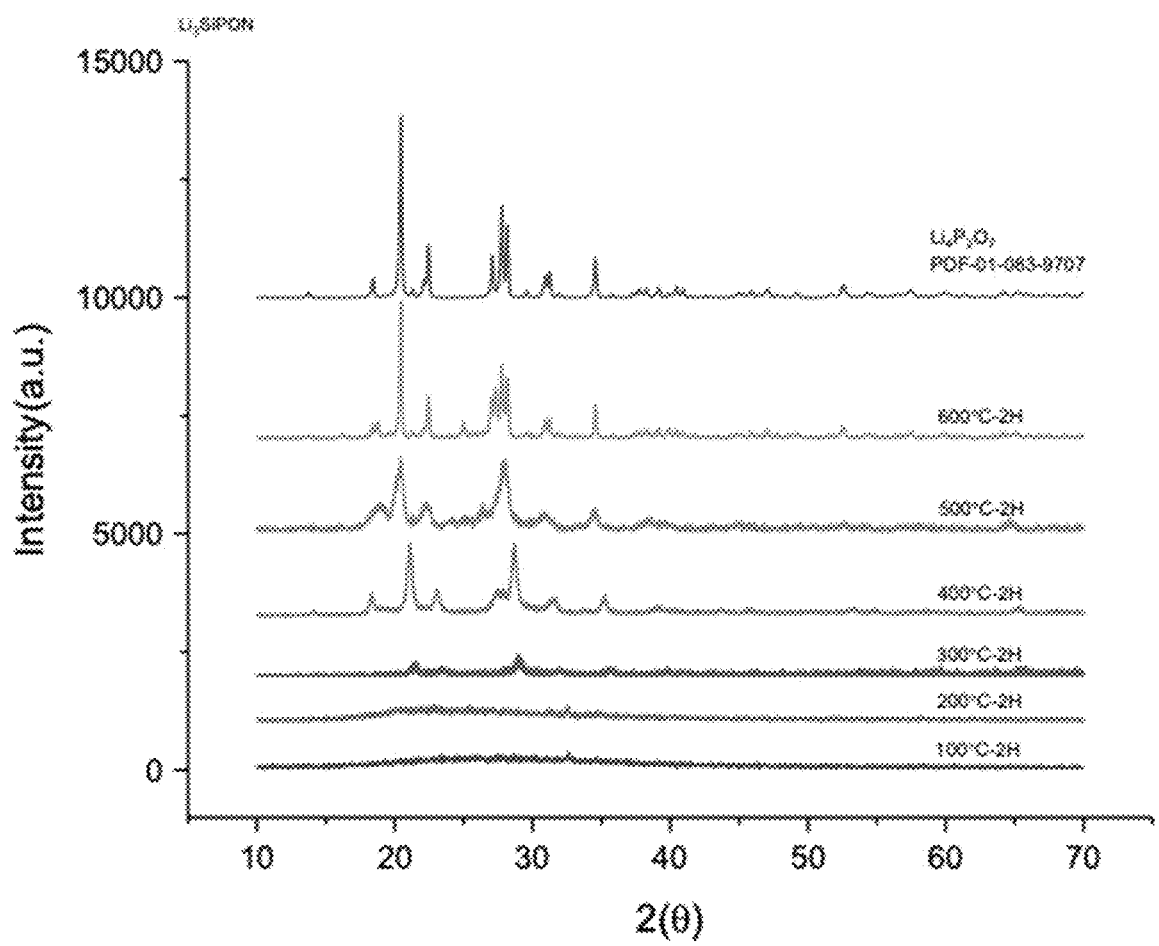
FIG. 63 shows XRD plots $Li_xSiPON$ pellet heated to 100-600° C./2 h/$N_2$.

FIG. 63 shows XRD patterns of $Li_xSiPON$ pellets heated to 100-600° C./2 h/$N_2$. The XRD of $Li_xSiPON$ pellets heated to 100-300° C. is mostly dominated by a broad peak corresponding to poorly crystalized compound indicating amorphous nature of the pellet. Two main peaks at 22° and 29° 2θ can be indexed to partially crystalline $Li_4P_2O_7$ when heated to 400° C. and 500° C. The XRD of $Li_xSiPON$ pellet heated 600° C. show sharp peaks that match the $Li_4P_2O_7$ phase.

Example 14

XPS Studies of $Li_3PON$ and $Li_6SiPON$.

Previous XRD studies at 100° C. show mainly amorphous phase, hence the technique cannot detect the targeted elements and does not allow quantification of elemental composition nor the possibility to deduce elemental ratios. Hence XPS studies on the polymer precursors are performed.

Figure 64:
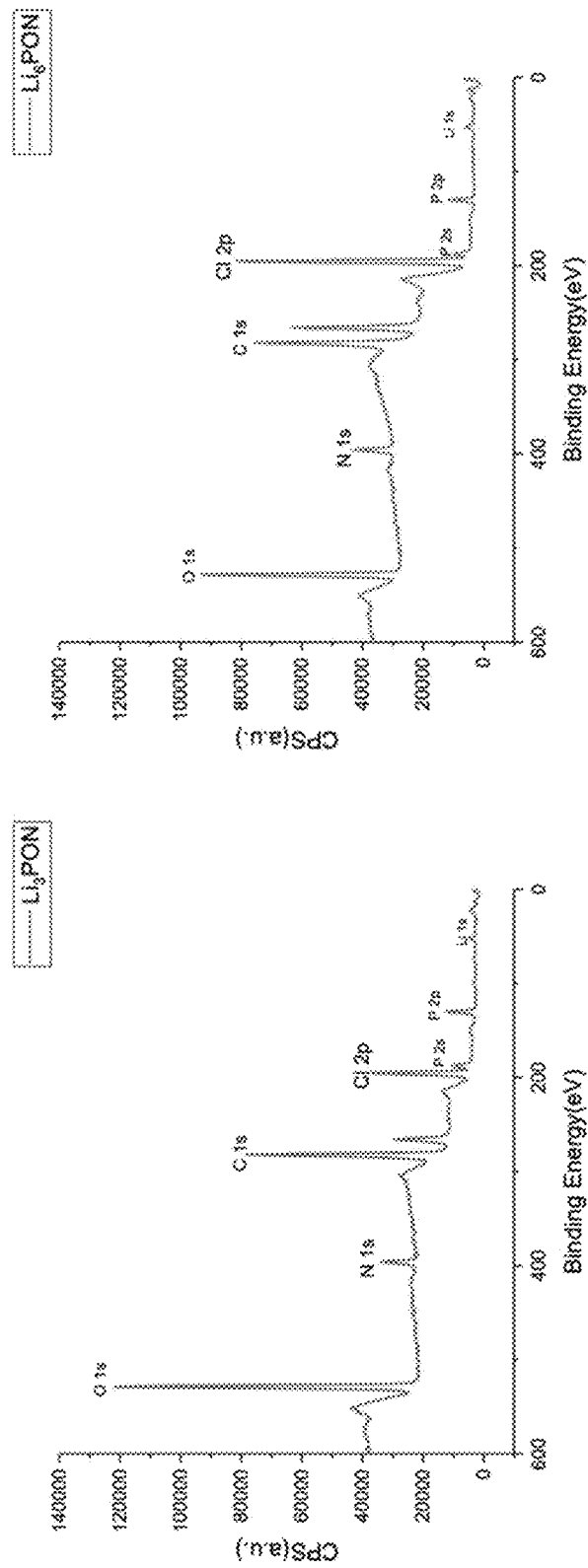
FIG. 64 shows XPS spectra (600 to 0 eV) of $Li_3PON$ and $Li_6PON$ pellets.

FIG. 64 shows XPS spectra of $Li_3PON$ and $Li_6PON$ pellets. XPS is used to determine the elemental composition of $Li_3PON$ and $Li_6PON$ pellets. XPS analysis records peaks representative of the LiPON signature (Li, P, O, N) and minor peaks for C and Cl. The presence of chlorine likely comes from residual NaCl. The presence of carbon might be from brief air exposure in mounting the samples as some $Li_2CO_3$ likely forms. XPS results are summarized in Table 14. They indicate that the precursor approach leads to materials similar to those found in previous studies of similar materials produced by gas phase methods.

TABLE 14

Atomic ratios based on XPS analyses for $Li_3PON$ and $Li_6PON$ pellets.

| Ratio | $Li_3PON$ | $Li_6PON$ |
|---|---|---|
| O/P | 6 | 4.5 |
| N/P | 1.25 | 1.66 |
| Li/N | 2.68 | 3.5 |

XPS analysis also provides information about bonding environments. The O is peak is assigned to oxygen in Li—O—Li, P—O—P, and P=O bonds. XPS analysis indicates that the Li/N ratio increases from about 2.7 to about 3.5 when more $LiNH_2$ is introduced to form $Li_6PON$. The experimental N/P ratio is calculated to be 3, the found ratio from XPS analysis suggests nitrogen is lost during polymerization as suggested by the above condensation reactions. However, the N/P ratio (1.25-1.66) is much higher than reported for gas phase deposition techniques (0.92). XPS measurements further confirm that the $Li_3PON$ and $Li_6PON$ pellets contain 4.7 and 5.35 at. % of N.

Figure 65:
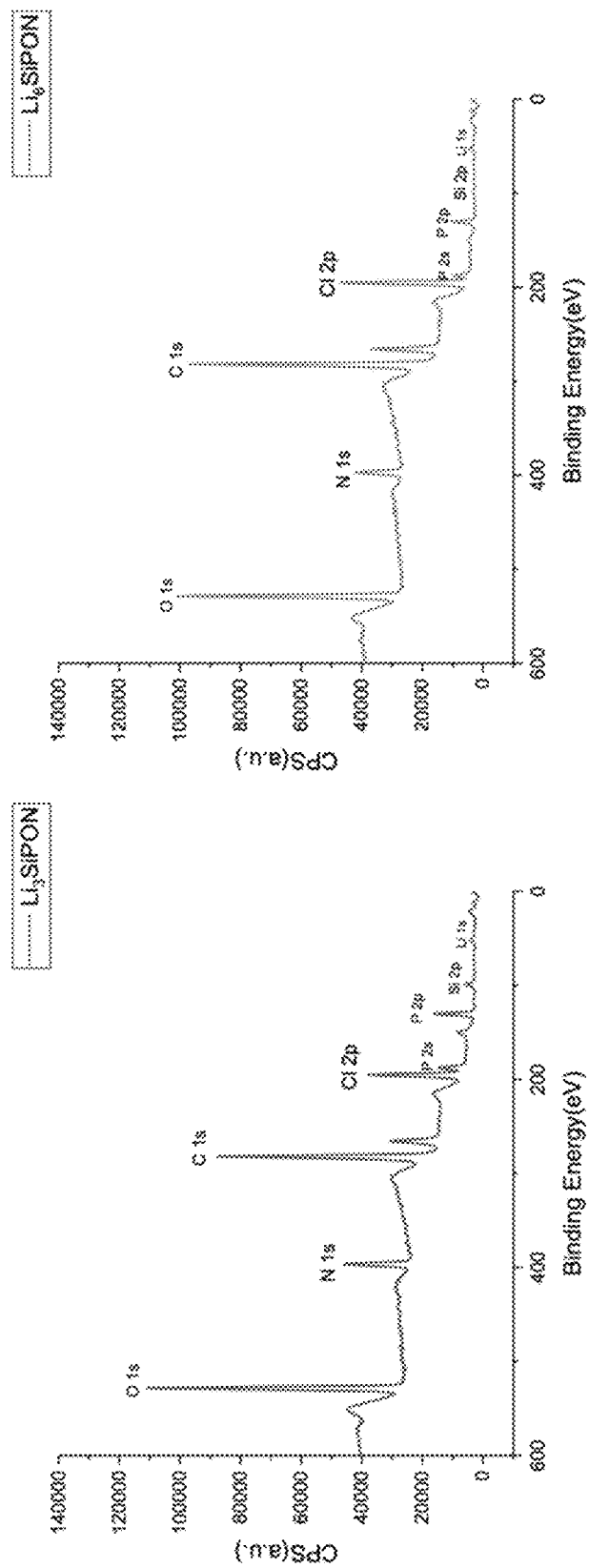
FIG. 65 shows XPS spectra (600 to 0 eV) of $Li_3SiPON$ and $Li_6SiPON$ pellets.

FIG. 65 shows XPS spectra for $Li_3SiPON$ and $Li_6SiPON$ pellets. XPS analysis shows LiSiPON signature (Li, P, O, N, Si) peaks again with minor peaks for C and Cl. The chlorine likely comes from residual NaCl. Table 15 summarizes the XPS results.

TABLE 15

Atomic ratios based on XPS analyses for $Li_3SiPON$ and $Li_6SiPON$ pellets.

| Ratio | $Li_3SiPON$ | $Li_6SiPON$ |
|---|---|---|
| O/P | 3.56 | 5.54 |
| N/P | 1.85 | 2.4 |
| Li/N | 1.43 | 1.68 |

The measured atomic composition shows that the Li/N ratio increases from about 1.43 to about 1.68 when more $LiNH_2$ is introduced for $Li_6SiPON$. However, the ratio is smaller than calculated for $Li_3PON$ (2.86) and $Li_6PON$ (3.5) pellets. It is likely that the introduction of silicon leads to loss of $(Me_3Si)_2N$ during condensation polymerization. The experimental ratio of N/P is calculated to be 3, the decrease in the ratio from XPS analysis suggests polymerization by the loss of nitrogen. However, the atomic percent of N is 8.5 and 6.7% for $Li_3SiPON$ and $Li_6SiPON$, respectively. The N/P ratio (1.85-2.4) is still higher than what is reported for $Li_3PON$ and $Li_6PON$ in Table 15.

Example 15

PEO-Based Polymer Electrolytes.

The PEO polymer with molecular weights of 900 k are dissolved in acetonitrile (18 mL) and stirred magnetically under $N_2$ until fully dissolved. Polymer precursors with weight ratios of 40 were mixed with the PEO/ACN solution and magnetically stirred for 24 hr. The PEO/precursor mixture is then cast on a Teflon plate. Solvent is allowed to evaporate at ambient for 24 h. The film is then dried under a vacuum of $3 \times 10^{-3}$ Torr for 24 h at 65° C. Table 16 lists the amount of 60 wt. % PEO/precursor dissolved in 18 ml CAN.

TABLE 16

List of PEO and polymer electrolytes dissolved in 18 mL ACN.

| Polymer Electrolyte | Mass of PEO (g) | Mass of polymer electrolyte(g) |
|---|---|---|
| $Li_3PON$ | 0.6 | 0.21 |
| $Li_6PON$ | 0.6 | 0.14 |
| $Li_2SiPHN$ | 0.9 | 0.6 |
| $Li_3SiPON$ | 0.9 | 0.6 |
| $Li_6SiPON$ | 0.9 | 0.6 |

The PEO/polymer precursor ratio is chosen as 60:40 because this composition results in dense films easy to handle and process with optimal conductivity. Higher PEO concentrations result in poorer ionic conductivity while lower PEO concentrations result in poorer mechanical properties.

Figure 66:
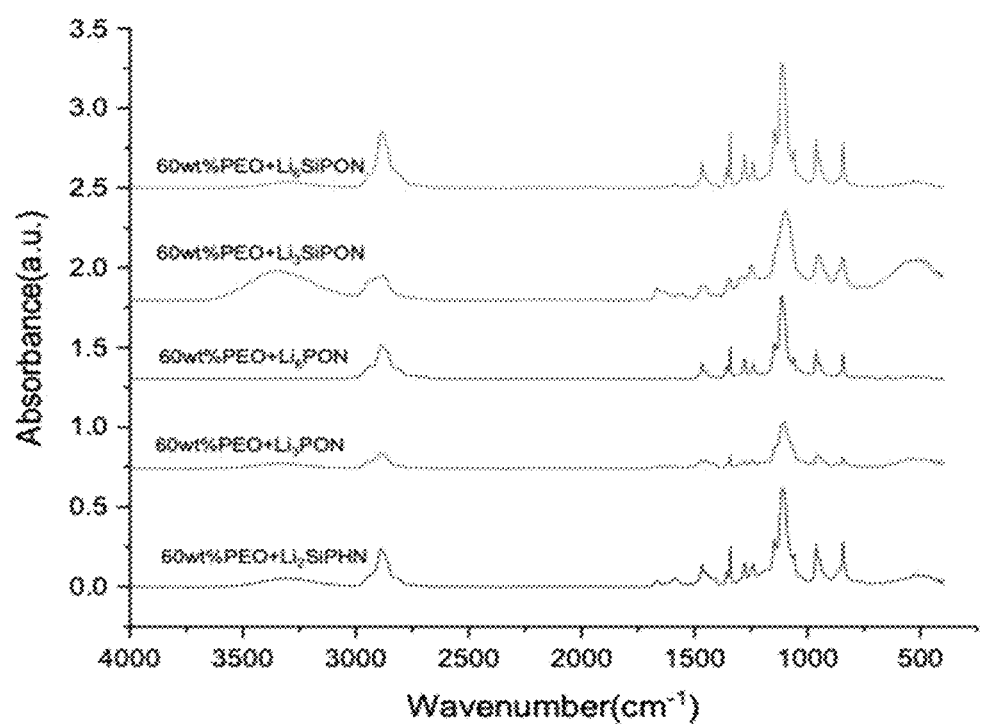
FIG. 66 shows FTIRs of 60 wt. % PEO/polymer precursor heated to 65° C./24 h/Vac.

FIG. 66 shows FTIRs of PEO/$Li_3PON$, $Li_6PON$, $Li_2SiPHN$, $Li_3SiPON$, and $Li_6SiPON$ composite films heated to 65° C./24 h/Vac. All spectra show a small vC—H peak at about 2900 $cm^{-1}$. A small peak at about 1400 $cm^{-1}$ is typical for N—H. In addition, peaks at 1090, 1142, and 839 $cm^{-1}$ correspond to PEO.

XPS experiments are carried out on the polymer electrolytes on a Kratos Axis Ultra XPS system at room temperature under $3.1 \times 10^{-8}$ Pa using a monochromatic Al source (14 kV and 8 mA). Binding energies of all the elements are calibrated relative to the gold Au $4f_{7/2}$ at 84 eV. All the data are analyzed by CASAXPS software using linear type background.

Figure 67:
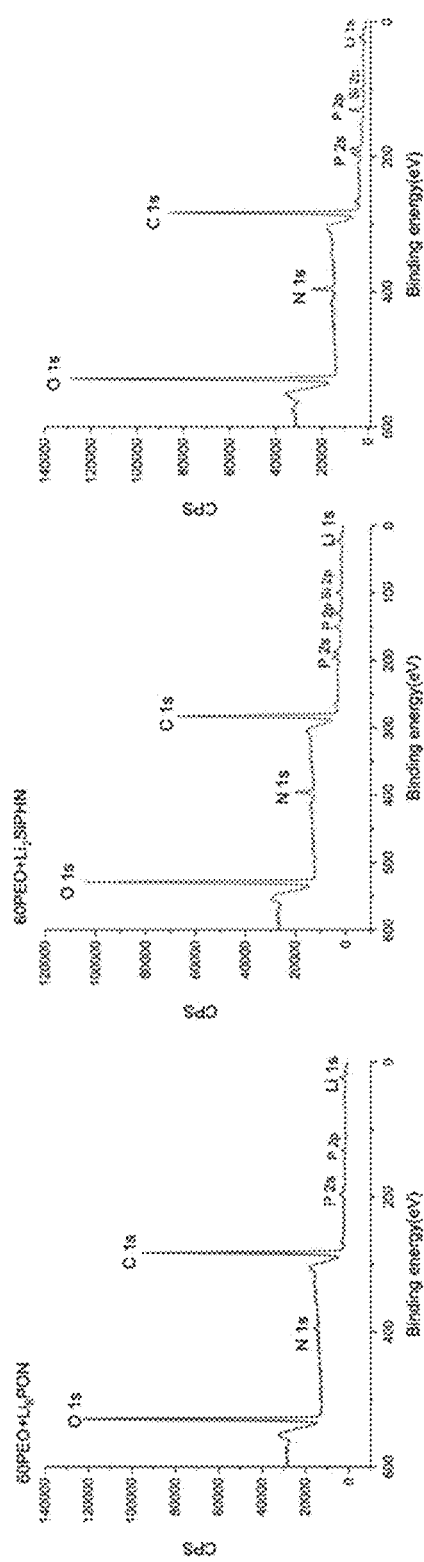
FIG. 67 shows wide-scan survey XPS spectra (600 to 0 eV) of 60 PEO/$Li_6PON$, $Li_2SiPHN$, and $Li_6SiPON$ composite films.

FIG. 67 shows a wide-scan survey XPS spectrum of 60 PEO/Li$_6$PON, Li$_2$SiPHN, and Li$_6$SiPON composite films. XPS is used to determine the elemental composition of the polymer electrolytes. XPS analysis demonstrates the appearance of the main peaks representative of the LiPON and LiSiPON signatures (Li, P, O, N, and Si peaks) and an additional peak of C from PEO. Results obtained from XPS are summarized in Tables 17 and 18.

TABLE 17

XPS analysis 60 PEO/Li$_6$PON, Li$_2$SiPHN, and Li$_6$SiPON composite films.

| | Position(eV) | | | At. % | | |
|---|---|---|---|---|---|---|
| Name | Li$_6$PON | Li$_2$SiPHN | Li$_6$SiPON | Li$_6$PON | Li$_2$SiPHN | Li$_6$SiPON |
| Li 1s | 52 | 52 | 53 | 7.88 | 4.44 | 5.2 |
| P 2p | 130 | 130 | 130 | 2.91 | 2.71 | 4.04 |
| O 1s | 529 | 529 | 529 | 22.58 | 23.68 | 25.37 |
| N 1s | 396 | 396 | 396 | 3.13 | 4.05 | 4.1 |
| C 1s | 280 | 285 | 283 | 63.5 | 62.44 | 60.26 |
| Si 2p | N/A | 99 | 98 | N/A | 2.7 | 1.04 |

TABLE 18

Atomic ratios based on XPS analyses for 60 PEO/Li$_6$PON, Li$_2$SiPHN, and Li$_6$SiPON composite films.

| Ratio | Li$_6$PON | Li$_2$SiPHN | Li$_6$SiPON |
|---|---|---|---|
| N/P | 1.07 | 1.49 | 1.01 |
| Li/N | 2.51 | 1.1 | 1.26 |

XPS analysis also provides information about elemental bonding environments. The N/P ratio (1.07-1.469) is still higher than what is reported by gas phase deposition techniques (0.92). The C is spectra could be deconvoluted into three Gaussian-Lorentzian mixed components. The binding energy of the carbon in all the polymer composite films coincides with the most intense carbon peak of PEO' attributed to the carbon on the —CH$_2$—CH$_2$—O-repeat unit. The binding energy of C is is in the order of Li$_2$SiPHN>Li$_6$SiPON>Li$_6$PON.

Figure 68:
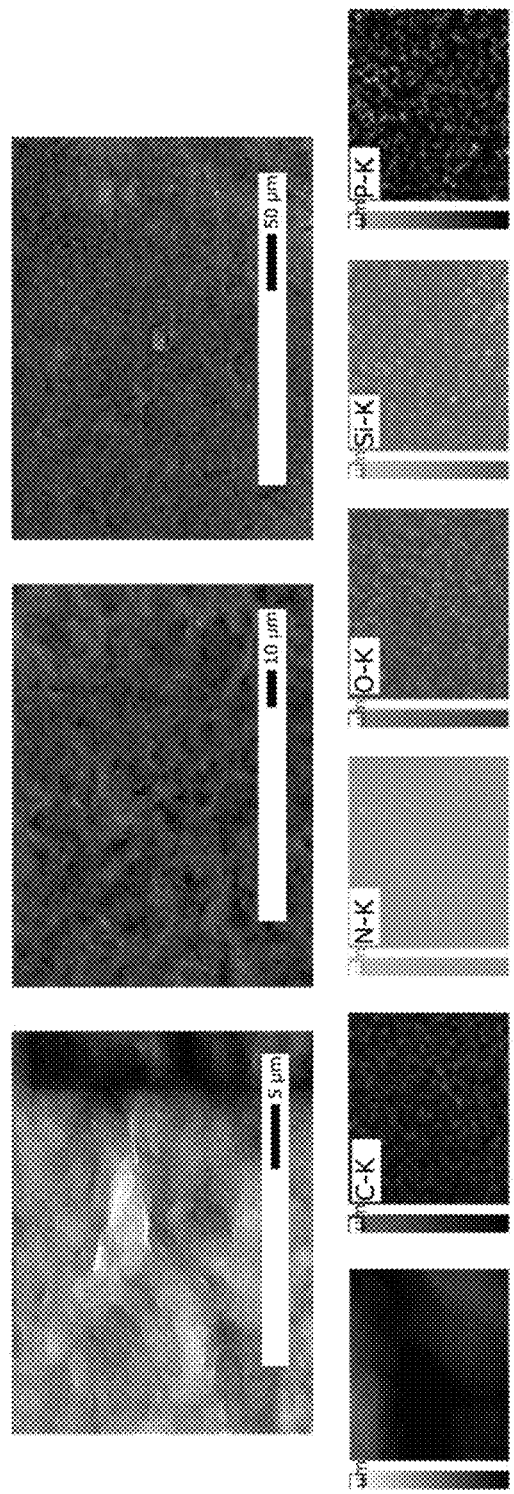
FIG. 68 shows SEM and EDX images of a 60PEO/$Li_2SiPHN$ composite film pressed at 5 k psi.
Figure 69:
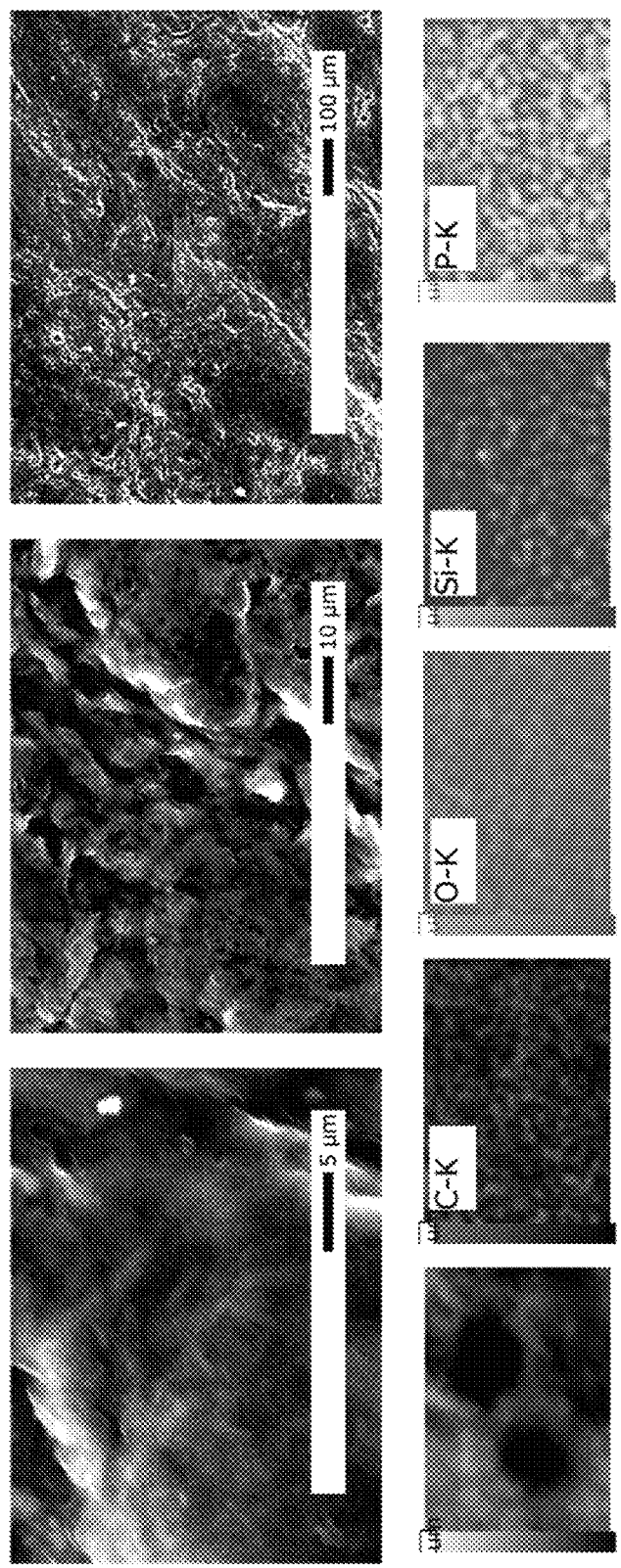
FIG. 69 shows SEM and EDX images of a 60PEO/$Li_6SiPON$ composite film pressed at 5 k psi.
Figure 70:
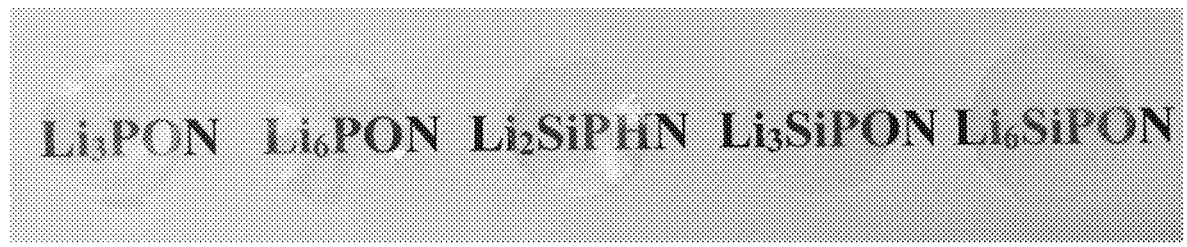
FIG. 70 shows photographs of various films.

FIGS. 68 and 69 show SEM images of PEO/polymer precursor composite films pressed at 5 kpsi. The microstructure of the films looks very dense. The microstructure depends on the preparation procedure. EDX mapping of the polymer electrolytes shows well distributed signature elements (Si, P, and N) of the polymer precursors supporting the XPS studies shown in FIG. 67. Based on the SEM images, the polymer precursor seems to be uniformly dispersed as shown in FIG. 70.

XRD Studies of 60 PEO/Polymer Precurosr

The polymer composite electrolyte films, as well as pure PEO, are analyzed using a Rigaku rotating anode goniometer (Rigaku Denki., Ltd., Tokyo, Japan). XRD scans a made using the Cu Kα radiation (1.541 Å) operating at 40 kV and 100 mA in the 2θ range of 10° to 40° and using a step width of 0.02°. The slower scan rate is used to minimize the signal-noise ratio.

Figure 71:
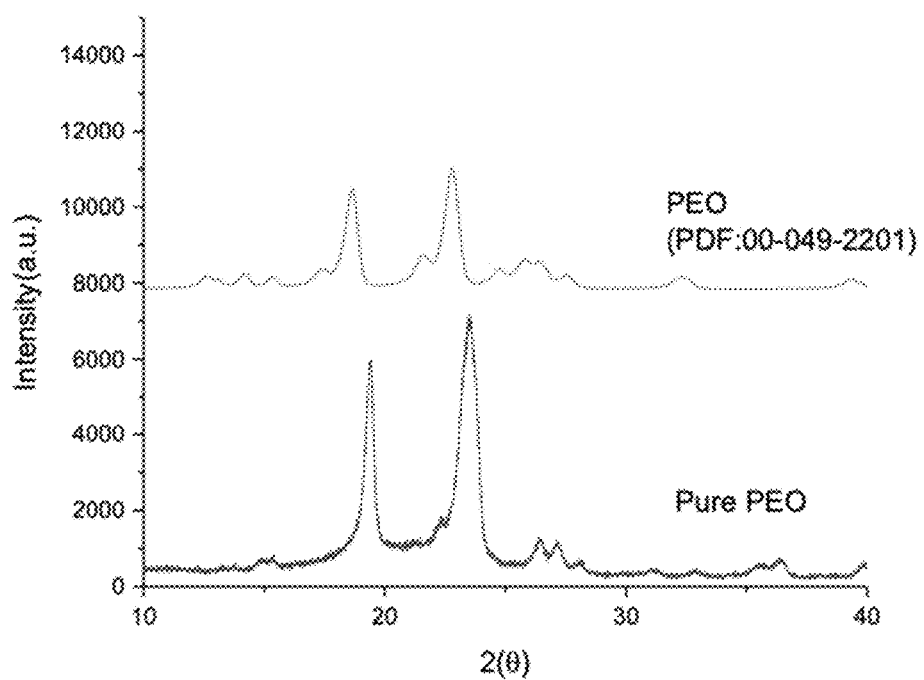
FIG. 71 shows XRD patterns of pure PEO.
Figure 72:
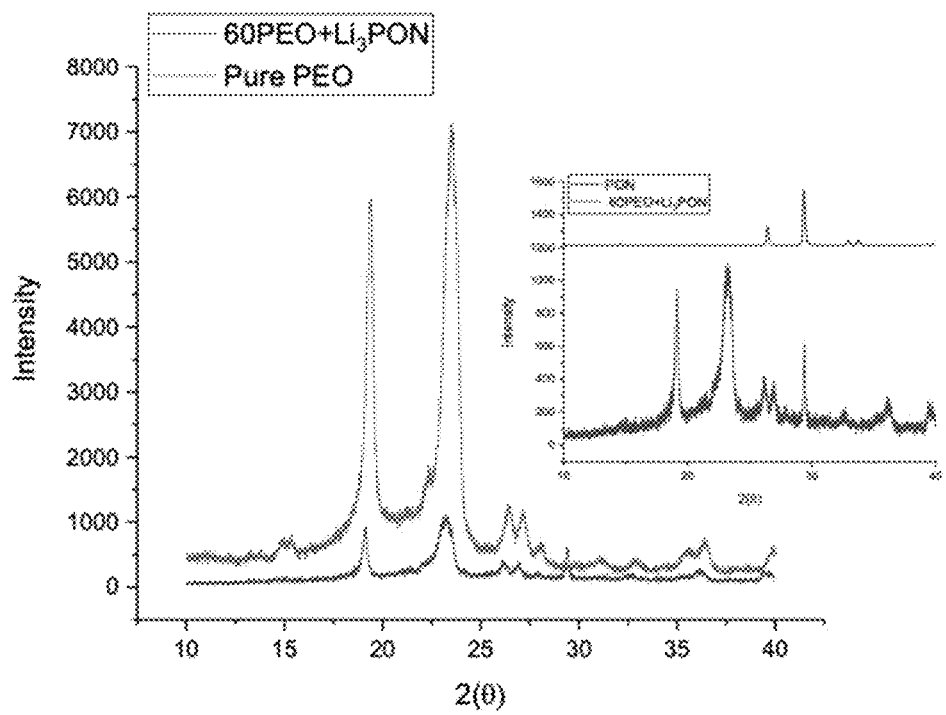
FIG. 72 shows XRD patterns of a 60 wt. % PEO/$Li_3PON$ composite film.
Figure 73:
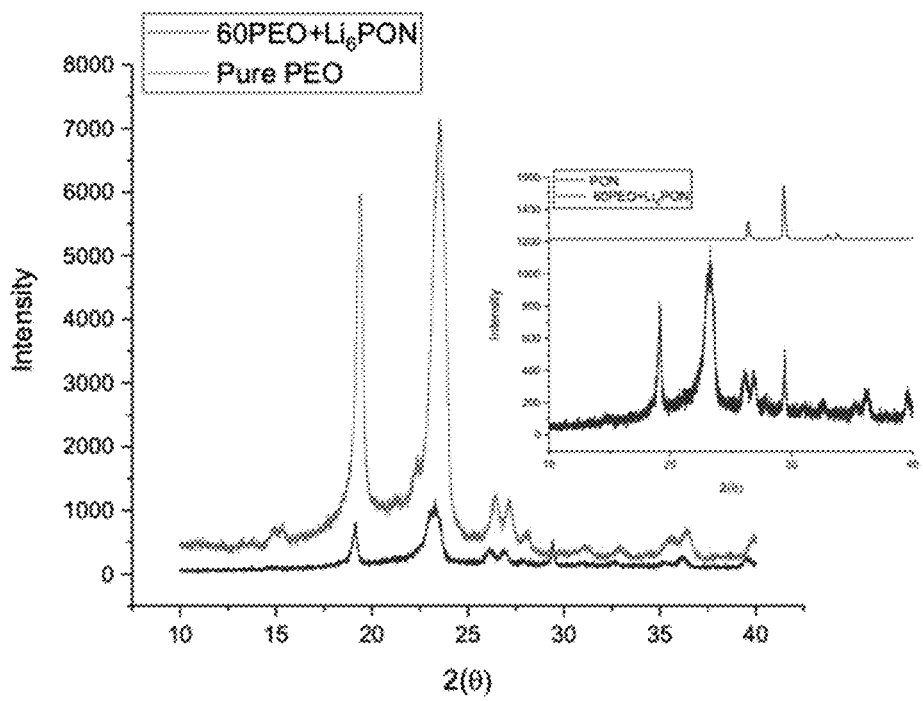
FIG. 73 shows XRD patterns of a 60 wt. % PEO/$Li_6PON$ composite film.
Figure 74:
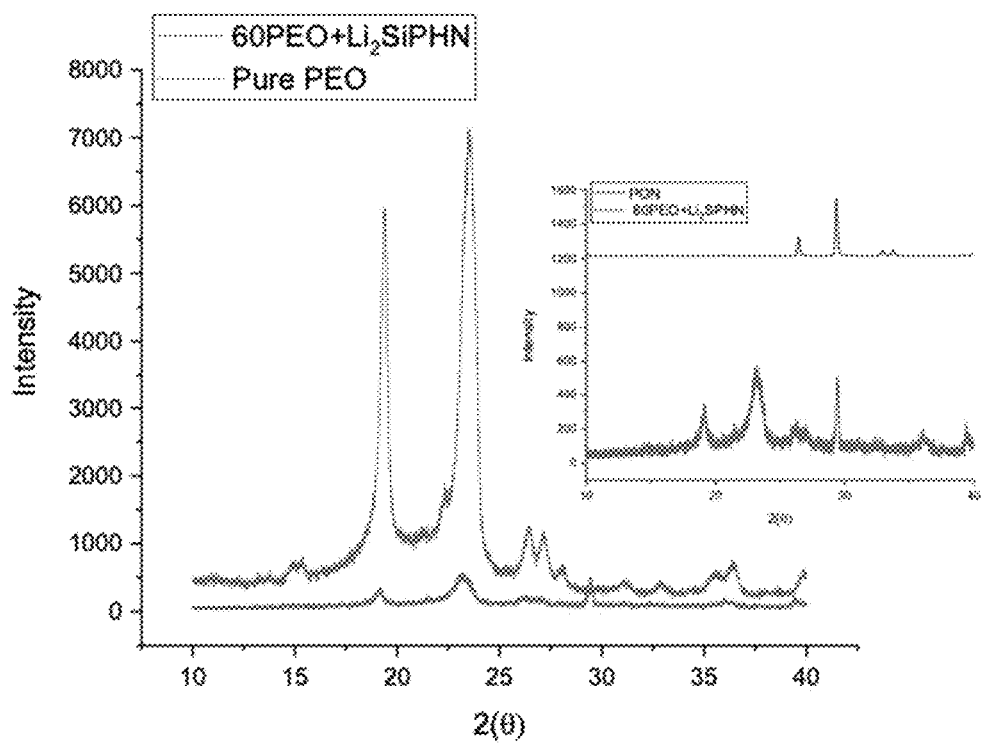
FIG. 74 shows XRD patterns of a 60 wt. % PEO/$Li_2SiPHN$ composite film.
Figure 75:
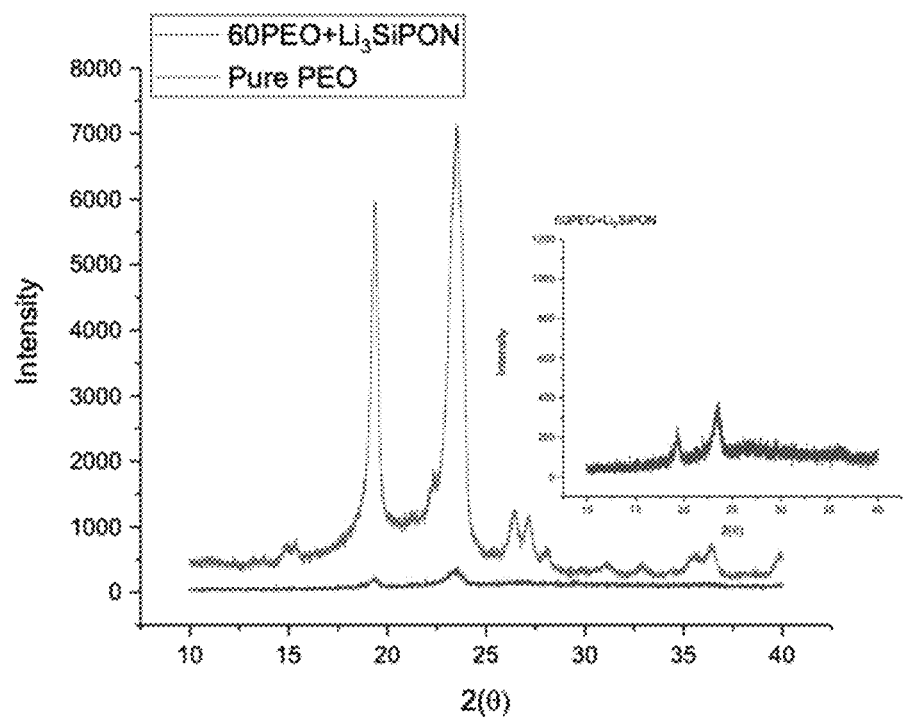
FIG. 75 shows XRD patterns of a 60 wt. % PEO/$Li_3SiPON$ composite film
Figure 76:
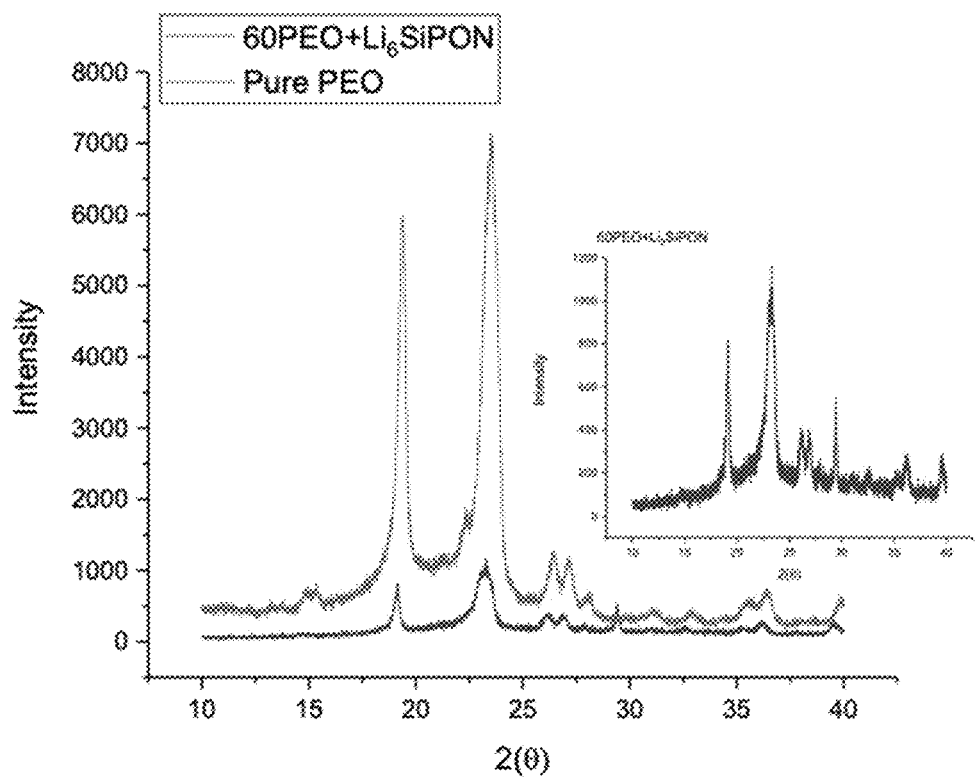
FIG. 76 shows XRD patterns of a 60 wt. % PEO/$Li_6SiPON$ composite film.

FIG. 71 shows XRDs of pure PEO. PEO shows a maximum intensity peak at 23.5°, following a maximum peak at 19.4° and more less intense doublet peak at 26.45°, which are assigned to (112), (120), and (222) planes (PDF: 00-049-2201), respectively. Table 19 lists the d-spacing, peak list, full width at half maximum (FWHM), height, and intensity of pure PEO.

TABLE 19

Peak list, d-spacing, and intensity of pure PEO.

| No. | 2-θ (deg) | D (ang.) | Height (cps) | FWHM (deg) | Int. I (cps deg) | Int. W (deg) | Asym. factor |
|---|---|---|---|---|---|---|---|
| 1 | 19.376(4) | 4.5773(10) | 3447(107) | 0.379(5) | 1972(11) | 0.57(2) | 1.55(9) |
| 2 | 23.522(5) | 3.7792(9) | 4197(118) | 0.761(5) | 4012(20) | 0.96(3) | 1.35(4) |
| 3 | 26.452(15) | 3.3668(19) | 490(40) | 0.54(2) | 334(18) | 0.68(9) | 1.7(3) |

FIGS. 72, 73, 74, 75, and 76 show XRD patterns of 60 wt. % PEO/Li$_3$PON, Li$_6$PON, Li$_2$SiPHN, Li$_3$SiPON, and Li$_6$SiPON composite films. The composite films show a maximum intensity peak at 23.3°, following maximum peak at 19.1° and less intense doublet peak at 26.2°, which are assigned to (112), (120), and (222) planes (PDF: 00-049-2201) respectively. An additional peak at 29.4° indexed to PON (PDF:04-002-0336) is also present for the polymer precursor derived electrolytes except for Li$_3$SiPON.

The X-ray spectrum of composite films exhibits peak shifts toward lower diffraction angle compared to pure PEO listed in Table 20. For example, the (112) peak shifts from 19.37° to 19.13° when Li$_3$PON precursor was used. The d-spacing changes from 4.57 to 4.63 Å and this indicated that the distance between two planes (112) was enlarged when the polymer precursor is introduced. The shifting of X-ray peak can be caused by strain or stress. The possible reason for the peak shifting is the presence of the polymer precursor induces stresses that changed d-spacing of PEO crystals. The change could be an indicator of the stress transfer between the polymer precursor and the polymer chains. X-ray spectra data for PEO/LI$_6$PON, PEO/Li$_2$SiPHN, PEO/Li$_3$SiPON, and PEO/Li$_6$SiPON composites compared to pure PEO are listed in Tables 21-24, respectively.

TABLE 20

Peak list, d-spacing, and intensity of a 60 wt. % PEO/Li$_3$PON composite film.

| No. | °2θ | D (ang.) | Height (cps) | FWHM (deg) | Int. I (cps deg) | Int. W (deg) | Asym. factor |
|---|---|---|---|---|---|---|---|
| 1 | 19.134(12) | 4.635(3) | 480(40) | 0.284(16) | 229(4) | 0.48(5) | 2.3(6) |
| 2 | 23.278(14) | 3.818(2) | 594(44) | 0.87(2) | 804(7) | 1.35(11) | 1.85(15) |
| 3 | 26.20(2) | 3.398(3) | 95(18) | 1.25(5) | 140(7) | 1.5(3) | 0.51(13) |
| 4 | 29.387(12) | 3.0368(12) | 362(35) | 0.139(9) | 58(2) | 0.16(2) | 1.1(4) |

TABLE 21

Peak list, d-spacing, and intensity of a 60 wt. % PEO/Li$_6$PON composite film.

| No. | °2θ | D (ang.) | Height (cps) | FWHM (deg) | Int. I (cps deg) | Int. W (deg) | Asym. factor |
|---|---|---|---|---|---|---|---|
| 1 | 19.128(13) | 4.636(3) | 382(36) | 0.314(15) | 192(3) | 0.50(6) | 1.7(4) |
| 2 | 23.310(15) | 3.813(2) | 604(45) | 0.859(19) | 801(7) | 1.33(11) | 2.01(18) |
| 3 | 26.364(19) | 3.378(2) | 112(19) | 1.35(5) | 187(7) | 1.7(4) | 0.79(15) |
| 4 | 29.404(18) | 3.0351(18) | 225(27) | 0.158(18) | 47(2) | 0.21(4) | 1.0(5) |

TABLE 22

Peak list, d-spacing, and intensity of a 60 wt. % PEO/Li$_2$SiPHN composite film.

| No. | °2θ | D (ang.) | Height (cps) | FWHM (deg) | Int. I (cps deg) | Int. W (deg) | Asym. factor |
|---|---|---|---|---|---|---|---|
| 1 | 19.15(2) | 4.630(6) | 135(21) | 0.41(3) | 84(3) | 0.62(12) | 1.6(4) |
| 2 | 23.17(2) | 3.836(4) | 252(29) | 0.94(2) | 312(5) | 1.24(16) | 0.94(10) |
| 3 | 26.25(2) | 3.392(3) | 47(12) | 1.19(6) | 59(3) | 1.3(4) | 0.53(7) |
| 4 | 29.432(14) | 3.0323(14) | 278(30) | 0.195(10) | 60(3) | 0.22(3) | 1.8(5) |

TABLE 23

Peak list, d-spacing, and intensity of a 60 wt. % PEO/Li$_3$SiPON composite film.

| No. | °2θ | D (ang.) | Height (cps) | FWHM (deg) | Int. I (cps deg) | Int. W (deg) | Asym. factor |
|---|---|---|---|---|---|---|---|
| 1 | 19.286(13) | 4.599(3) | 68(15) | 0.55(4) | 47(3) | 0.7(2) | 0.9(3) |
| 2 | 23.45(4) | 3.790(6) | 143(22) | 0.89(4) | 189(4) | 1.3(2) | 1.4(3) |

TABLE 24

Peak list, d-spacing, and intensity of a 60 wt. % PEO/Li$_6$SiPON composite film.

| No. | °2θ | D (ang.) | Height (cps) | FWHM (deg) | Int. I (cps deg) | Int. W (deg) | Asym. factor |
|---|---|---|---|---|---|---|---|
| 1 | 19.103(7) | 4.6421(16) | 448(39) | 0.246(10) | 175(4) | 0.39(4) | 1.02(12) |
| 2 | 23.284(16) | 3.817(3) | 466(39) | 0.77(2) | 534(7) | 1.15(11) | 1.79(18) |
| 3 | 26.18(5) | 3.402(7) | 65(15) | 0.48(7) | 48(5) | 0.7(2) | 1.6(10) |
| 4 | 26.92(3) | 3.309(4) | 58(14) | 0.30(8) | 26(5) | 0.45(19) | 1.6(10) |

The d-spacing for plane (112) is in increasing order of $Li_6SiPON \gg Li_6PON \gg Li_3PON \gg Li_2SiPHN \gg Li_3SiPON \gg PEO$ The d-spacing for plane (120) is in increasing order of $Li_2SiPHN \gg Li_3PON \gg Li_6SiPON \gg Li_6PON \gg Li_3SiPON \gg PEO$ The d-spacing for plane (222) is in increasing order of $Li_6SiPON \gg Li_3PON \gg Li_2SiPHN \gg Li_6PON \gg PEO$.

The XRD pattern for 60 wt. % PEO/$Li_3SiPON$ does not show a peak for (222) plane, and it shows the lowest intensity compared to the other polymer precursor composite films. Hence, this composite polymer electrolyte showed the lowest crystallinity percentage.

Figure 77:
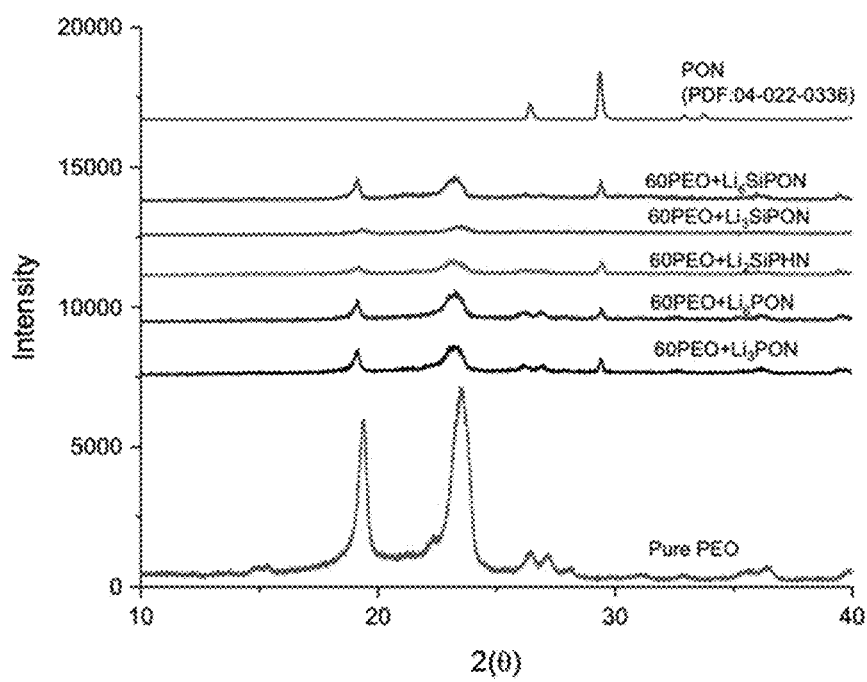
FIG. 77 shows XRD patterns of a 60 wt. % PEO/polymer precursor composite film.

Addition of the polymer precursors especially with $Me_3Si$ moieties decreases crystallinity of the polymer electrolyte considerably as demonstrated by broadening and reduction of PEO peak intensity as shown in FIG. 77.

Figure 78:
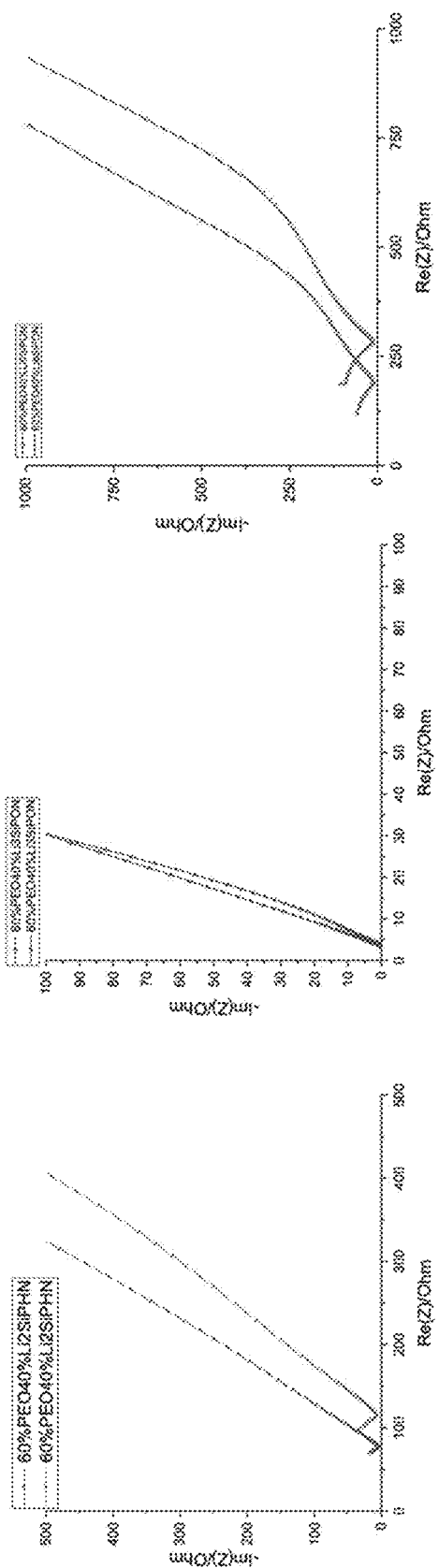
FIG. 78 shows Nyquist plots of 60 wt. % PEO/$Li_2SiPHN$, $Li_3SiPON$, $Li_6SiPON$ at ambient.
Figure 79:
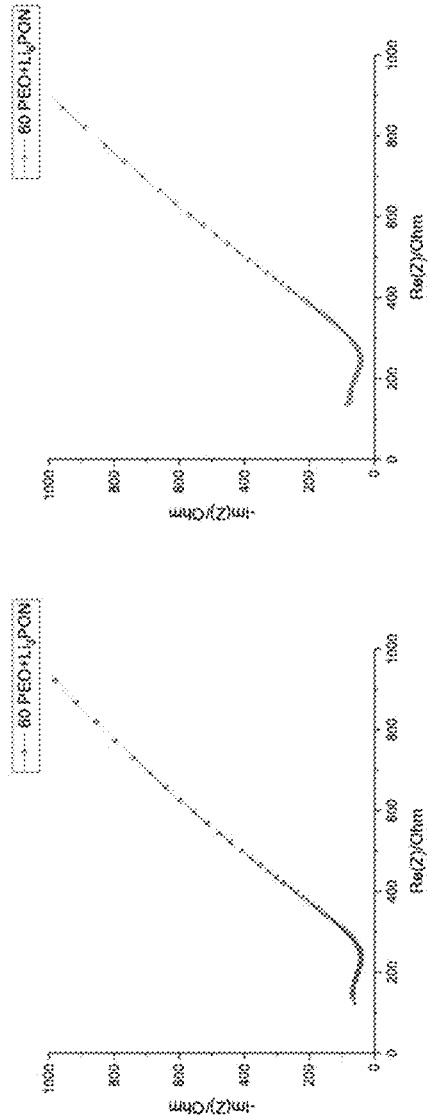
FIG. 79 shows Nyquist plots of 60 wt. % PEO/$Li_3PON$ and $Li_6PON$ at ambient.
Figure 80:
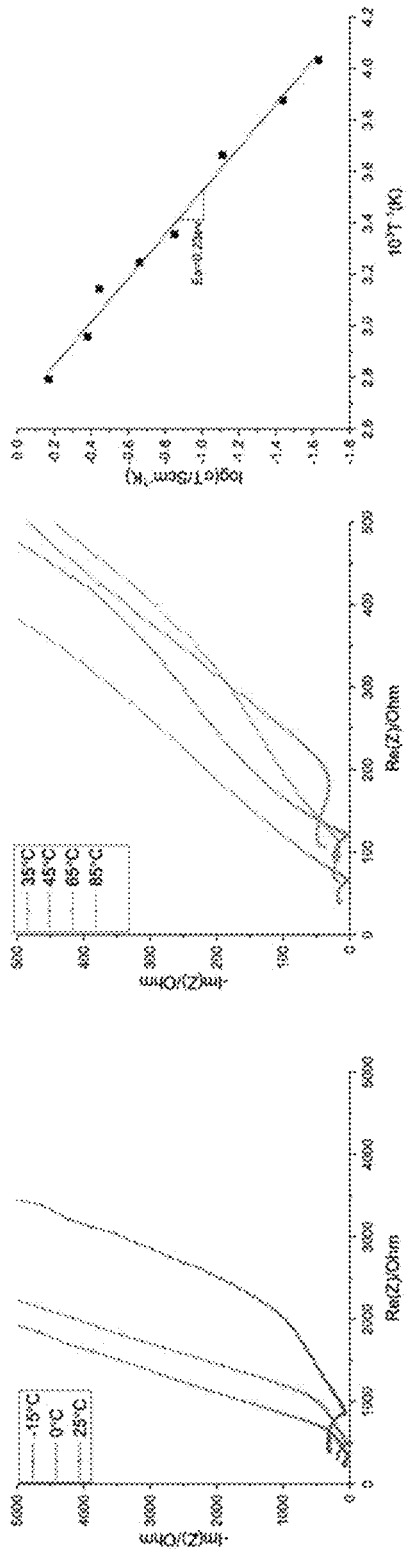
FIG. 80 shows Nyquist and Arrhenius plots of 60 wt. % PEO/$Li_3PON$ heated to selected temperatures.
Figure 81:
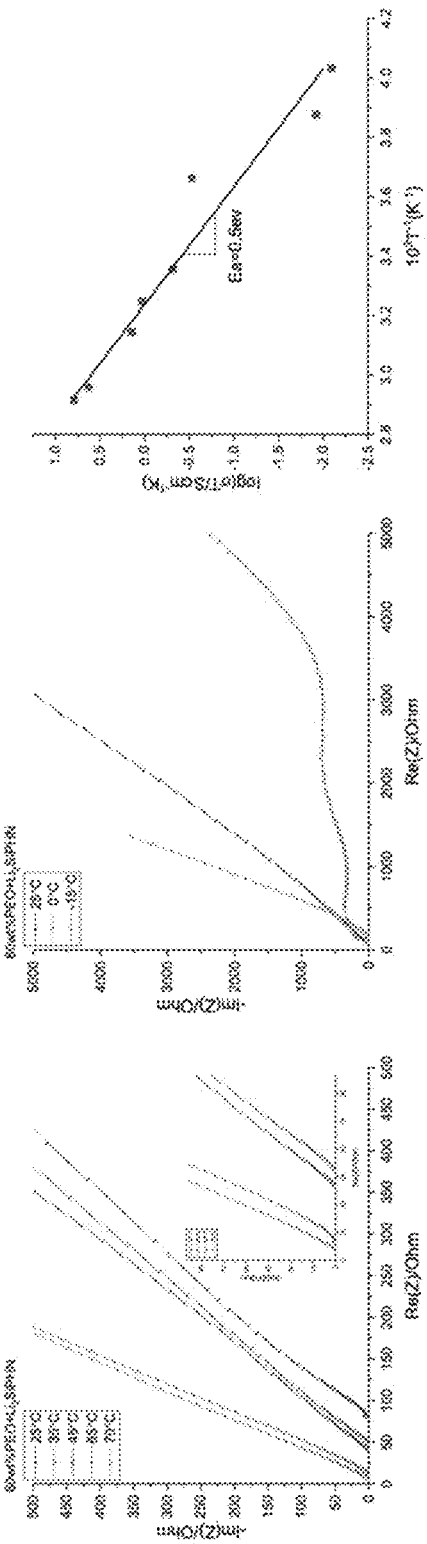
FIG. 81 shows Nyquist and Arrhenius plots of 60 wt. % PEO/$Li_2SiPHN$ heated to selected temperatures.
Figure 82:
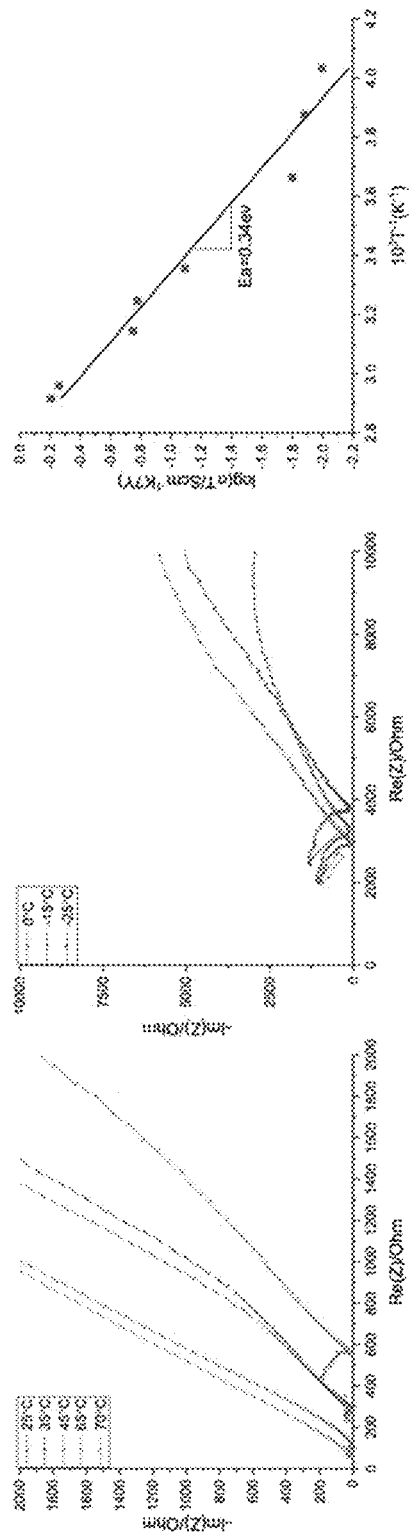
FIG. 82 shows Nyquist plots and Arrhenius plots of 60 wt. % PEO/$Li_6SiPON$ heated to selected temperatures.
Figure 83:
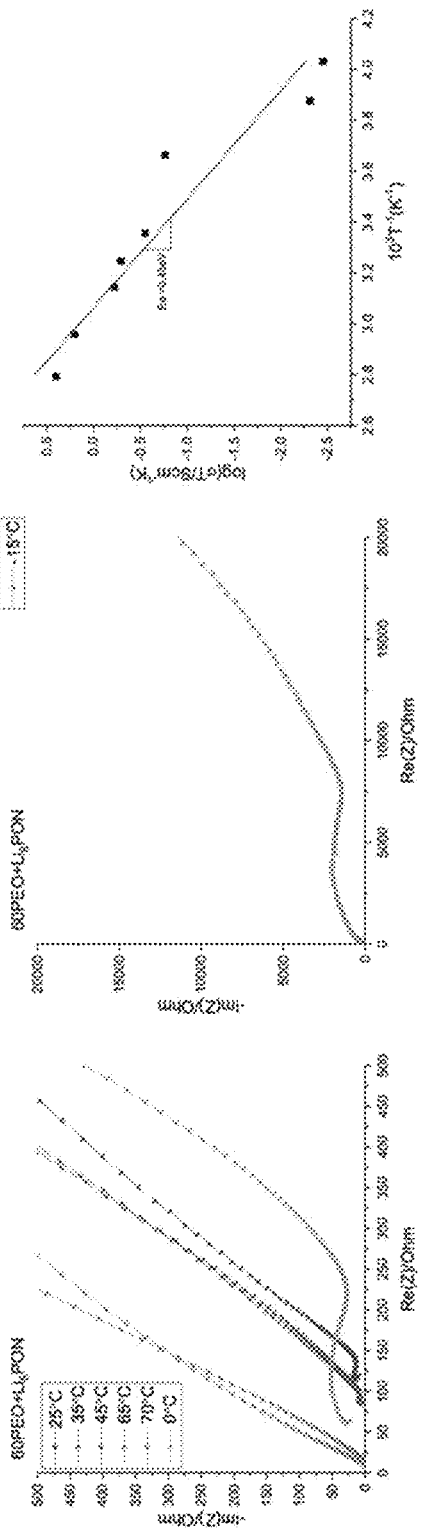
FIG. 83 shows Nyquist plots and Arrhenius plots of 60 wt. % PEO/$Li_6PON$ heated to selected temperatures.

FIGS. 78 and 79 show Nyquist plots of PEO/$Li_3PON$, $Li_6PON$, $Li_2SiPHN$, $Li_3SiPON$, and $Li_6SiPON$ composite films (100 μm) heated at ambient. The resulting room temperature impedance measurements are summarized in Table 25.

TABLE 25

Total room temperature conductivity of PEO/precursors.

| Precursor | Conductivity (S/cm) |
| --- | --- |
| $Li_3PON$ | $4.4 \pm 0.6 \times 10^{-4}$ |
| $Li_6PON$ | $3.7 \pm 0.4 \times 10^{-4}$ |
| $Li_2SiPHN$ | $1.1 \pm 0.3 \times 10^{-3}$ |
| $Li_3SiPON$ | $2.8 \pm 0.2 \times 10^{-3}$ |
| $Li_6SiPON$ | $2.7 \pm 0.1 \times 10^{-4}$ |

Table 25 summarizes the total room temperature resistivity of PEO/$Li_2SiPHN$, $Li_3SiPON$, and $Li_6SiPON$ composite films heated to 65° C./12 h/Vac. The PEO/$Li_3SiPON$ composite film shows the highest conductivity of 2.8 mS/cm when compared to the other polymer precursors. The PEO/precursor composite films 100 μm thick reveal decreases in PEO crystallinity as shown in the FIG. 77 XRD plots coincident with measured impedance values of 0.2-3 mS/cm at ambient; much higher than gas phase deposited LiPON typically $10^{-3}$ mS/cm and higher than simple PEO/$Li^+$ salt polymer systems.

FIGS. 80, 81, 82, and 83 show typical Nyquist and Arrhenius plots of 60 wt. % PEO/precursor composite films where electrochemical impedance is collected in a frequency range of 7 MHz to 1 Hz at −15° C. to 70° C. Room temperature conductivities of about 0.5, 1.6, and 0.27 mS $cm^{-1}$ and activation energies of 0.23, 0.45, 0.5, and 0.34 eV are obtained for $Li_3PON$, $Li_6PON$, $Li_2SiPHN$, and $Li_6SiPON$, respectively. The high ionic conductivity in the polymer electrolyte is attributed to the increase in ionic charged carrier concentration. Table 26 illustrates the total ionic conductivities of 60 wt. % PEO/precursor films heated to selected temperatures.

TABLE 26

Total conductivities ($\sigma_t$) of 60 wt. % PEO/polymer precursor heated to selected temperatures.

| T (° C.) | $\sigma(S\ cm^{-1})$ $Li_3PON$ | $\sigma(S\ cm^{-1})$ $Li_6PON$ | $\sigma(S\ cm^{-1})$ Li2SiPHN | $\sigma(S\ cm^{-1})$ $Li_6SiPON$ |
| --- | --- | --- | --- | --- |
| −15 | $1.42 \times 10^{-4}$ | $1.89 \times 10^{-5}$ | $4.65 \times 10^{-5}$ | $4.07 \times 10^{-5}$ |
| 0 | $2.83 \times 10^{-4}$ | $6.29 \times 10^{-4}$ | $1.09 \times 10^{-4}$ | $5.09 \times 10^{-5}$ |
| 25 | $4.72 \times 10^{-4}$ | $9.44 \times 10^{-4}$ | $1.63 \times 10^{-3}$ | $2.71 \times 10^{-4}$ |
| 35 | $7.08 \times 10^{-4}$ | $1.67 \times 10^{-3}$ | $3.46 \times 10^{-3}$ | $5.43 \times 10^{-4}$ |
| 45 | $1.13 \times 10^{-3}$ | $1.89 \times 10^{-3}$ | $4.4 \times 10^{-3}$ | $5.61 \times 10^{-4}$ |
| 65 | $1.23 \times 10^{-3}$ | $4.71 \times 10^{-3}$ | $1.25 \times 10^{-2}$ | $1.63 \times 10^{-3}$ |
| 70 | $1.89 \times 10^{-3}$ | $7.08 \times 10^{-3}$ | $1.81 \times 10^{-2}$ | $1.72 \times 10^{-3}$ |

The temperature dependent conductivity of the polymer electrolytes increases with increases in temperature for all PEO/precursor compositions. The activation energy for these composite electrolytes decreases from 0.5 to 0.23 eV for $Li_2SiPHN$ vs. $Li_3PON$ precursor. This latter value might be ascribed to the amorphous nature of the polymer electrolyte with the addition of secondary PON phase, suppressing the crystallinity of the PEO and facilitating fast $Li^+$ motion.

Symmetric Cell Studies

Symmetric Li/60 wt. % PEO+$Li_3PON$ and $Li_6SiPON$/Li cells were assembled in a glovebox under Argon. Before cell assembly, Li metal was heated to 175° C. for 2 h, and 60 wt. % PEO+$Li_3PON$ and $Li_6SiPON$ polymer electrolyte were melt bonded onto the Li.

Figure 84:
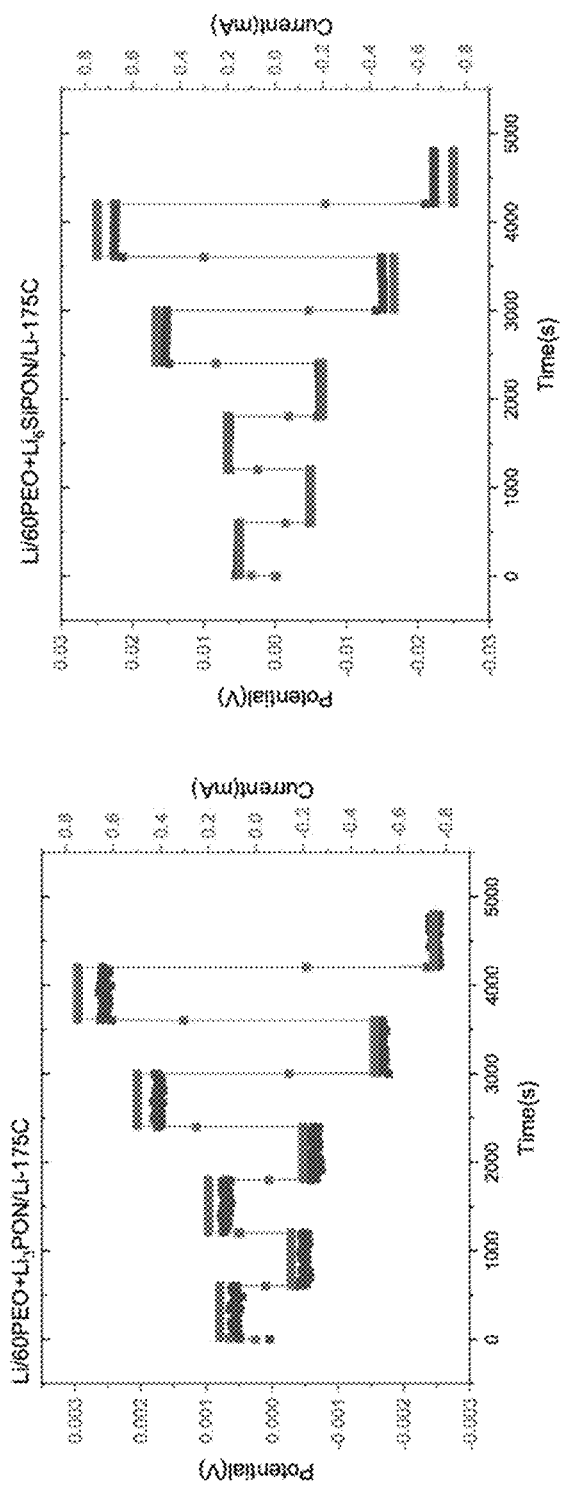
FIG. 84 shows galvanostatic cycling of Li/60PEO+40$Li_3PON$(left) and $Li_6SiPON$(right)/Li symmetric cells at the current density of +150-750 μA at room temperature.

FIG. 84 shows galvanostatic cycling of Li/60PEO+40$Li_3PON$ and 40$Li_6SiPON$/Li at room temperature. The main goal of the symmetric cell experiment is to increase the current densities and study the interfacial behavior of the electrode-electrolyte such that an optimal c-rate is used when half-cell is assembled. The cells are tested for charge and discharge using a DC steady state method in which a constant current (±0.15-0.75 mA) is used. The symmetric cells show a stable voltage response of 0.003 and 0.03 V for $Li_3PON$ and $Li_6SiPON$ based polymer electrolytes, respectively. From these preliminary results, it is observed that the polymer electrolytes are stable vs. Li metal at current densities of (0.325 mAh/$cm^2$).

CELGARD® separator coated with new batch $Li_3PON$, $Li_6PON$, $Li_2SiPHN$, $Li_3SiPON$ and $Li_6SiPON$.

CELGARD® separator Li-ion battery separator film (25 μm thick×18 mm diameter) substrates are dip-coated 1x in the precursor in $Li_3PON$, $Li_6PON$, $Li_2SiPHN$, $Li_3SiPON$, and $Li_6SiPON$ solutions using copper wire to suspend the sample. This experiment is conducted to measure the impedance of the polymer coatings without any heat treatments; which is similar to measuring the impedance of conventional liquid electrolyte.

Figure 85:
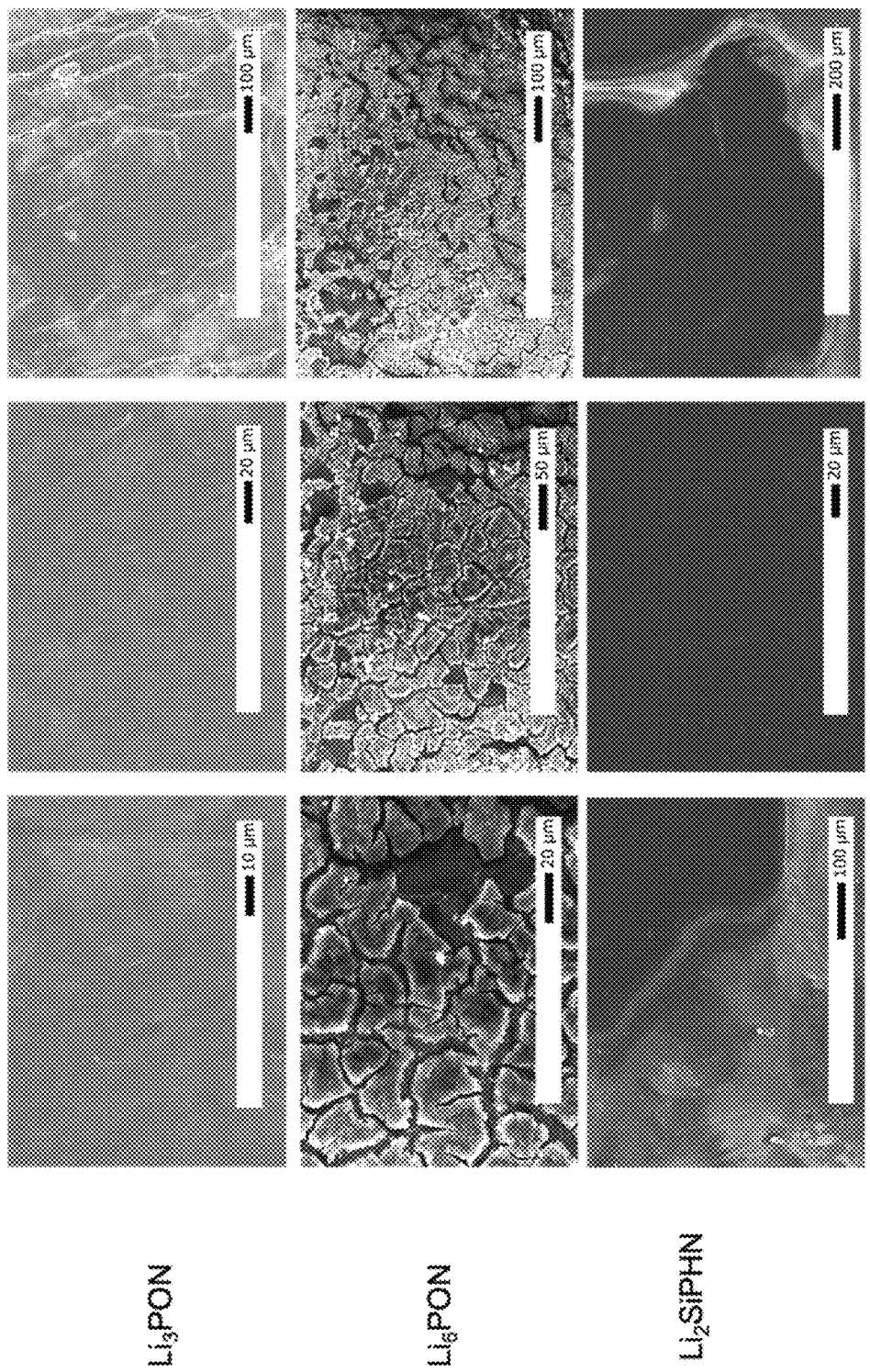
FIG. 85 shows SEM images of Celgard+$Li_3PON$, $Li_6PON$, and $Li_2SiPHN$ heated to 90° C./12 h/Vacuum.
Figure 86:
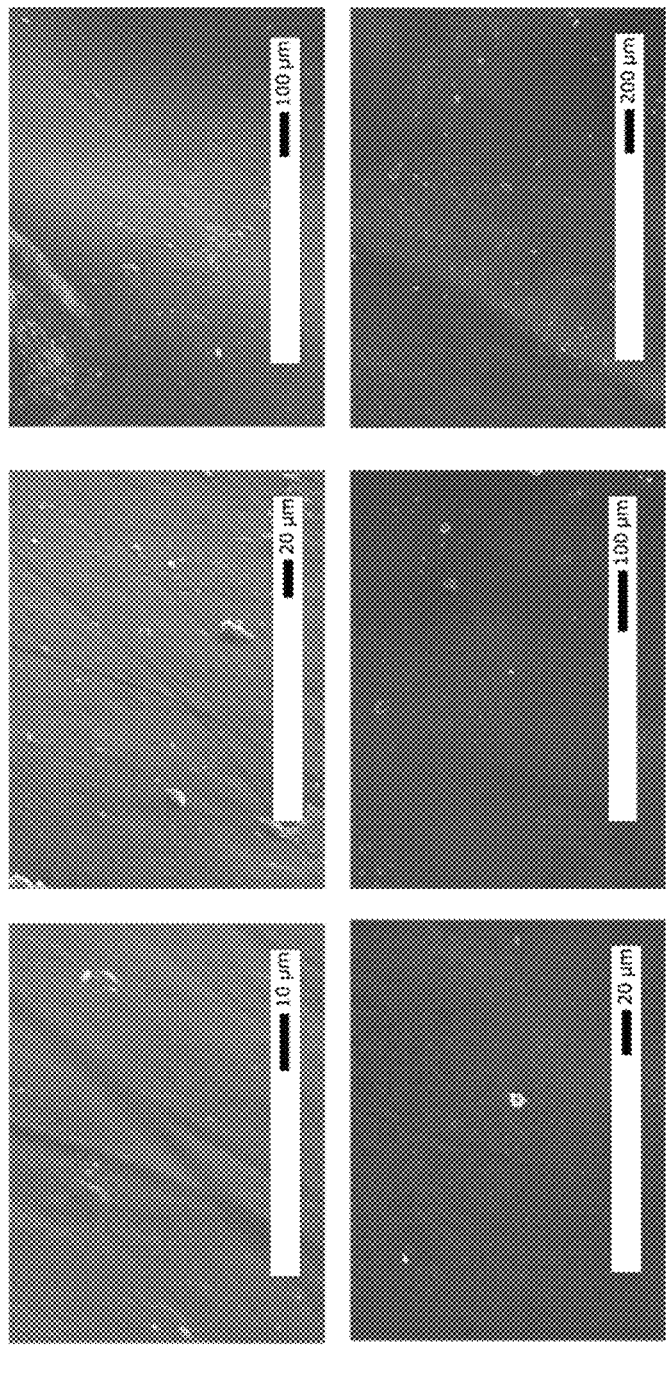
FIG. 86 shows SEM images of Celgard+$Li_3SiPON$ and $Li_6SiPON$ heated to 90° C./12 h/Vacuum.

FIG. 85 shows SEM microstructures of a CELGARD® separator coated with precursors heated to 90° C./12 h/Vacuum. The $Li_3PON$ and $Li_2SiPHN$ coatings form a substantially smooth and substantially uniform coating with minimal cracks compared to the $Li_6PON$ coating. There is a minimal bonding between the CELGARD® separator and $Li_6PON$ precursor solution, as a cracked interface is present. The resulting separator also has a porous coating FIG. 86 shows shows SEM microstructures of a CELGARD® separator coated with precursors heated to 90° C./12 h/Vacuum. The $Li_3PON$ and $Li_2SiPHN$ coatings seem to form a smooth and uniform coating with minimal cracks compared to the $Li_6PON$ coating. There is a minimal bonding between the CELGARD® separator and $Li_6PON$ precursor solution, as a cracked interface is present. The resulting separator also has a porous coating.

Figure 87:
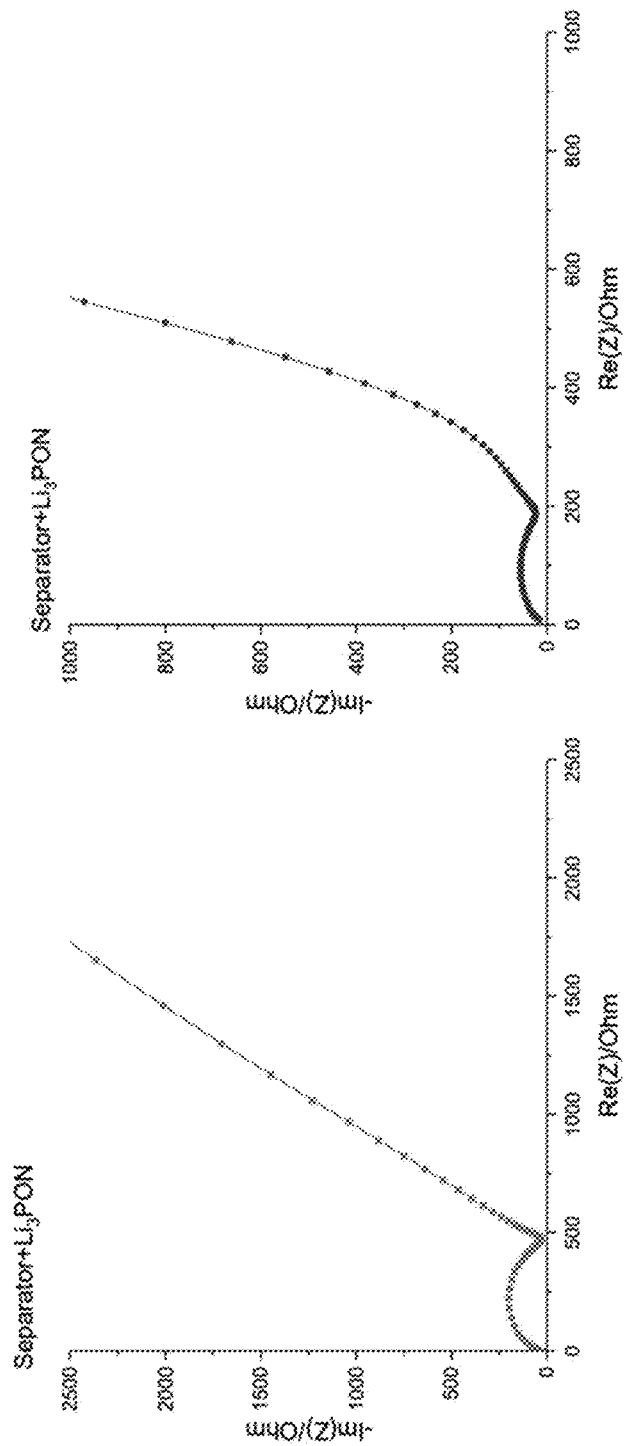
FIG. 87 shows Nyquist plots of Celgard+$Li_3PON$ from different batches at room temperature.
Figure 88:
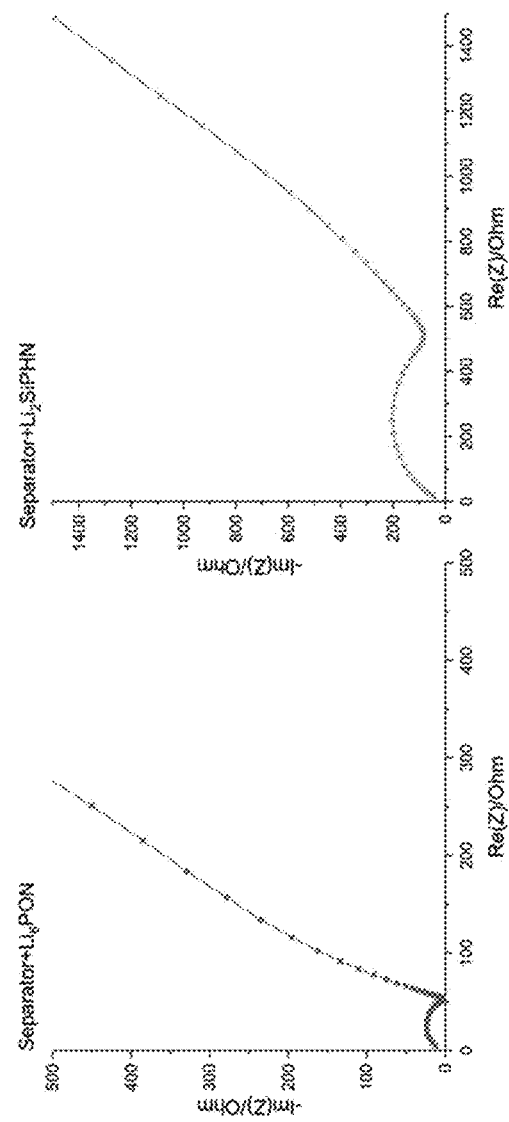
FIG. 88 shows Nyquist plots of Celgard+$Li_6PON$ and $Li_2SiPHN$ at room temperature.
Figure 89:
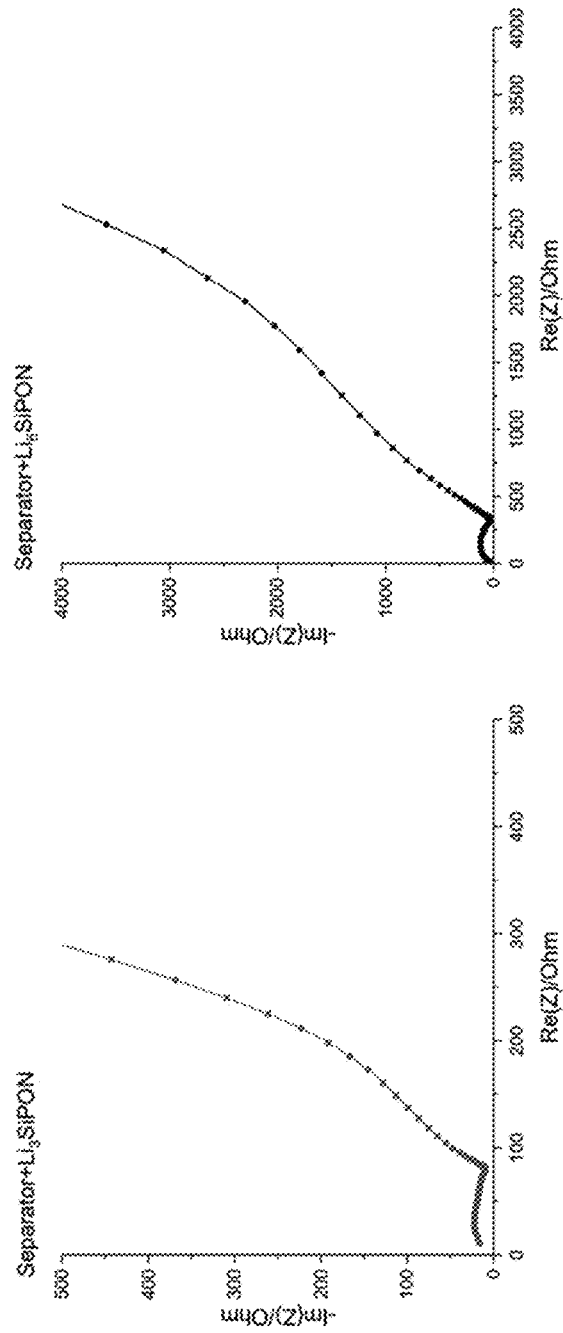
FIG. 89 shows Nyquist plots of Celgard+$Li_3SiPON$ and $Li_6SiPON$ at room temperature.

FIGS. 87, 88, and 89 show Nyquist plots of the CEL-GARD® separator+Polymer precursor at room temperature. The resulting equivalent series resistances are listed in Table 27. Electrochemical impedance was measured with minimal exposure to air as soon as the Celgard was coated with the polymer precursors.

TABLE 27

List of equivalent series resistance of polymer-coated CELGARD ® separators at room temperature.

| Coated Celgard | Resistance (Ω) |
|---|---|
| $Li_3PON$ | 350 |
| $Li_6PON$ | 50 |
| $Li_2SiPHN$ | 450 |
| $Li_3SiPON$ | 100 |
| $Li_6SiPON$ | 300 |

From these preliminary results, it can be concluded that the polymer precursors have optimal lithium ion diffusivity through the separator. Thus, they can be used to wet the cathode electrodes when all-solid state batteries are assembled. The wet conductivity results are $Li_2SiPHN<<Li_3PON<<Li_6SiPON<<Li_3SiPON<Li_6PON$. The $Li_6PON$ precursor is a suitable electrolyte to be used when assembling a half-cell.

Li/Polymer Coated Separator/Li

A symmetric Li/CELGARD® separator+, $Li_3PON$, $Li_6PON$, $Li_3SiPON$, and $Li_6SiPON$/Li cells are assembled in a glovebox at UMEI under Argon flow. Before cell assembly, the metallic Li (16 mm diameter) is scraped to expose a clean surface. Symmetric cells are constructed using the standard procedure in a coin cell. The coin cells are compressed using a about 300 kPa uniaxial pressure. The symmetric cells are cycled at room temperature using a potentiostat/galvanostat (BioLogic SP300). The solution of polymer precursors dissolve in THF (20 µL) are used as an electrolyte.

Figure 90:
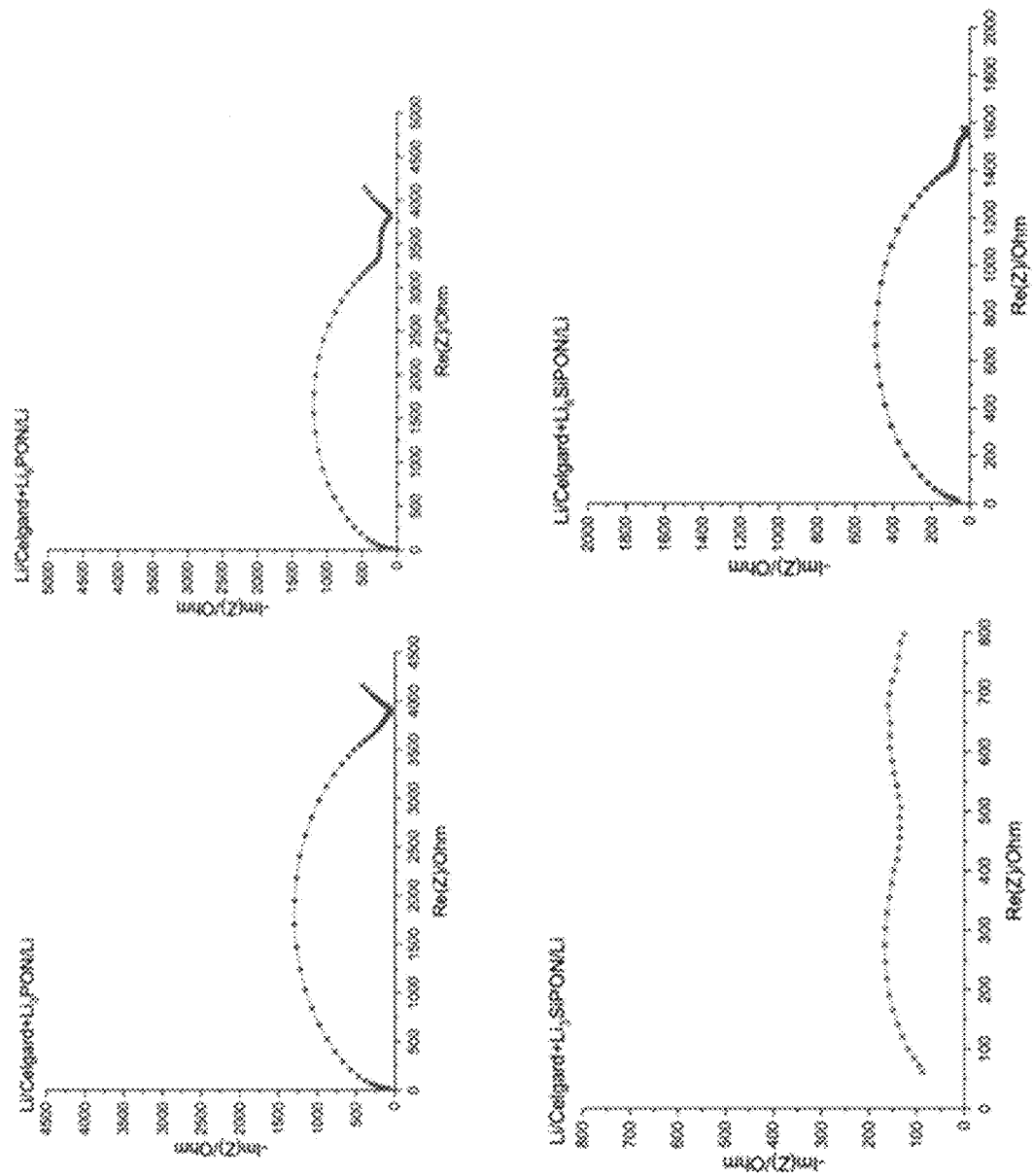
FIG. 90 shows Nyquist plots of Li/Celgard+$Li_3PON$, $Li_6PON$, and $Li_2SiPHN$/Li at 25° C.

FIG. 90 shows Nyquist plots of Li/CELGARD® separator+Polymer precursor/Li symmetric cells at room temperature before cycling. The resulting equivalent series resistance is listed in Table 28. EIS measurements are carried out to compare the impedance differences of the symmetric cells when using different polymer precursors as an electrolyte. In general, the high-frequency semicircle relates to Li$^+$ migration through the SEI interface ($R_{SEI}$), and the lower frequency semicircle relates to charge transfer resistance ($R_{ct}$).

TABLE 28

List of charge transfer resistance ($R_{ct}$), solid electrolyte interface resistance ($R_{SEI}$), and for the symmetric cells using polymer-coated CELGARD ® separator films.

| Celgard + Polymer coating | $R_{ct}$ Ω | $R_{SEI}$ Ω |
|---|---|---|
| $Li_3PON$ | 4000 | — |
| $Li_6PON$ | 500 | 3200 |
| $Li_3SiPON$ | 300 | 500 |
| $Li_6SiPON$ | 200 | 1400 |

Figure 91:
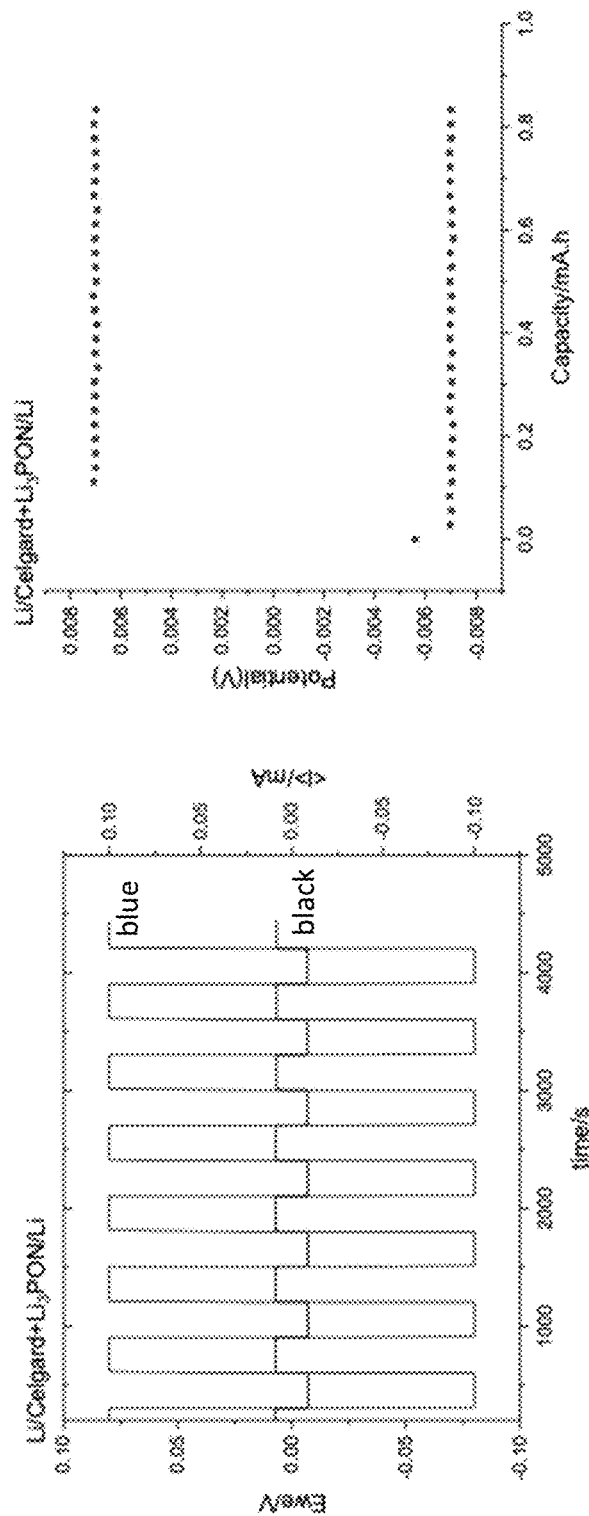
FIG. 91 shows galvanostatic cycling of a Li/Celgard+$Li_3PON$/Li symmetric cell at the current density of ±0.1 mA. The blue line corresponds to the constant current and the black line is the voltage response.

FIG. 91 shows Li/CELGARD® separator+$Li_3PON$/Li cells galvanostatically cycled at room temperature. The cells are tested for charge and discharge using a DC steady state method in which a constant current (±0.1 mA) is used. The resulting potential is measured over time. The anode and the polymer precursor electrolyte interface stability are characterized as a function of current density. The potential vs capacity plot shows that the electrolyte is stable up to 1 mAh.

Figure 92:
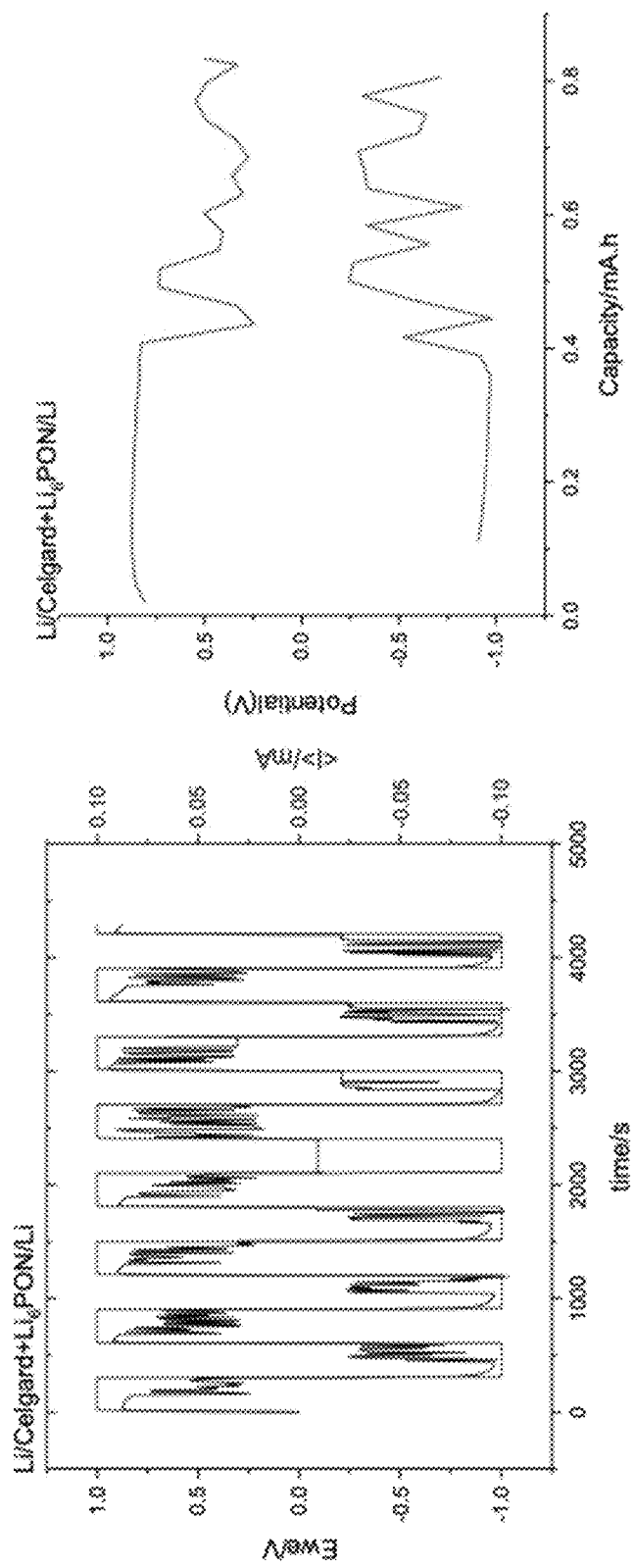
FIG. 92 shows galvanostatic cycling of a Li/Celgard+$Li_6PON$/Li symmetric cell at the current density of ±0.1 mA.

FIG. 92 shows Li/CELGARD® separator+$Li_6PON$/Li cells galvanostatically cycled at room temperature. The cell is tested for charge and discharge using a DC steady state method in which a constant current (±0.1 mA) is used.

Figure 93:
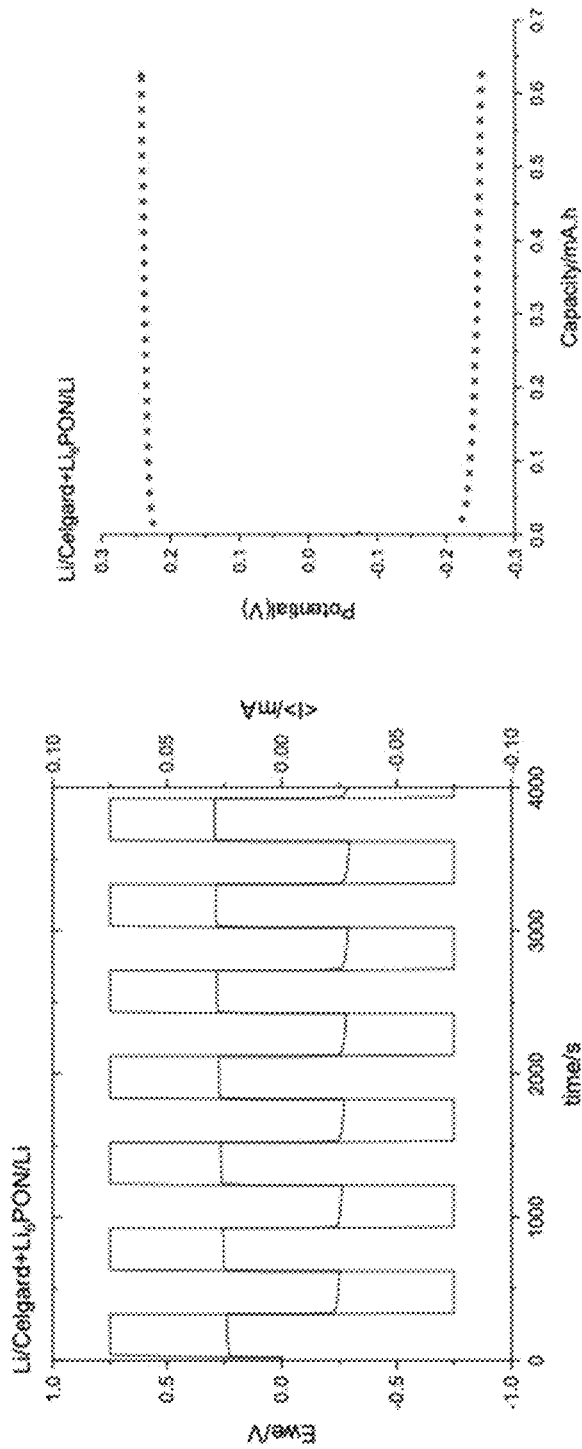
FIG. 93 shows galvanostatic cycling of a Li/Celgard+$Li_6PON$/Li symmetric cell at the current density of ±0.075 mA.

The CELGARD® separator coated with $Li_6PON$ polymer precursors shows unstable voltage spikes when 0.1 mA current density is used. Higher current densities (0.1 mA) seem to result in higher interfacial impedance as presented by the increase in voltage response to 1V. However, the symmetric cell shows a stable voltage response (0.25 V) when the lower current density of 0.075 mA is used as shown in FIG. 93. The potential vs capacity plot shows that the electrolyte is stable up to 0.75 mAh.

Figure 94:
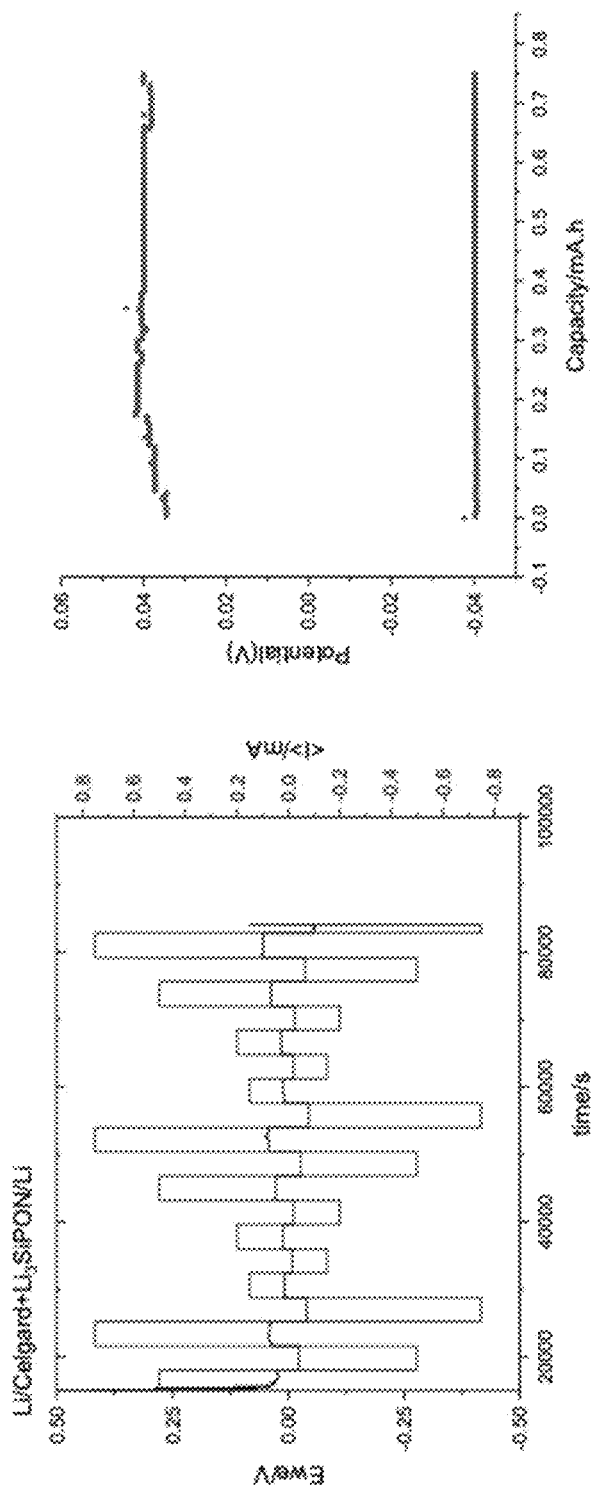
FIG. 94 shows galvanostatic cycling of a Li/Celgard+$Li_3SiPON$/Li symmetric cell at the current density of ±0.15-0.75 mA.

FIG. 94 shows Li/CELGARD® separator+$Li_3SiPON$/Li cells galvanostatically cycled at room temperature. The cell is tested for charge and discharge using a DC steady state method in which a constant current (±0.15-0.75 mA) is used. The symmetric cell shows a stable voltage response (0.04V) when the high current density of 0.75 mA is used. The potential vs capacity plot shows that the electrolyte is stable up to 0.75 mAh.

Figure 95:
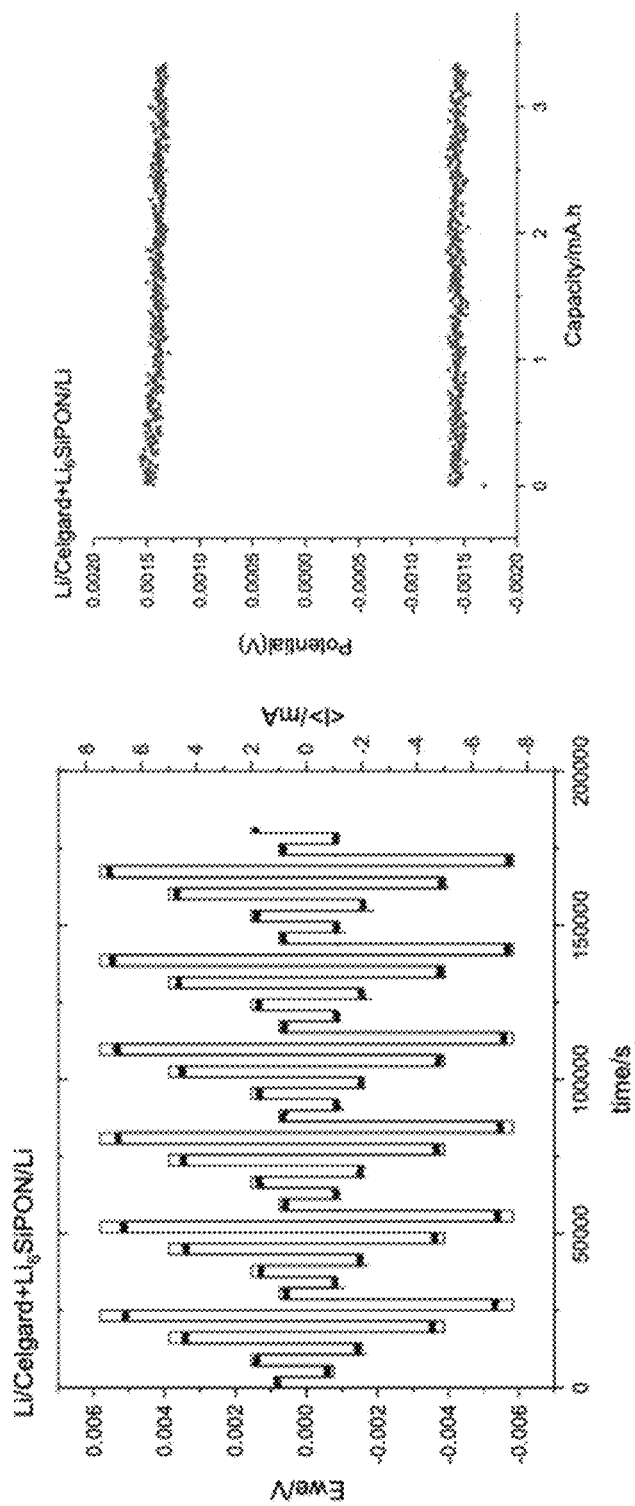
FIG. 95 shows galvanostatic cycling of a Li/Celgard+$Li_6SiPON$/Li symmetric cell at the current density of ±0.15-0.75 mA.

FIG. 95 Li/CELGARD® separator+$Li_6SiPON$/Li cells galvanostatically cycled at room temperature. The cells are tested for charge and discharge using a DC steady state method in which a constant current (±0.75-1.5 mA) is used. The CELGARD® separator coated with $Li_6SiPON$ shows an ideal voltage response suggesting that there is a minimum interfacial impedance throughout the galvanostatic cycling. This is revealed by low voltage response (about 0.006V) at higher current densities (±7.5 mA). The interfacial impedance is constant when the current density decreased to (±0.15 mA) demonstrated by the voltage response (~0.0015 V) confirmed per Ohms' law that R=V/I. The potential vs capacity plot shows that the electrolyte is stable up to 3.5 mAh.

$Li_2SiPHN$ $Li_2SiPHN$ precursor is heated to 80° C./Vacuum. The resulting dried $Li_2SiPHN$ (1 g) powder is compacted into a pellet using 3 mm diameter die. The resulted pellets are heated between alumina plates to 100-600° C./2 h at a ramp rate of 1° C. min$^{-1}$ under 120 ml min$^{-1}$ $N_2$ flow.

Figure 96:
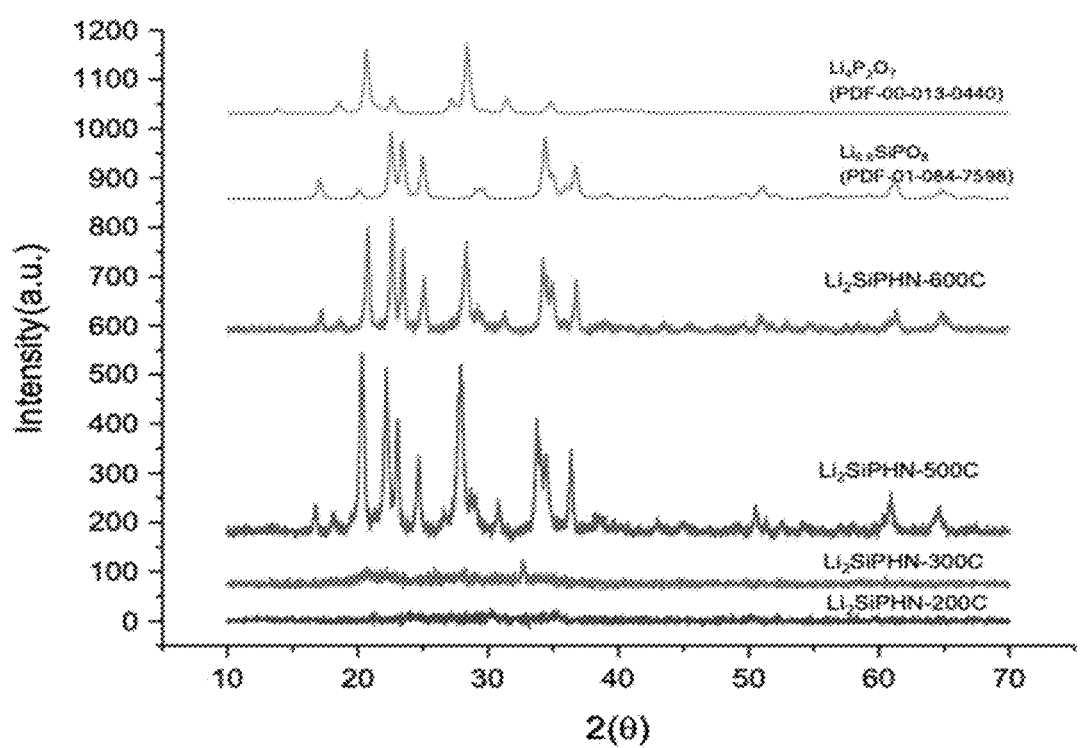
FIG. 96 shows XRD plots a $Li_2SiPHsN$ pellet heated to 100-600° C./2 h/$N_2$.

FIG. 96 shows XRD patterns of $Li_2SiPHN$ pellets heated to 100-600° C./2 h/$N_2$. The XRD of $Li_2SiPHN$ pellets heated to 100-300° C. is mostly dominated by a broad peak corresponding to poorly crystalized compound indicating amorphous nature of the pellet. Two main peaks at 22° and 29° 2θ can be indexed to partially crystalline $Li_4P_2O_7$ when heated to 500° C. The double peaks near 24° and 25° 2θ can be indexed to $Li_{6.6}SiPO_8$.

Figure 97:
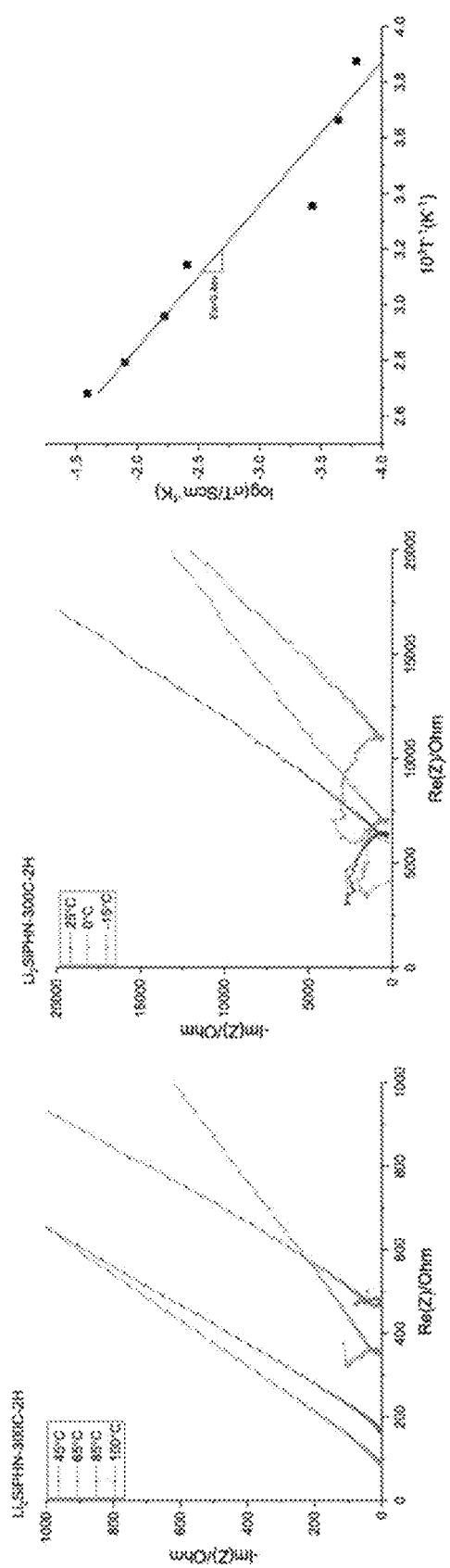
FIG. 97 shows Nyquist and Arrhenius plots of a $Li_2SiPHN$ pellet heated to selected temperatures.

FIG. 97 shows typical Nyquist and Arrhenius plots of a $Li_2SiPHN$ pellet where electrochemical impedance is collected in a frequency range of 7 MHz to 1 Hz at −15° C. to 100° C. Room temperature conductivities of about 1.25× 10$^{-6}$ S cm$^{-1}$ and activation energies of 0.4 eV are obtained.

Table 29 illustrates the total ionic conductivities of a $Li_2SiPHN$ pellet heated to selected temperatures. Ionic conductivities of about 7×10$^{-5}$S cm$^{-1}$ are obtained when films are heated to 100° C.

TABLE 29

Total conductivities ($\sigma_t$) of Li$_2$SiPHN
pellet heated to selected temperatures.

| T (° C.) | $\sigma$(S cm$^{-1}$) |
|---|---|
| -15 | 6.22 × 10$^{-7}$ |
| 0 | 8.3 × 10$^{-7}$ |
| 25 | 1.24 × 10$^{-6}$ |
| 45 | 2.45 × 10$^{-5}$ |
| 65 | 1.75 × 10$^{-5}$ |
| 85 | 3.56 × 10$^{-5}$ |
| 100 | 7.0 × 10$^{-5}$ |

Figure 98:
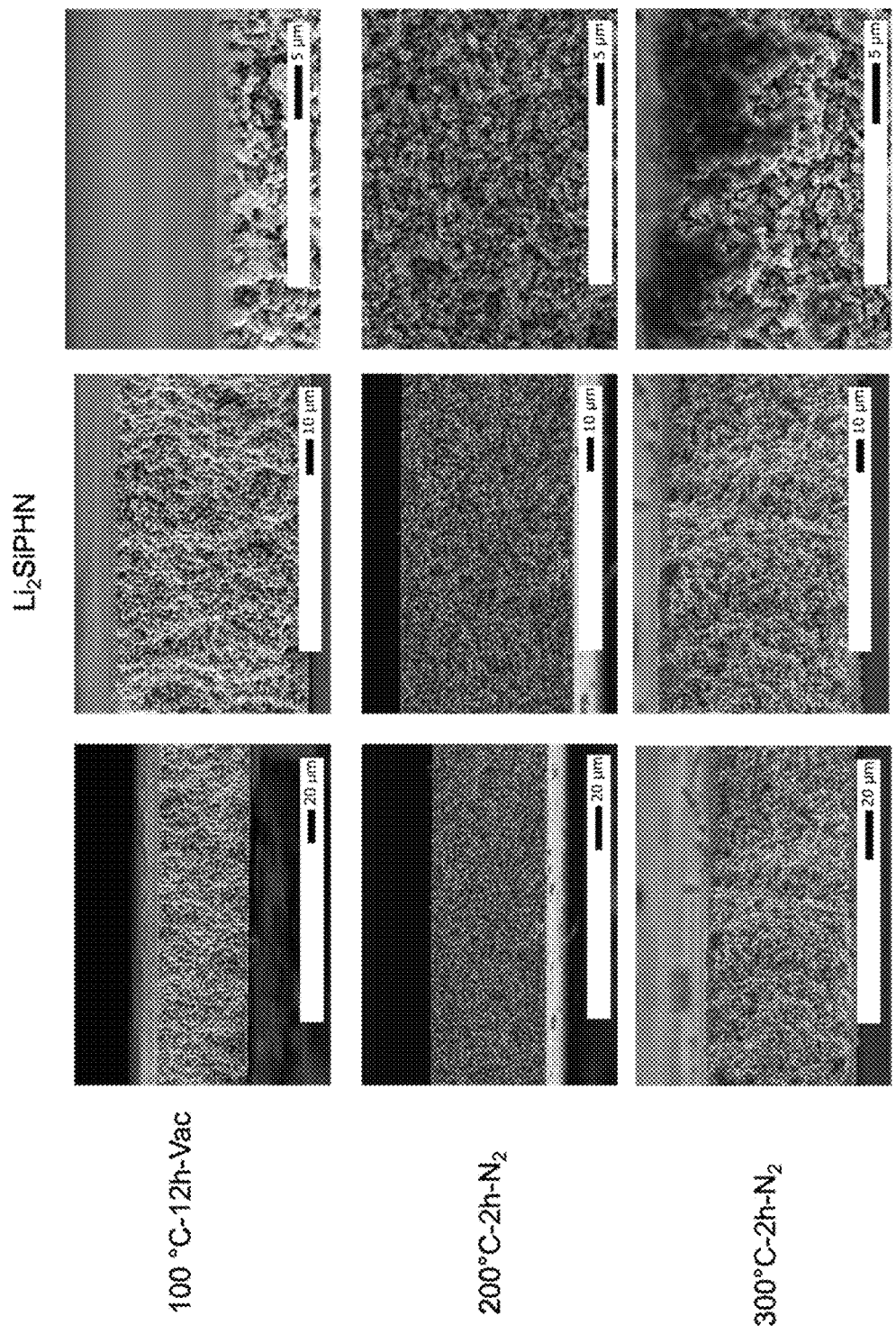
FIG. 98 shows SEM fracture surface images of LATSP+$Li_2SiPHN$ heated to 100°, 200°, and 300° C./2 h/$N_2$.

FIG. 98 shows SEM microstructures of LATSP+ Li$_2$SiPHN heated to 100, 200, and 300° C./2 h/N$_2$. LATSP+ Li$_2$SiPHN films do not show a uniform coating interface when heated to 100 and 200° C. However, when the heating temperature is increased to 300° C./2 h/N$_2$ the coating is noticeable in which it covered some areas of the substrate and percolates into the substrate. However, the coating is not uniform as it barely covers the surface of the substrate.

Figure 99:
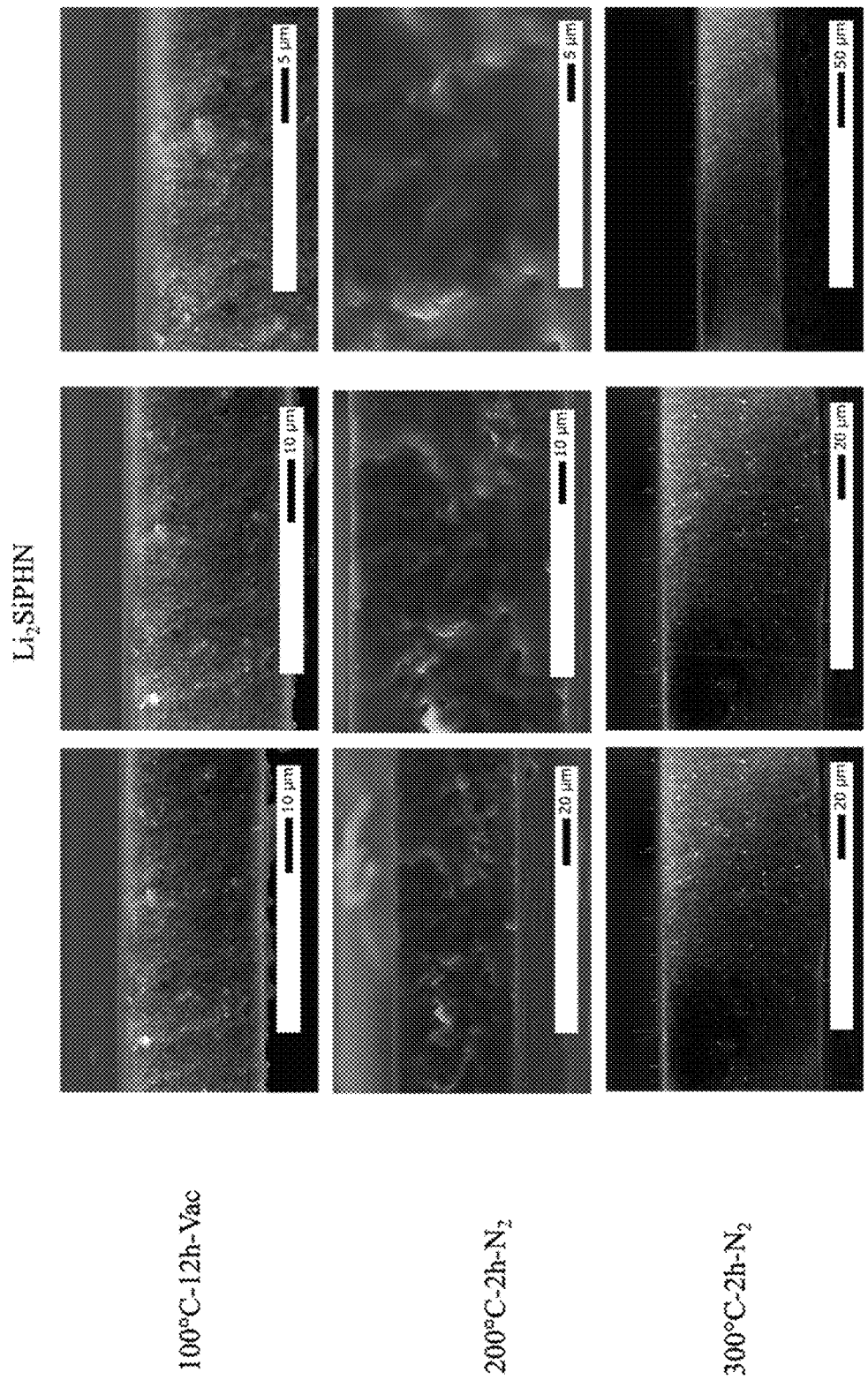
FIG. 99 shows SEM fracture surface images of $LiAlO_2$+$Li_2SiPHN$ heated to 100, 200, and 300° C./2 h/$N_2$.

FIG. 99 shows SEM microstructures of LiAlO$_2$+ Li$_2$SiPHN heated to 100, 200, and 300° C./2 h/N$_2$. LiAlO$_2$+ Li$_2$SiPHN films show a uniform coating interface when heated to 100° C. with an average coating thickness of about 4 μm. However, when the heating temperature is increased to 200° C./2 h/N$_2$ the coating is noticeable in which it covers some areas of the substrate and percolates into the substrate resulting in pore-free microstructure.

Figure 100:
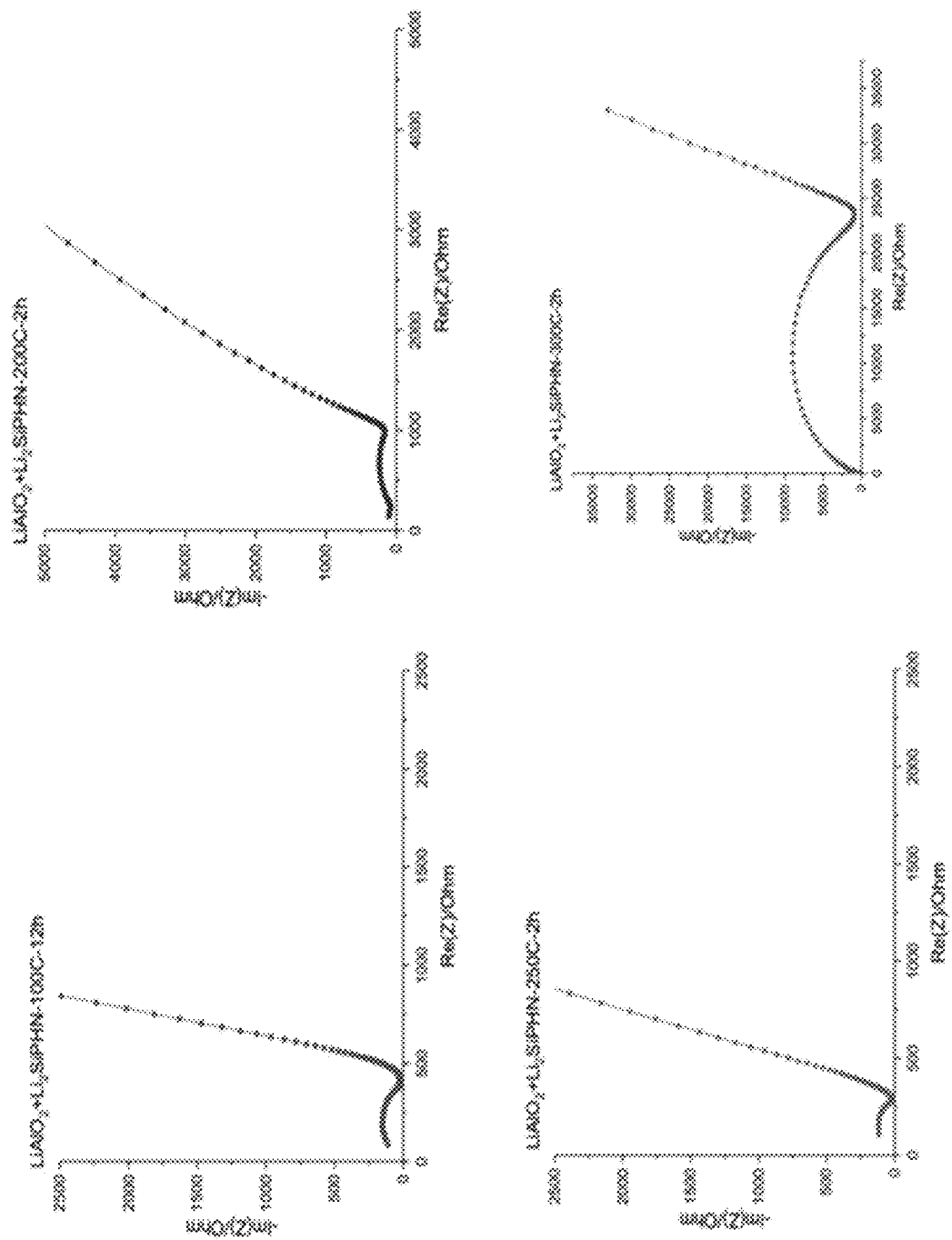
FIG. 100 shows Nyquist plots of $LiAlO_2$+$Li_2SiPHN$ heated to 100, 200, 250, and 300° C./2h/$N_2$.

FIG. 100 shows Nyquist plots of LiAlO$_{2+300}$% substrates coated with Li$_2$SiPHN precursor solutions and heated to 100, 200, 250, and 300° C./2 h/N$_2$. The resulting impedance measurements are summarized in Table 30.

TABLE 30

Total conductivities ($\sigma_{RT}$) of LiAlO$_2$ + 300% films
coated with polymers at selected temperatures.

| Film substrate | Temp. (° C.) | $\sigma$ RT(S/cm) |
|---|---|---|
| LiAlO$_2$ + Li$_2$SiPHN | 100 | 1.4 ± 0.1 × 10$^{-4}$ |
| | 200 | 7 ± 0.3 × 10$^{-5}$ |
| | 250 | 2.8 ± 0.3 × 10$^{-5}$ |
| | 300 | 3.1 ± 0.1 × 10$^{-6}$ |

LIAlO$_2$ substrates coated with Li$_2$SiPHN do not show consistent conductivity when heat treated to 100-300° C. This can be ascribed to the fact that the coating is not stable in air and that the precursor suspension precipitates while coating. The conductivity drops in two orders of magnitude when treated from 100-300° C.

Example 16

Polymer precursor reactions for LiAlO$_x$.

The first step is to develop a model system as illustrated immediately below.

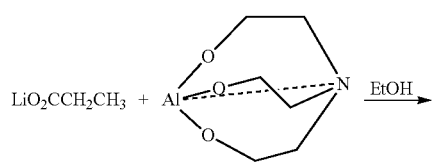

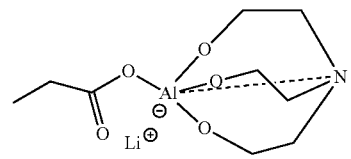

This reaction successfully produces an ethanol soluble aluminate. The use of excess LiO$_2$CCH$_2$CH$_3$ can provide, on thermal decomposition, Li$_x$AlO$_y$, where x>1. On solvent removal the aluminate complex is a crystalline solid that would be difficult to use for coatings unless it melts on heating.

Characterization Data

In a sample vial, 1 g of lithium propionate is added with 5.93 g of alumatrane (in EtOH), the ratio of Li:Al is 1:1 according to TGA results, about 10 mL more EtOH is added to the mixture. The reaction mixture is heated up to about 50° C. for 1 h while stirring magnetically. The solution becomes transparent.

Thereafter, the solvent is removed by rotatory evaporation, and the residue is vacuum dried in a vacuum oven at about 60° C. The yield is 3.0 g of yellow (or orange) solid.

TGA/DTA (1000° C./air) on the LiAlO$_x$ precursor shows a ceramic yield of 20.6% at 1000° C. The mass loss suggests that it decomposes around 350° C. leaving an intermediate char phase that oxidizes on heating from 430° C. to 580° C., slowly losing CO$_2$ (or oxidation of residual carbon), then it decomposes again and remains stable from 630° C. The residue is an LiOAl compound (LiAlO$_2$).

Figure 101:
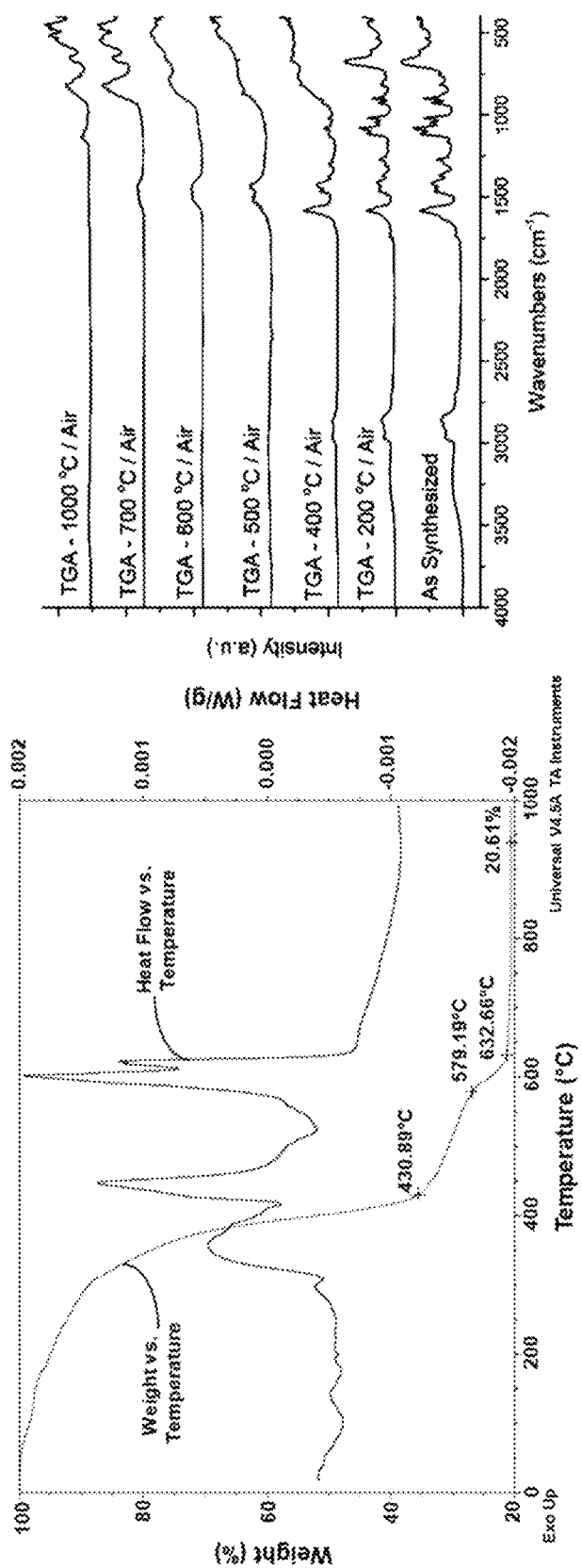
FIG. 101 shows TGA (1000° C./air) of $LiAlO_x$ precursor and FTIR spectra of residue from TGA of $LiAlO_x$ precursor at different temperatures.

FIG. 101 is the FTIR spectra of residue from TGA of LiAlO$_x$ precursor at different temperatures in air. It suggests that the reaction product is crystalline, but on heating it decomposes into an amorphous phase, as suggested by IR spectra of TGA at 500° C. and 600° C. At 400° C., it is no longer a discrete compound, but a ceramic in the process of becoming amorphous. v-CH absorption band (about 2800 cm$^{-1}$) disappears at 500° C., meaning that at this stage, it decomposes and loses carbon. The final phase (TGA 700, 1000° C./air) shows peaks at 817 cm$^{-1}$ and 652 cm$^{-1}$, which come from Al—O, and the peak at 1140 cm$^{-1}$ comes from Li—O, is a LiOAl compound.

Example 17

Lithium Aluminate from Polyacrylic Acid.

As an alternative to the LiO$_2$CCH$_2$CH$_3$ component, it is also possible to make a polyacrylic acid (PAA) derivative as shown immediately below.

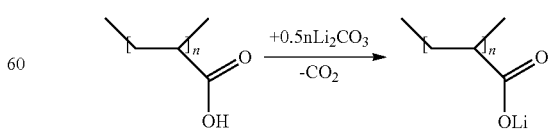

The PAA derivative can then be reacted with alumatrane to produce a processable polymer precursor as shown immediately below.

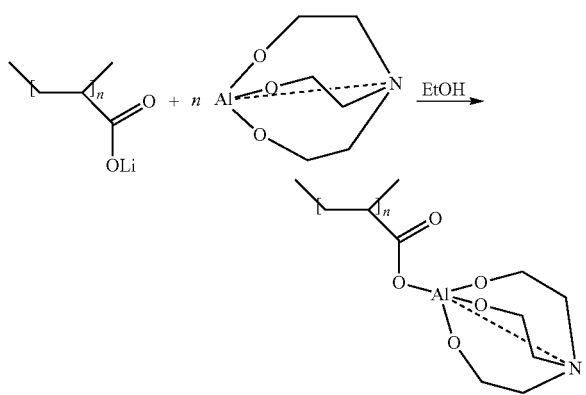

The ratio of Li to Al can be controlled by the stoichiometry of this reaction. Less alumatrane gives more Li in the $Li_xAlO_y$ material to be produced.

Characterization Data

In a 100 ml round bottom flask, PAA (2.5 g, 1.25 mmol) and $Li_2CO_3$ (1.3 g, 17.3 mmol) are added with 30 mL of EtOH. The ratio of —$CO_2H$ group to $Li_2CO_3$ is 2:1. The reaction is kept stirring magnetically under $N_2$ while heating at 60° C. with a reflux condenser.

The reaction mixture stays cloudy after 1 week of reacting, meaning that the reaction mixture is not very soluble in EtOH. Then 5 mL DI water is added to the reaction. A few minutes after adding the water, the solution clears up, but a white solid bulk forms, and it is floating on the surface of the solution. Gas also comes out from the reaction, which should be $CO_2$. The reaction is kept running at 60° C. After 5 d of reacting with water, the white solid sinks down to the bottom, meaning no more $CO_2$ is forming, the reaction is over. The solid is taken out from the reaction and a test on a small sample shows that it is water soluble.

The solid is then put into vacuum oven and dried at 60° C. for a few days. The yield of the product is 2.4 g after drying, and the theoretical yield is 2.7 g.

Figure 102:
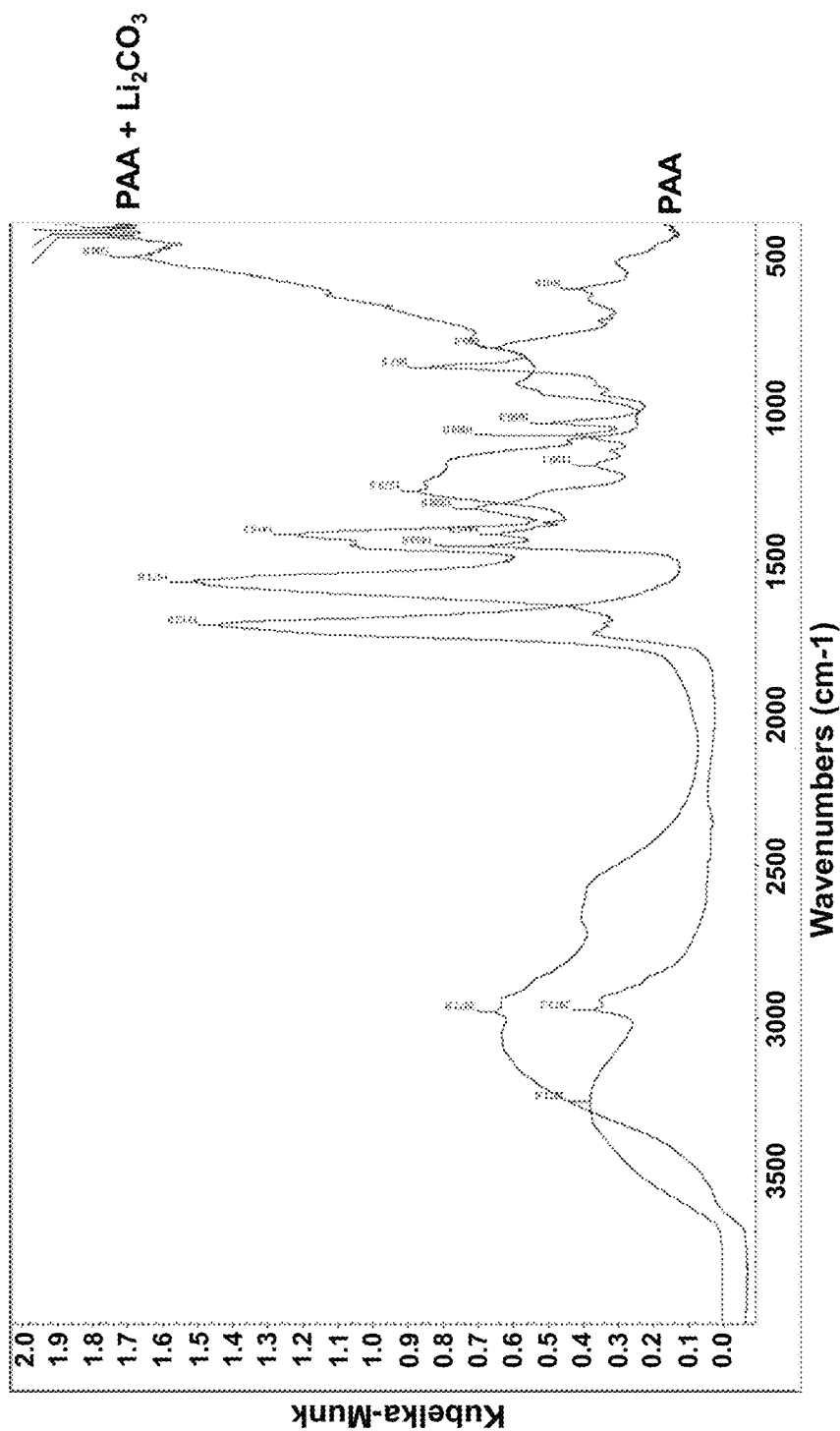
FIG. 102 shows FTIR spectra of PAA and the solid from reaction of PAA with $Li_2CO_3$.

FIG. 102 is the FTIR of the solid comparing with PAA. There shows a large $\nu O$—H peak at about 3300 $cm^{-1}$, and a $\nu C$—H band at the right of 3000 $cm^{-1}$ on the product. The $\nu C$=O band at 1712 $cm^{-1}$ almost disappears, and there shows a large carbonate group at 1572 $cm^{-1}$, which suggests that reaction has taken place, —$CO_2H$ group reacted with carbonate. The O—H group might come from unreacted polymer.

Example 18

Synthesis of MgSiPON.

In a 50 ml round bottom Schlenk flask, $NaNH_2$ (2.1 g, 0.06 mol) and $OPCl_3$ (1.5 ml, 16.1 mmol) are added to 20 ml of distilled THF under $N_2$ in an ice bath to form a reaction mixture. The reaction mixture becomes yellow about 5 min after reacting, showing that a reaction is taking place. The ice bath is removed after about 1 day of reacting.

After a week of reacting, soluble and insoluble parts in the reaction mixture are separated by centrifugation. The resulting liquid is an orange colored solution.

Thereafter, the solution is transferred into another 50 ml Schlenk flask. $Mg(NSi_2Me_6)_2$ (5.0 g, 14.5 mmol, about 90% equivalent amount of $OPCl_3$) is added to the solution under $N_2$ in an ice bath. No bubbles generated from the reaction mixture. The color of the reaction mixture turns dark after about 10 min of reacting. The reaction mixture remains a transparent solution, and no insoluble part forms. The ice bath is removed after 1 day of reacting.

MgSiPON Precursor.

A small sample of the liquid from the MgSiPON solution is taken and vacuum dried at 40° C. on a Schlenk line, then heated to 180° C. under vacuum for 1 h. The product is an orange solid. TGA and FTIR studies are run on the orange solid.

Figure 103:
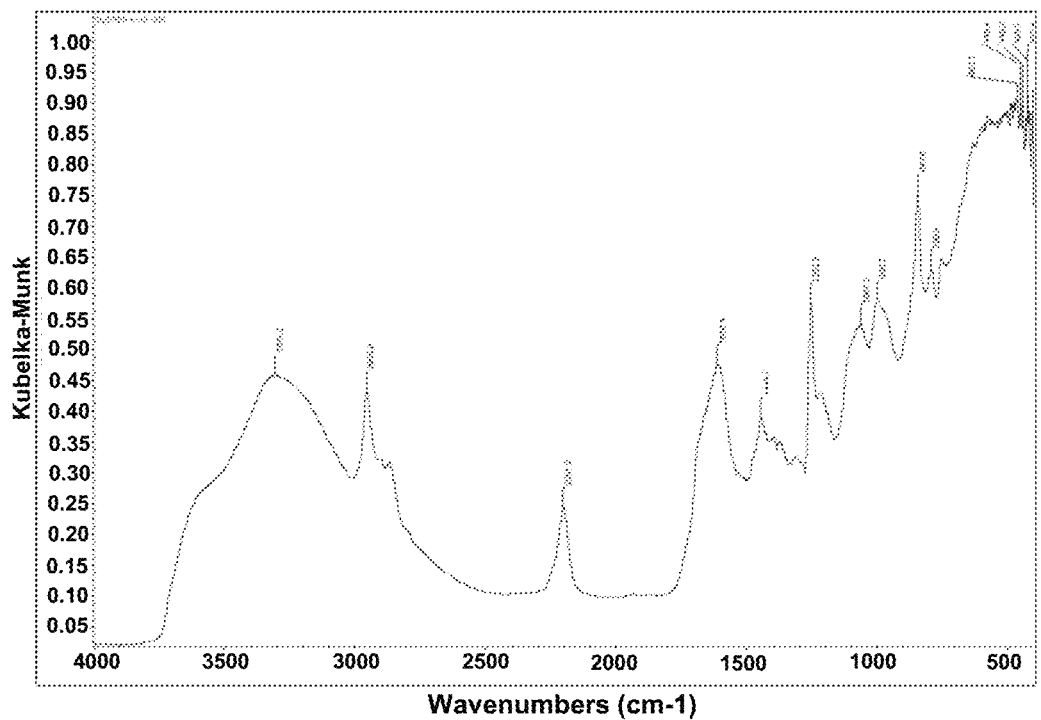
FIG. 103 shows an FTIR spectrum of MgSiPON.

As shown in FIG. 103, the FTIR shows a broad band centered around 3000 $cm^{-1}$, and an overtone at 1610 $cm^{-1}$, $\nu N$—H and $\nu O$—H, respectively. There is also a sharp peak at 2956 $cm^{-1}$ for $\nu C$—H. The small sharp peak at 1444 $cm^{-1}$ is typical for $NH_4^+$ (ammonium ions). The peaks at about 1250, 1060 and 900 $cm^{-1}$ should be $\nu P$=O, $\nu P$—O and $\nu P$—O—P/P—N, respectively.

Figure 104:
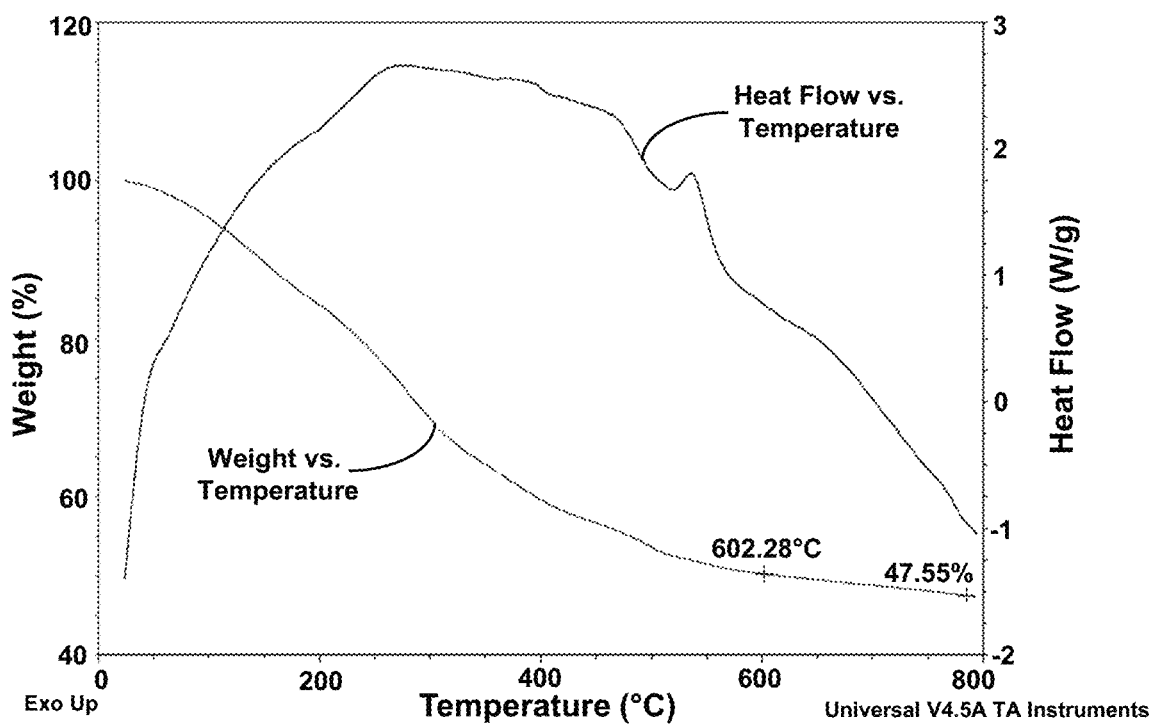
FIG. 104 shows a TGA of a MgSiPON precursor.

FIG. 104 shows the TGA (800° C./$N_2$) of the MgSiPON precursor. Mass loss starts almost from the beginning, and may be due to an elimination of volatile groups, such as $NH_3$. Decomposition ends at about 600° C. The ceramic yield at 800° C. is 47%.

Figure 105:
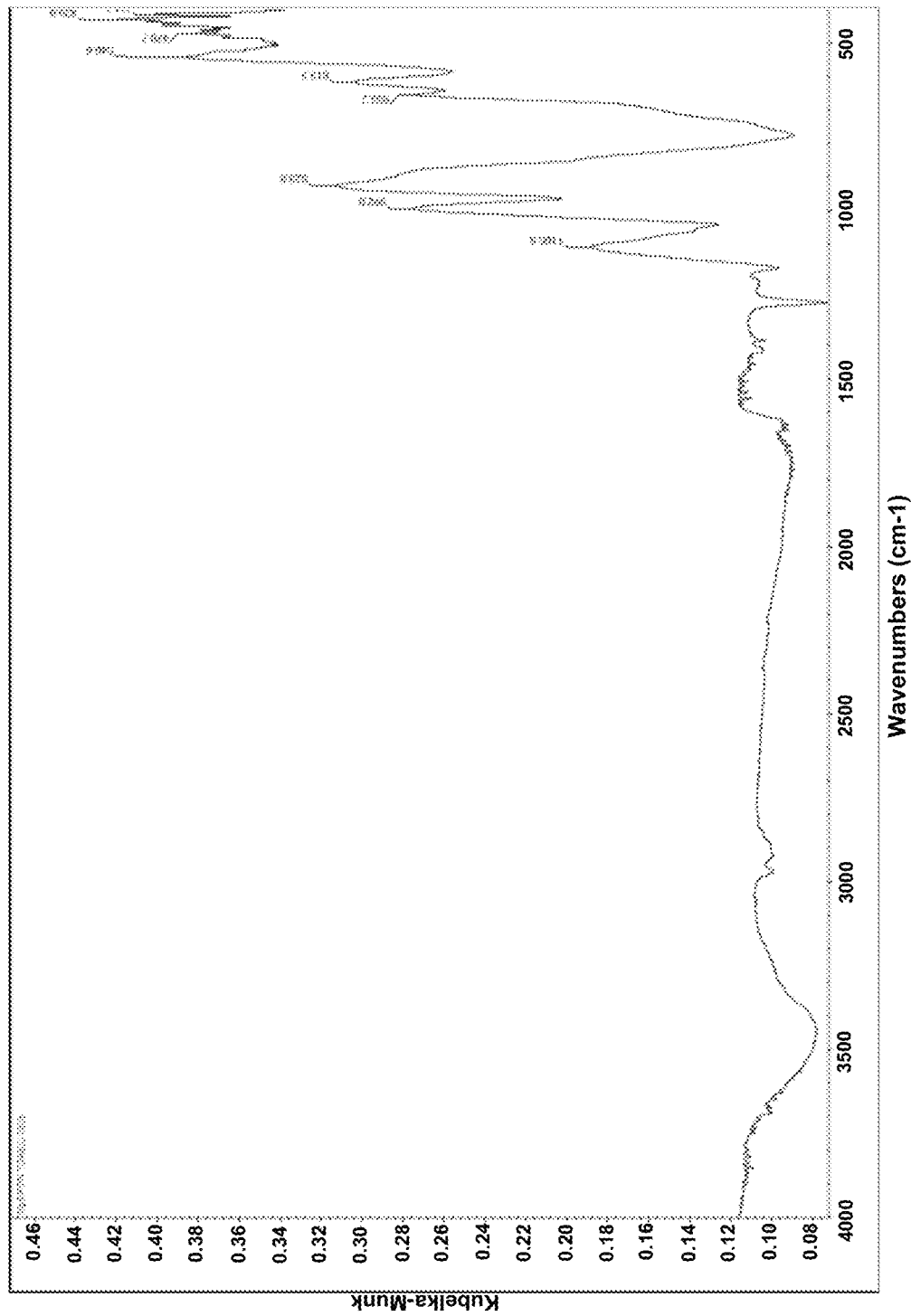
FIG. 105 shows an FTIR spectrum of a residue formed during the a MgSiPON synthesis.

The residue is a dark solid. As shown in FIG. 105, FTIR on the residue shows large peaks at about 1100 and 900 $cm^{-1}$, which may come from $\nu P$=O/P—O, and $\nu P$—O—P/P—N, respectively.

Example 19

Precursors Used to Bond Different Components for Solid State Battery Assembly.

Because a precursor can be applied to multiple surfaces, it can be used to mate surfaces in its precursor form, such that on heating two mated surfaces, a ceramic ionic electrolyte bond is created.

Cathode+Precursor Electrolyte+Ceramic Electrolyte.

The precursor described here is $Na_3SiPON$.

$Na_{0.8}CoO_2$ (NCO)+$Na_3SiPON$+$Na_{3.1}Zr_{1.95}Mg_{0.05}Si_2PO_{12}$ (NZMSP).

Figure 106:
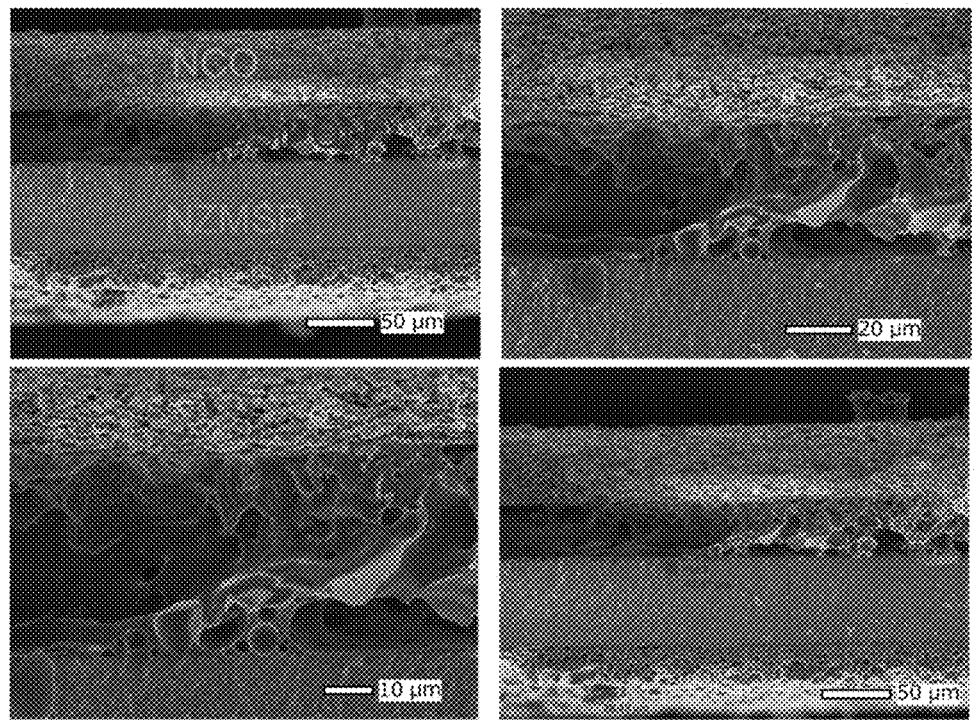
FIG. 106 shows SEM fracture surface images of NZMSP+$Na_3SiPON$+NCO heated to 400° C./2 h/$N_2$.

FIG. 106 shows SEM microstructures of NZMSP+$Na_3SiPON$+NCO heated to 400° C./2 h/$N_2$. There is a clear bond between NZMSP substrates and the cathode NCO through $Na_3SiPON$ precursor solution. The coating on NZMSP is denser compared to the other substrate. It is clearly possible to differentiate the layers using the SEM images. However, the coating is too thick with an average thickness of approximately 43 μm. THF 0may be added to decrease the thickness of the coating.

$Li_4Ti_5O_{12}$+$Li_3SiPON$+$LiAlO_2$+300%.

The interfacial behavior directly dictates the lifespan, energy density, and safety of all solid state batteries. These coatings might lower the interfacial resistance and stabilize the interfacial performance between SSE/electrode.

$LiAlO_2$+300% green films are placed between α-alumina disks and heated at 665° C. for 2 h at a ramp rate of 3° C. $min^{-1}$, followed by sintering to 1100° C./2 h at a ramp rate of 1° C. $min^{-1}$ in air (100 ml $min^{-1}$).

$LiAlO_2$+300% films are dip-coated for 1 min in $Li_3SiPON$ solution and bonded to LTO films. The resulting anode-electrolyte are left to dry for 12 h under vacuum at 100° C. Dried samples are then heated up to 400° C./2 h/$N_2$ at a ramp rate of 1° C./min.

Figure 107:
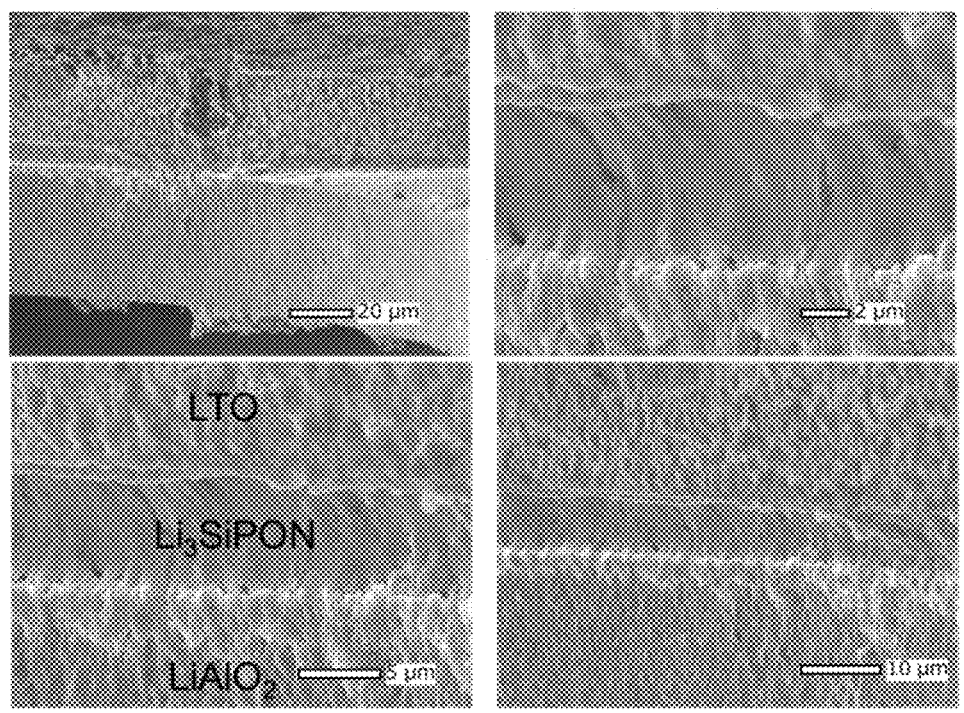
FIG. 107 shows SEM fracture surface images of LTO+$Li_3SiPON$+$LiAlO_2$ heated to 400° C./2 h/$N_2$.

FIG. 107 shows SEM microstructures of LTO+$Li_3SiPON$+$LiAlO_2$, heated to 400° C./2 h/$N_2$. There is a clear bond between $LiAlO_2$ substrates and the anode LTO through $Li_3SiPON$ precursor coating. The resulting coating interface is dense and uniform, as can be seen from the SEM images. The $Li_3SiPON$ coating seems to bind the anode and the ceramic electrolyte. This interposed buffer layer reduces the cathode/SSE impedance in the space charge regions.

LTO+Li$_3$SiPON+LATSP.

Green films of LATSP are placed in between alumina plates and debindered/crystallized at 665° C./2 h at a ramp rate of 5° C. min$^{-1}$ followed by sintering at 1000° C./1 h at a ramp rate of 1° C. min$^{-1}$ under 120 ml min$^{-1}$ air flow.

LATSP films are dip-coated for 1 min in Li$_3$SiPON solution and bonded to LTO films. The resulting anode-electrolyte are left to dry for 12 h under vacuum at 100° C. Dried samples are then heated up to 400° C./2 h/N$_2$ at a ramp rate of 1° C./min.

Since LATSP is unstable against Li metal at high temperatures, an alternative anode material (LTO) is examined.

Figure 108:
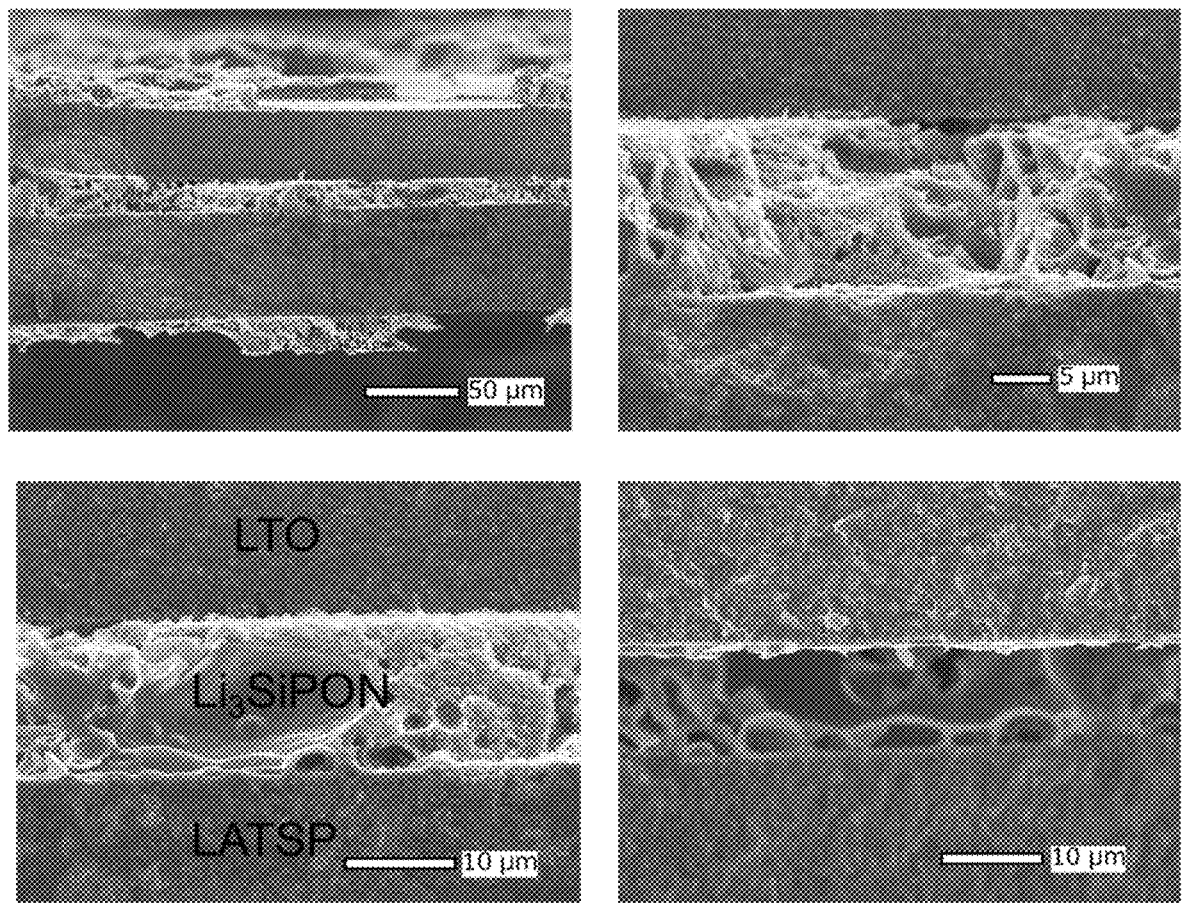
FIG. 108 shows SEM fracture surface images of LTO+$Li_3SiPON$+LATSP heated to 400° C./2 h/$N_2$.

FIG. 108 shows SEM microstructures of LTO+Li$_3$SiPON+LATSP heated to 400° C./2 h/N$_2$. There is a clear bond between LATSP substrates and the anode LTO through Li$_3$SiPON precursor solution. However, the coating is too thick with an average coating thickness of approximately 14 μm. A random orientation of the adjacent grains can be seen; the structural and chemical deviation is unavoidable on the boundaries, which might not be energetically favorable for Li$^+$ transport.

Example 20

Precursor Used to Coat Particles of Cathode Materials.
LCO+LSP+Ag.

The main components of the electrodes are the active material and the electrolyte. When formulating composite cathodes, it is important that the content of the active material should be high as possible to increase the capacity. However, lowering the electrolyte content decreases the conduction path, and thus, decreases the utilization rate of the active materials, owing to limited charge transfer.

In order to optimize the electrode structure, a new composite cathode is formulated using commercial LiCoO$_2$ powder, LSP nanopowder, Ag, and Li$_3$PON and Li$_3$SiPON precursor solutions.

Table 31 lists components used for making a suspension of LCO/LSP/Ag, with target volume fractions of 67/27/6 respectively. All the components are added to a 20 mL vial and ball-milled with 3.0 mm diameter ZrO$_2$ beads (6 g) for 24 h to homogenize the suspension. The suspension is cast using a wire wound rod coater. Died green films are thermopressed at 50° C. with a pressure of 100 MPa for 5 min using a heated bench top press.

TABLE 31

Suspension formulation for (LCO/LSP/Ag).

| | Role | Mass (g) |
|---|---|---|
| LCO | Ceramic(cathode) | 0.82 |
| LSP | Ceramic (electrolyte) | 0.21 |
| Ag | Metal (current collector) | 0.16 |
| Polyvinyl Butyral | Binder | 0.11 |
| Benzyl Butyl Phthalate | Plasticizer | 0.11 |
| Ethanol | Solvent | 0.95 |
| Acetone | Solvent | 0.95 |
| Polyacrylic acid | Dispersant | 0.01 |
| Li$_2$B$_4$O$_7$ | Ceramic(sintering-aid) | 0.01 |

The resulting composite cathode is heated to 500° C./1 h/air for carbon burn out, then soaked for 1 min in Li$_3$SiPON and Li$_3$PON solution. The resulting composite cathode soaked in precursor electrolyte was left to dry for 12 h under vacuum at 100° C. Dried samples are then heated up to 400° C./2 h/N$_2$ at a ramp rate of 1° C./min.

Figure 109:
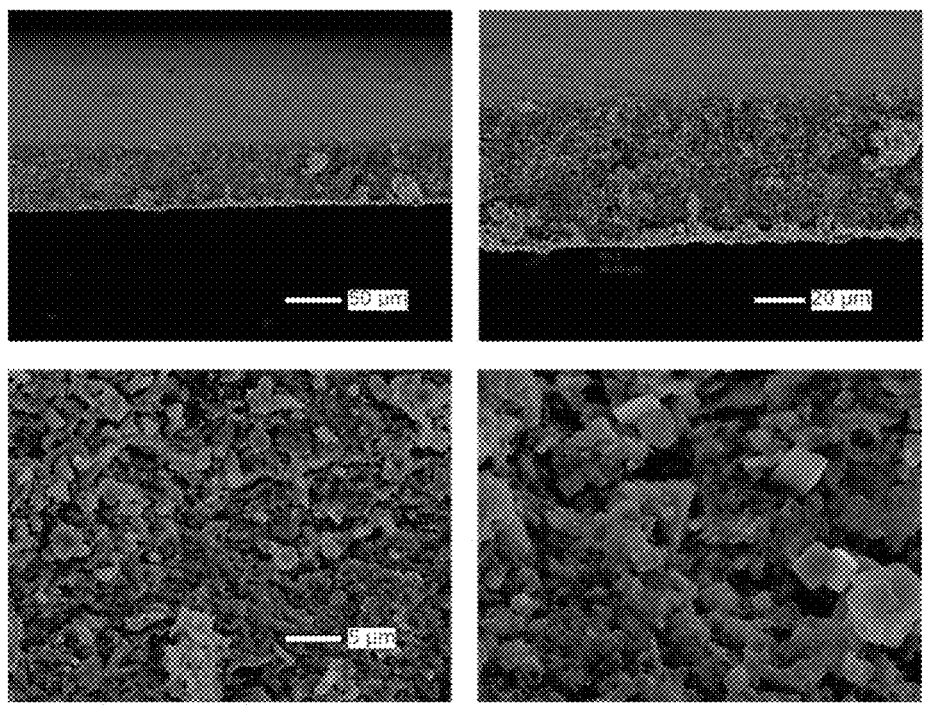
FIG. 109 shows SEM fracture surface images of LCO/LSP/Ag+$Li_3PON$ heated to 400° C./2 h/$N_2$.
Figure 110:
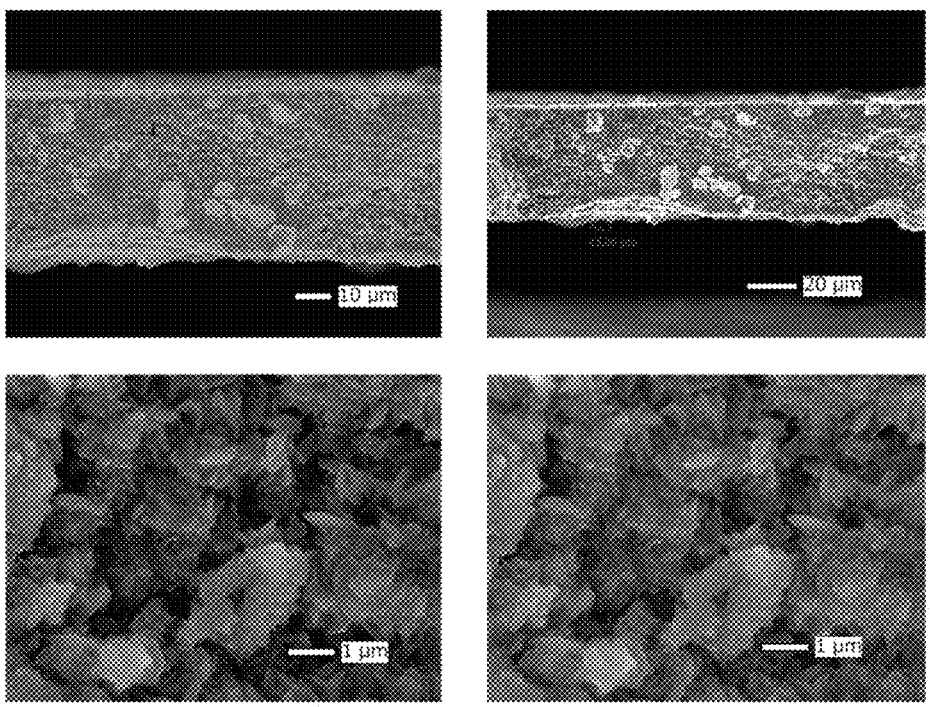
FIG. 110 shows SEM fracture surface images of LCO/LSP/Ag+$Li_3SiPON$ heated to 400° C./2 h/$N_2$.

FIGS. 109 and 110 show SEM microstructures of LCO/LSP/Ag films coated with Li$_3$PON and Li$_3$SiPON heated to 400° C./2 h/N$_2$, respectively. The microstructures are expected to be less dense than films sintered to a higher temperature (900° C./1 h/air) without the coating. Both films show that the coating percolates the porous composite cathode. The resulting cathode as treated is mechanically stronger than without the percolation and heating of the electrolyte precursor.

Example 21

Coating of a Mg Conducting Ceramic with an Mg Electrolyte.

MZP:Fe+MgSiPON.

MZP:Fe green films are placed between α-alumina disks and sintered to 900° C. for 3 h at a ramp rate of 3° C. min$^{-1}$ in air (100 ml min$^{-1}$). MZP:Fe films are dip-coated for 1 min in MgSiPON solution. The resulting coated films are left to dry for 12 h under vacuum at 100° C. Dried samples are then heated up to 400° C./2 h/N$_2$ at a ramp rate of 1° C./min.

Figure 111:
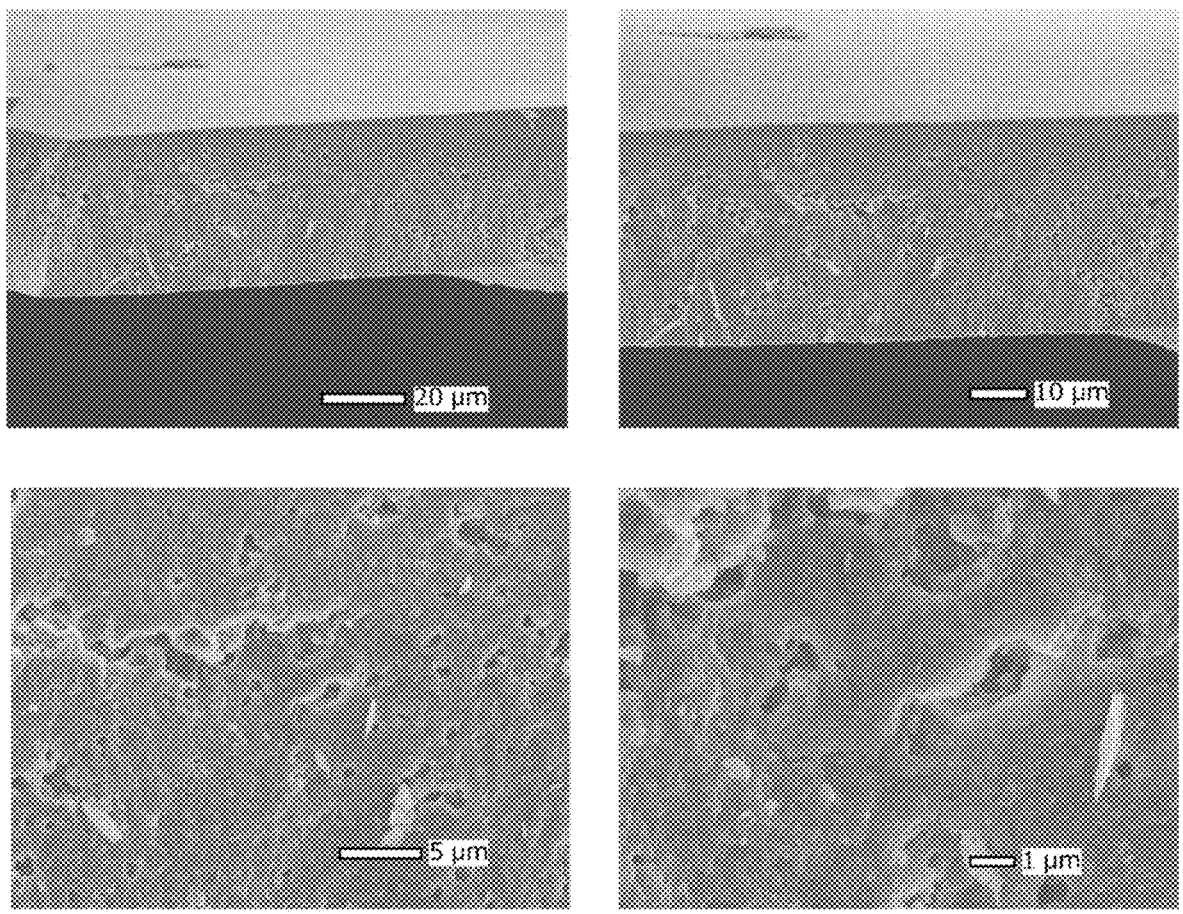
FIG. 111 shows SEM fracture surface images of MZP:Fe+MgSiPON heated to 400° C./2 h/$N_2$.

FIG. 111 shows SEM microstructures of MZP:Fe+MgSiPON heated to 400° C./2 h/N$_2$. There is no clear interface between MZP:Fe substrates and the MgSiPON coating.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of synthesizing a precursor for making a polymer, glass, or ceramic material, the method comprising:
    reacting OPCl$_3$ with NH$_3$ or MNH$_2$, where M is Li, Na, K, Mg, Ca, Ba, or combinations thereof, to form O=P(NH$_2$)$_3$; and either
    i. reacting the O=P(NH$_2$)$_3$ with M1NH$_2$, where M1 is Li, Na, K, Mg, Ca, Ba, or combinations thereof, to form the precursor; or
    ii. heating the O=P(NH$_2$)$_3$ to form a branched or cyclomeric compound; and
    reacting the branched or cyclomeric compound with M1NH$_2$, where M1 is Li, Na, K, Mg, Ca, Ba, or combinations thereof, to form the precursor.

2. The method according to claim 1, wherein the method comprises i. and the reacting the O=P(NH$_2$)$_3$ with the M1NH$_2$ is performed at a temperature of greater than or equal to about −50° C. to less than or equal to about 200° C. to form the precursor as the oligomer.

3. The method according to claim 2, further comprising: heating the oligomer to a temperature greater than or equal to about 40° C. to less than or equal to about 300° C. to increase the molecular weight of the oligomer.

4. The method according to claim 1, wherein the method comprises i. and the reacting the O=P(NH$_2$)$_3$ with the M1NH$_2$ is performed at a temperature of greater than about 20° C. to less than or equal to about 500° C. to form the precursor as the polymer.

5. The method according to claim 4, further comprising:
heating the polymer to a temperature greater than or equal to about 50° C. to less than or equal to about 400° C. to increase the ceramic yield of the polymer.

6. The method according to claim 1, wherein the method comprises ii. and the reacting is performed at a temperature of greater than or equal to about 30° C. to less than or equal to about 150° C.

7. The method according to claim 1, wherein the method comprises ii. and is performed on a surface of, and optionally in pores of, a solid-state battery component selected from the group consisting of a cathode, an anode, a solid electrode, and combinations thereof.

8. The method according to claim 1, wherein the precursor has the formula $M1_aM2_bP_mH_nN_xO_yS_z$, where M1 is Li, Na, K, Mg, Ca, Ba, or combinations thereof; M2 is Al, S, Se, C, Si, Ge, Sn, Zn, or combinations thereof; $1 \leq a \leq 10$; $0 \leq b \leq 10$; $0 \leq m \leq 50$; and $0 \leq n \leq 60$; $0 \leq x \leq 50$; $0 \leq y \leq 20$; and $0 \leq z \leq 20$.

9. The method according to claim 8, wherein the precursor is PON, $Li_xPON$, $Na_xPON$, SiPON, $Li_xSiPON$, $Na_xSiPON$, LiNaSiPON, or MgSiPON, where x is 1, 1.5, 3, or 6.

10. A method of making an ion-conducting polymer-precursor composite material, comprising:
adding the precursor formed according to the method of claim 1 to a solution comprising an ion-conducting polymer and a solvent to form a polymer-precursor solution;
casting the polymer-precursor solution on a plate; and
removing the solvent from the polymer-precursor solution to form the ion-conducting polymer-precursor composite material.

11. The method according to claim 10, wherein the ion-conducting polymer is polyethylene oxide (PEO), polypropylene oxide (PPO), an ion-conducting carboxylate polymer, copolymers thereof, or mixtures thereof.

12. The method according to claim 10, wherein the solvent is acetonitrile.

13. The method according to claim 10, wherein the precursor is PON, $Li_xPON$, $Na_xPON$, SiPON, $Li_xSiPON$, $Na_xSiPON$, LiNaSiPON, or MgSiPON, where x is 1, 1.5, 3, or 6.

14. The method according to claim 10, further comprising:
incorporating the ion-conducting polymer-precursor composite material into a solid-state battery as a solid composite electrolyte.

15. A method of synthesizing a precursor for making a polymer, glass, or ceramic material, the method comprising:
reacting $OPCl_3$ with $NH_3$ or $MNH_2$, where M is Li, Na, K, Mg, Ca, Ba, or combinations thereof, to form $O{=}P(NH_2)_3$, wherein the reacting is performed in a polar, aprotic solvent at a temperature of greater than or equal to about −50° C. to less than or equal to about 200° C.;
and either
i. reacting the $O{=}P(NH_2)_3$ with $M1NH_2$, where M1 is Li, Na, K, Mg, Ca, Ba, or combinations thereof, to form the precursor; or
ii. heating the $O{=}P(NH_2)_3$ to form a branched or cyclomeric compound; and reacting the branched or cyclomeric compound with $M1NH_2$, where M1 is Li, Na, K, Mg, Ca, Ba, or combinations thereof, to form the precursor,
wherein the precursor is an oligomer or a polymer.

16. A method of making a polymer, glass, or ceramic material, the method comprising:
forming a precursor that is an oligomer or polymer by reacting $OPCl_3$ with $NH_3$ or $MNH_2$, where M is Li, Na, K, Mg, Ca, Ba, or combinations thereof, to form $O{=}P(NH_2)_3$; and
either
i. reacting the $O{=}P(NH_2)_3$ with $M1NH_2$, where M1 is Li, Na, K, Mg, Ca, Ba, or combinations thereof, to form the precursor; or
ii. heating the $O{=}P(NH_2)_3$ to form a branched or cyclomeric compound; and reacting the branched or cyclomeric compound with $M1NH_2$, where M1 is Li, Na, K, Mg, Ca, Ba, or combinations thereof, to form the precursor;
heating the precursor to a temperature of greater than or equal to about ambient temperature to less than or equal to about 1000° C. to form the polymer, glass, or ceramic material.

17. The method according to claim 16, further comprising, prior to the heating:
applying the precursor that is an oligomer or polymer to at least a portion of a surface of a battery component selected from the group consisting of a cathode, an anode, a solid electrolyte, and combinations thereof,
wherein the applying is performed by a process selected from the group consisting of doctor blading, spreading, brushing, spin casting, pouring, pipetting, printing, spray coating, dip coating, and combinations thereof.

18. The method according to claim 16, further comprising:
combining the precursor with at least one of an electrode active material, with a separator material, or with a solid-state electrolyte material to generate at least one of a composite electrode material, a composite separator material, or a composite solid-state electrolyte material.

* * * * *

UNITED STATES PATENT AND TRADEMARK OFFICE
CERTIFICATE OF CORRECTION

| | | |
|---|---|---|
| PATENT NO. | : 12,327,871 B2 | Page 1 of 1 |
| APPLICATION NO. | : 17/271244 | |
| DATED | : June 10, 2025 | |
| INVENTOR(S) | : Richard M. Laine et al. | |

It is certified that error appears in the above-identified patent and that said Letters Patent is hereby corrected as shown below:

On the Title Page

At Column 2, (57) Abstract, Line number 4, delete "P(NH2)$_3$," and insert --P(NH$_2$)$_3$,--.

In the Claims

At Column 62, Claim number 16, Line number 20, before "either", delete "¶".

Signed and Sealed this
Fifth Day of August, 2025

Coke Morgan Stewart
*Acting Director of the United States Patent and Trademark Office*